US006650317B1

(12) United States Patent
Boone et al.

(10) Patent No.: US 6,650,317 B1
(45) Date of Patent: Nov. 18, 2003

(54) VARIABLE FUNCTION PROGRAMMED CALCULATOR

(75) Inventors: Gary W Boone, Houston, TX (US); Michael J Cochran, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/369,572

(22) Filed: Jan. 5, 1995

Related U.S. Application Data

(63) Continuation of application No. 08/034,634, filed on Mar. 22, 1993, now abandoned, which is a continuation of application No. 07/846,962, filed on Mar. 6, 1992, now abandoned, which is a continuation of application No. 07/537,214, filed on Jun. 11, 1990, now abandoned, which is a continuation of application No. 07/373,111, filed on Jun. 28, 1989, now abandoned, which is a continuation of application No. 07/097,480, filed on Sep. 15, 1987, now abandoned, which is a division of application No. 06/915,857, filed on Oct. 6, 1986, now abandoned, which is a continuation of application No. 06/750,647, filed on Jun. 28, 1985, now abandoned, which is a continuation of application No. 06/604,404, filed on Apr. 27, 1984, now abandoned, which is a continuation of application No. 06/002,815, filed on Jan. 12, 1979, now abandoned, which is a division of application No. 05/856,932, filed on Dec. 2, 1977, now Pat. No. 4,242,675, which is a continuation of application No. 05/420,999, filed on Dec. 3, 1973, now abandoned, which is a continuation of application No. 05/163,565, filed on Jul. 19, 1971, now abandoned.

(51) Int. Cl.[7] .................................................. G09G 5/00
(52) U.S. Cl. ........................ 345/168; 341/26; 708/100; 708/190
(58) Field of Search ............................... 341/22, 26, 23, 341/24; 178/17, 18; 84/684, 682, 617, 655, 656; 364/709.16, 706, 927; 365/189.07; 395/144; 345/168, 169, 172; 708/100, 190

(56) References Cited

U.S. PATENT DOCUMENTS 2,918,669 A   12/1959 Klein
2,989,729 A    6/1961 Schafer .................. 340/147

(List continued on next page.)

FOREIGN PATENT DOCUMENTS

DE   1549395   5/1967
DE   1255174   11/1967

(List continued on next page.)

OTHER PUBLICATIONS

"Computers and Computing—Past, Present and Future, " *IEEE Spectrum*, Jan. 1968.

(List continued on next page.)

*Primary Examiner*—Amare Mengistu
(74) *Attorney, Agent, or Firm*—Lawrence J. Bassuk; W. James Brady; Frederick J. Telecky, Jr.

(57) ABSTRACT

A variable function calculator utilizes a fixed program memory array such as a programmed read only memory in which a number of programs are stored depending upon the desired functions of the calculator. The calculator also includes a program counter, an instruction register, control decoders, jump-condition circuits, a clock generator, a timing generator, digit and FLAG mask decoders, key input logic, a register and FLAG data storage array, a decimal and FLAG arithmetic logic unit, an output decoder, and a digit scanner which scans both the keyboard and display outputs. Aside from providing basic desk top calculator functions, the read only memory may be programmed so that the system provides metering functions, arithmetic teaching functions, control functions, etc.. A preferred embodiment of the invention is capable of being fabricated as a monolithic integrated semiconductor system utilizing contemporary metal-insulator-semiconductor techniques.

91 Claims, 54 Drawing Sheets

U.S. PATENT DOCUMENTS

| | | | |
|---|---|---|---|
| 3,028,659 A | 4/1962 | Chow | |
| 3,036,773 A | 5/1962 | Brown | 235/157 |
| 3,094,610 A | 6/1963 | Humphrey et al. | 235/157 |
| 3,210,733 A | 10/1965 | Terzian et al. | 340/172.5 |
| 3,231,725 A | 1/1966 | Davis et al. | 235/153 |
| 3,248,711 A | 4/1966 | Lewin | |
| 3,263,219 A | 7/1966 | Brun et al. | 340/172.5 |
| 3,266,023 A | 8/1966 | Werne | 340/72.5 |
| 3,286,239 A | 11/1966 | Thompson et al. | 340/172.5 |
| 3,309,672 A | 3/1967 | Brun et al. | 340/172.5 |
| 3,309,679 A | 3/1967 | Weisbecker | 340/172.5 |
| 3,315,235 A | 4/1967 | Carnevale et al. | 340/172.5 |
| 3,332,071 A | 7/1967 | Goldman et al. | |
| 3,368,205 A | 2/1968 | Hunter et al. | 340/172.5 |
| 3,370,276 A | 2/1968 | Schell, Jr. | 340/172.5 |
| 3,400,259 A | 9/1968 | Maczo | 235/156 |
| 3,415,981 A | 12/1968 | Smith et al. | 340/172.5 X |
| 3,416,139 A | 12/1968 | Marx | 340/172.5 |
| 3,427,445 A | 2/1969 | Dailey | 235/175 |
| 3,430,209 A | 2/1969 | Goshorn et al. | 340/172.5 |
| 3,440,618 A | 4/1969 | Chinlund | 340/172.5 |
| 3,454,310 A | 7/1969 | Wilhelm, Jr. | 238/92 |
| 3,460,094 A | 8/1969 | Pryor | 340/172.5 |
| 3,461,434 A | 8/1969 | Barton et al. | 340/172.5 |
| 3,462,742 A | 8/1969 | Miller et al. | 340/172.5 |
| 3,470,540 A | 9/1969 | Levy | 340/172.5 |
| 3,473,160 A | 10/1969 | Wahlstrom | 340/172.5 |
| 3,492,656 A * | 1/1970 | Volker | 340/711 |
| 3,493,936 A | 2/1970 | Gunderson et al. | 340/172.5 |
| 3,517,171 A | 6/1970 | Avizienis | 340/172.5 X |
| 3,535,683 A | 10/1970 | Woods et al. | 340/172.5 |
| 3,548,172 A | 12/1970 | Centner et al. | 235/151.11 |
| 3,548,382 A | 12/1970 | Lichty et al. | 340/172.5 |
| 3,555,519 A | 1/1971 | Nercessian | 340/172.5 |
| 3,560,933 A | 2/1971 | Schwartz | 340/172.5 |
| 3,560,940 A | 2/1971 | Gaenssien | 340/173 |
| 3,562,714 A | 2/1971 | Miller et al. | 340/172.5 |
| 3,566,097 A | 2/1971 | Hildebrandt | 235/159 |
| 3,566,153 A | 2/1971 | Spencer | 307/205 |
| 3,566,357 A | 2/1971 | Ling | 340/172.5 |
| 3,566,358 A | 2/1971 | Hasbrouck | 340/172.5 |
| 3,571,581 A | 3/1971 | Kaus et al. | 235/153 |
| 3,573,741 A | 4/1971 | Gavril | 340/172.5 |
| 3,576,984 A | 5/1971 | Gregg, Jr. | 235/176 |
| 3,579,192 A | 5/1971 | Rasche et al. | 340/172.5 |
| 3,579,201 A | 5/1971 | Langley | 364/200 |
| 3,582,902 A | 6/1971 | Hirtle et al. | 340/172.5 |
| 3,584,207 A | 6/1971 | Huddinge et al. | 235/175 |
| 3,585,601 A | 6/1971 | Lahrson et al. | 340/172.5 |
| 3,585,607 A | 6/1971 | DeHaan et al. | 340/172.5 |
| 3,588,845 A | 6/1971 | Ling | 340/173 |
| 3,593,313 A | 7/1971 | Tomaszewski et al. | 340/172.5 |
| 3,593,316 A | 7/1971 | Friehand et al. | 340/172.5 |
| 3,596,074 A | 7/1971 | Mitrofenoff | 235/174 |
| 3,596,075 A | 7/1971 | Weeden | 235/175 |
| 3,597,641 A | 8/1971 | Ayres | 307/303 |
| 3,602,901 A | 8/1971 | Dixon et al. | 340/172.5 |
| 3,609,712 A | 9/1971 | Dennard | 340/173 FF |
| 3,610,799 A * | 10/1971 | Watson | 84/617 |
| 3,610,902 A | 10/1971 | Rahenkamp et al. | 235/152 |
| 3,611,437 A | 10/1971 | Varadi et al. | 340/173 SP |
| 3,618,037 A | 11/1971 | Wollum et al. | 340/172.5 |
| 3,623,009 A | 11/1971 | Ragen | 340/172.5 |
| 3,623,082 A * | 11/1971 | Stein et al. | 340/365 S |
| 3,623,156 A | 11/1971 | Osborne | 340/172.5 |
| 3,626,385 A | 12/1971 | Bouman | 340/172.5 |
| 3,633,011 A | 1/1972 | Bederman et al. | 340/172.5 |
| 3,633,180 A | 1/1972 | Pabst | 340/172.5 |
| 3,633,268 A | 1/1972 | Engbert | |
| 3,638,197 A | 1/1972 | Brennan, Jr. et al. | 340/172.5 |
| 3,641,501 A | 2/1972 | Lloyd et al. | 340/172.5 |
| 3,641,511 A | 2/1972 | Cricchi et al. | 340/173 R |
| 3,646,522 A | 2/1972 | Furman et al. | 340/172.5 |
| 3,648,246 A | 3/1972 | Zurla | 340/172.5 |
| 3,651,484 A | 3/1972 | Smeallie | 364/200 |
| 3,657,529 A | 4/1972 | Hamano | 235/159 |
| 3,657,706 A | 4/1972 | Horgan et al. | 340/172.5 |
| 3,659,275 A | 4/1972 | Marshall | 340/172.5 X |
| 3,662,346 A | 5/1972 | Tada | 340/172.5 |
| 3,668,653 A | 6/1972 | Fair et al. | 340/172.5 |
| 3,671,727 A | 6/1972 | Rhoades | 235/151.11 |
| 3,673,576 A | 6/1972 | Donaldson, Jr. | 340/172.5 |
| 3,673,577 A | 6/1972 | Edstrom et al. | 340/172.5 |
| 3,675,213 A | 7/1972 | Spangler | 340/172.5 |
| 3,676,656 A | 7/1972 | Schmidt | 364/900 X |
| 3,680,054 A | 7/1972 | Bunker et al. | 340/172.5 |
| 3,681,755 A | 8/1972 | Stone et al. | 340/172.5 |
| 3,681,757 A | 8/1972 | Allen et al. | 340/172.5 |
| 3,683,371 A | 8/1972 | Holtz | 340/365 |
| 3,686,637 A | 8/1972 | Zachar et al. | |
| 3,702,988 A | 11/1972 | Haney et al. | 340/172.5 |
| 3,704,454 A | 11/1972 | McCoy et al. | 340/173 SP |
| 3,710,326 A | 1/1973 | Nezu et al. | 340/172.5 |
| 3,715,416 A | 2/1973 | Campbell et al. | 264/39 |
| 3,715,746 A * | 2/1973 | Hatano | 340/711 X |
| 3,717,871 A | 2/1973 | Hatano et al. | 340/365 E |
| 3,720,820 A | 3/1973 | Cochran | 340/172.5 |
| 3,725,873 A | 4/1973 | Hare | 340/172.5 |
| 3,728,710 A | 4/1973 | Berg | 340/172.5 X |
| 3,733,588 A | 5/1973 | Conn | 340/172.5 |
| 3,745,536 A * | 7/1973 | Klehm | 341/26 X |
| 3,753,007 A * | 8/1973 | Viswanathan | 341/24 X |
| 3,757,306 A | 9/1973 | Boone | 340/172.5 |
| 3,757,308 A | 9/1973 | Fosdick | 340/172.5 |
| 3,760,370 A | 9/1973 | Cochran | 340/172.5 |
| 3,760,375 A | 9/1973 | Irwin et al. | 340/172.5 |
| 3,761,918 A | 9/1973 | Hatano et al. | 340/365 E |
| 3,800,129 A | 3/1974 | Umstattd | 235/156 |
| 3,859,635 A | 1/1975 | Watson et al. | 340/172.5 |
| 3,951,028 A * | 4/1976 | Robinson | 84/682 X |
| 3,976,975 A | 8/1976 | Cochran | 340/172.5 |
| 4,001,566 A | 1/1977 | Stevenson | 235/159 |
| 4,014,013 A | 3/1977 | McElroy | 340/336 |
| 4,016,540 A | 4/1977 | Hyatt | 340/172.5 |
| 4,037,094 A | 7/1977 | Vandierendonck | 235/175 |
| 4,037,202 A | 7/1977 | Terzian | 364/200 |
| 4,074,351 A | 2/1978 | Boone et al. | 364/200 |
| 4,087,855 A | 5/1978 | Bennet et al. | 364/200 |
| 4,152,769 A | 5/1979 | Olander, Jr. et al. | 364/709 |
| 4,152,771 A | 5/1979 | Olander, Jr. et al. | 364/710 |
| 4,225,934 A | 9/1980 | Vandierendonck | 364/716 |
| 4,326,265 A | 4/1982 | Boone | 364/900 |
| 4,370,709 A | 1/1983 | Fosdick | 346/200 |
| 4,463,421 A | 7/1984 | Laws | 364/200 |
| 4,471,460 A | 9/1984 | Boone | 364/900 |
| 4,471,461 A | 9/1984 | Boone | 364/900 |
| 4,485,455 A | 11/1984 | Boone et al. | 364/900 |
| 4,825,364 A | 4/1989 | Hyatt | |
| 4,829,419 A | 5/1989 | Hyatt | |
| 4,866,718 A | 9/1989 | Fosdick | 371/40.1 |
| 4,942,516 A | 7/1990 | Hyatt | 364/200 |

FOREIGN PATENT DOCUMENTS

| | | |
|---|---|---|
| DE | 1282337 | 11/1968 |
| DE | 1297910 | 6/1969 |
| DE | 1965830 | 12/1969 |
| DE | 2014325 | 5/1970 |
| FR | 1567047 | 5/1969 |
| GB | 1042785 | 9/1966 |
| GB | 1172842 | 12/1969 |
| GB | 1172844 | 12/1969 |

| | | |
|---|---|---|
| GB | 1172845 | 12/1969 |
| GB | 1172846 | 12/1969 |
| GB | 1195268 | 6/1970 |
| GB | 1198084 | 7/1970 |
| GB | 1241983 | 8/1971 |
| GB | 1253177 | 11/1971 |
| JP | 45-6476 | 3/1970 |

OTHER PUBLICATIONS

"Moore's Law Meets MIPS," *Byte*, Feb. 1992, vol. 17, No. 2, p. 125.

*Fairchild Semiconductor Integrated Circuit Data Catalog*, 1970 (Fairchild Semiconductor 1969) referencing the Fairchild 3250, the Fairchild 3804 and the Fairchild 3800.

Burks et al. [1946], "Preliminary discussion of the logical design of an electronic computing instrument," Report to the U.S. Army Ordinance Department, p. 1; also appears in *Papers of John von Neumann*, W. Aspray and A. Burks, eds., The MIT Press, Cambridge, Mass. and Tomash Publishers, Los Angeles, Calif., 1987, 97–146.

Chu, *Digital Computer Design Fundamentals*, McGraw Hill, New York, 1962.

Cohen et al, "MTOS Four Phase Clock Systems", Nov. 1967, Reprinted from NEREM Record 1967, vol. 9, *IEEE* Catalog No. F–85.

Intel Corporation, *8–Bit Embedded Controller Handbook, Architectural Overview of the MCS–51 Family of Microcontrollers*, Sep. 1989, pp. 5–1–5–21.

Ledley, *Digital Computer and Control Engineering*, McGraw Hill, 1960.

Miller, "'Moore's Law' Holds True For New Generation Of Processor," *InfoWorld*, Apr. 17, 1989, pp. 71.

Morse et al., "Intel Microprocessors—8008 to 8086," *IEEE Computer*, Oct. 1980, pp. 42–60.

Everett, "The Whirlwind I Computer", *Review of Electronic Digital Computers, Joint Computers American Institute of Electrical Engineers—Institute of Radio Engineers Conference*, Feb., 1952, pp. 70–74.

Viatron Coputer Systems Corporation, "Yes, Virginia there is a System 21", *Computerworld*, Oct. 8, 1969.

Canon X, Canon Y and Canon 160 Series Calculator Chip Sets. Nov. 7, 1970.

Digital Equipment Corporation, *Control Handbook*, 1968, 1969.

Microdata Corporation, *Microprogramming Handbook, Second Edition*, 1971.

AEG–Telefunken–Handbuch, vol. 6, "Einfuhrung in die Methoden der Digitaltechnik", 1970.

Dworatschek, "Einfuhrung in die Datenverarbeitung", 1970.

Knupfer, "Technik Digitaler Rechenanlagen", 1969.

Lexikon der Datenverarbeitung, 1969.

Steinbuch, "Taschenbuch der Nachrichtenverarbeitung", 2nd Edition, 1967, pp. 996–999.

Asada et al., "Application Of ELSIs To Electronic Desk–Tip Calculator," *Japan Electronic Engineering*, Mar. 1970, pp. 25–29.

Atley, "LSI Poses Dilemma For Systems Designers," *Electronic Design*, Feb. 1, 1970.

Beelitz et al., "System Architecture For Large–Scale Integration," *Fall Joint Computer Conference*, 1967, pp. 185–200.

Boysel, *Fairchild Marketing Sheet, LSI MOS Subsystem Development Section*, 1967.

Boysel et al., "Random Access MOS Memory Packs More Bits To The Chip," *Electronics*, Feb. 16, 1970.

Boysel, "Adder On A Chip: LSI Helps Reduce Cost Of Small Machine," *Electronics*, Mar. 18, 1968.

Boysel, "Cutting Systems Costs With MOS," *Electronics*, Jan. 20, 1969.

Boysel et al., "Four–Phase LSI Logic Offers New Approach To Computer Designer," *Computer Design*, vol. 9, No. 4, pp. 141–146, Apr. 1970.

Boysel, *Fairchild Semiconductor Integrated Circuit Data Catalog*, 1970 (Fairchild Semiconductor 1969) referencing the Fairchild 3250, the Fairchild 3804 and the Fairchild 3800.

Boysel, "Four–Phase Logic," *Chilton's The Electronic Engineer*, Mar. 1970.

Cochran, "Internal Programming Of The 9100A Calculator", *Hewlett–Packard Journal*, vol. 20, No. 1, pp. 14–16, Sep. 1968.

"'CPU On A Chip' Goes Public," including a photograph of Intel 4004 processor on a chip, *Electronics*, May 1971.

"8–bit Parallel Processor Rev. 1" Schematic, May 19, 1970.

"Calculator–On–A–Chip—NOW!," *Electronic Products*, Mar. 1, 1971, p. 42.

"Computers and Computing—Past, Present and Future," *IEEE Spectrum*, Jan. 1968.

"CPU Chip Turns Terminal Into Stand–Alone Machine," *Electronics*, Jun. 7, 1971, pp. 36–37.

"CTC CPU Preliminary Description, "Mar. 9, 1970.

IBM 7090 Data Processing System Reference Manual—A22–6528, Aug. 1961, pp. 609 and 74–76 (Reviewed Appendix A).

"Keyboard Encoder," *Electronic Engineering*, Sep. 1970, p. 96.

"Market For Microminiature Desk–Top Calculators Expanding," *Japan Electronic Engineering*, Mar. 1971, pp. 66–67.

"Moore's Law Meets MIPS," *Byte*, Feb. 1'992, vol. 17, No. 2, p. 125.

"Mostek Puts Calculator On One Chip," *Electronic News*, Feb. 1, 1971, p. 25.

"Mostek Puts Calculator On One Chip," *Electronic News*, p. 125, Feb. 1, 1971.

"One–Chip Calculator Introduced," *Electronic Equipment Engineering*, Mar. 1971, p. 28.

"Preliminary Description Business Terminal Assembler," Dec., 1969.

"Single–Chip Calculator Hits The Finish Line," *Electronics*, Feb. 20, 1971 [MNP5000224–223].

"The One–Chip Calculator Is Here, And It's Only The Beginning," *Electronic Design*, p. 34, Feb. 18, 1971.

Alaspa et al., "COS/MOS Parallel Processor Array," *IEEE Journal of Solid State Circuits*, vol. SC–5. No. 5, Oct. 1970.

*Computer Structure: Readings and Examples*, 1971.

Cook et al., "System Design Of A Dynamic Microprocessor," *IEEE Transactions On Computers*, vol. C–19, No. 3, Mar. 1970, pp. 213–222.

*Data Point 2200 Assembler Manual*, Feb. 19, 1970, pp. 1–6 and Appendices.

deAtley, "Can You Build A System With Off–The–Shelf–LSI?,", *Electronic Design 5*, pp. 46–51, Mar. 1, 1970.

Dingwall, "High–Yield Processing For Fixed–Interconect," *IEEE Transactions On Electron Devices*, vol. ED–15, No. 9, Sep. 1968, pp. 631–637.

Documents produced as exhibits to the deposition of George Earley Stevenson.

Documents produced at the deposition of David Cochran in Dell V. TI relating to work performed at Rockwell [MNP 012086–012552].

*Electronic Design*, Feb. 18, 1971, p. 34 (See Appendix A list for review).

*Electronics* (Moore's Law) (35th Anniversary Ed.) 1965.

Faggin et al., "The MCS–4—An LSI Micro Computer System," *IEEE '72 Region Six Conference*, Intel Corporation, pp. 1–6.

Fairchild Semiconductor, "PPS25 Programmed Processor System Preliminary Users Manual," Oct. 25, 1972, pp. 1–39.

Fairchild Semiconductor publication regarding 3800 8–B Parallel Accumulator, MOS Integrated Circuit, Fairchild Semiconductor, 1968.

Fairchild, "3800/3804 Bit Slice Processor," 1968.

Fields, "Six MOS Chips Equal One Calculator," *Electronics*, Jul. 20, 1970, pp. 122–123.

Fields et al. "U.S. Firms Gird For Calculator Battle," *Electronics*, Nov. 23, 1970.

Gurski et al., "THAM 4,5: An Approach To Small Machine Design In Large–Scale Integration," *International Solid–State Circuits Conference*, Feb. 15, 1968, pp. 46–47.

Heath, "Large–Scale Integration in Electronics," *Scientific American*, Mar., 1970.

Hoff, "Impact of LSI On Future Minicomputers," *1970 IEEE International Convention Digest*, Mar. 1970.

*IEEE Digest*, Mar. 1970, p. 285.

Intel, "1201 Preliminary Functional Specification,", May 25, 1970.

Intel Corporation, *8008 8 Bit Parallel Processor Unit Users Manual*, Mar. 1973.

Larson et al., "Interfacing Man, Computer, and Process: A User–Designed Operator Console," *Progress In Direct Digital Control; A Compilation of Articles*, Instrument Society of America publication, Pittsburgh, 1969.

Ledley, *Digital Computer and Central Engineering*, McGraw Hill, 1969.

Lesniewski, "A Large–Scale Integration (LSI) Computer Concept Utilizing Only Five Types of General–Purpose Arrays," Masters Thesis, 1970.

Levy et al., "System Utilization Of Large–Scale Integration," *IEEE Transactions On Electronic Computers*, vol. EC–16, No. 5, Oct. 1967, pp. 562–566.

Lucas, "An Accumulator Chip," *IEEE Transactions On Computers*, vol. C–18, No. 2, Feb. 1969, pp. 105–114.

Monnier, "A New Electronic Calculator With Computerlike Capabilities," *Hewlett–Packard Journal*, vol. 20, No. 1, pp. 3–9, Sep. 1968.

Morse et al., "Intel Microprocessors—8008 to 8086," *Computer*, Oct. 1960, pp. 42 and 59.

Osborne, "Hardware Design Of The Model 9100A Calculator," *Hewlett–Packard Journal*, vol. 20, No. 1, pp. 10–13, Sep. 1968.

Petritz, "Technological Foundations And Future Directions Of Large–Scale Integrated Electronics," *AFIPS Conference Proceedings*, vol. 29, Nov. 10, 1966.

Petriz, "Current State of Large Scale Integration Technology,", 1967.

Prior invention in the United States by Shima and Intel of scanning keyboard and single–chip processor in Feb., 1971.

Prior knowledge in the United States and prior invention by George Stevenson of the single–chip calculator disclosed in Svenenson Patent No. 4,001,566.

Prior invention and sale of scanning keyboard and processor chip set in Fairchild PPS–25.

Prior invention by Seymour Greenfield and prior sale of the Viatron 2140/2150 computer terminal including the CP–01 single–chip processor.

Prior invention and sale by RCA to NASA of a single–chip microprocessor described in "Monolithic Parallel Processor" published prior to Dec. 10, 1970.

Prior invention and offer for sale of the Intel 4004 CPU and MCS–4 microprocessor by Intel engineers Marcian ("Ted") Hoff, Stanley Mazor and Federico Faggin.

Reference Manual—IBM 7090 Data Processing System–A22–6528–3, Aug. 1961, pp. 609 and 74.

*Review of Electronic Digital Computers, Joint Computers American Institute of Electrical Engineers—Institute of Radio Engineers Conference*, Feb., 1952, pp. 70–74.

Rice, "LSI And Computer System Architecture," *Computer Design*, Dec. 1970, pp. 57–63.

Rosen, "Electronic Computers: A Historical Survey," *computing Surveys*, vol. 1, No. 1, pp. 7–36, Mar. 1969.

Rudenberg, "Approaching The Minicomputer On A Silicon Chip—Progress And Expectations For LSI Circuits," *AFIPS Conference Proceedings, 1972 Spring Joint Computer Conference*, May 16–18, 1972.

Sack et al., "Evolution Of The Concept Of A Computer On A Slice," *IEEE* 1964, pp. 1713–1720.

Sarubbi et al, "Manual Controls For A Read–Only Store Controlled Computer," *IBM Technical Disclosure Bulletin*, Jan. 1965, pp. 666–668.

Smith, "Impact Of LSI On Micro Computer And Calculator Chips," Reprinted from NEREM 72 Record; copyright 1972 by the Boston Section of the IEEE.

Terry et al., "Tiny Japan Calculators Coming,", *Electronic News*, Feb. 8, 1971, p. 38.

Texas Instruments, "64–Key Dynamic MOS Keyboard Encoder," *Report No. 30–70–132*, 1970, pp. 1–11.

Texas Instruments, "MOS Keyboard Encoders General Considerations," *Report No. 03–70–131*, 1970, pp. 1–8.

van Barneveld, "'Large–Scale Integration' in MOS–technieken," *De Ingenieur*, Jul. 9, 1971, pp. 94–97.

vonNeumann, "First Draft Of A Report On Edvac," 1945.

Weinberger, "Large Scale Integration of MOS Complex Logic: A Layout Method," *IEEE Journal Of Solid–State Circuits*, vol. SC–2, No. 4, Dec. 1967, pp. 182–190.

Electronic News, "Mostek Puts Calculator on One Chip", Feb. 1, 1971, p. 25.

Electronic Engineering, "Keyboard Encoder", Fairchild Semiconductor, Sep. 1970, p. 96.

Fairchild Semiconductor, "If You Want Better Designs, Use Fewer Components", EEE, May 1969, pp. 24–25.

Fields, Stephen Wm., "Six MOS Chips Equal One Calculator", Electronics, Jul. 20, 1970, pp. 122–123.

Hoff, Marcian Edward, Deposition transcript pp. 1–315 and exhibits 1–65, Texas Instruments Incorporated vs. Zenith Electronics Corporation and Zenith Data Systems, No. 3–89–2960–R, United States District Court, Northern District of Texas, Dallas Division, Aug. 20 and 21, 1990.

Intel Corporation, *8008 8 Bit Parallel Central Processor Unit Users Manual*, Mar. 1973.

Intel Corporation, *MCS–4 Micro Computer Set Users Manual*, Mar. 1972.

Mazor, Stanley Deposition transcript pp. 1–262 and exhibits 1–93, Texas Instruments Incorporated vs. Zenith Electronics Corporation and Zenith Data Systems, No. 3–89–2960–R, United States District Court, Northern District of Texas, Dallas Division, Oct. 30 & 31, 1990.
Philips Product News, "Integrating Desk Calculators The EDC100 MOS Set", Apr. 1971, pp. 1–14.
Sarubbi, J. A. et al., "Manual Controls for a Read–Only Store Controlled Computer", IBM Technical Disclosure Bulletin, vol. 7, No. 8, Jan. 1965, pp. 666–668.
Stevenson, George E., Deposition transcript pp. 1–282 and exhibits 505, 511 and unnumbered photo of chip, Grid Systems Corporation and Tandy Corporation vs. Texas Instruments Incorporated et al., C–90–2571–DLJ, United States District Court For The Nothern District of California, Sep. 14, 1992.
Texas Instruments, Report No. 30–70–132, "64–Key Dynamic MOS Keyboard Encoder", 1970, pp. 1–11.
Texas Instruments, Report No. 30–70–131, "MOS Keyboard Encoders General Considerations", 1970.
Texas Instruments, "MOS/LSI TMS 1802 NC One–Chip Calculator Circuit", Bulletin CB–143, Sep., 1971, 21 pps.
Hewlett Packard, "An Introduction to HP Computers", Apr. 1970.
Faggin, Federico, Deposition transcript pp. 1–153 and exhibits 1–20, Texas Instruments Incorporated vs. Zenith Electronics Corporation and Zenith Data Systems, No. 3–89–2960–R, United States District Court, Northern District of Texas, Dallas Division, Nov. 2, 1990.
Feeney, Harold, Deposition transcript pp. 1–153 and exhibits 1–35, Texas Instruments Incorporated vs. Zenith Electronics Corporation and Zenith Data Systems, No. 3–89–2960–R, United States District Court, Northern District of Texas, Dallas Division, Nov. 1, 1990.
Instrument Society of America; "Progress in Direct Digital Control"; Pittsburgh, 1969; Larsen, et al.; pp. 158–164; A User–Designed Operator Console.
Fairchild semiconductor PPS25 programmed processor system preliminary users manual Oct. 25, 1972, pp. 1–39.
Alaspa et al.; COS/MOS Parallel Processor Array; IEEE Journal of Solid State Circuits, Oct. 1970.
Beelitz et al; System Architecture for Large–Scale Integration; AFIPS Conference Proceedings; Nov. 1967.
Bohn; Variable Size LSI Arrays Using Customized Uni–Cells NEREM Record, 1967.
Boysel; Adder on a Chip: LSI Helps Reduce Cost of Small Machine; Electronics; Mar. 1968.
Boysel; Memory on a Chip: A Step Toward Large Scale Integration; Electronics; Feb. 1967.
Buchholz; Computer Controlled Audio Output; IBM Bulletin; Oct. 1960.
Calhoun et al.; A Means of Reducing Custom LSI Interconnection Requirements; IEEE Journal of Solid State Circuits, Oct. 1972.
Chapman; Prospectives in Voice Response from Computers; Proceedings of the International Conference on Comm; 1970.
D'Agostine; A Flexible Approach to Emitter–Coupled Logic Arrays; International Solid State Circuits Conference, Feb. 15, 1968.
Dingwall; High–Yield Processing for Fixed–Interconnect Large–Scale Integrated Arrays; IEEE Transactions on Electron Devices, Sep. 1968.

Dunn et al.; At Last, A Bioplar Shift Register with the Same Bit Capacity as MOS; Electronics, Dec. 8, 1969.
Electronic Arrays Inc.; Electronics, Nov. 23, 1970.
Electronic Arrays Inc.; Electronics, Feb. 16, 1970.
Fabricated Fourth Generation Computer; AFIPS Conference Proceedings; Dec. 1968.
Flanagan et al; Synthetic Voices for Computers; IEEE Spectrum; Oct. 1970.
Freitag, Design Automation for Large Scale Integration; Westcon, Aug. 1966.
Freitag; Automatic Mask Generation for Integrated Circuits: NEREM Record, 1966.
Frohman–Bentchkowsky et al; Silicon Gate MOS Technology and its Memory Applications; Westcon, Aug. 1970.
Gross et al; Computer Systems for Pattern Generator Control; Bell System Technical Journal, Nov. 1970.
Heath; Large–Scale Integration in Electronics; Scientific American, Feb. 1970.
Hochman et al; Technological Advances in Large Scale Integration; IEEE Spectrum, May 1970.
Hopkins; Electronic Navigator Charts Man's Path to the Moon; Electronics; Jan. 1967.
Hovik; Microprogramming; Electronic Prod. Mag.; Apr. 1971.
Hudson; The Applications and Implications of Large Scale Integration; Computer Design; Jun. 1968.
Hughes Aircraft; Electronics, Dec. 7, 1970.
IBM 7094 Data Processing System; Form No. A2–2–6703; Oct. 21, 1966.
Intel; Electronics, Jan. 5, 1970.
Koster; A Stored Program Display Console: Bunker Ramo Model 90; Sixth National Symposium on Information Display; Sep. 1965.
Lathrop; Discretionary Wiring Approach to Large Scale Integration; Westcon, Aug. 1966.
Levy et al.; System Utilization of Large Scale Integration; IEEE Transactions on Electronic Computers; Oct. 1967.
Marvin et al; Customizing by Interconnection; Electronics, Feb. 20, 1967.
Matthews; The Digital Computer as a Musical Instrument; Science; Nov. 1963.
Mend et al; Microminiature Solid–State Imaging System Utilizing Hybrid LSI Techniques; IEEE Journal of Solid State Circuits, Oct. 1970.
Monolithic Memories Inc.; Electronics, May 24, 1971.
Penisten; Impact of LSI Technology on the Electronics Market; Design Interface Seminar, Mar. 28, 1969.
Philco; Electronics, Jan. 19, 1970.
Philco; Electronics, Apr. 27, 1970.
Rice; LSI and Computer System Architecture; Computer Design; Dec. 1970.
Rosenfeld; Computer Assisted Mask Production; IEEE Proceedings, Sep. 1969.
Rudenberg; Large Scale Integration: Promises Versus Accomplishments—The Dilemma of Our Industry; Fall Joint Computer Conference, 1969.
Schischa et al; System Design as Influenced by Large Scale Integration; NEREM Record, 1967.
Sirkin et al; Microprogramming Made Easy–With a 4,096–bit Bipolar ROM; Electronics, Mar. 15, 1971.
Solitron Devices Inc.; Electronics, Mar. 30, 1970.
Texas Instruments Incorporated; Electronics, Sep. 14, 1970.
Thomas; Computer Generated Intraconnections For LSI; National Electonics Conference, 1968.

Thorton; LSI Subsystems Assembled by the Silicon Wafer–Chip Technique; International Solid State Circuits Conference, Feb. 15, 1968.

Ulrickson; Computed Aided LSI Design; Wescon, Aug. 1969.

Unisem; Electronics, Nov. 23, 1970.

Weitzman; Voice Recognition and Response Systems; Datamation; Dec. 1969.

van Barneveld, E. J., "'Large–Scale Integration' in MOS–Technieken", De Ingenieur, vol. 83, No. 27, Jul. 9, 1971, pp. 94–97.

Wilkes, M. V. et al., "Micro–Programming and the Design of the Control Circuits in an Electronic Digital Computer", Proceedings of the Cambridge Philosophical Society, Science Museum Library, London, Jan. 27, 1953, pp. 230–238.

Asada, Atsushi et al., "Application of ELSIs to Electronic Desk–Top Calculator", Japan Electronic Engineering, Mar. 1970, pp. 24–29.

Bell et al., "Computer Structures—Readings and Examples", pp. 243–256, 1971.

Boysel, Lee L., et al., "Four–Phase LSI Logic Offers New Approach to Computer Designer", Computer Design, Apr. 1970, pp. 141–146.

Cochran, David S., "Internal Programming of the 9100A Calculator", Hewlett–Packard Journal, Sep. 1968, vol. 20, No. 1, pp. 14–16.

Cook, Robert W. et al., "System Design of a Dynamic Microprocessor", IEEE Transactions on Computers, vol. C–19, No. 3, Mar. 1970, pp. 213–222.

Crawford, Robert H., "MOSFET in Circuit Design", McGraw Hill, 1967, pp. 113–118.

Curran, Lawrence, "Autonetics Arrays Its MOS Forces", Electronics, Apr. 28, 1969, pp. 103–109.

de Atley, Elizabeth, "LSI Poses Dilemma For Systems Designers", Electronic Design 3, Feb. 1, 1970, pp. 44–52.

de Atley, Elizabeth, "Can You Build a System With Off–The–Shelf LSI?", Electronic Design 5, Mar. 1, 1970, pp. 46–51.

EEE, "New Semiconductor Concepts Simplify Pocket Calculator", Jun. 1970, pp. 26–30.

EEE, "One–Chip Calculator Introduced", Mar. 1971, p. 28.

Electronic Design, "The One–Chip Calculator is Here, and It's Only the Beginning", Feb. 18, 1971, p. 34.

Electronic Material, Jan. 1971, pp. 63–67.

Electronic Material, May 1971, pp. 91–95.

Electronics, "CPU Chip Turns Terminal Into Stand–Alone Machine", Jun. 7, 1971, pp. 36–37.

Fairchild Semiconductor, "3800 8 Bit Parallel Accumulator–MOS Integrated Circuit", May 1968, pp. 1–6.

Gurski, C. S. et al., "An Approach to Small Machine Design in Large–Scale Integration", ISSCC, Feb. 1968, pp. 46–47.

Hitachi Hyoron, "System Design of LSI Desk Top Calculator", vol. 52, No. 9, 1970, pp. 858–863.

Hoff, Marcian E. Jr., "Impact of LSI on Future Minicomputers", IEEE International Convention Digest, Mar. 1970, pp. 284–285.

IBM 7090 Data Processing System Reference Manual–A22–6528–3, Aug. 1961, pp. 6–9 and 74–76.

Japan Electronic Engineering, "Market for Microminiature Desk–Top Calculators Expanding", Mar. 1971, pp. 66–67.

Larsen, M. J. et al., "Interfacing Man, Computer, and Process: A User–Designed Operator Console", Instrument Society of America, Progress in Direct Digital Control, Pittsburgh, 1969.

Monnier, Richard, "A New Electronic Calculator With Computerlike Capabilities", Hewlett–Packard Journal, Sep. 1968, vol. 20 , No. 1, pp. 3–9.

Moore, Gordon E., "Cramming More Components Onto Integrated Circuits", Electronics, Ap. 19, 1965, pp. 114–117.

Near, Charles W., "Computer–Testing the HP Model 9100A Calculator", Hewlett–Packard Journal, Sep. 1968 pp. 17–19.

Near, Charles W. et al., "Read–Only Memory Adds to Calculator's Repertoire", Electronics, Feb. 3, 1969, pp. 70–77.

Nikkei Electronics, Jun. 7, 1971, pp. 50–54.

Nikkei Electronics, Jul. 5, 1971, p. 22.

Nikkei Electronics, Jul. 5, 1971, p. 88.

Oliver, Bernard M., "How the Model 9100A Was Developed" Hewlett–Packard Journal, Sep. 1968, vol. 20, No. 1, page unnumbered.

Osborne, Thomas E., "Hardware Design of the Model 9100A Calculator", Hewlett–Packard Journal, Sep. 1968, vol. 20, No. 1, pp. 10–13.

Petritz, Richard L., "Technological Foundations and Future Directions of Large–Scale Integrated Electronics", AFIPS, Proceedings–Fall Joint Computer Conference, vol. 29, 1966, pp. 65–87.

Reiss et al., "Integrierte Digitalbausteine", Simens AG 1970, p. 103, partial translation.

Ribeiro, S., "Talking to the Minicomputer", IEEE Transactions on Industrial Electronics and Control Instrumentation, vol. IECI–18, No. 2, May 1971, pp. 67–72.

Rosen, Saul, "Electronic Computers: A Historical Survey", Computing Surveys, vol. 1, No. 1, Mar. 1969, pp. 7–36.

Sack, E. A. et al., "Evolution of the Concept of a Computer on a Slice", Proceedings of the IEEE, Dec. 1964, pp. 1713–1720.

Shergalis, Laurence D., "The HP Model 9100A Computing Calculator", Hewlett–Packard Journal, Sep., 1968, p. 2.

Solid–State Circuit Handbook, Issued Jul. 10, 1971, pp. 923–925.

Terry, E. C. et al., "Tina Japan Calculators Coming", Electronic News, Feb. 8, 1971, p. 38.

Feeney, Harold, Deposition transcript pp 1–98 and exhibits 36–42, Texas Instruments Incorporated vs. Zenith Electronics Corporation and Zenith Data Systems, No. 3–89–2960–R, United States District Court, Northern District of Texas, Dallas Division, Dec. 18, 1992.

Mazor, Stanley, "CTC CPU Preliminary Decription", handwritten, Mar. 4 or 9, 1970.

Mazor, Stanley, Deposition transcript pp 1–114 and exhibits 850–858, Grid Systems Corporation and Tandy Corporation vs. Texas Instruments Incorporated et al., C–90–2571–DLJ, United States District Court For The Northern District of California, Sep. 23, 1992.

Micheletti, William J., Laboratory and engineering Notebook, Title page, Information page, Index page and pp. 1–4, dated Apr. 15, 1970 and May 27, 1970.

"8 Bit Parallel Processor", photoreduction of four pages, dated Apr. 27, 1970, Rev. 1, May 19, 1970, carrying handwritten name of Jim Kantowski.

Fairchild Semiconductor, "If you want Better Designs", EEE, May 1969, pp. 24–25.*

* cited by examiner

| FIG. 17A | FIG. 17B | FIG. 17C | FIG. 17D |
| --- | --- | --- | --- |
| FIG. 17E | FIG. 17F | FIG. 17G | FIG. 17H |
| FIG. 17I | FIG. 17J | FIG. 17K | FIG. 17L |
| FIG. 17M | FIG. 17N | FIG. 17O | FIG. 17P |
| FIG. 17Q | FIG. 17R | FIG. 17S | FIG. 17T |
| FIG. 17U | FIG. 17V | FIG. 17W | FIG. 17X |
| | FIG. 17Y | FIG. 17Z | |

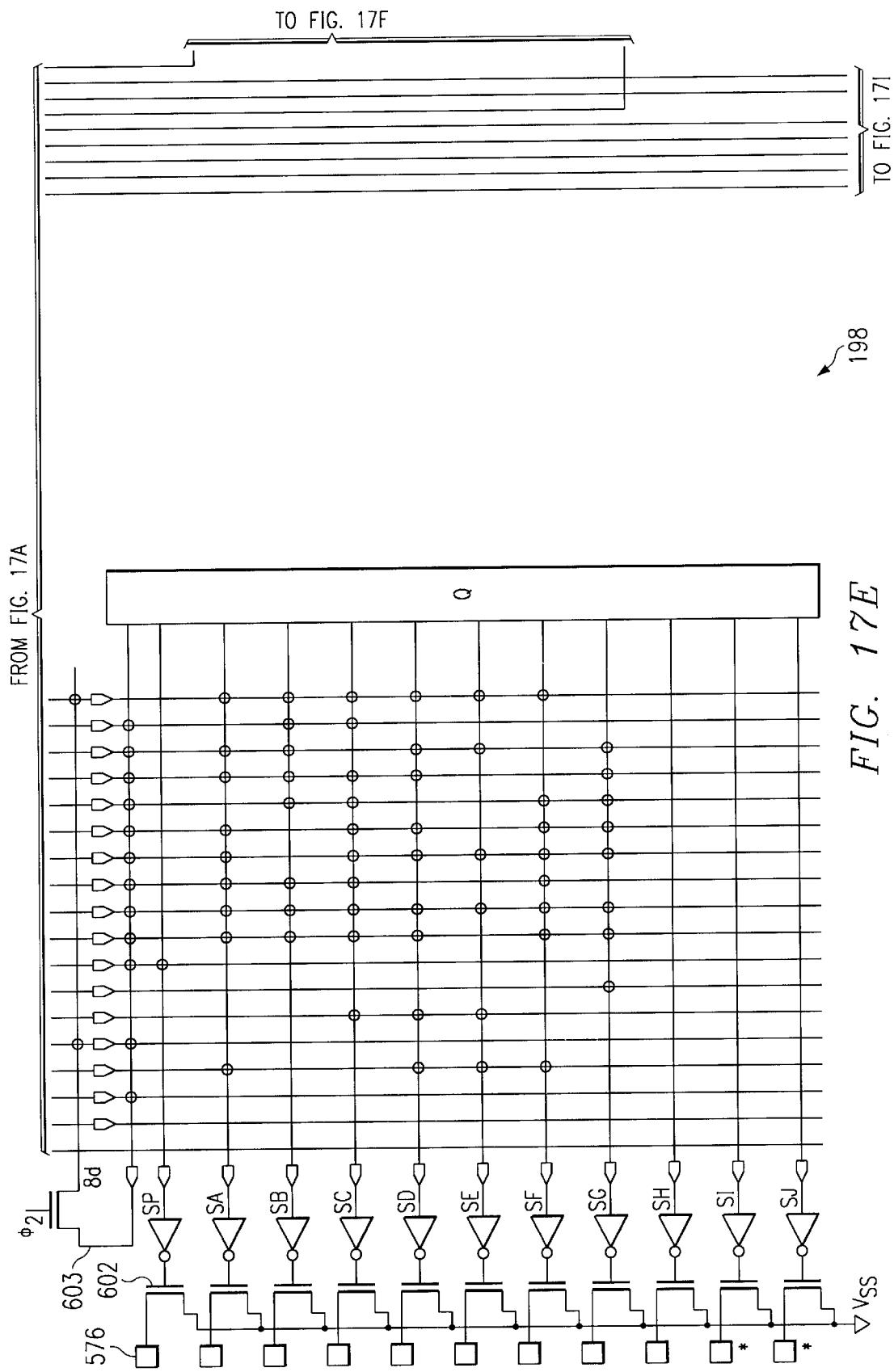

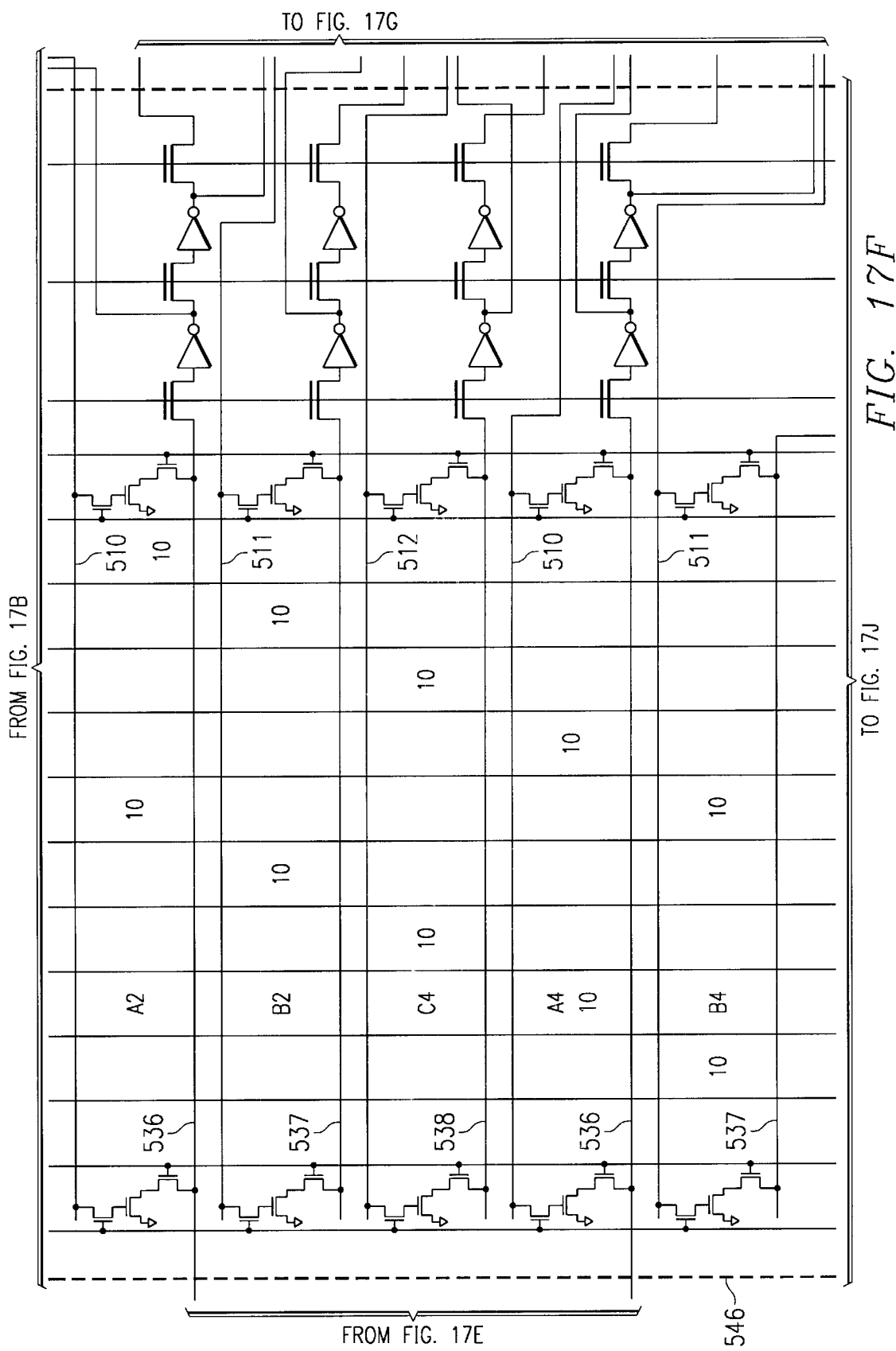

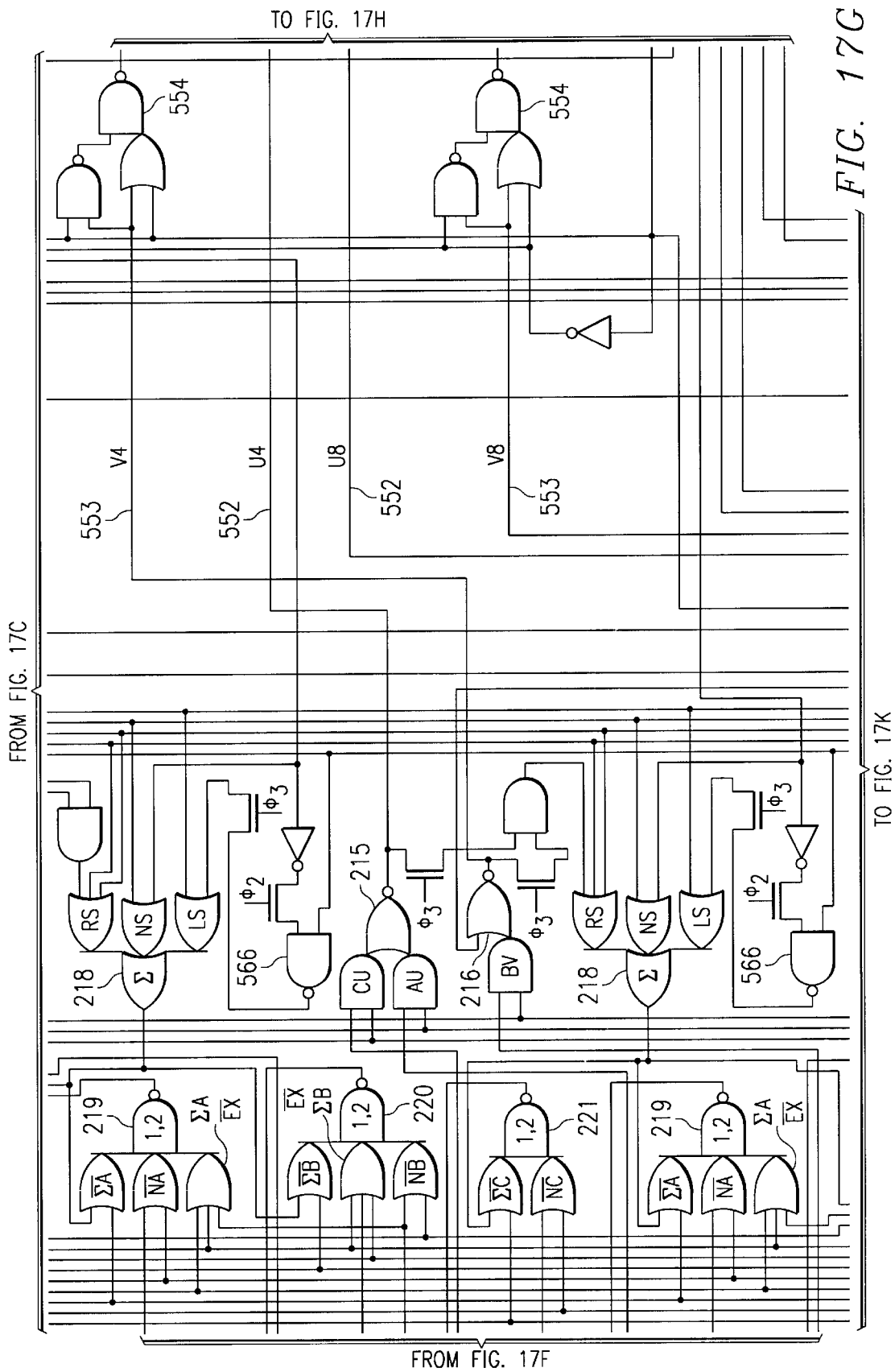

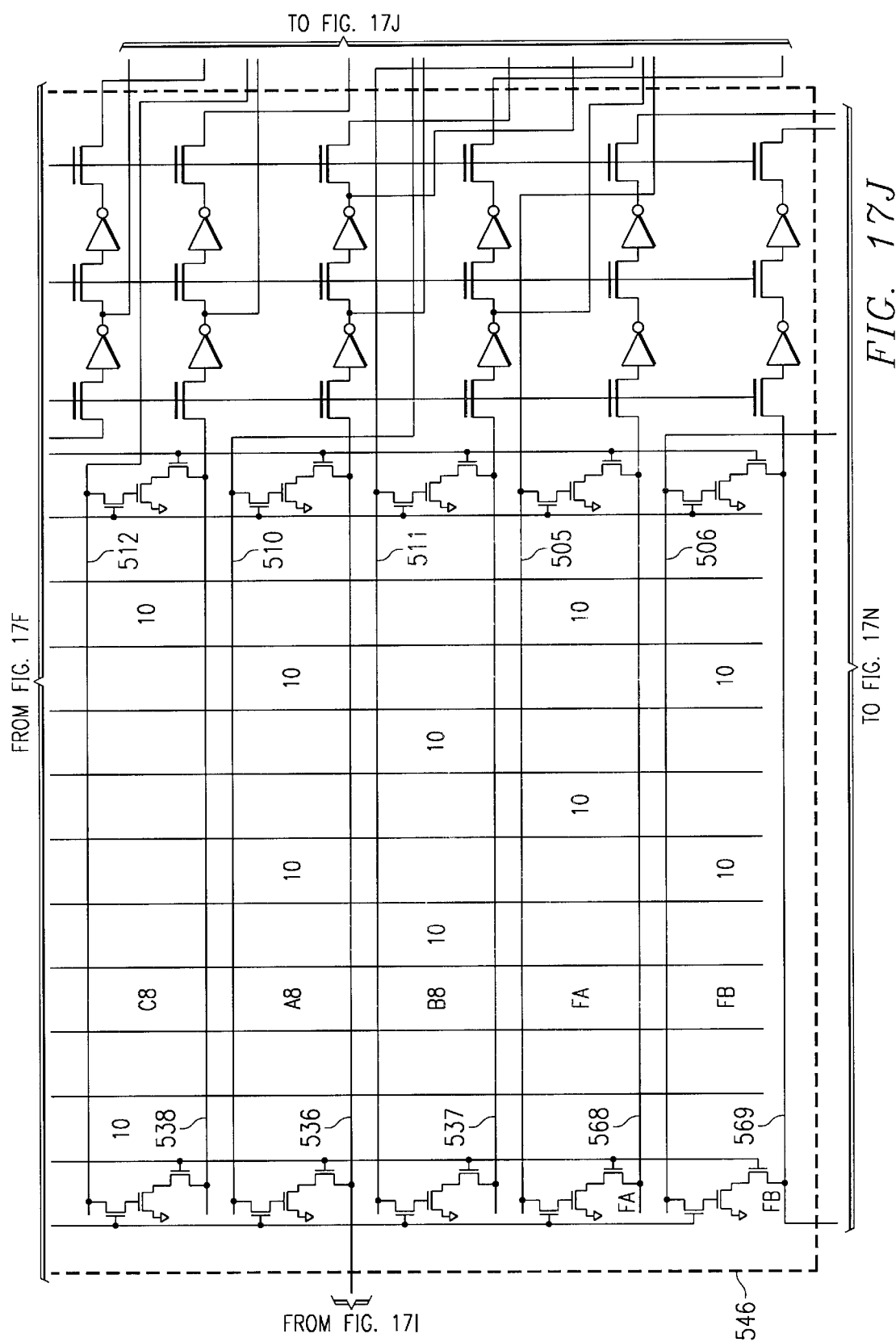

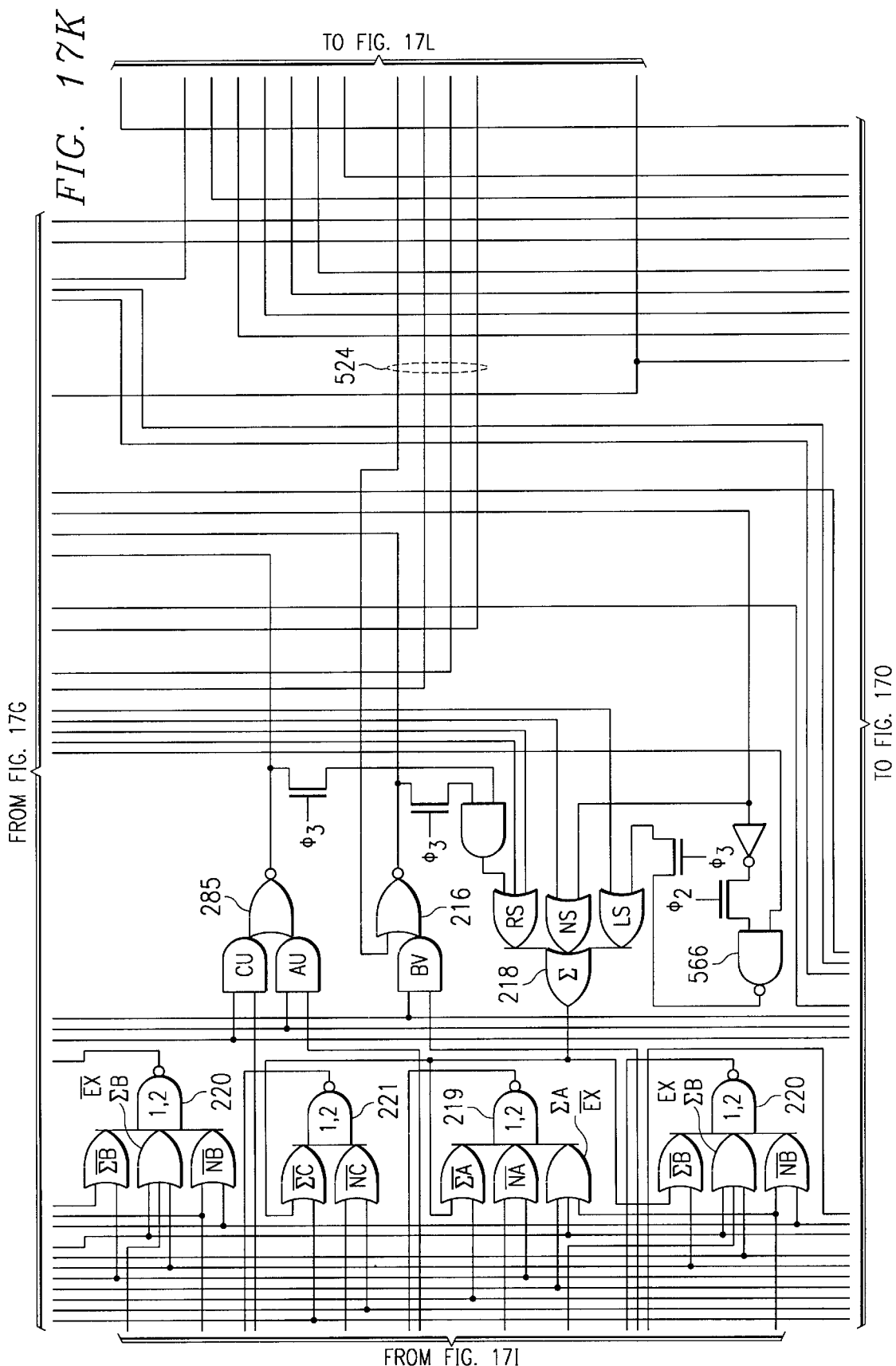

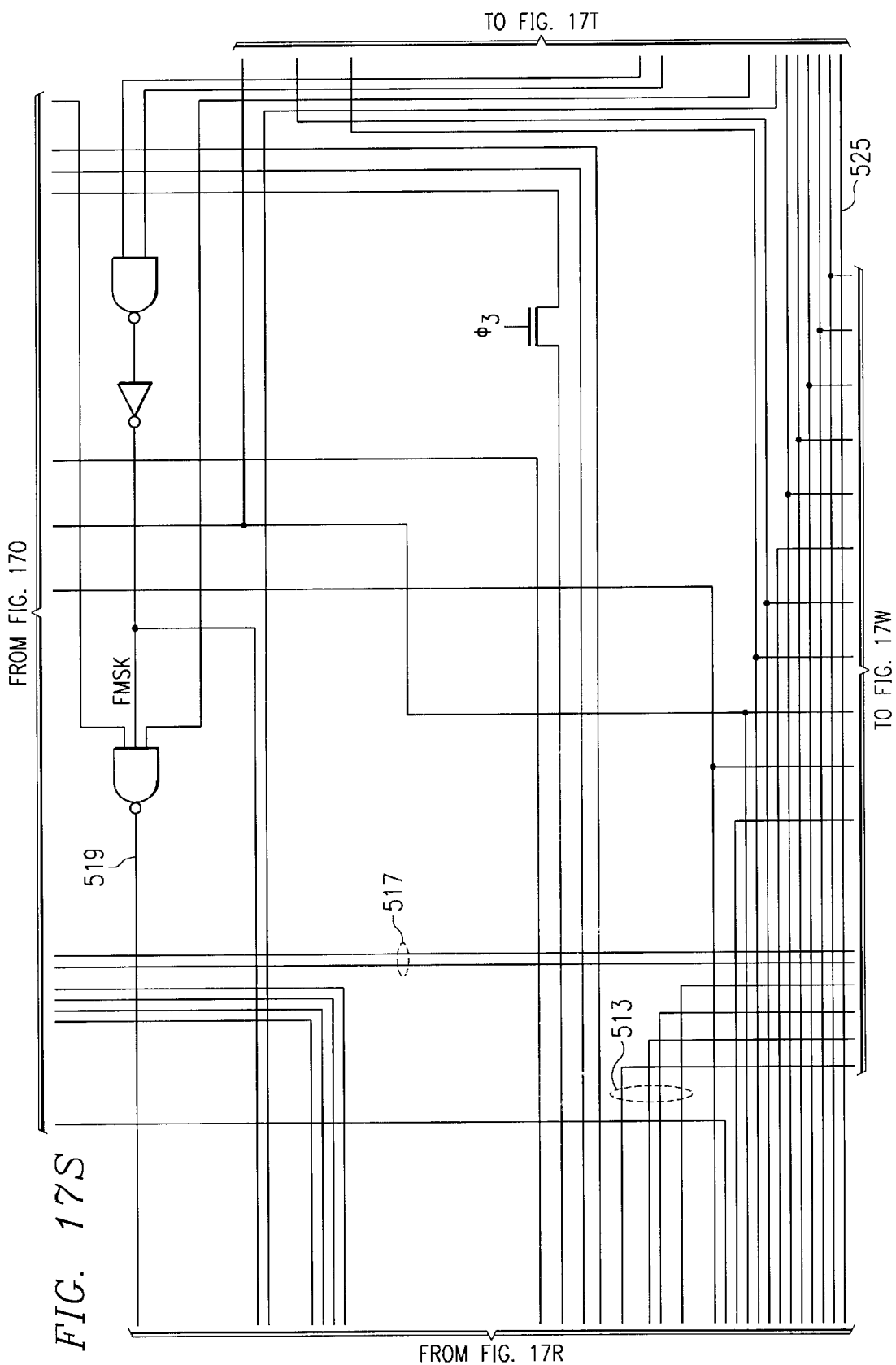

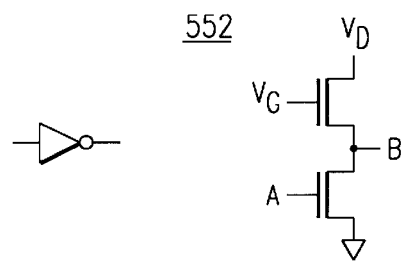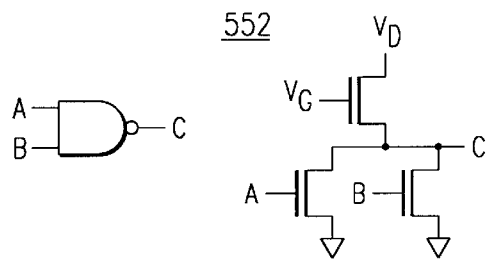
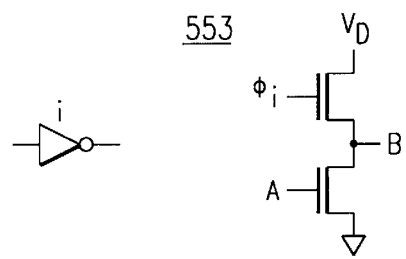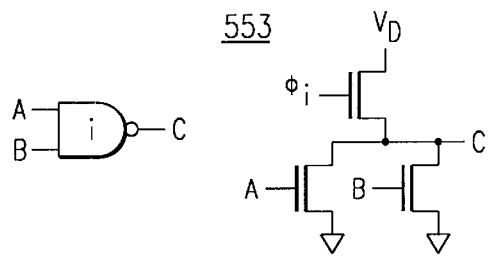
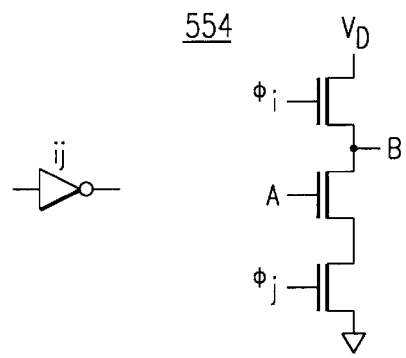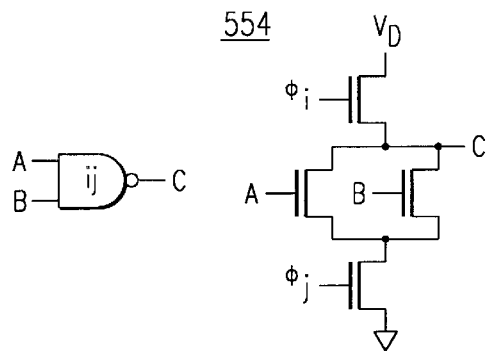
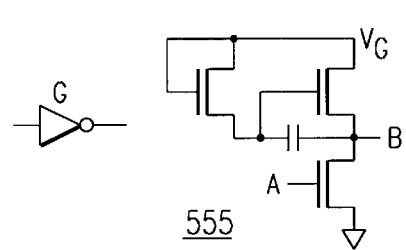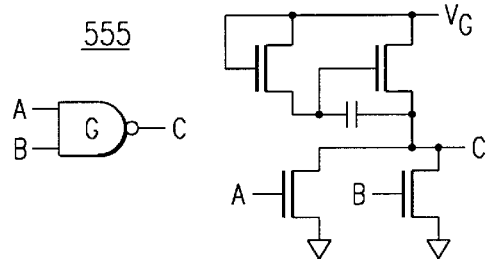
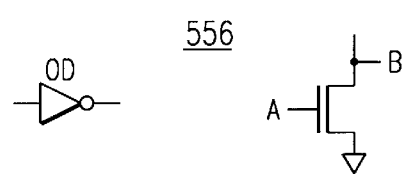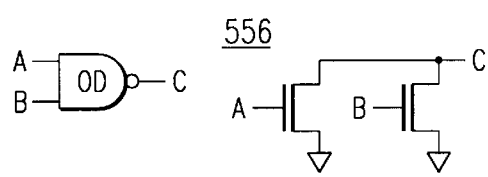
FIG. 18A   FIG. 18B

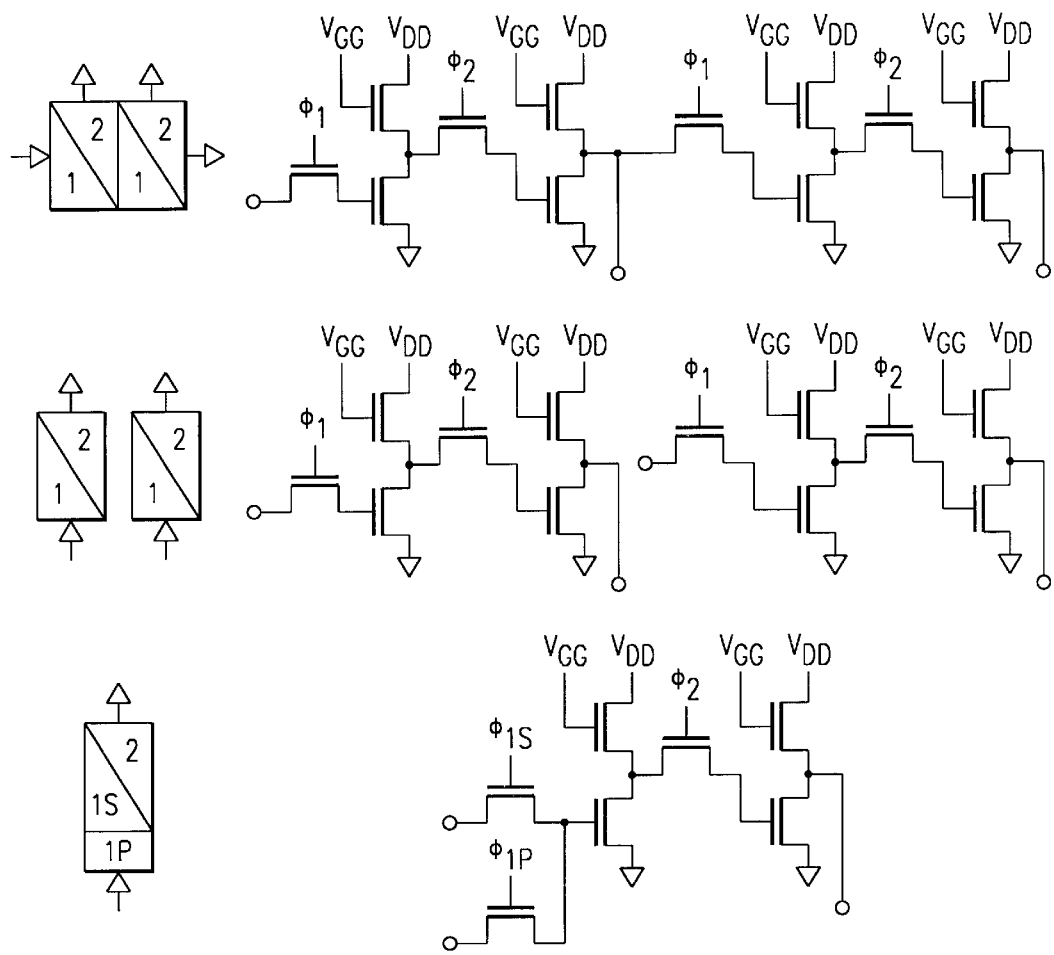
FIG. 18D
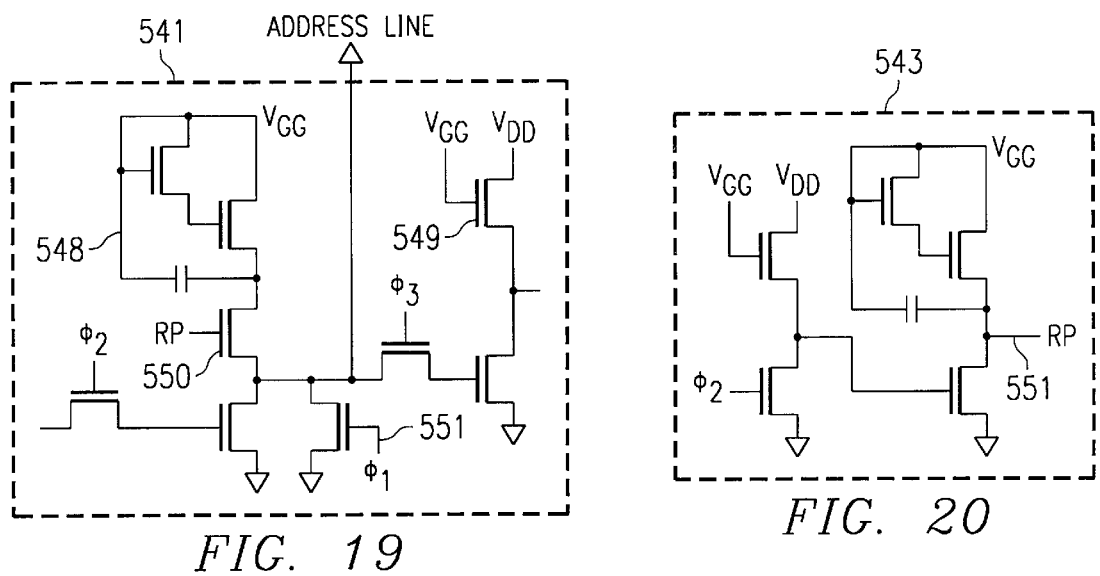
FIG. 19
FIG. 20

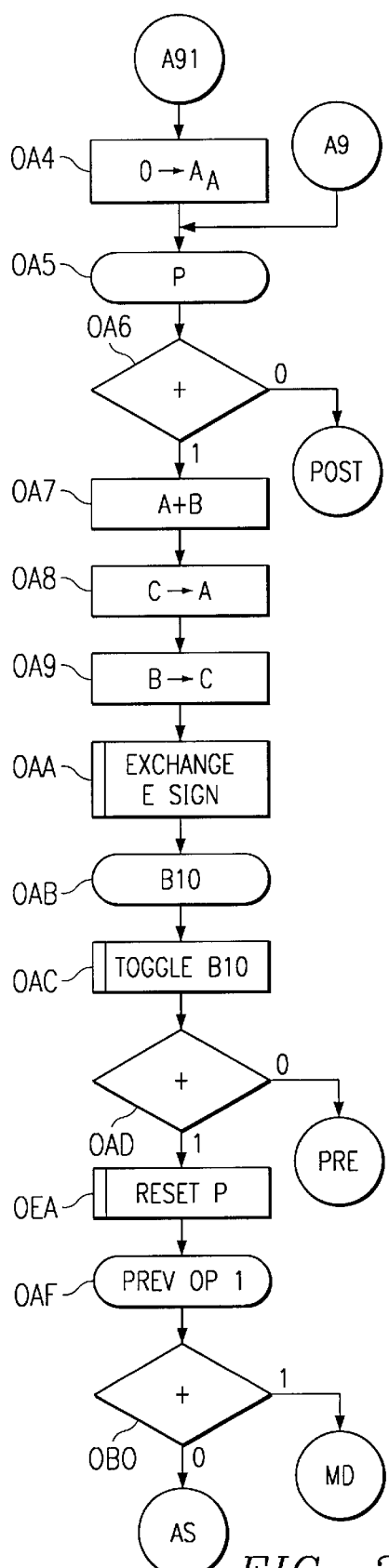
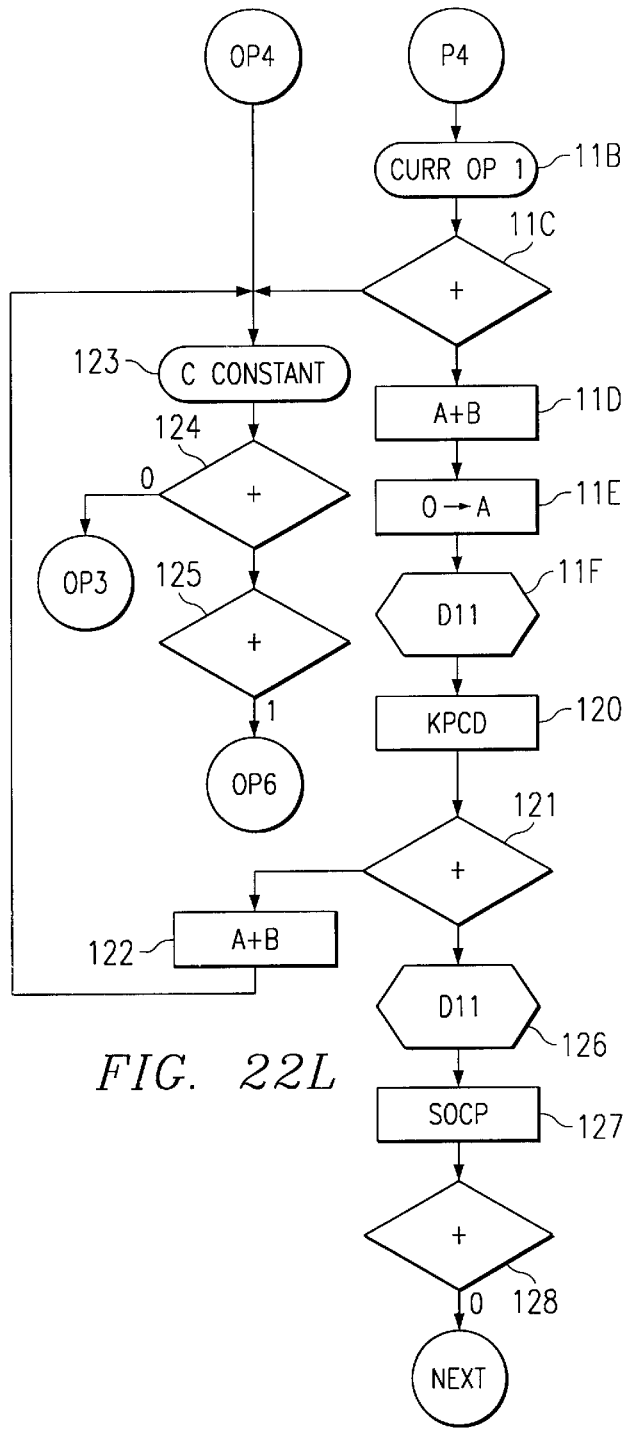
FIG. 22K
FIG. 22L

VARIABLE FUNCTION PROGRAMMED CALCULATOR

This application is a continuation of application Ser. No. 08/034,634, filed Mar. 22, 1993, now abandoned; which is a continuation of application Ser. No. 07/846,962, filed Mar. 6, 1992, now abandoned; which is a continuation of application Ser. No. 07/537,214, filed Jun. 11, 1990, now abandoned; which was a continuation of application Ser. No. 07/373,111, filed Jun. 28, 1989, now abandoned; which was a continuation of Ser. No. 07/097,480, filed Sep. 15, 1987, now abandoned; which was a division of application Ser. No. 06/915,857, filed Oct. 6, 1986, now abandoned; which was a continuation of application Ser. No. 06/750,647, filed Jun. 28, 1985, now abandoned; which was a continuation of application Ser. No. 06/604,404, filed Apr. 27, 1984, now abandoned; which was a continuation of application Ser. No. 06/002,815, filed Jan. 12, 1979, now abandoned; which was a division of application Ser. No. 05/856,932, filed Dec. 2, 1977, now U.S. Pat. No. 4,242,675; which was a continuation of application Ser. No. 05/420,999, filed Dec. 3, 1973, now abandoned; which was a continuation of application Ser. No. 05/163,565, filed Jul. 19, 1971, now abandoned.

This invention relates to calculators and, more particularly, to a variable function fixed program calculator capable of being fabricated as a monolithic integrated semiconductor system utilizing contemporary semiconductor technology.

It is an object of the present invention to provide a system which functions as a basic desk top calculator. More particularly, it is an object of the invention to provide such calculator function including primitive decimal operations, such as add, subtract, multiply and divide with floating decimal point entry and either floating or fixed decimal point results on multi-digit operands. This object is accomplished in accordance with the present invention by providing, for example, a dynamic charge storage random access memory shifting array for registration of numeric and control data. The calculator includes a control memory such as a programmable logic array (PLA), a program memory such as a read only memory (ROM) and means for performing arithmetic and logic modification of registered data including binary coded decimal (BCD), bit-parallel digit-serial decimal arithmetic, and set-reset-toggle (SRT) FLAG data modification.

Another object of the invention is to provide a calculator system which is capable of being fabricated as a monolithic integrated semiconductor system. More particularly, it is an object of the invention to provide such calculator system which is capable of being fabricated as a monolithic integrated metal-insulator-semiconductor system utilizing contemporary metal-insulator-semiconductor technology. This object is accomplished in accordance with the present invention by providing a random access memory shift register system which requires approximately one-third the area of conventional shift register systems, providing internal generation of multi-phase clocks from a single phase input clock which is included in the calculator but which is external to the monolithic structure and by providing a common programmed scanning system in the monolithic structure to provide both keyboard encoding and display decoding with minimum external connections between the monolithic system and the keyboard and display The total number of connections from the monolithic structure to other calculator subsystems such as the keyboard, display and power supply are therefore minimized so that the monolithic structure is capable of being packaged in a conventional twenty-eight or forty pin package.

It is a further object of the present invention to provide a versatile calculator system in which the calculator function and input and output interfaces can be varied without changing the basic calculator structure, and particularly without changing the basic calculator structure as an integrated semiconductor system. This object is accomplished with the present invention by providing a programmable read only memory which provides a fixed program for the calculator system in accordance with the desired function of the calculator system and by providing programmable logic arrays for decoding and encoding the input, output and operating data by masking such data to any desired format. The programmable read only memory and the programmable logic arrays are easily modified by changing only the gate-insulator mask for the metal-insulator-semiconductor integrated system embodiment during the fabrication process.

Yet another object of the invention to provide a calculator with improved means for encoding keyboard commands and status information and which also functions as a direct interface means between a display decoder and a display for segmented and/or individual-decimal-numerical displays. This object is accomplished in accordance with the invention by providing a programmed scanning system to service both the keyboard input and display output, thereby minimizing hardware requirements for the key input system. Four keyboard input pins combine with eleven scanner output pins to allow a total of forty-four distinct keys and/or switches. The programmed routine residing in the read-only memory encodes the input from the keyboard array under program control. The scanning system operates at a slow enough rate to eliminate the need for any external keyboard drive circuitry and allows direct drive of large capacitance loads with response consistent to the scan rate. The scan program includes an encoding routine to effectively defeat transient noise and key bounce types of interference from the keyboard. An additional advantage of the keyboard scanning system then is that it requires few diodes, no amplifiers and simple switches which need not be low resistance or low bounce time switches. The display output includes internal segment or digit decoding, digit-blanking and zero suppression logic and utilizes the same scanning system as the keyboard. The display itself may be comprised of light-emitting diodes, liquid crystal, cold cathode gas discharge display elements, fluorescent display elements, multi-digit single-envelope cold-cathode gas-discharge tubes, incandescent display elements, etc. The multiple display capability is provided by the generally defined digit scanning and segment or numeral decoding system and by providing for an inter-digit blanking signal which is variable in terms of leading and trailing edge blanking intervals and in terms of its application to either the segment drivers or the digit drivers or both. The output decoder is comprised of a programmable logic array segment decoder circuit which can be programmed to accommodate any seven, eight, nine, ten segment or ten digit numerical display font plus a right or left decimal point. In this manner the calculator system of the present invention is essentially insensitive to the selection of a display which is utilized in conjunction with it.

It is still a further object of the invention to provide internal means for suppression of insignificant leading zeros in the calculator display. This object is accomplished by the programmed scanning system which provides scanning of the most significant output digits first and minimizes hardware means for detecting and suppressing leading zeros.

Another object of the invention is to allow both constant-operand and chained-intermediate-result type of calculations in a fully algebraic manner. This object is accomplished by providing an operator selectable control or mode switch to distinguish the constant-operand mode from the chained-intermediate-result mode of operation and by providing a fixed program decision routine in the read only memory array to detect the desired mode and effect it.

It is yet a further object of the invention to provide a calculator system which includes means for providing an automatic round-off solution for high accuracy in calculation. This object is accomplished in accordance with the present invention by utilizing a fixed program routine stored in the read only memory which adds the numeral five to the least significant digit which is to be lost. In this manner, a one is added to the second least significant digit which is to be kept when the least significant digit which is to be lost is greater than or equal to five.

Another object of the invention is to provide a calculator system with minimum power dissipation in order to provide a uniquely portable desk top calculator with good battery life. This object is accomplished in accordance with the present invention by provision of special control circuits to turn off dissipating functional elements except when such functional elements are actually being used and by provision of special pre-charge ratioless circuits within an metal-insulator-semiconductor embodiment of the read only memory, programmable logic array and arithmetic logic unit functional subsystems. For example, the instruction output from the read only memory need be detected only one per instruction cycle; a power control is applied to the read only memory decoder effecting a duty cycle of $\frac{2}{13}$ths of the nominal static power dissipation to eliminate DC currents so that only transient $CV^2f$ power is disipated.

Still further objects and advantages of the invention will be apparent from the following detailed description and claims and from the accompanying drawings illustrative of the invention wherein:

Figures 16, 17:
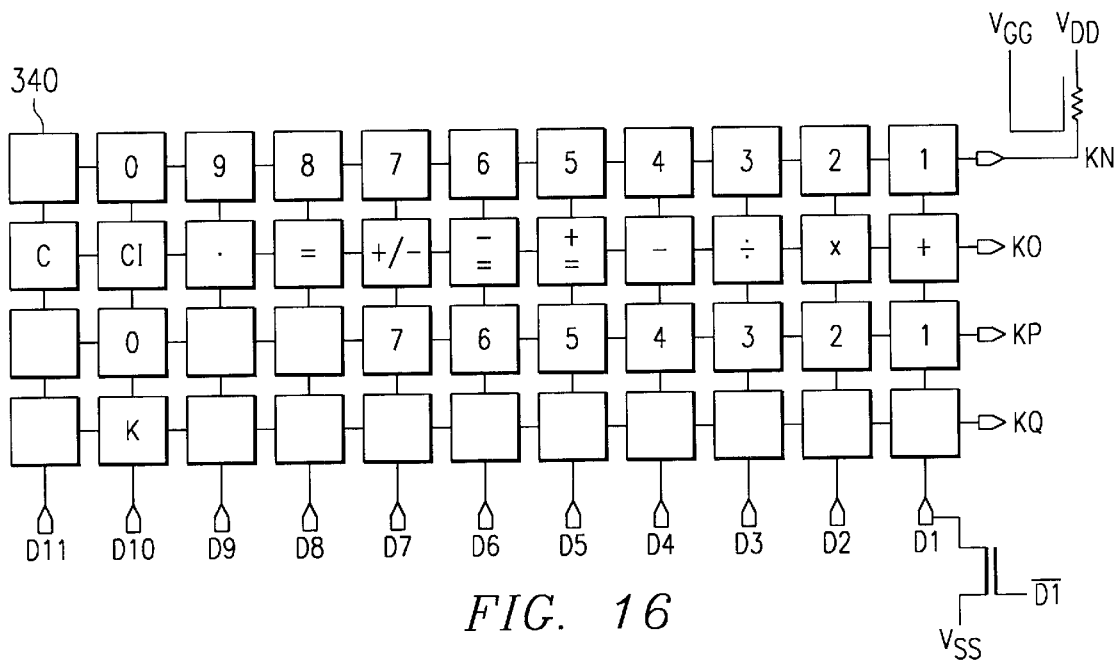
FIG. 16 is a circuit representation of a keyboard utilized in conjunction with the described calculator embodiment including the inter-connections to the scanning circuits.
FIG. 17 is a logic and circuit diagram of a metal-insulator-semiconductor embodiment of the calculator system of the invention which is further comprised of FIGS. 17A–Z.
Figure 21:
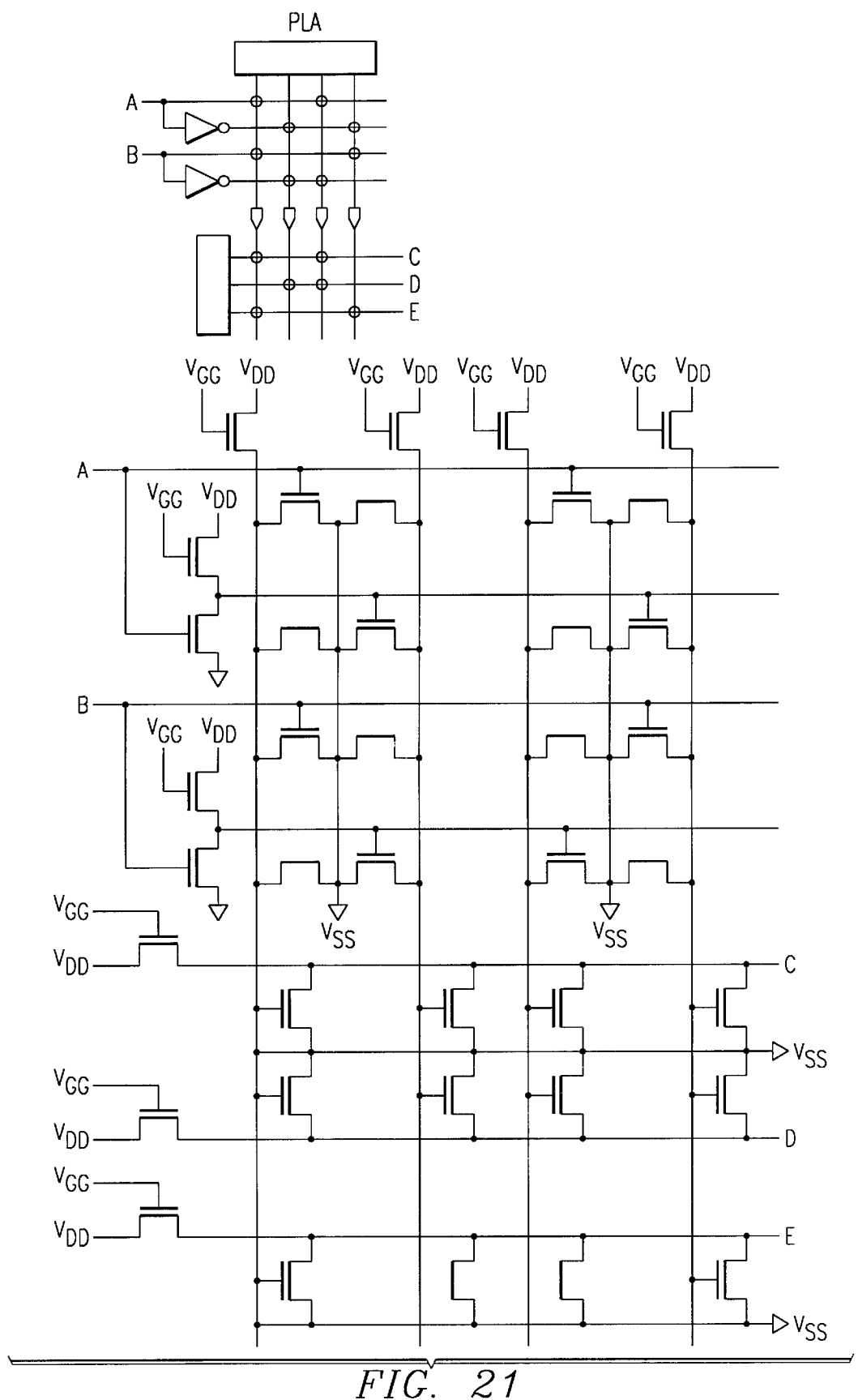
Figure 22A:
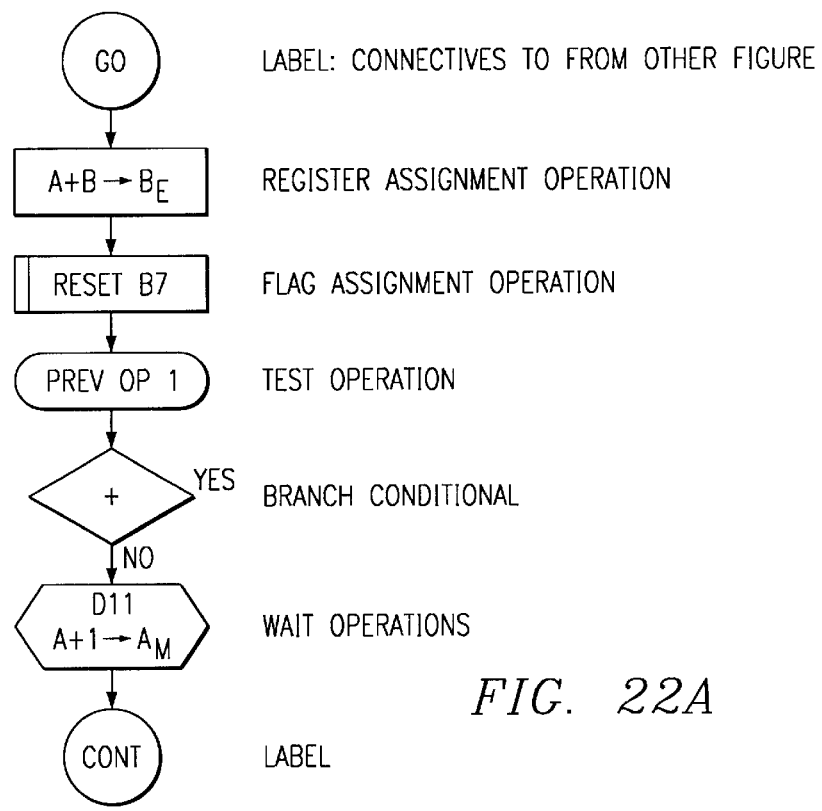
Figure 22C:
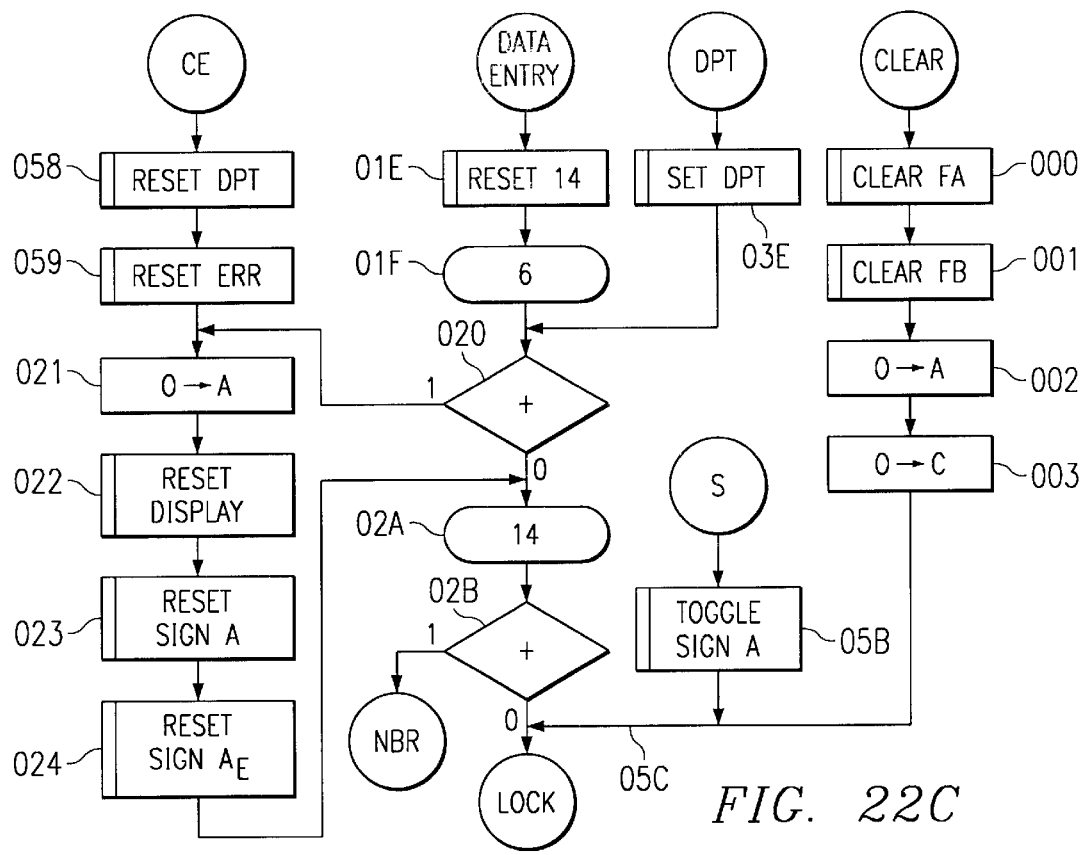
Figure 22B:
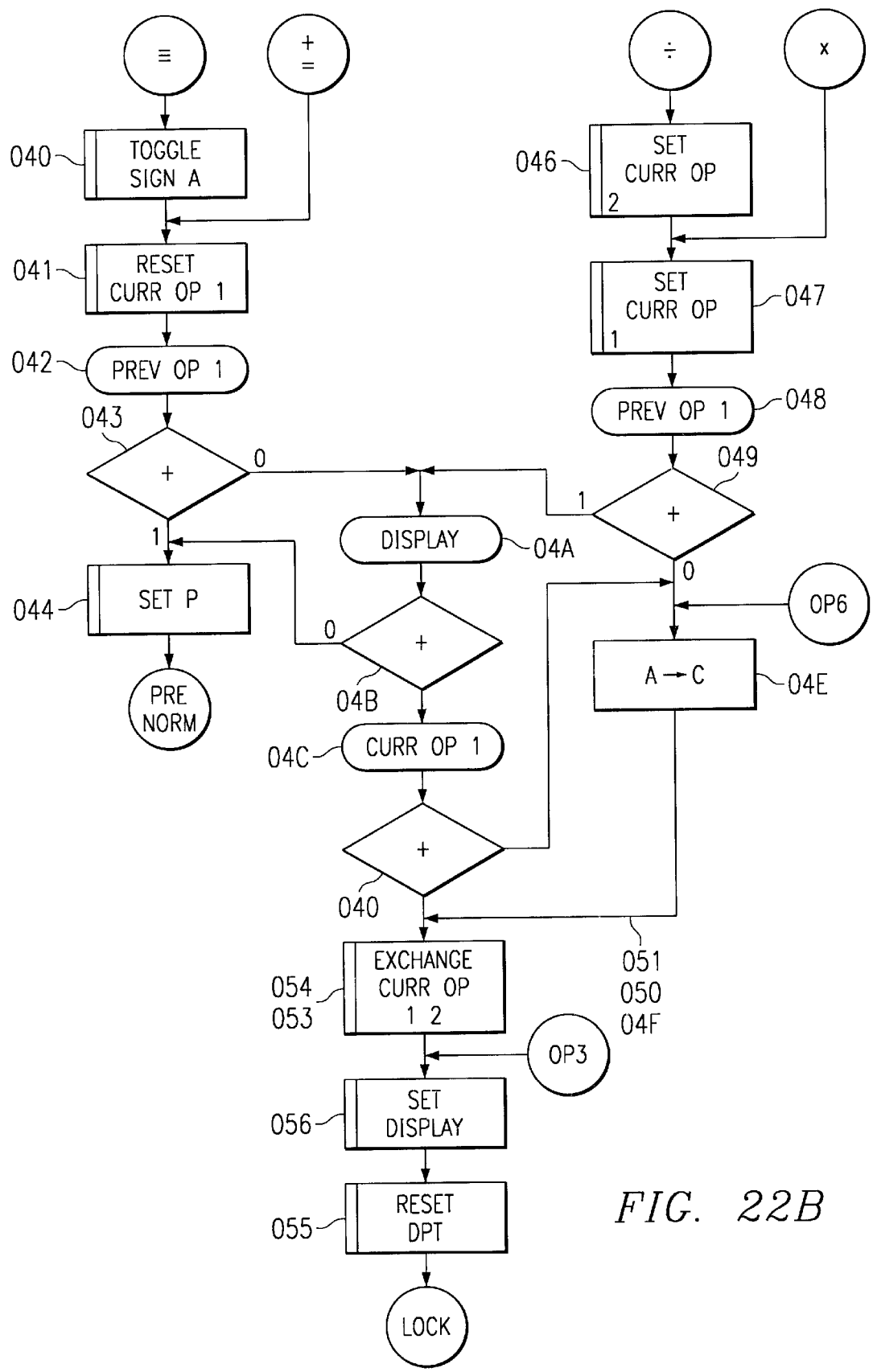
Figure 22D:
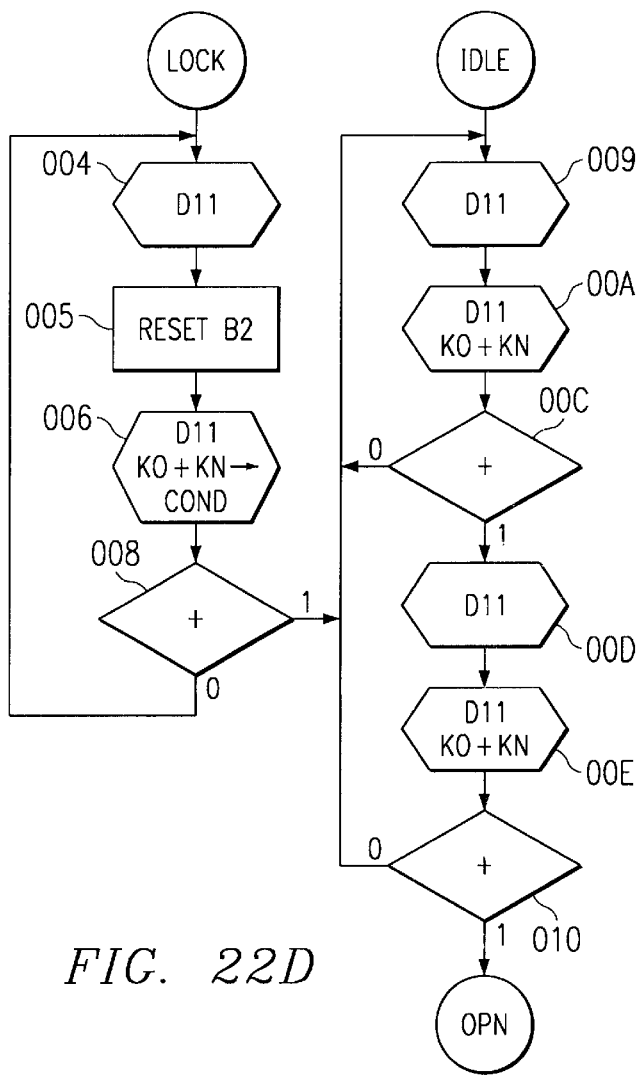
Figure 22F:
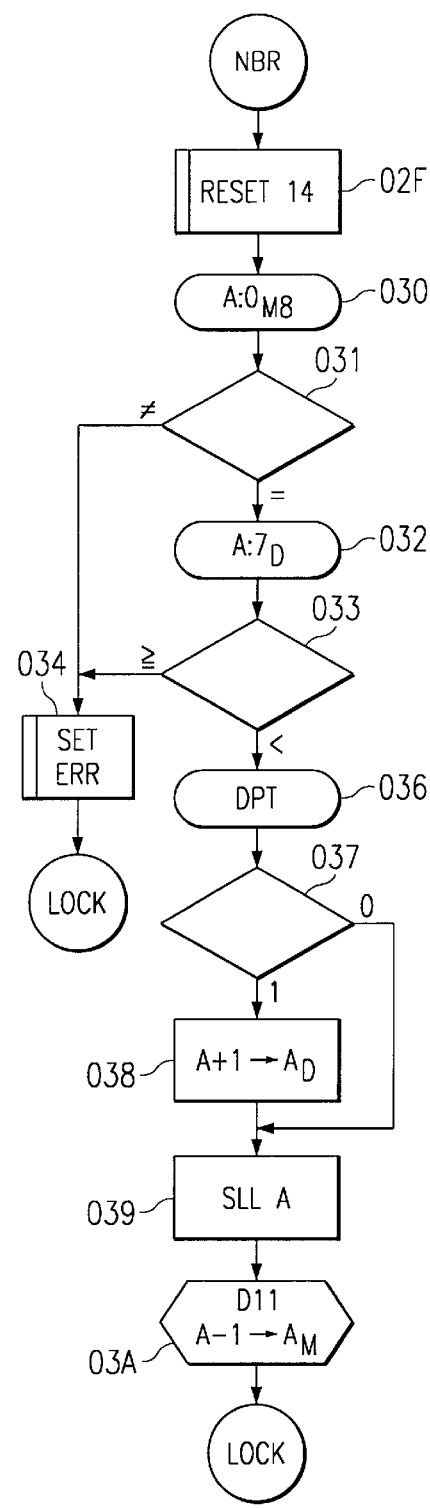
Figure 22E:
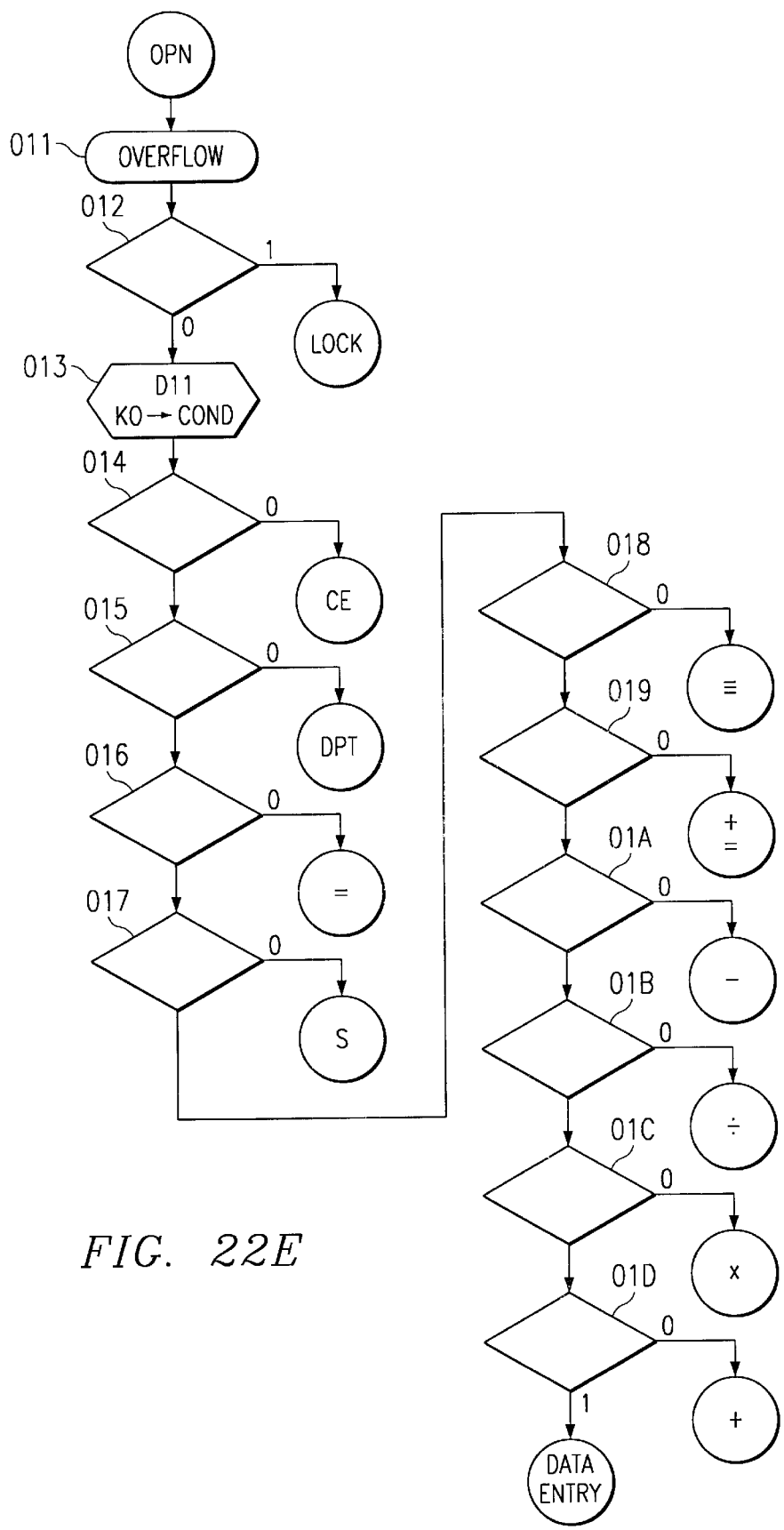
Figure 22G:
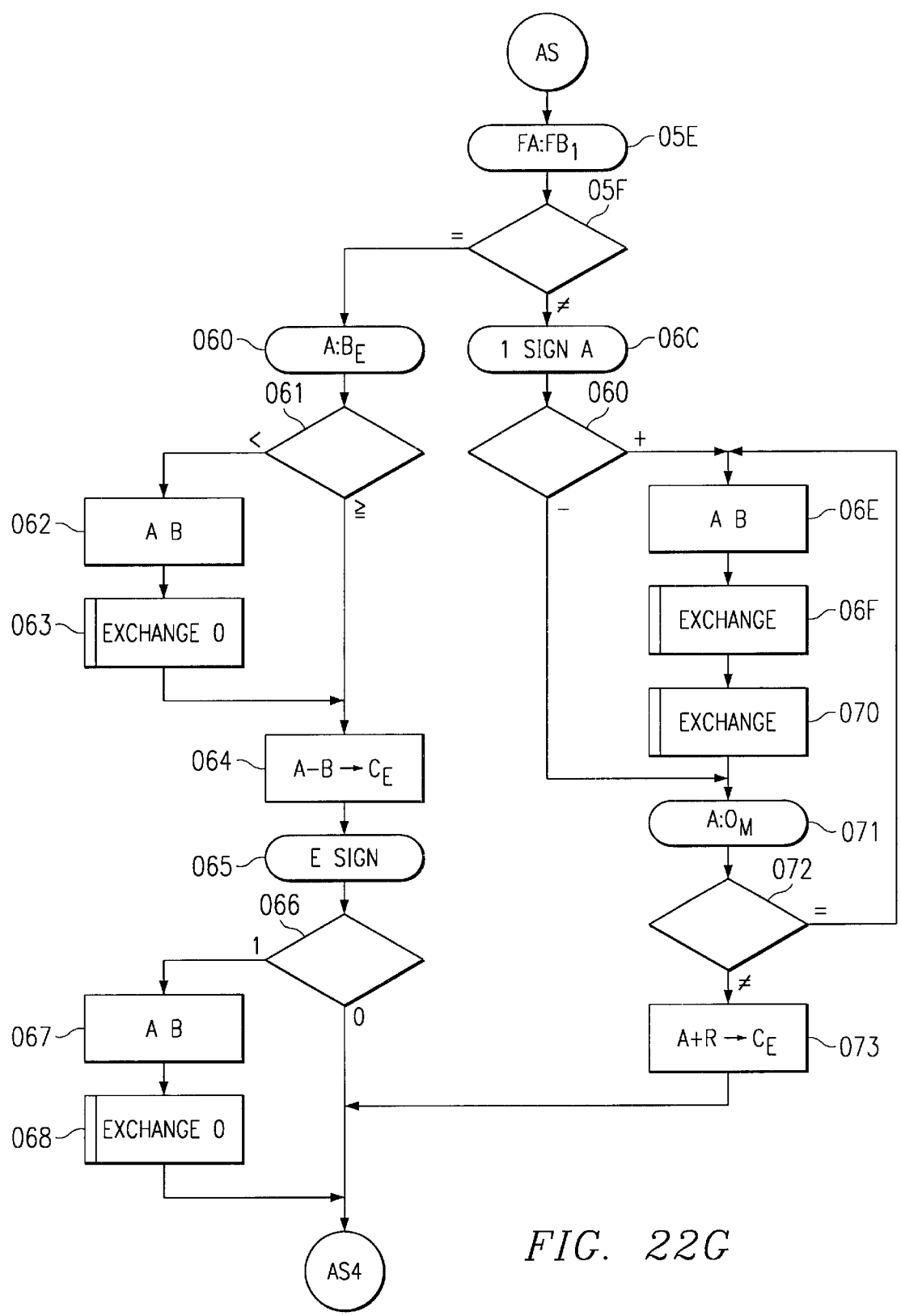
Figure 22H:
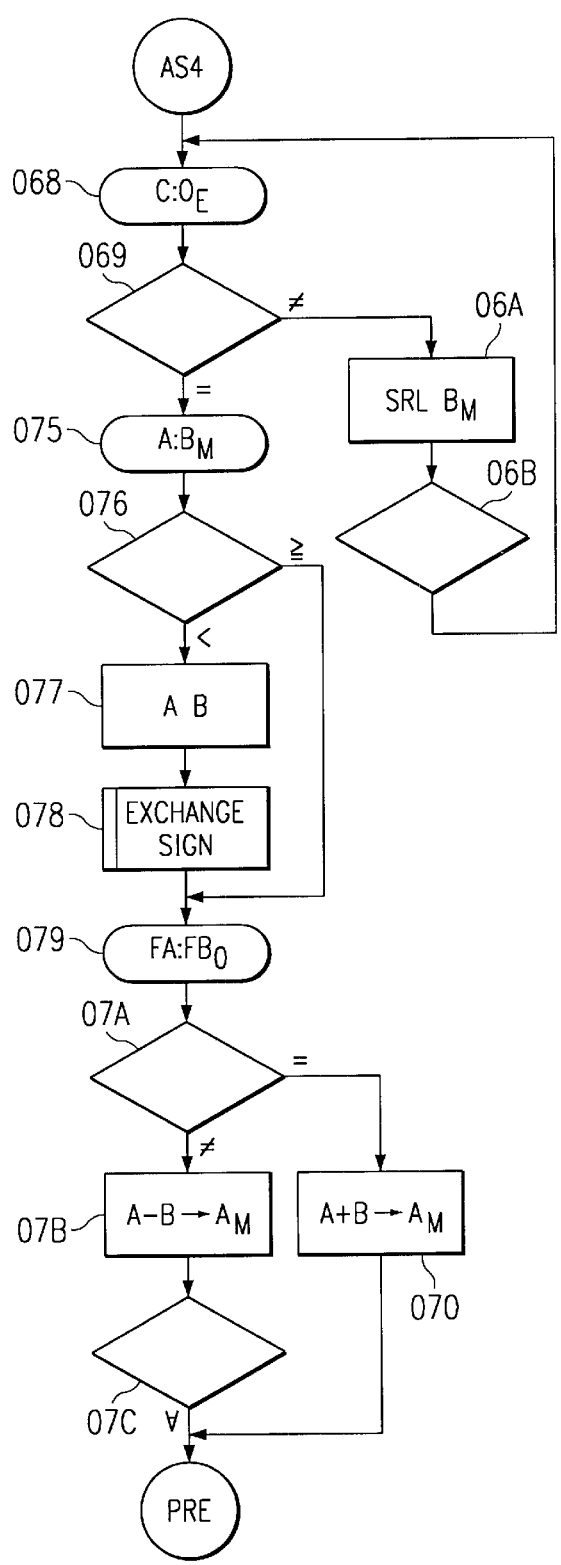
Figure 22I:
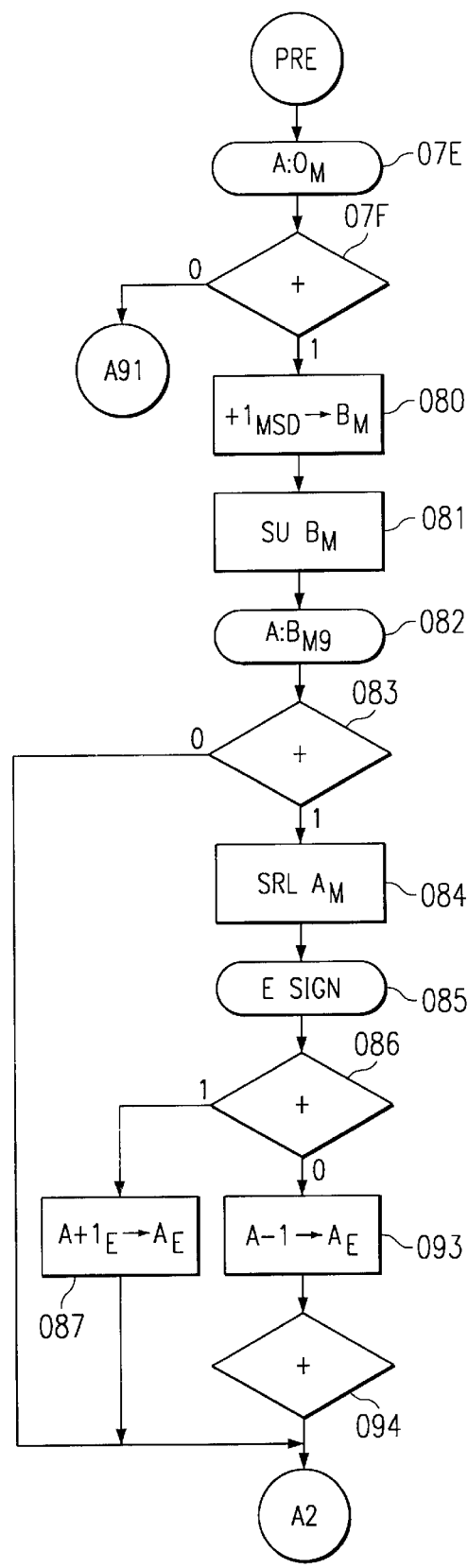
Figure 22J:
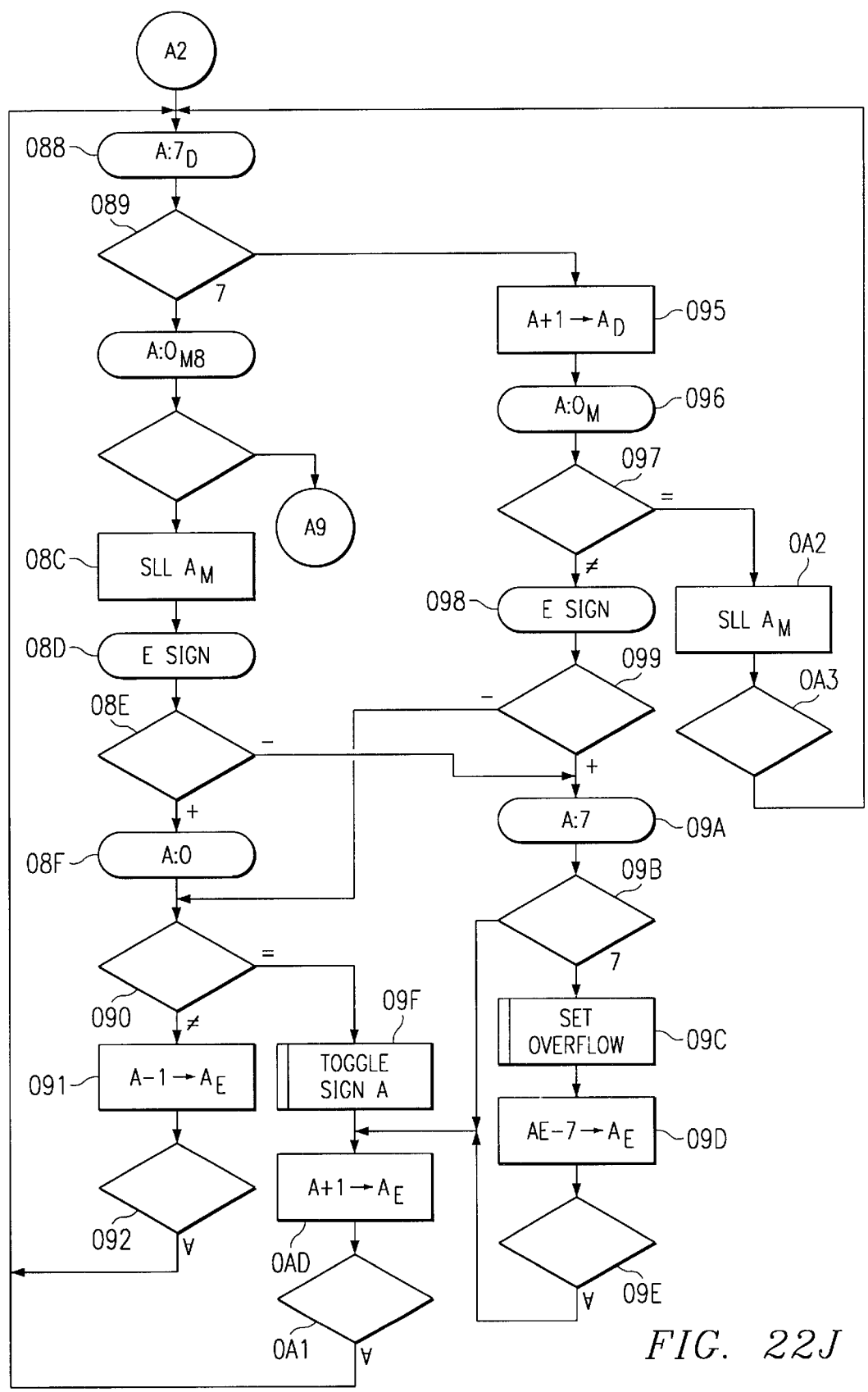
Figure 22M:
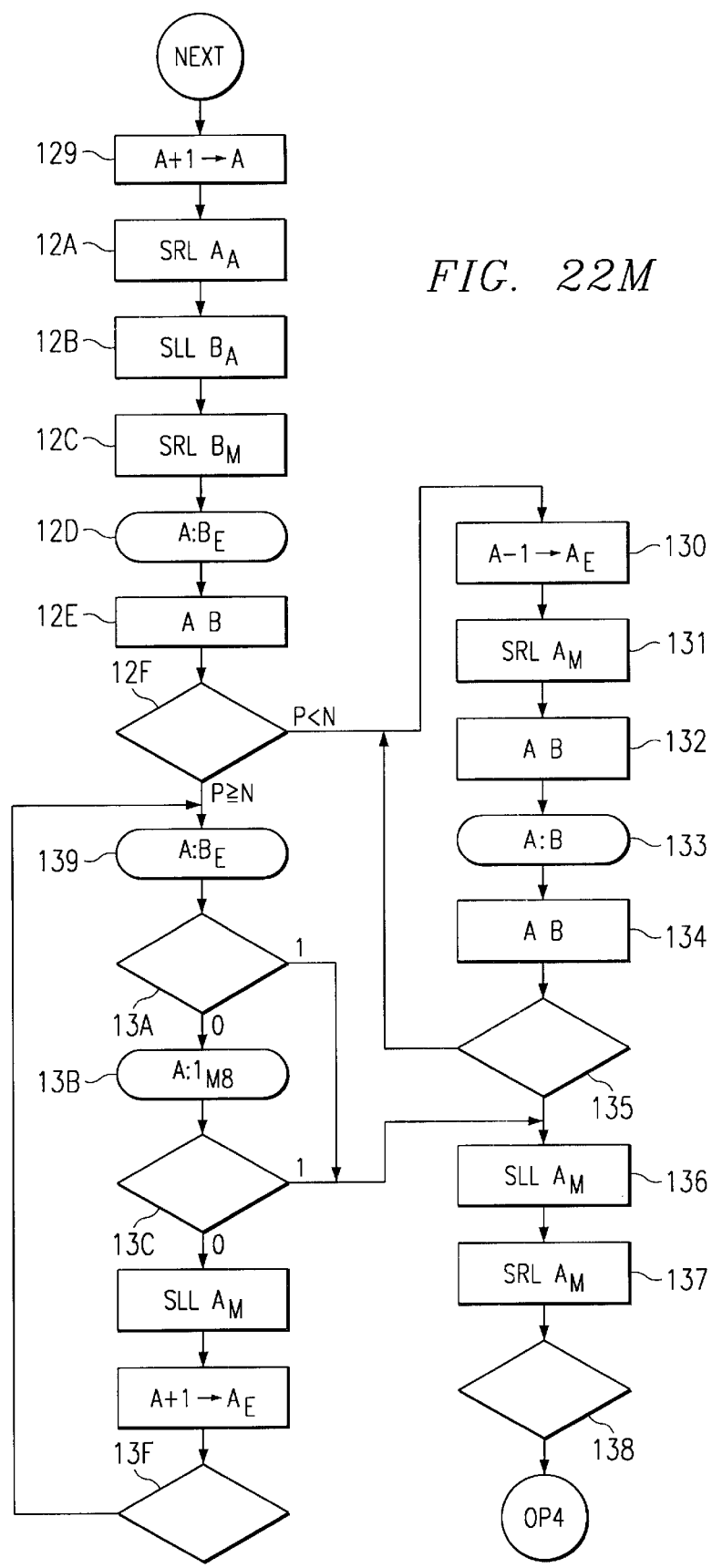
Figure 22N:
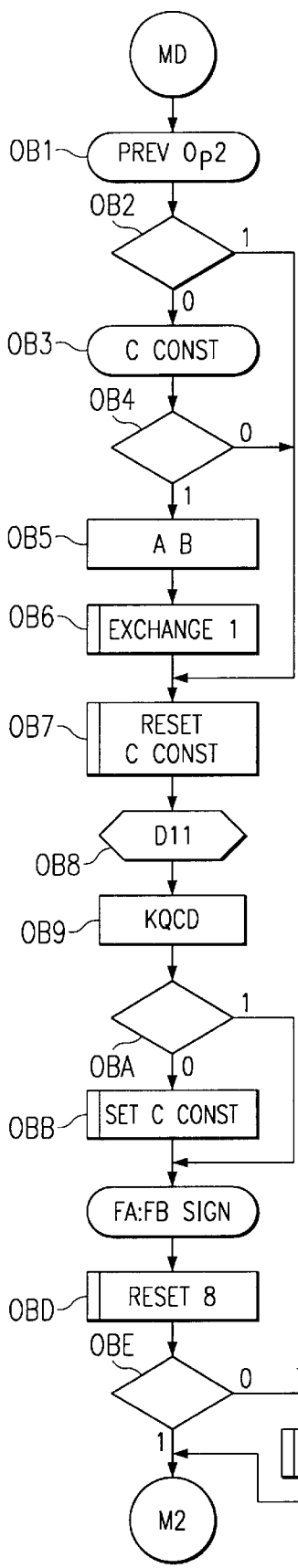
Figure 22P:
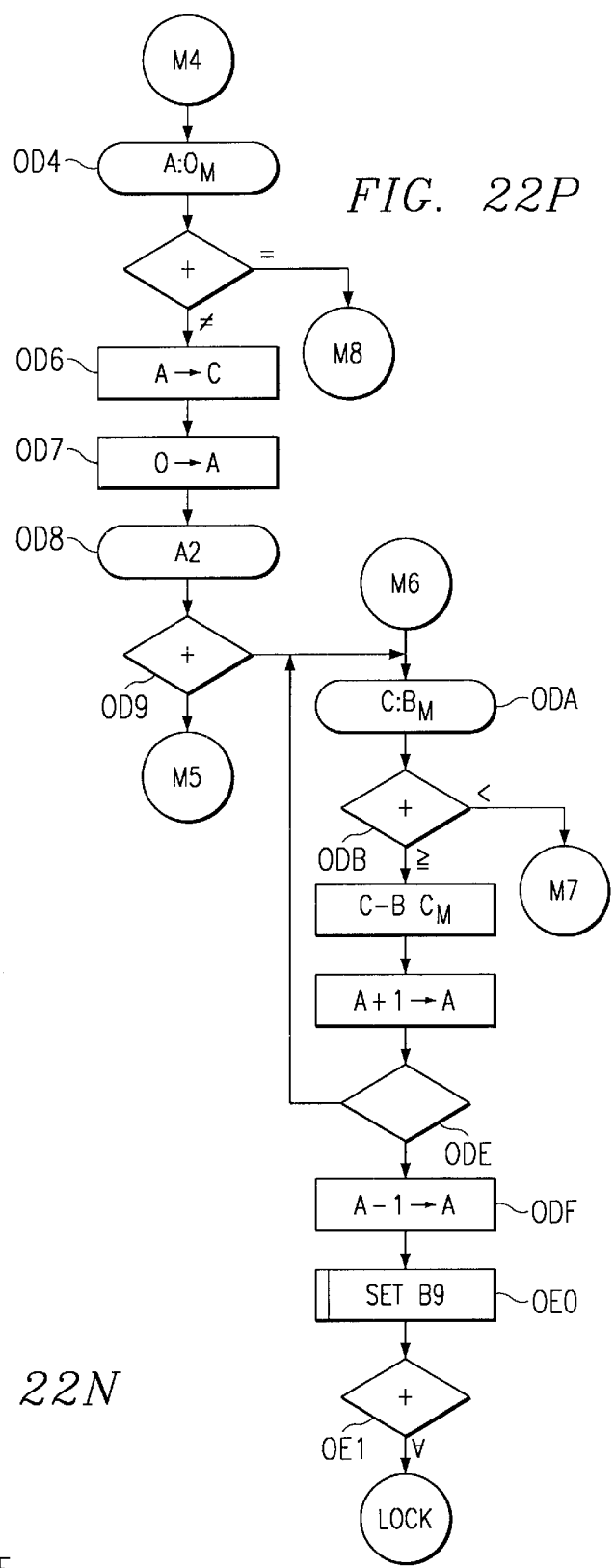
Figure 220:
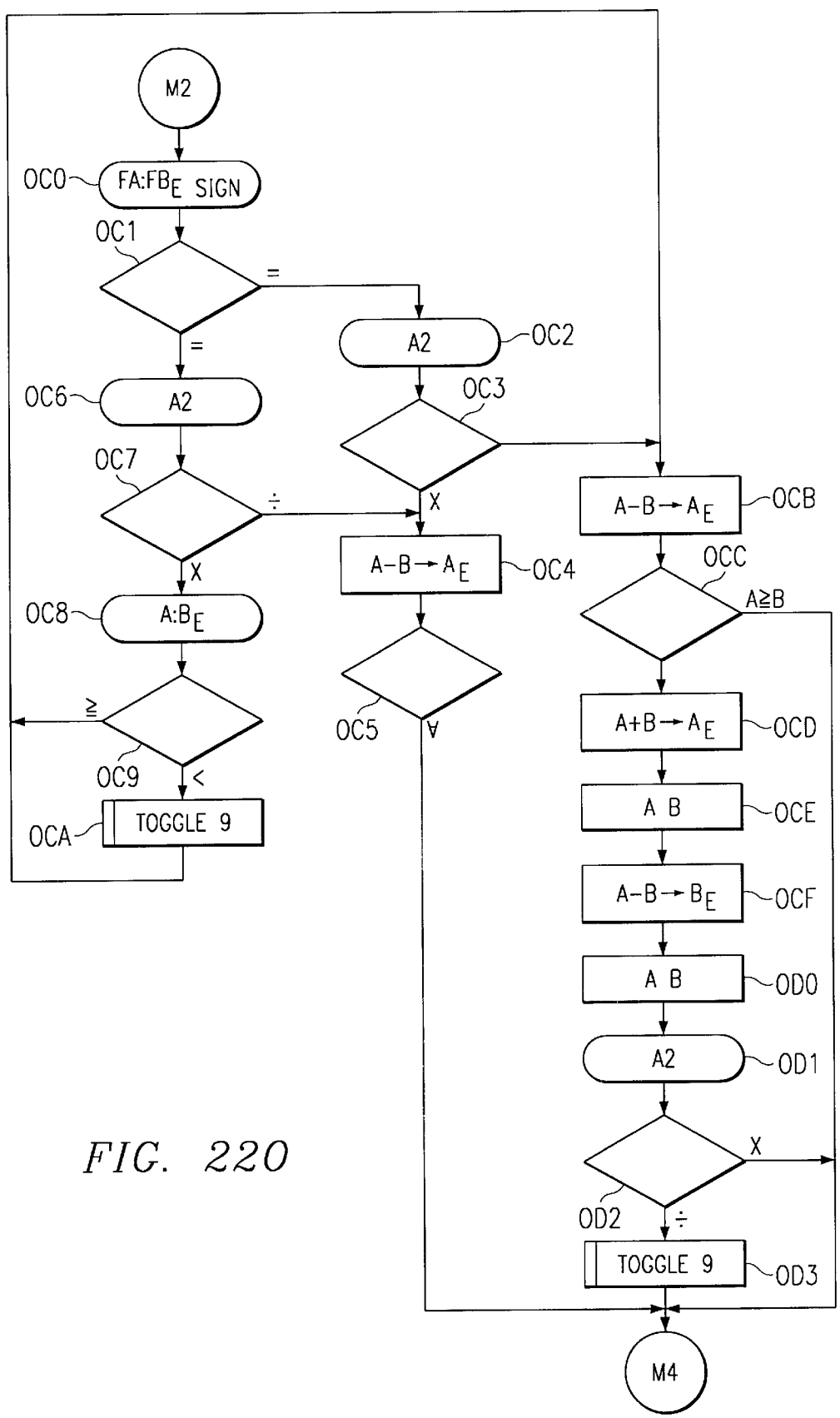
Figure 22Q:
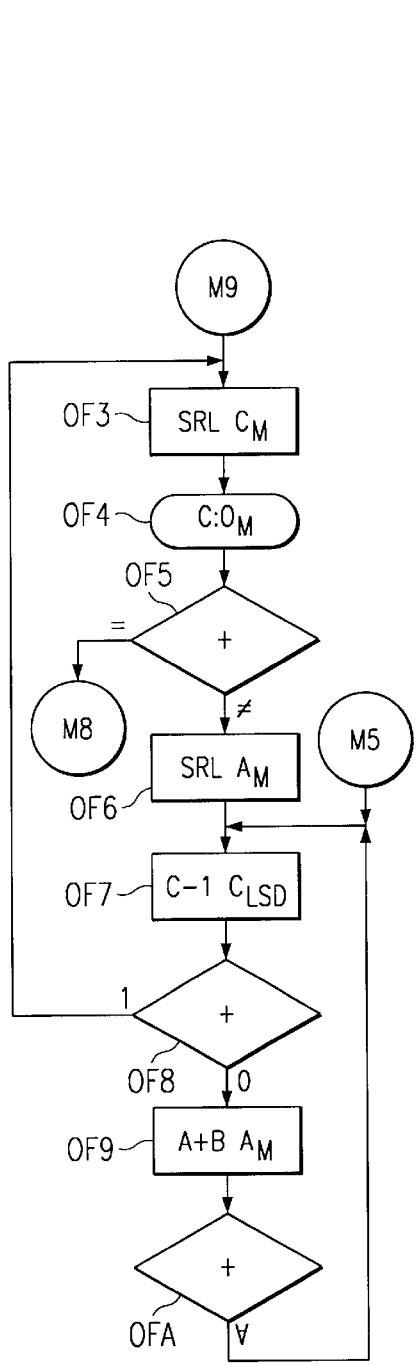
Figure 22R:
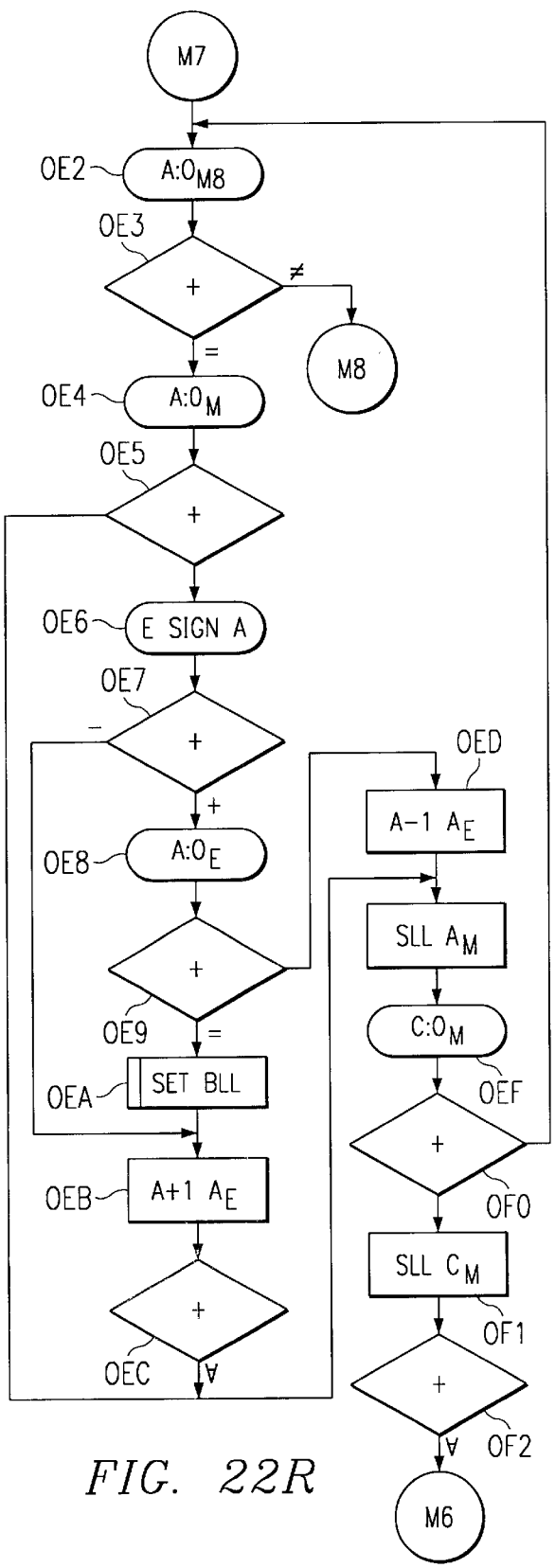
Figure 22S:
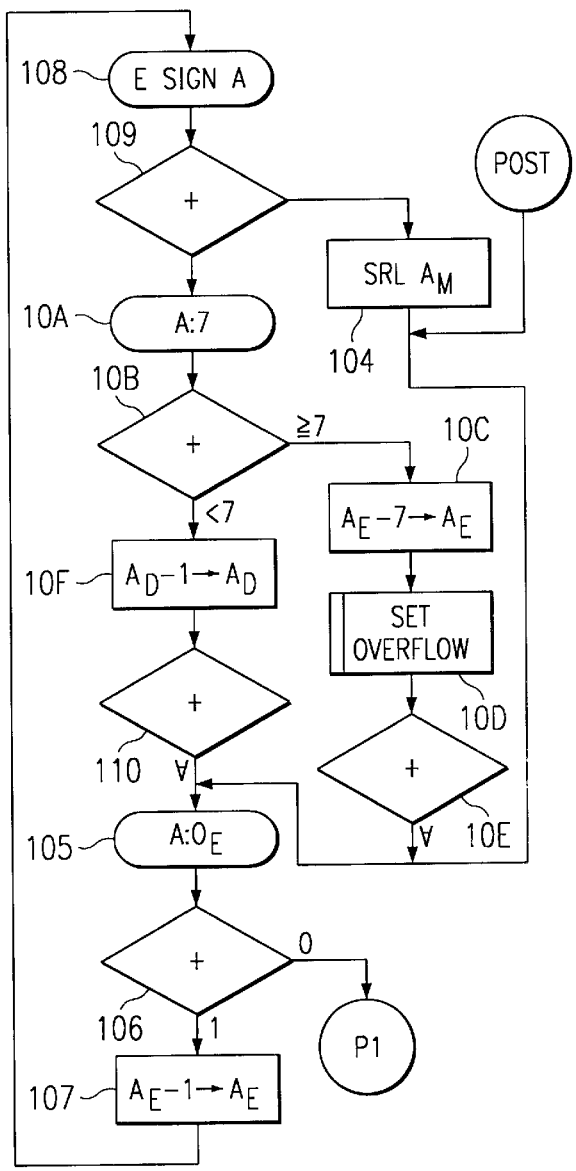
Figure 22T:
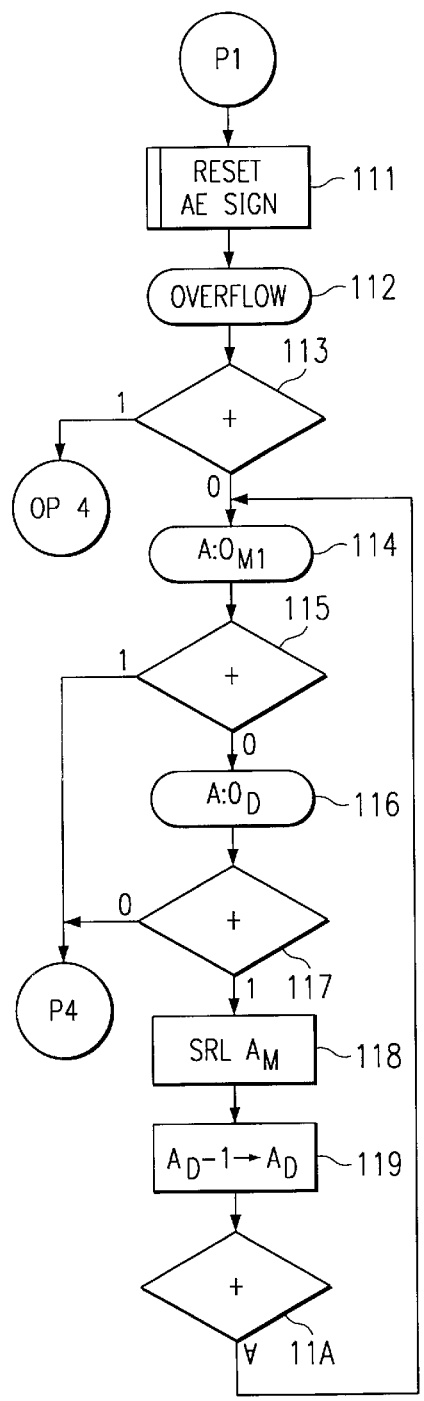
Figure 23:
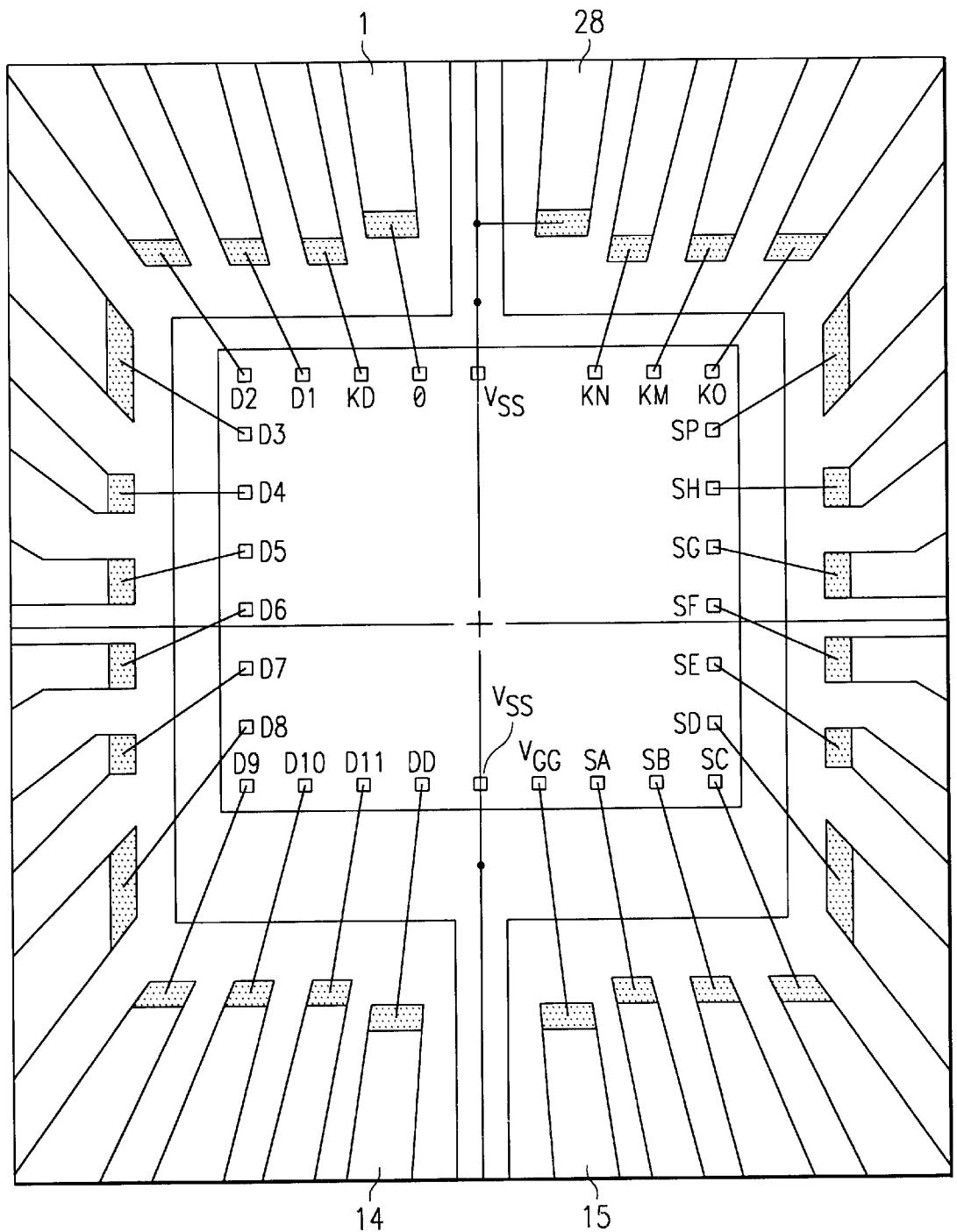

FIGS. 18A–D are diagrams showing the metal-insulator-semiconductor circuit equivalents of various logic gates shown in FIG. 17;

FIG. 19 is a circuit diagram illustrating the metal-insulator-semiconductor equivalent circuits of shift register cells 541 utilized in the commutator of the random access memory array shift register system utilized in the embodiment of FIG. 17;

FIG. 20 is a circuit diagram illustrating the metal-insulator-semiconductor driver circuit for the shift register cells of FIG. 19;

FIG. 21 is a diagram illustrating the circuit equivalents of the programmable logic arrays (PLA) utilized in the embodiment of FIG. 17;

FIGS. 22A–T are flow charts showing the programs stored in the programmable read only memory of an embodiment of the calculator system to provide desk top calculator functions including floating decimal point operation, input routines and output routines; and FIG. 23 is a planar view of the packaged monolithic structure showing terminal interconnects to the keyboard, display drivers and power supply.

According to the present invention a variable function programmed calculator which includes a fixed program stored in a read only memory is capable of being fabricated as a monolithic integrated semiconductor system. In particular, the described embodiment is capable of being fabricated as a monolithic integrated metal-insulator-semiconductor system utilizing contemporary metal-insultor-semiconductor technology. The calculator system may be programmed to perform desk top calculator functions including floating decimal point operation or may be programmed to perform other useful operations. A monolithic structure of the calculator system includes a fixed program which is programmed in the programmable read only memory by modifying one of five or seven masks (the gate-insulator mask) during the fabrication process. In addition, the input, output and operating format of data within the calculator system is programmable in programmable logic arrays by altering the same masks. In the following sections the calculator system is first described in terms of the functional relationship between its various subsystems, then in terms of specific circuits and finally in terms of the fixed programs stored in the. read only memory.

FUNCTIONAL DESCRIPTION OF THE CALCULATOR SYSTEM

Figure 1:
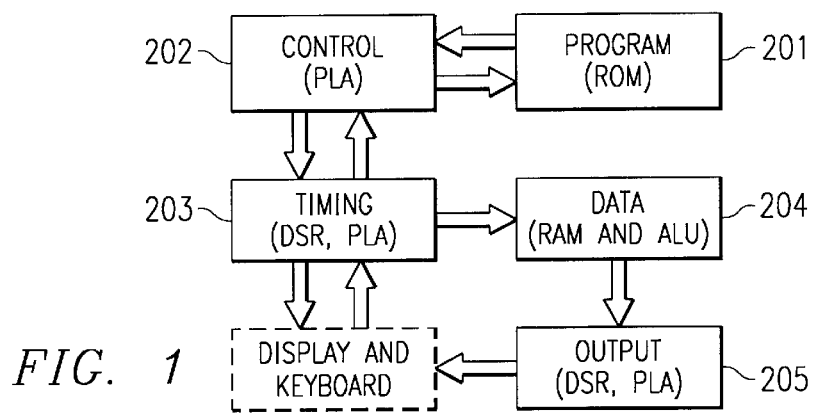
FIGS. 1 and 2 are block diagrams illustrating the calculator system of the present invention.
Figure 2:
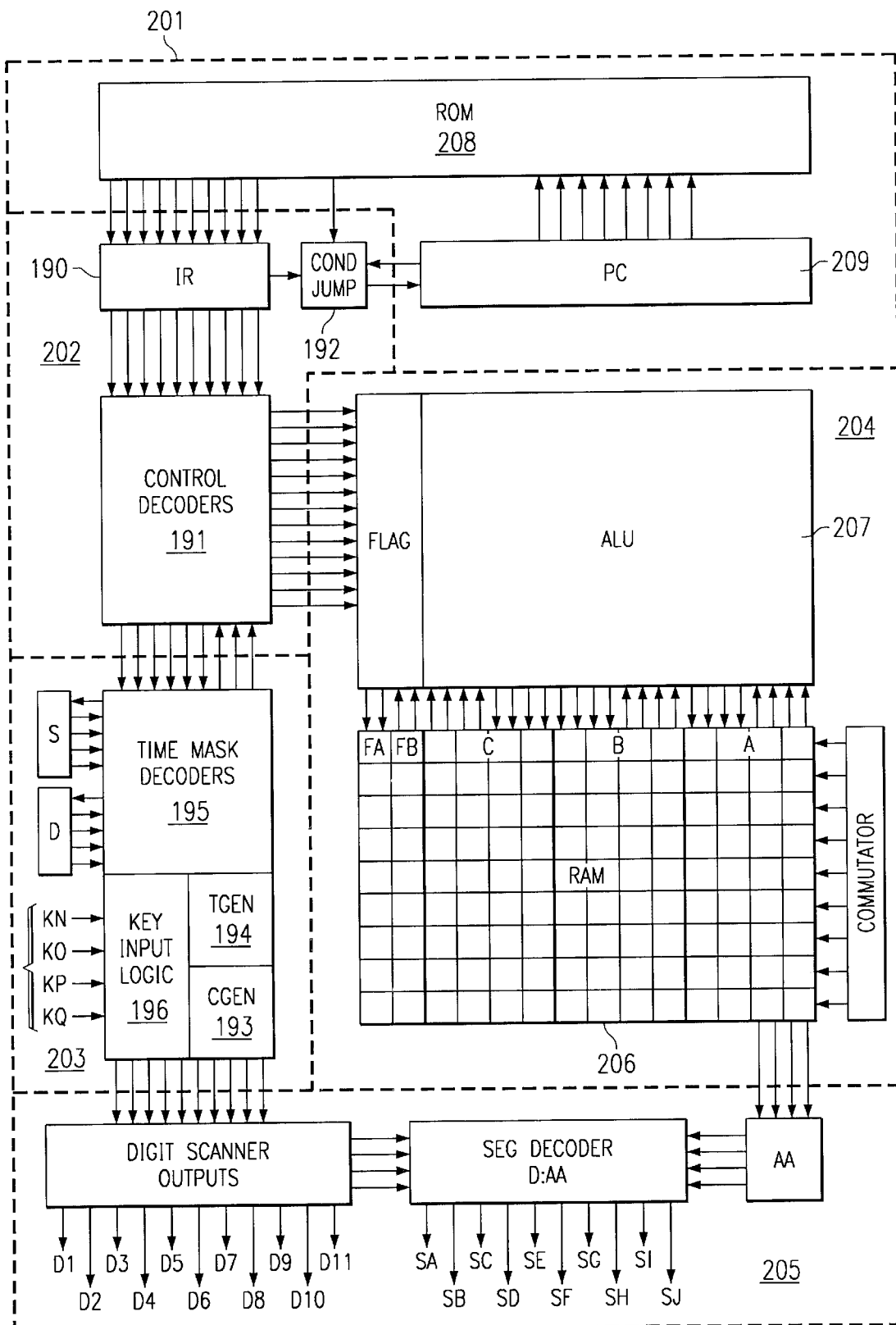

Referring to FIGS. 1 and 2, the calculator system of the present invention is illustrated in terms of the functional dependence among five internal functional subsystems of the calculator system and the relation between the internal functional subsystems and external functional elements. Program block 201 comprises a read oily memory (ROM) 208 for storing fixed programs to operate the calculator in a desired manner and program counter (PC) 209. Control block 202 comprises instruction register (IR) 190 for storing a control instruction, control decoders. 191 for decoding control instructions and jump condition circuit 192. Timing block 203 comprises a clock generator 193, a timing generator 194, digit and FLAG mask decoders 195, and key input logic 196. Data block 204 comprises random access memory shift register system and FLAG data storage array 206, decimal arithmetic unit 207 and FLAG logic unit 229. Output block 205 comprises segment output decoder 198 and digit scanner outputs 197.

DATA BLOCK 204

Figure 3:
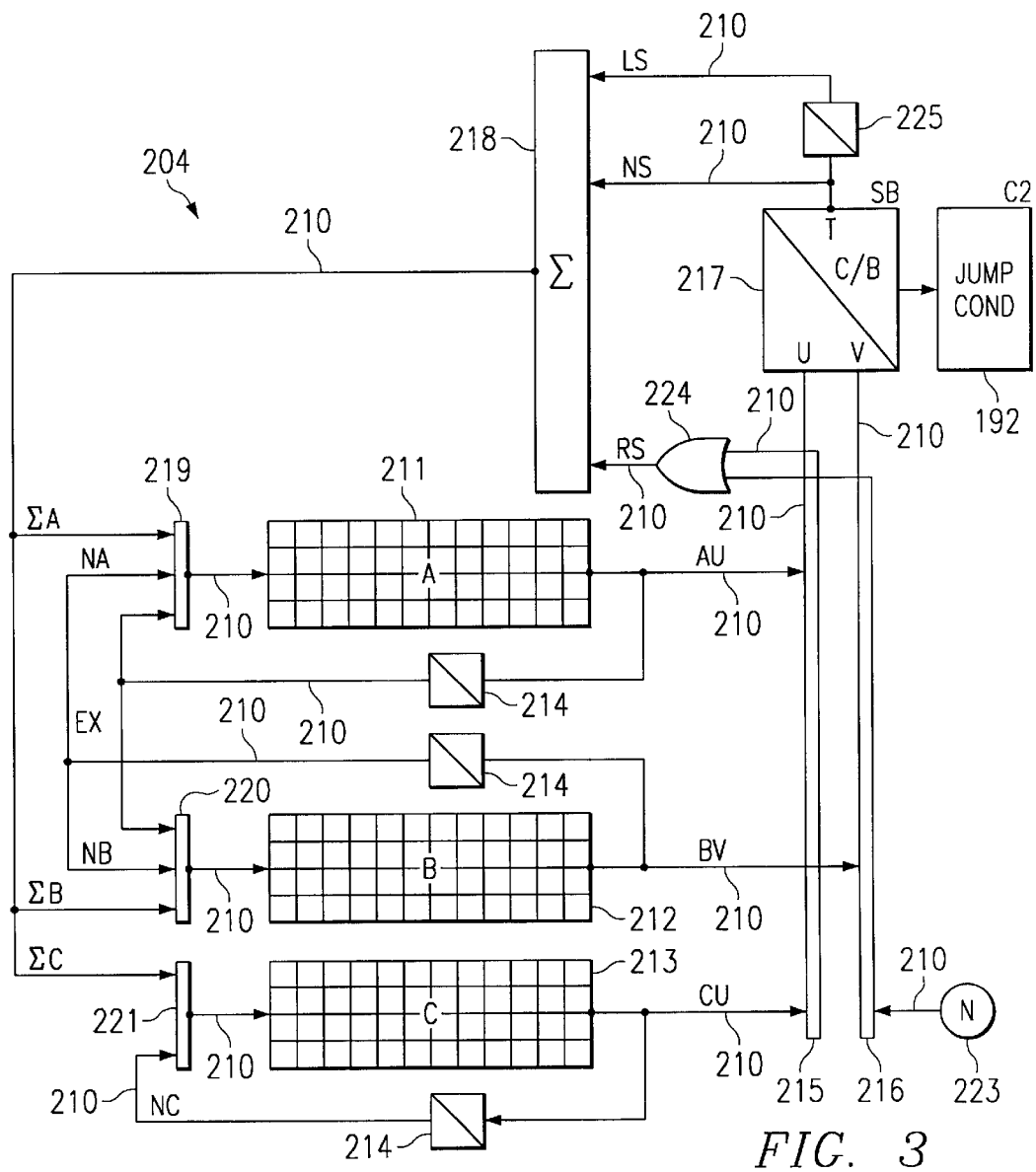
FIG. 3 is a block diagram functionally describing data block 204 of one embodiment of the calculator system of the invention.

Referring to FIG. 3, a functional description of data block 204 is described in detail. Data block 204 includes means for providing decimal or hexadecimal data storage and means for providing basic operations. The storage structure of the present embodiment is parallel for decimal or hexadecimal digits; therefore, each interconnect 210 coupling the various functional elements symbolize four physical interconnections. A register 211, B register 212 and C register 213 of memory array shift register system 206 comprise the primary decimal or hexadecimal storage means for the calculator logic unit. 1-bit dynamic shift register delay circuits 214 are utilized to provide recirculating refresh of primary registers 211, 212 and 213. The outputs of A register 211 and C register 213 are input to the U selector 215. The output of B register 212 and a constant N provided by means 223 are input to V selector 216. A binary or binary coded decimal (BCD) adder 217 calculates the sum or difference between U and V, i. e., U+V or U−V. U is the plus side of the adder; V is the minus side of the adder. A Σ data selector 218 provides means for short and long path shifting operations. An output from adder 217 to an input of Σ data selector 218 corresponds to the normal path in which no shift is provided. The delayed adder input 225 to Σ data selector 218 corresponds to the long path in which a left shift is provided. The UV logical OR-gate 224 input to Σ data selector 218 corresponds to a short path which provides for a right shift. Data selector 219 selects the input to A register 211 as either the Σ output of Σ data selector 218 or the delayed B register 212 output or the delayed A register output. Data selector 220 selects the input to the B register as either the Σ output of Σ data selector 218 or the delayed A register 211 output or the delayed B register 212 output. Data selector 221 selects the input to the C register as either the Σ output of Σ data selector 218 or the delayed C register 213 output. Jump condition latch circuit 192 is loaded with the carry-borrow output of adder 217.

A register 211, B register 212 and C register 213 each provide dynamic recirculating storage for thirteen decimal or hexadecimal digits in the present embodiment. Adder 217, U data selector 215, V data selector 216, Σ data selector 218, A data selector 219, B data selector 220 and C data selector 221 provide means for arithmetic and logical modification of the contents of registers 211, 212 and 213 by synchronous operation of selector and adder controls which is henceforth described in detail in the section describing control block 202.

Figure 4:
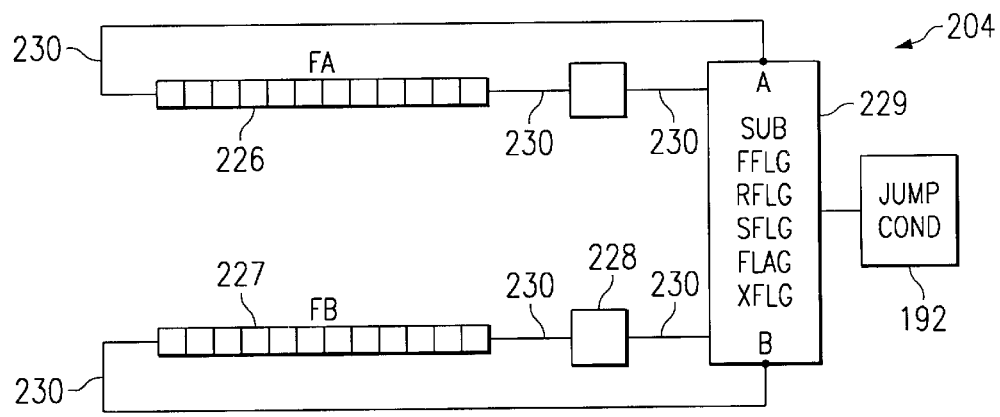
FIG. 4 is a block diagram of the FLAG registers illustrating the operation thereof.

Referring to FIG. 4, the contents of data block 204 is illustrated with respect to 1-bit status or FLAG element storage and operation. The coupling of the functional elements is indicated by interconnects 230. Two 12-bit registers FA register 226 and FB register 227 provide means for storage of status or FLAG information. The outputs of FA register 226 and FB resister 227 are delayed by 1-bit by means of dynamic shift register elements 228 before being input to FLAG operation logic unit 229. The A and B outputs of FLAG operation logic unit 229 are coupled to FLAG registers 226 and 227. Operations of FLAG operation logic unit 229 include recirculation, set, reset and toggle of individually addressed FLAGs; and, exchange and compare of FA and FB pairs of FLAGs. Controls SUB, FFLG, RFLG, SFLG, SLAG, and XFLAG are generated to perform the desired operation on a particular addressed FLAG or pair of FLAGs. The operation compare FLAG and the operation test FLAG result in an output from FLAG operation unit 229 to condition circuit 192. The control mechanism for these FLAG operations are henceforth described in detail in the section describing control block 202 below.

Control Block 202

The functions of control block 202 are to accept instruction words from program control block 201, interpret the instruction word and a condition flip-flop as a command word for a subsequent instruction cycle and decode certain controls which operate data selectors and logic units in data block 204, program block 201 and output block 205.

Figure 5:
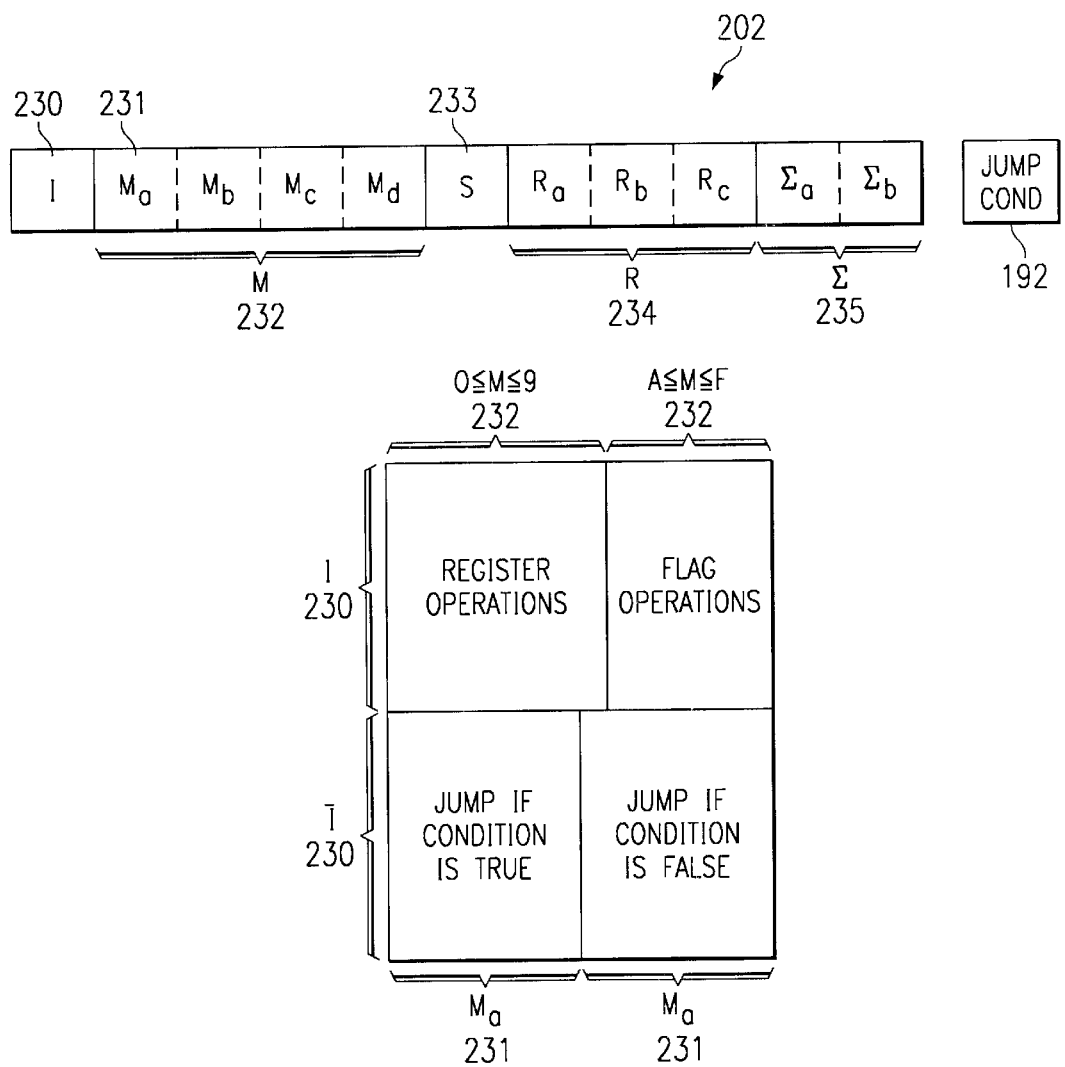
FIG. 5 is a symbolic representation of the basic command word format and instruction map utilized in an embodiment of the calculator system.

The basic command word format and instruction map are illustrated in FIG. 5. Referring to FIG. 5, I-bit 230 distinguishes jump from non-jump instructions. When I-bit 230 is a logical 0, then the instruction is a jump instruction and M-bit 231 distinguishes between true and false conditional jumps while the remaining bits of M field 232, S field 233, R field 234 and Σ field 235 contain the absolute address associated with the jump. When the instruction is a jump instruction (as indicated by a logical 0 being in the I-bit), but the jump condition is not satisfied, then ordinary incrementation of the program counter is effected. When the I-bit is a logical 1, then either a register or a FLAG operation is decoded; the entire M field 232 is used to distinguish register from FLAG operations as detailed in TABLE I below. When the binary code contained in M field 232 is between 0 and 9, a register operation is decoded; when the binary code contained in M field 232 is between 10 and 15, a FLAG operation is decoded.

In the case of register operations, the 10 codes M=0 through M=9 are used to select one of 6 digit masks in combination with one of 3 constant values (N). The assignment of the 6 masks and 3 constants depends upon the desired data word format. The selections shown in TABLE I are utilized in the programming of a floating point decimal calculator function in accordance with the present invention.

In the case of the FLAG operation, the 6 codes M=10 through M=15 are used to distinguish 6 FLAG codes, that is, compare, exchange, set, reset, toggle and test.

S-bit 233 of the command word controls three functional elements in data block 204. S-bit 233 distinguishes add from subtract in binary or BCD adder 217, distinguishes left shift from right shift in the Σ shift logic and distinguishes A from B in the FLAG operation logic. Add, shift and FLAG operations are exclusive operations and therefore require no further decoding. R field 234 distinguishes among arithmetic, exchange and keyboard input instructions as described in conjunction with TABLE II below. When the binary value contained in R field 234 is between 1 and 5, an arithmetic operation is indicated and U data selector gate 215 and V data selector gate 216 are controlled to enable the variables indicated in TABLE II as inputs to adder 217. When the binary value contained in R field 234 is equal to 6, an exchange of A and B, without digit masking is enabled, by-passing adder 217 and the Σ gate 218. When the binary value contained in R

TABLE I

| M | REGISTER MASK | N | FLAG OPERATION |
|---|---|---|---|
| 0 | ALL | | |
| 1 | EXPONENT | | |
| 2 | MANTISSA | | |
| 3 | LSD | 1-LSD | |
| 4 | MANTISSA | 1-LSD | |
| 5 | MANTISSA | 1-MSD | |
| 6 | EXPONENT | 1-EXPONENT | |
| 7 | DPT | 1-DPT | |
| 8 | DPT | 8-DPT | |
| 9 | EXPONENT | 8-EXPONENT | |
| A | | | COMPARE |
| B | | | EXCHANGE |
| C | | | SET |
| D | | | RESET |
| E | | | TOGGLE |
| F | | | TEST |

TABLE II

| R | ARITHMETIC U | V | EXCHANGE A,B |
|---|---|---|---|
| 0 | | | |
| 1 | A | N | |
| 2 | O | B | |
| 3 | C | N | |
| 4 | A | B | |
| 5 | C | B | |
| 6 | | | A⇆B |
| 7 | | | |

TABLE III

| Σ | DATA SELECTORS A | B | C |
|---|---|---|---|
| 0 | A | B | C |
| 1 | Σ | B | C |
| 2 | A | Σ | C |
| 3 | A | B | Σ | field 234 is 0 or 7, then an arithmetic no-op (no operation) is indicated, providing means for implementation of a special class of instructions for keyboard synchronization and encoding.

Σ field 235 determines the selection of the output from Σ data selector 218 to A register 211, B register 212, C register 213 or none of these Σ data selector outputs. As shown in TABLE III, three codes are decoded to enable the output of Σ data selector 218 to be input to A register 211, B register 212 and C register 213; and the fourth code provides means for a no-op code to enable a class of keyboard synchronization and encoding instructions.

Condition circuit 192 reflects the status of the calculator at any given point in the execution of its fixed program. It is combined with the contents of Ma-bit 231 to determine if a jump instruction is to be executed or skipped. Condition circuit 192 is loaded with a carry-borrow (C/B) result of an arithmetic operation, the contents of any FLAG test or comparison (FA:FB) of any pair of FLAGs with a common (FMSK) address, the scanned conductance(closed equals 1) of key matrix cross-points of the keyboard switches in normal scanning sequence, or the value of a particular digit scanner state, for example, D11.

The carry-borrow and FLAG inputs to the condition circuit provide means for convenient branch operations whereby the sequential program execution can be made dependent on results of data, on arithmetic register operations, and on the current status of the calculator system as indicated by any of a plurality of status memories (FLAGs) as for example in the illustrated embodiment in which 26 FLAGs are available.

The key matrix and digit scanner inputs to the condition circuit provide means for convenient and efficient synchronization and encoding under program control of a plurality of keyboard inputs, as for example in the present illustrated embodiment, 44 inputs are available. TABLE IV shows the coding and operation of these instructions. The WAIT operations provide control means to recirculate program counter (PC) 209 at its current value (not incremented) until the WAIT condition (D11, KN, or KP) is satisfied. In addition, a register operation which subtracts the numeral 1 from the mantissa of A register 211 can be associated with the D11 WAIT condition and is associated with the KN and KP WAIT condition instructions. The logical shift and FLAG initialization instructions are also shown in TABLE IV.

Timing Block 203

Figure 6:
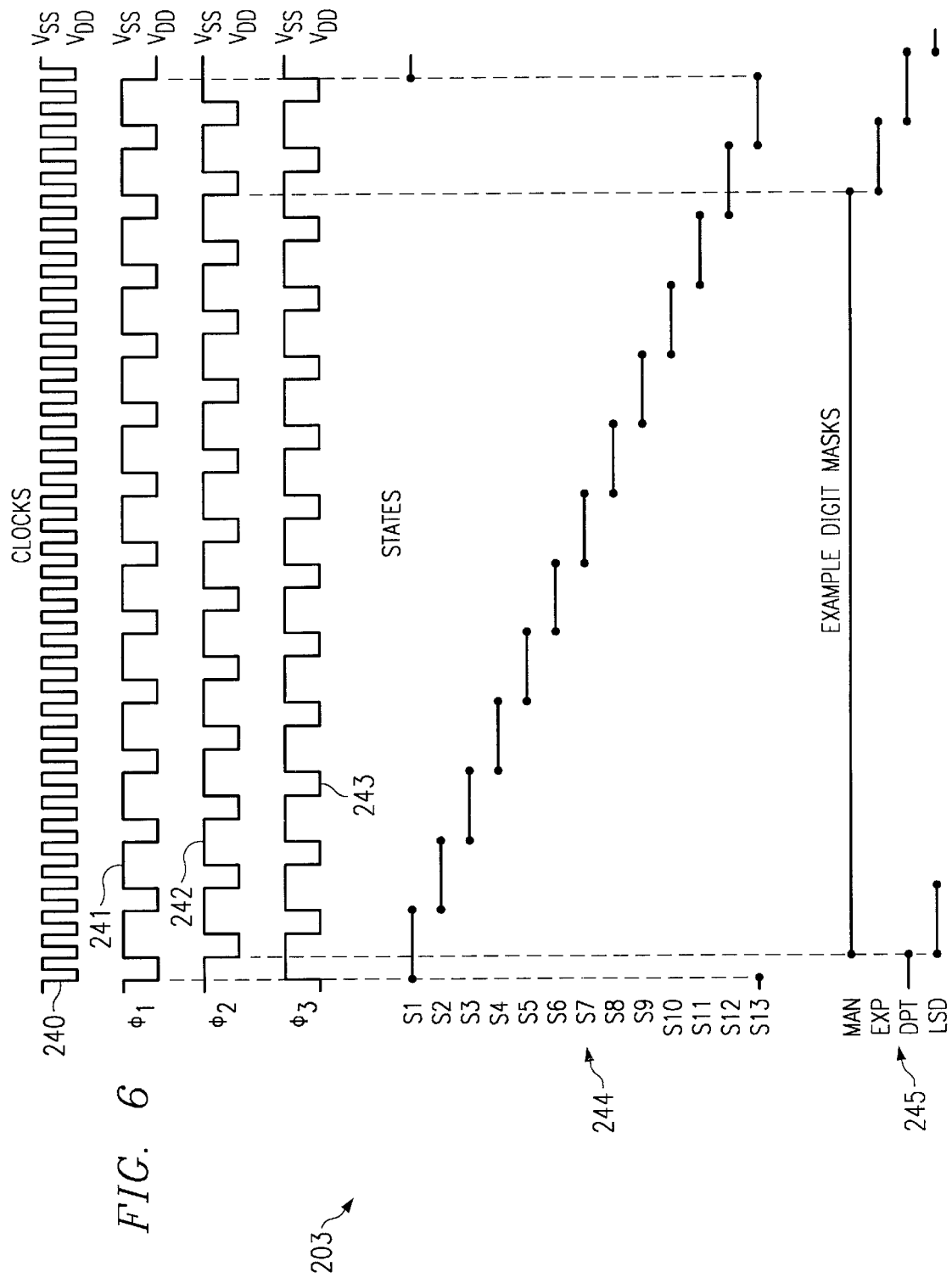
FIG. 6 is a graph illustrating the basic instruction cycle timing for the calculator system.

The function of the subsystem within timing block 203 is to generate three phase internal clocking (internal being within the monolithic structure of the preferred MOS embodiment) from an external single phase oscillator voltage, generate internal state and digital timing based upon the clocking inputs and provide digit and FLAG masking decoders. The basic instruction cycle timing for the calculator is illustrated in FIG. 6. The φ system timing input 240 is a square wave provided by an oscilator with approximately 50% duty cycle. The 3 internal clocks $\phi_1$, $\phi_2$ and $\phi_3$ provide signals 241, 242 and 243, respectively, which are derived from the φ system clock by means of a recirculating ring counter. With binary coded decimal parallel arithmetic utilized in accordance with the present invention, each digit of add or subtract calculation utilizes one full set of clock pulses $\phi_1$, $\phi_2$, and $\phi_3$. The full set of clock pulses is considered a state; consider for example the first state S1 with a corresponding signal 244. There are 13 such states S1–S13 corresponding to the 13 digit circulation of registers 211–213 in data block 204. The 13 states are generated by means of a feedback shift counter. Although the 13 states and 13 digit registers will allow storage of 13-digit numbers, a generalized floating point notation which is more convenient from the standpoint of program storage and manipulation of data is utilized in accordance with the present invention. This is accomplished by the masking and sub-addressing of registers 211–213 to mask or isolate 6 particular fields as follows: Mantissa field 245 which has N digits, the first of which is the least significant digit (LSD), the last of which is the overflow digit (OVF) and the (N−1)th digit of which is the most significant digit (MSD); masks are thus provided for the mantissa, the LSD, the MSD and the OVF. There is also provision for an exponent (EXP) mask and a display (DPT) mask. These 6 masks are generated in the digit mask decoder as commanded by the M mask field 232 of the instruction word. In accordance with the present invention, the masks are

TABLE IV

| I | M | S | R | Σ | WAIT COND. | REGISTER ARITHMETIC | JUMP COND. | CLEAR FLAGS |
|---|---|---|---|---|---|---|---|---|
| 1 | 0 | 0 | 7 | 0 | D-11 | | | |
| 1 | 0 | 0 | 0 | 0 | D-11 | A-1→$A_M$ | | |
| 1 | 0 | 1 | 0 | 0 | KP | A-1→$A_M$ | | |

TABLE IV-continued

| I | M | S | R | Σ | WAIT COND. | REGISTER ARITHMETIC | JUMP COND. | CLEAR FLAGS |
|---|---|---|---|---|---|---|---|---|
| 1 | 1 | 0 | 0 | 0 | KN | A-1→$A_M$ | | |
| 1 | 1 | 1 | 0 | 0 | | | KOvKN | |
| 1 | 1 | 0 | 0 | 0 | | | KQ | |
| 1 | 0 | 0 | 1 | 1 | | SLL(A) | | |
| 1 | 1 | 0 | 2 | 2 | | SLL(B) | | |
| 1 | 2 | 0 | 3 | 3 | | SLL(C) | | |
| 1 | 0 | 1 | 1 | 1 | | SRL(A) | | |
| 1 | 1 | 1 | 2 | 2 | | SRL(B) | | |
| 1 | 2 | 1 | 3 | 3 | | SRL(C) | | |
| 1 | 13 | 0 | 3 | 1 | | | | FA |
| 1 | 13 | 1 | 3 | 1 | | | | FB | individually adjustable so that variable functioning systems can be accommodated within the calculator system. In the MOS embodiment, variations of the masks are effected by varying the gate oxide mask during the fabrication process to change the calculator operation. One variation for example, would be to set up one or more of the 6 masks to cover two digits and controlling the adder circuit in the data block to operate in hexadecimal as opposed to binary coded decimal thereby allowing for the processing of 8-bit binary characters by the calculator system.

In addition to the digit mask provisions, a subsystem of timing block 203 controls the addressing of FLAGS. The addressing of FLAGs is essentially a one out of thirteen selection and is accomplished by the FLAG mask decoder.

Figure 7:
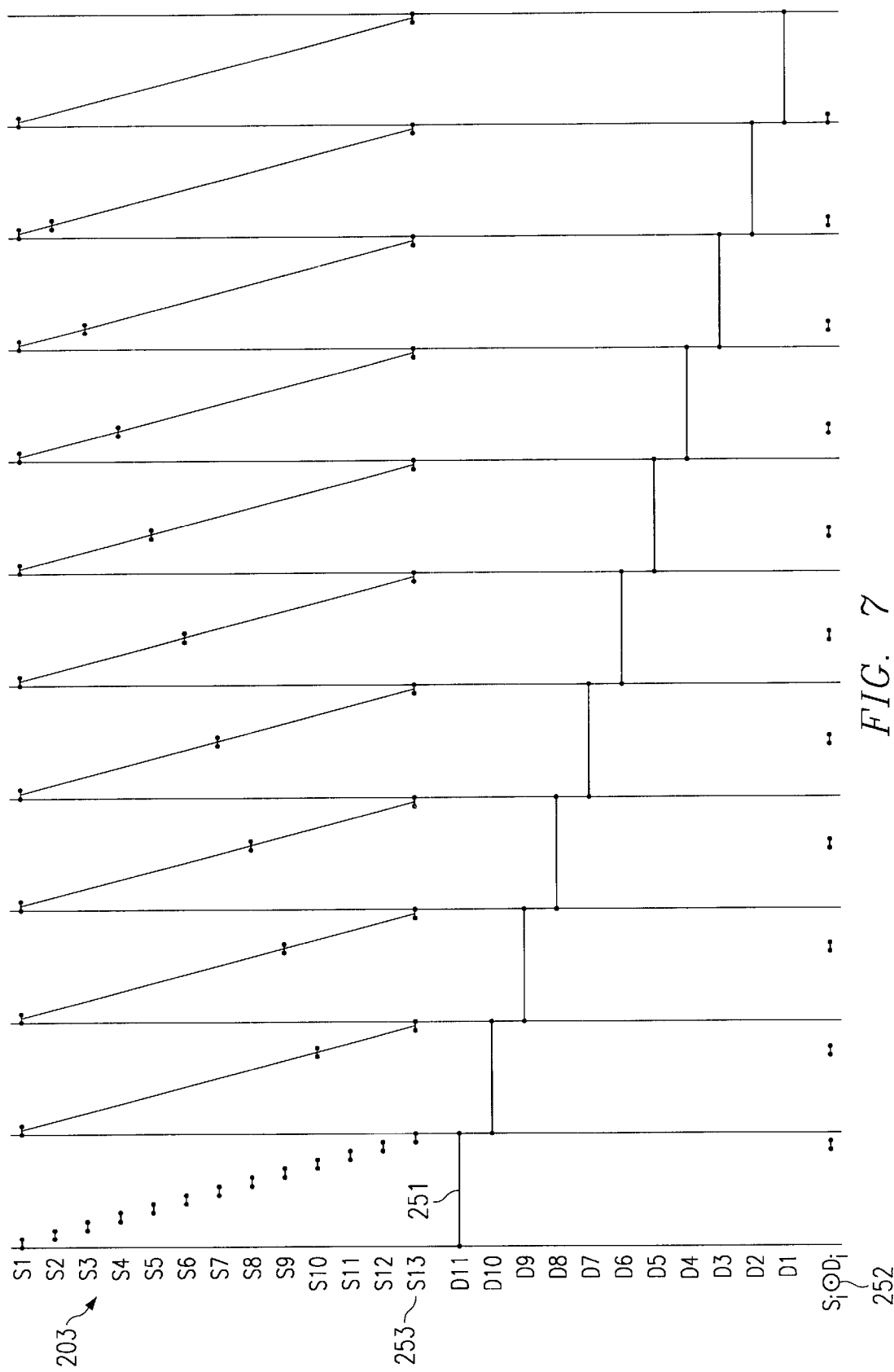
FIG. 7 is a graph representing the scan cycle timing for the keyboard and display scan and relates the scan cycle to the instruction cycle timing period.

FIG. 7 illustrates the scan cycle timing for the keyboard and display scan and relates the scan cycle to the instruction cycle timing period. In accordance with the present embodiment of the invention both the key-board inputs and display outputs are scanned with the same scan signals. In this manner, the number of pins required to package the system as a monolithic integrated semiconductor structure are reduced to a minimum and the internal system logic is simplified. It is desirable to scan at a rate which is slow enough to be consistent with conventional displays such as a neon tube display in addition to, for example, a liquid crystal display and simultaneously to calculate at a very high rate. Hence, the scanner of the present invention operates by nesting multiple instruction cycles within a scan cycle. In the illustrated embodiment there are 11 scan signals which are sufficient for a 10 digit numeric display plus a 1 digit control display such as an error (E) signal or minus (-) sign. This also allows very efficient coding of the keyboard entry routine. During each digit time, for example, D11 with logic 1 signal 251, 1 digit of a particular register is synchronously decoded. In order to retrieve the various digits of a particular register in sequence the output decoder is double buffered. The input of the buffer is clocked on the state 252 which corresponds to the (equivalence: $S_i \odot D_i$). The output is clocked on a fixed state, for example, signal 253 of state S13, synchronous with the digit scan cycle. In this manner, during a digit scan cycle, each digit from the registers is recovered in sequence and synchronously displayed. The digit counter is itself clocked by a particular state, for example, state S13 and Operated by a feedback shift counter similar to the state feedback shift counter. In the present embodiment, the digit feedback shift counter counts down modulo 11 whereas the state counter counts up modulo 13. In this manner the real-time most-significant-first scan which results provides means for implementation of zero suppression logic in the display.

Figure 8:
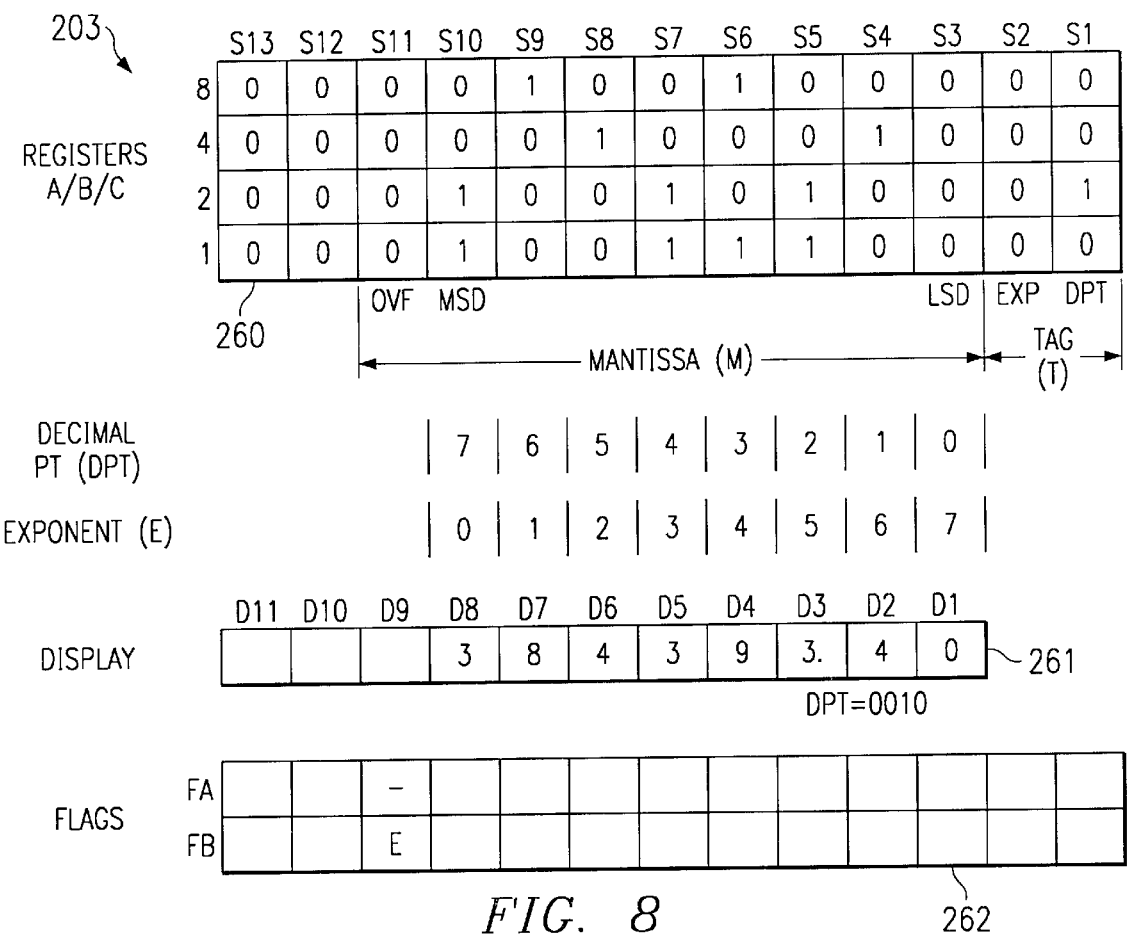
FIG. 8 is a representation of the data format for the A register, B register, C register, FA FLAG register, FB FLAG register and display.

The exemplified digit masks discussed with respect to FIG. 6 are further clarified in FIG. 8. FIG. 8 illustrates the data format for A register 211, B register 212, C register 213, FA FLAG storage element 226, FB FLAG storage element 227, and the display. A numeric example is shown in the register format 260 in order to clarify the operation of the digit masks. In the example, the decimal points (DPT) is shown equal to 2. Therefore, in display format 261, the decimal appears at the $D_3$ location. The mantissa field is shown in the example for an 8 digit calculator system to exist between S11 and S3.

Although there is no rigid requirement for the FLAG format 262, in the present embodiment it is convenient to dedicate FA FLAG storage element 226 and FB FLAG storage element at S11 mask or time-address to storage of the minus (-) and error (E) FLAGS for the display. In this manner the logic of segment decoder 198 and hence of output block 205 is greatly simplified.

Finally, the subsystem of timing block 203 includes the key input logic. The function performed by this logic is buffering and synchronization to the internal instruction cycle. In accordance with the present calculator system no provision need be made in hardware to defeat transient noise, mechanical key bounce or double key entry; each of these functions are included as fixed program routines.

Program Block 201

As illustrated in FIG. 2, the subsystem of program block 201 is comprised of read only memory (ROM) 208 and program counter (PC) 209. Read only memory 208 functions as a storage means for a linear program list which in the present embodiment contains 320 11-bit instruction words to provide the fixed programs which perform the particular calculator functions. Various embodiments of the calculator system are therefore provided by providing various combinations of programs in read only memory 208. Read only memory 208 may be programmed in accordance with the techniques described in U.S. Pat. No. 3,541,543 to R. H. Crawford et al, titled Binary Decoder. The programs may include keyboard input routines, internal format routines, internal calculation routines and display format routines. Specific programs utilized in conjunction with the desk top calculator function of the calculator system and the programming of the calculator system to perform other functions are described in a later section.

Program counter 209 is, in the present embodiment, a 9-bit dynamic storage register which accepts a new input during each instruction cycle. The new input is either the program count itself, the program count incremented by 1 or 9-bits from the previous instruction word. These three inputs provide WAIT instructions, normal operating instructions and jump instructions, respectively.

Figure 9:
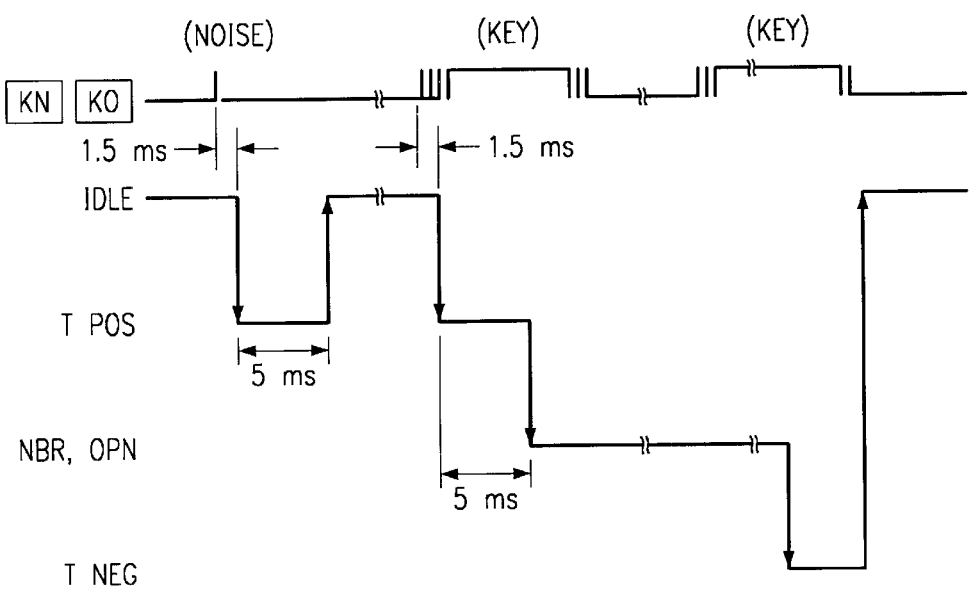
FIG. 9 is a graph representing the keyboard program timing showing that the input-sensing program provides protection against transient noise, double-entry, leading-edge bounce and trailing-edge bounce.

One function of program block 201 is to provide a defeat mechanism by which malfunction of the keyboard encoding procedure is prevented. The input-sensing program provides protection against transient noise, double-entry, leading-edge bounce, and trailing-edge bounce, as shown in FIG. 9. An 'IDLE' routine sequentially scans the [KO], [KN] and [KQ] inputs until a non-quiescent input is detected. The input is sampled again 2.5 ms later by a "TPOS" routine to distinguish a valid key-push from the transient noise. If the test is positive, then (5 ms after the initial detection) the program jumps to a 'NBR' or 'OPN' entry routine; otherwise, it returns to the 'IDLE' routine. The 'NBR' routine enters the number which is keyed-in into the display register; 'OPN' performs the keyed-in operation. Both routines terminate in a jump to a 'TNEG' routine. 'TNEG' performs a scan of the [KN], [KO] and [KQ] inputs to determine that the entire keyboard is in its quiescent condition. After a successful (negative) test the program jumps back to the 'IDLE' routine.

Figure 10:
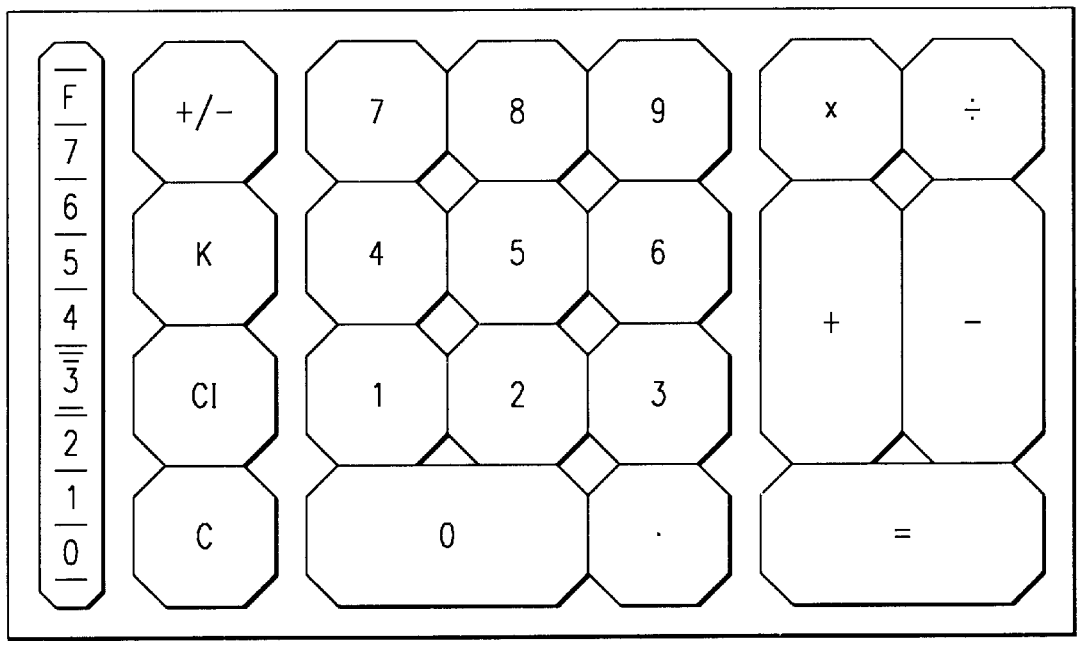
FIGS. 10 and 11 are planar diagrams showing exemplary calculator keyboards utilized in conjunction with the present calculator system.
Figure 11:
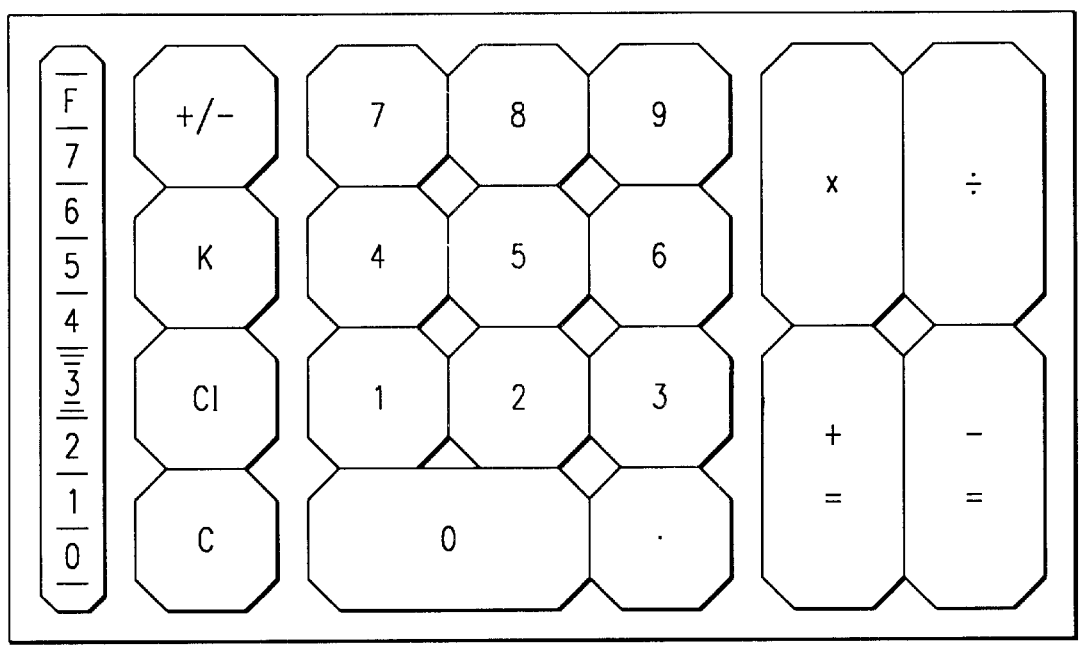

Five classes of keyboard inputs and consequent program routines are utilized in order to perform calculations and/or logic functions with the Calculator System, as follows: Number Keys, Mode Switches, A Decimal Point Switch, Operation Keys, and Interlock Keys. The distinctions between "keys" and "switches" is that keys are operated momentarily and exclusively, whereas switches are generally static and may have a normally-closed position. The program classes are explained by way of example; exemplary Calculator Keyboards using these keys are shown in FIGS. 10 and 11.

Number Keys: There are ten numeric keys and a decimal point key. Operation of the [0], [1], [2], [3], [4], [5], [6], [7], [8], and [9] keys left-shifts the display register one digit and enters the corresponding number into the least-significant digit. The [.] key is operated in normal sequence of figure entry. If it is not used, the point is assumed to be after the last numeric entered. The entry mode is always floating.

Mode Switches: The constant switch [K] selects between chain operation and constant operation. Normal operation of the calculator, with the constant key [K] up (open) allows chained calculations without loss of intermediate results. Alternative operation with [K] down (closed) allows constant operand operation.

Point Switch: Floating or fixed mode of operations is selected by an 11-position switch [F]-[9]-[8]-[7]-[6]-[5]-[4]-[3]-[2]-[1]-[0]. Positions [0] through [9] are used for fixed-point calculation results; the [F] position selects full-floating operation.

Operation Keys: With 10 Number Keys, 2 Mode Switches, 11-position Point Switch, and 44 Matrix Crosspoints, there remains space for a total of 21 possible operation keys. These key locations are sufficient to include the two main keyboard configurations illustrated in FIGS. 10 and 11. [+] Stores an addition command and performs a possible preceding operation; [−] stores a subtraction command and performs a possible preceding operation; [×] stores a multiplication command and performs a possible preceding operation; [÷] stores a division command and performs a possible preceding operation; [+/−] changes the sign of the display register; [=] performs the preceding operation and stores a command to clear at the next number entered;. [+] enters the last keyed-in number in the calculator and performs a possible preceding operation; [−] enters the last keyed-in number in the machine as a negative number; [C] clears all three registers and any preceding operation; [CI] clears the display register.

Interlock Key routines are functional hybrids of (momentary) operation keys and (static) mode switches. They provide a mechanism for interlocking the operation of the Calculator System to the operation of other devices. In particular, the Calculator System may be programmed for at least three additional types of applications by the operation of Interlock Key routines, as follows: the Calculator System (master) controlling of a Slave Device (e. g., print mechanism or print control circuit); slave operation of the Calculator System by a Master Device (e. g., a remote controller through a real-time communication medium); and multiprocessing by a plurality of Calculator Systems of the present invention according to a preprogrammed interlock routine for determination of priority and effecting of intercommunication.

Output Block 205

In the described embodiment of the Calculator System, twenty-two outputs are provided to perform display and keyboard scanning, and synchronously decode the contents of the display register.

Figures 12, 13:
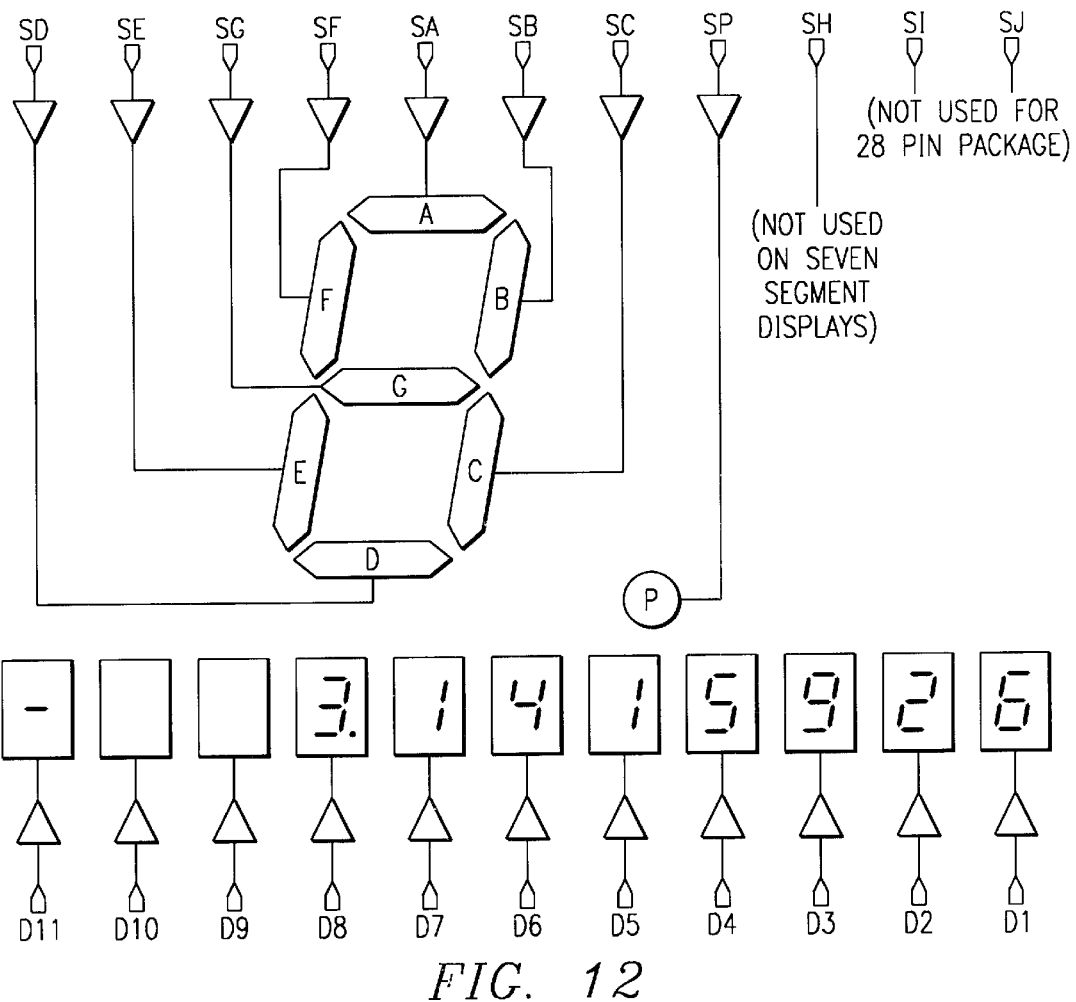
FIG. 12 is a circuit diagram of the display element showing the input and output connections to the digit scanning circuits.
FIG. 13 is a diagram showing a representative display font of a display utilized in conjunction with an embodiment of the present invention.

Referring to FIG. 12, the Digit Driver (D1, D2, D3, D4, D5, D6, D7, D8, D9, D10, D11) outputs of digit decoder 195 are used to scan-encode the keyboard and to scan the display. An inter-digit blanking signal is gate-mask programmed to disable the digit drivers for interface to particular display devices. The polarity of the digit signals is positive; that is, during Di, Di is conducting to VSS. This is provided in the described MOS calculator system embodiment in order to effectively scan the keyboard matrix.

The Segment Driver (SA, SB, SC, SD, SE, SF, SG, SH, SI, SJ, SP) outputs of the segment decoder 198 are gate-mask programmed for direct compatibility with 7- and 8-segment (plus decimal point) displays. In addition to segment code, both inter-digit blanking and segment polarity can be selected. Thus, the inter-digit blanking signal is programmable in increments of 12 microseconds (nominal); and it can be applied to either digit drivers or segment drivers, or both. The leading zeros (high-order zeros before the decimal point or a non-zero figure) are suppressed by disabling all segment drivers.

Figure 14:
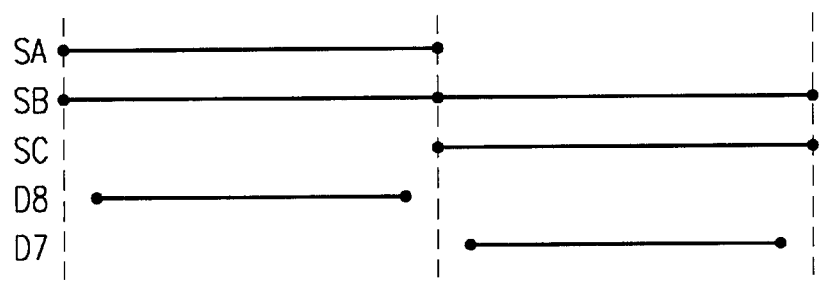
FIG. 14 is a graph showing how the segment drive includes the digit drive of an embodiment of the invention.
Figure 15:
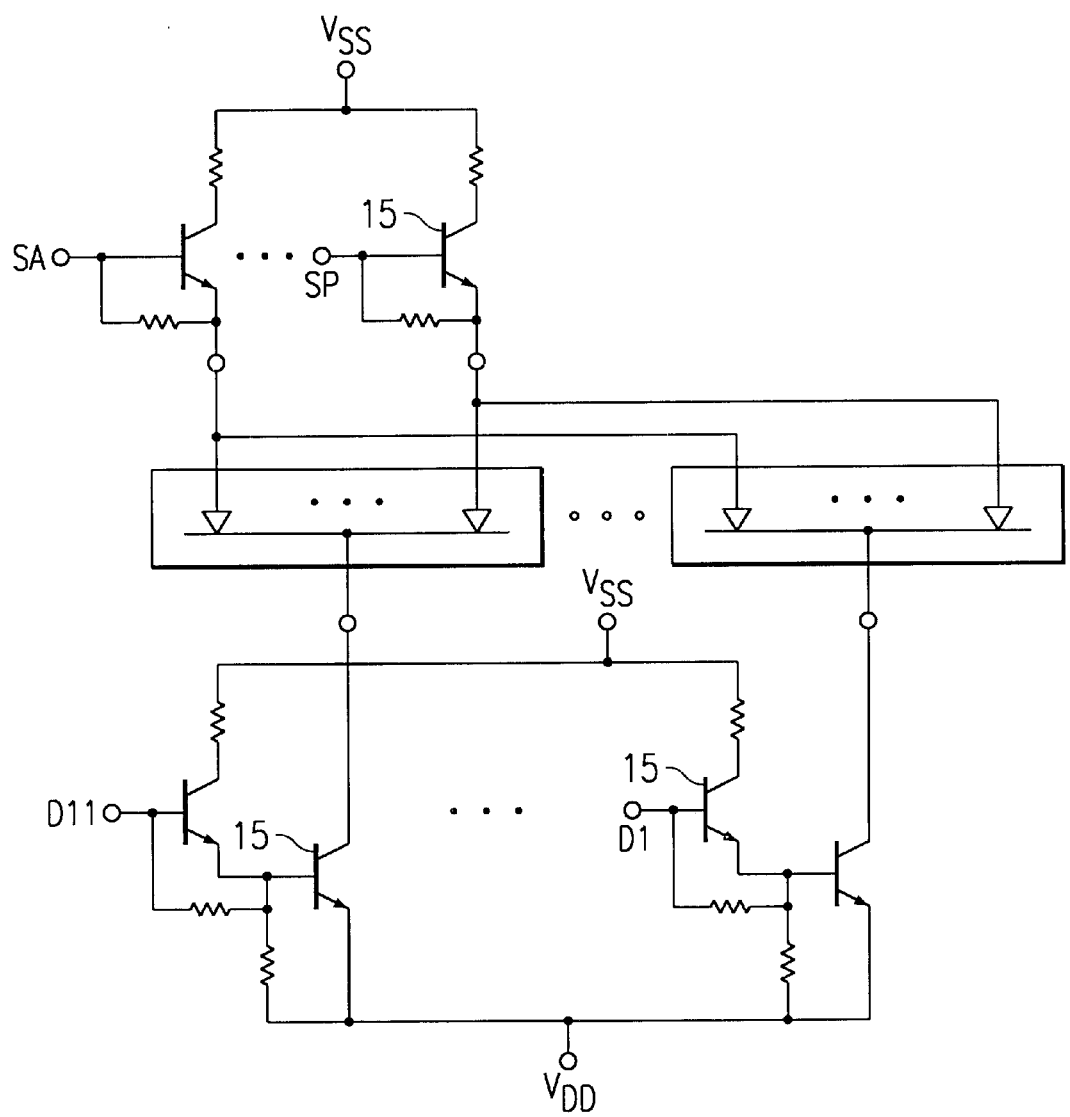
FIG. 15 is a circuit diagram of an interface circuit between the display elements and the scanning circuits in an embodiment of the present invention.

The described Calculator System embodiment digit and segment decoders have been programmed for a 7-bar digit-blanked characteristic with positive segment decoding (segment A "on" is decoded as SA conducting to VSS). The display font is illustrated in FIG. 13. The complete coding of the numerals, error (E) and minus (−) indications are shown. SH is not used for display but outputs information useful for testing purposes. SI and SJ are available in hardware for use with numeric displays with one terminal (e.g., cathode) per numeral. However, these outputs are not used for, segmented displays in order to allow the monolithic integrated semiconductor embodiment of the Calculator System to be placed in a 28-pin packaging. When a clock period is 4 microseconds, for example, the scan rate is 156 microseconds per digit. For example, the present embodiment is programmed for 12-microsecond leading-edge blanking and 12-microsecond trailing-edge blanking on the digit drivers only. Hence,the segment drive covers the digit drive, as illustrated in FIG. 14. An interface circuit which includes bi-polar transistors 15 for a common-cathode 7-bar LED display is shown in FIG. 15. The interface circuit of the present embodiment is fabricated on a separate semiconductor substrate.

FIG. 16 illustrates the key assignment of the described calculator embodiment. Each key, e. g., 340 is a Form A normally open single pole, single throw switch, which has meaning for the particular input routine programmed in ROM 208.

It is also contemplated that some of the "Mode Switches" discussed previously in the Program Block section could in some embodiments be in the form of jumper wires, thus more permanently selecting a particular mode for a particular model or family of equipment. In this way, a "master program" involving a single embodiment of the invention could economically and feasibly cover the whole family of distinct operational characteristics.

Logic and Circuit Description of the Mos Calculator System Embodiment

Figure 17A:
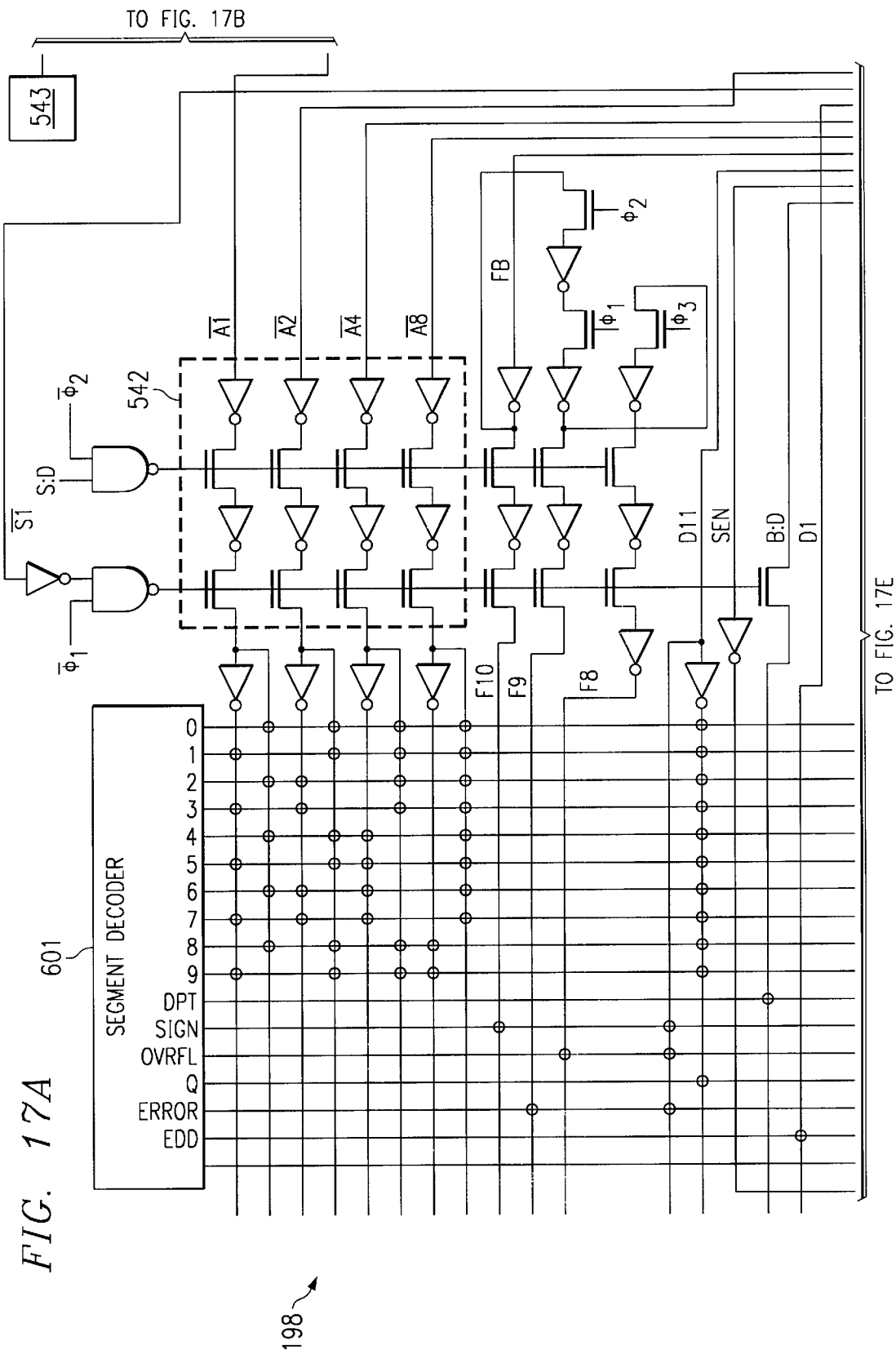
Figure 17B:
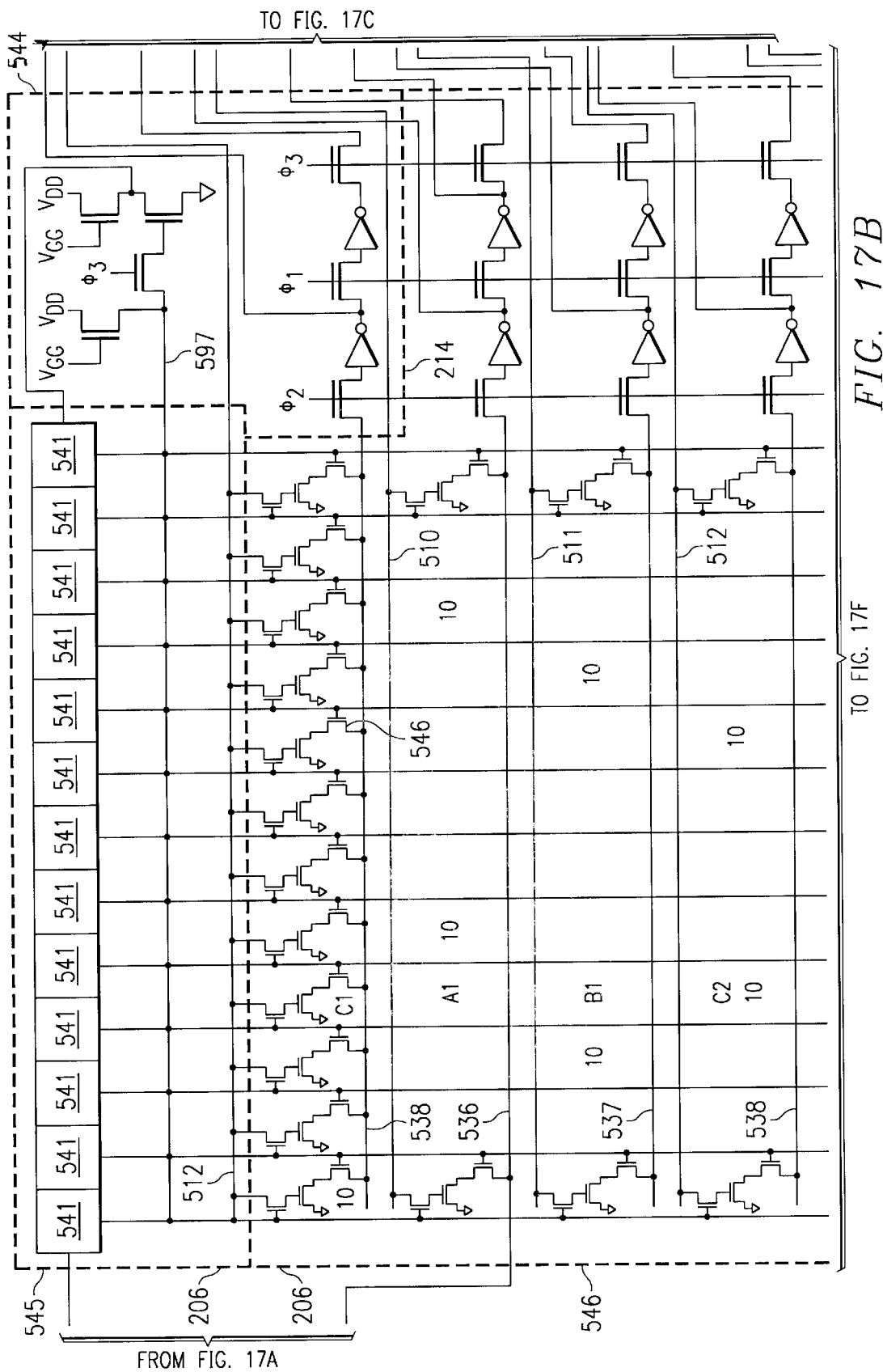
Figure 17C:
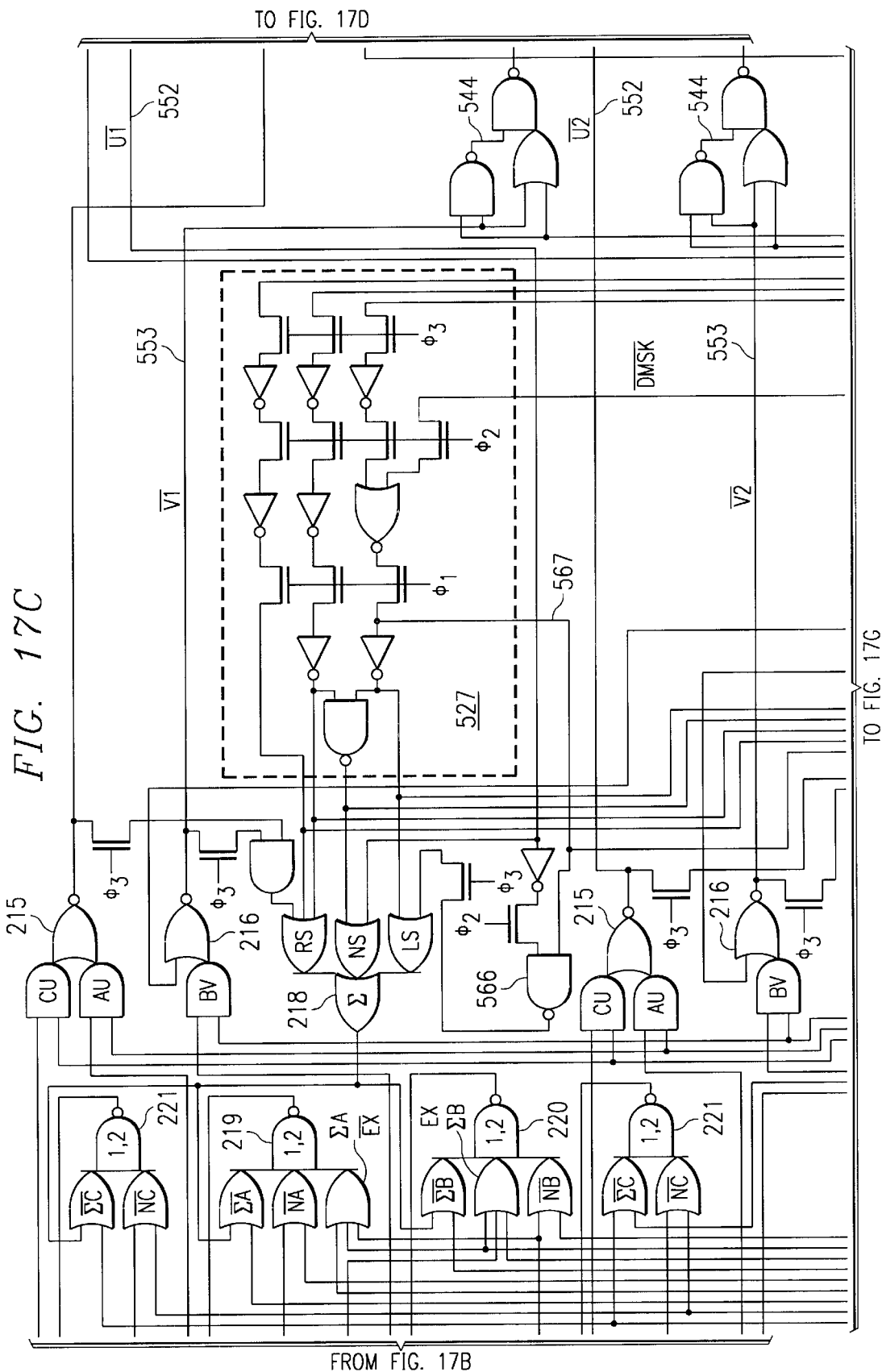
Figure 17D:
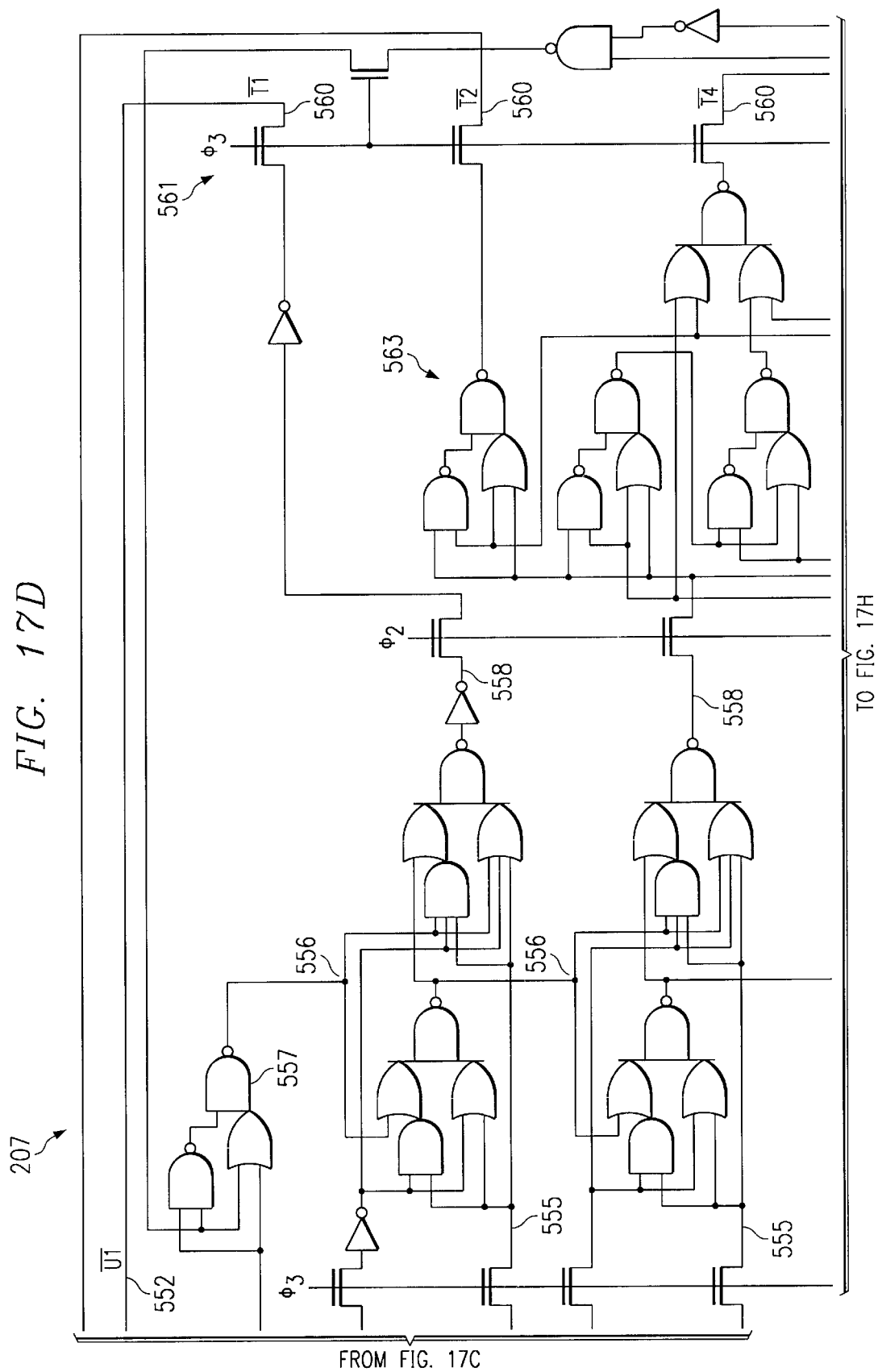
Figure 17H:
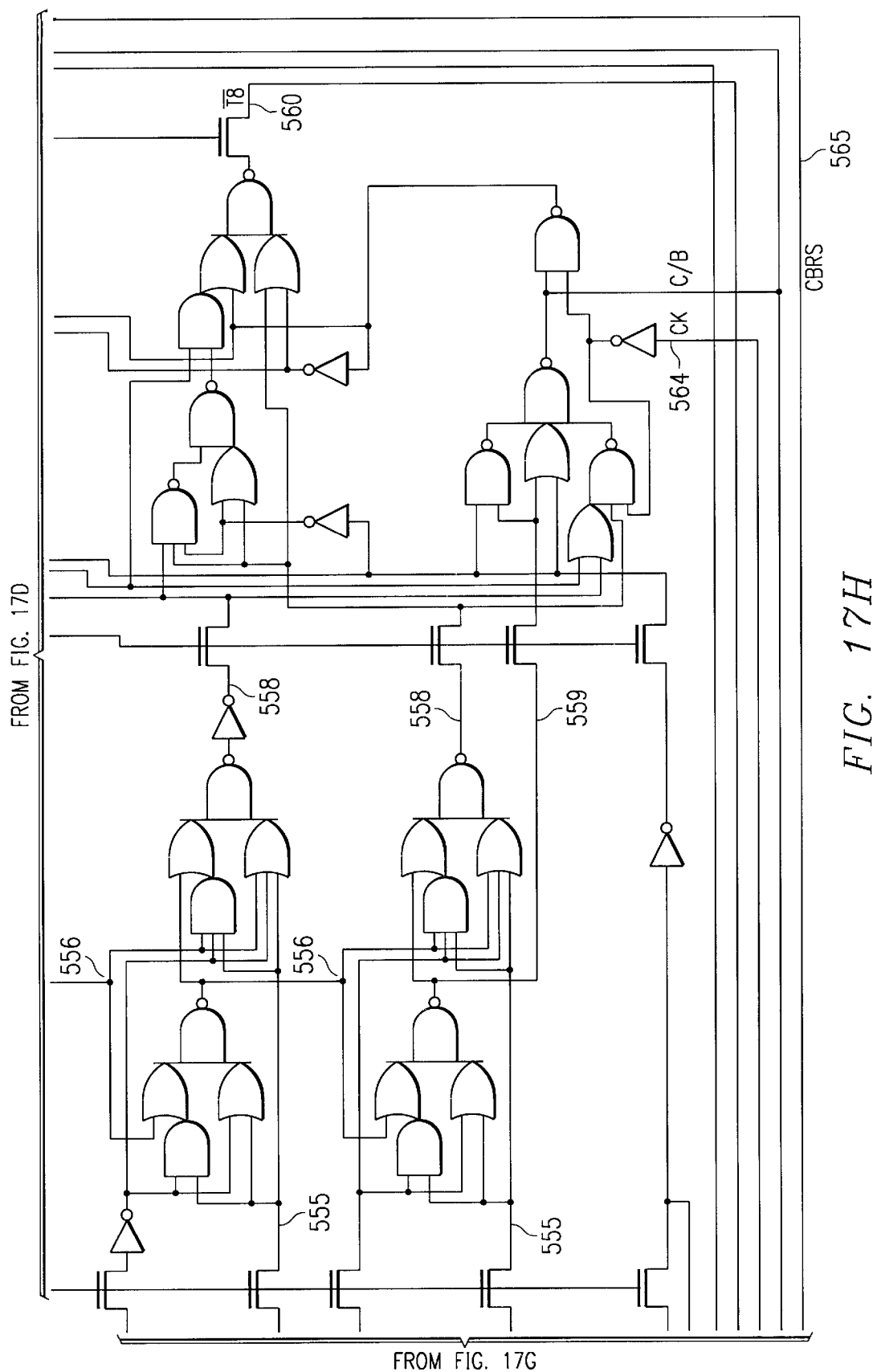
Figure 17I:
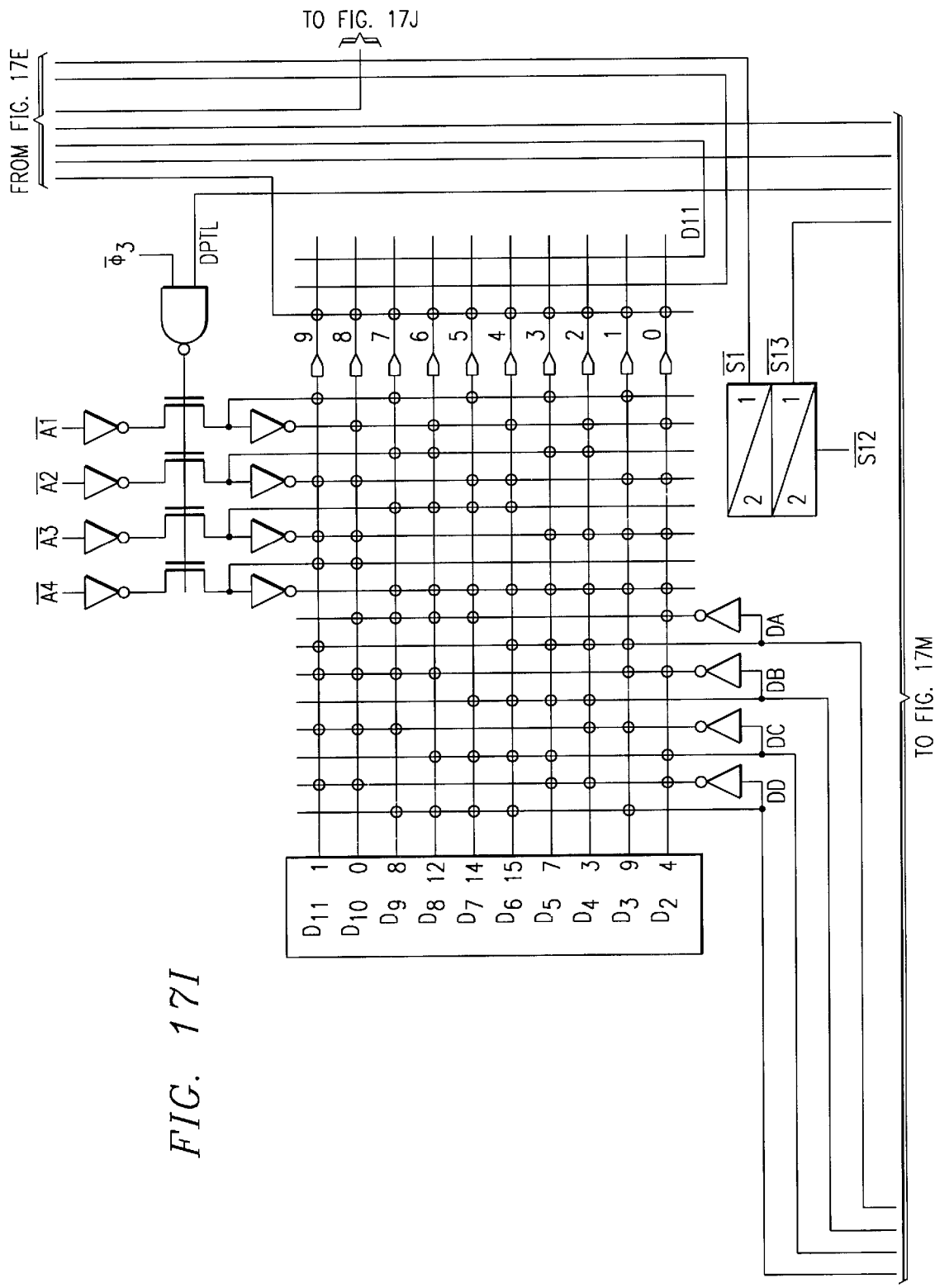
Figure 17L:
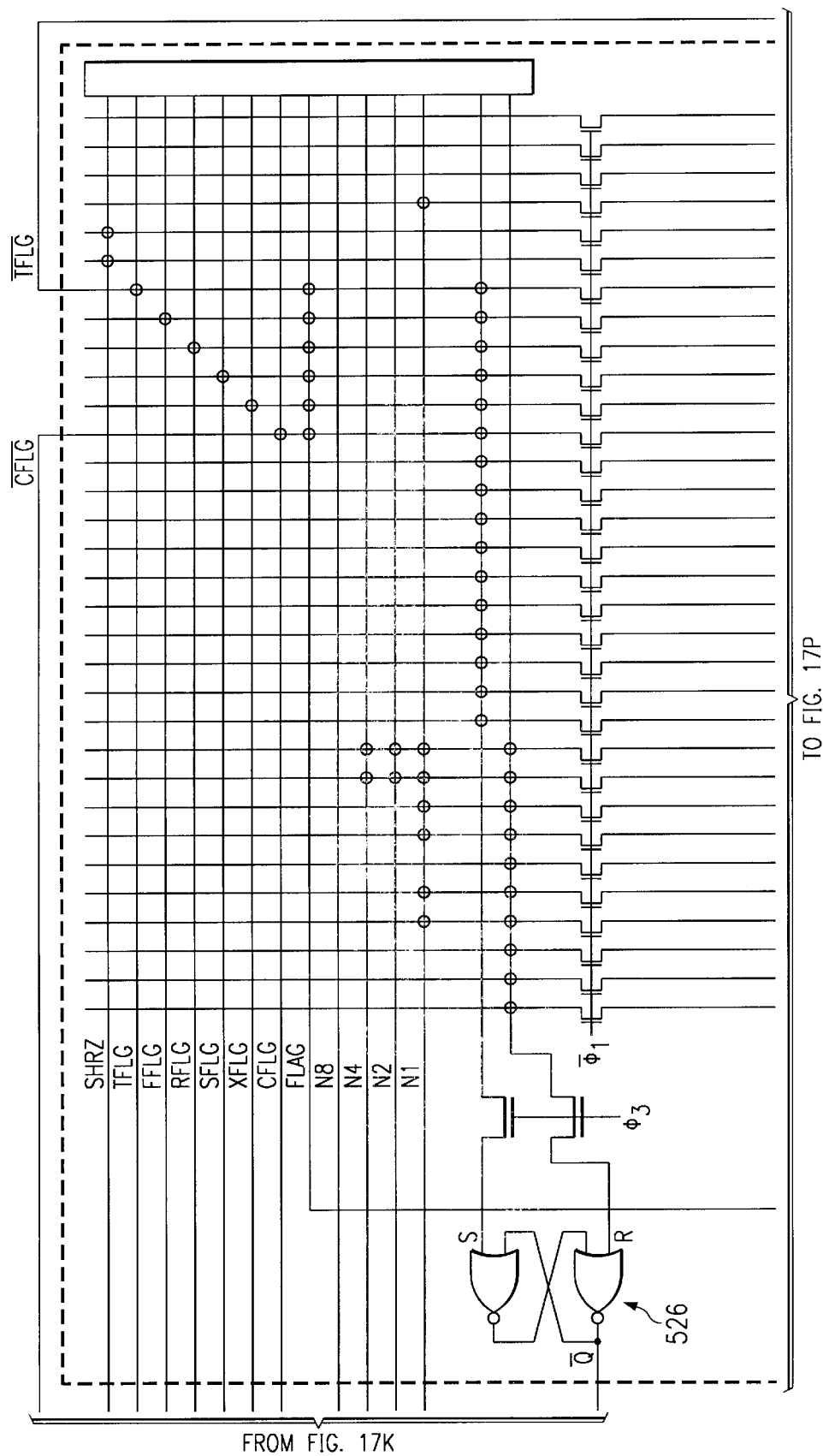
Figure 17M:
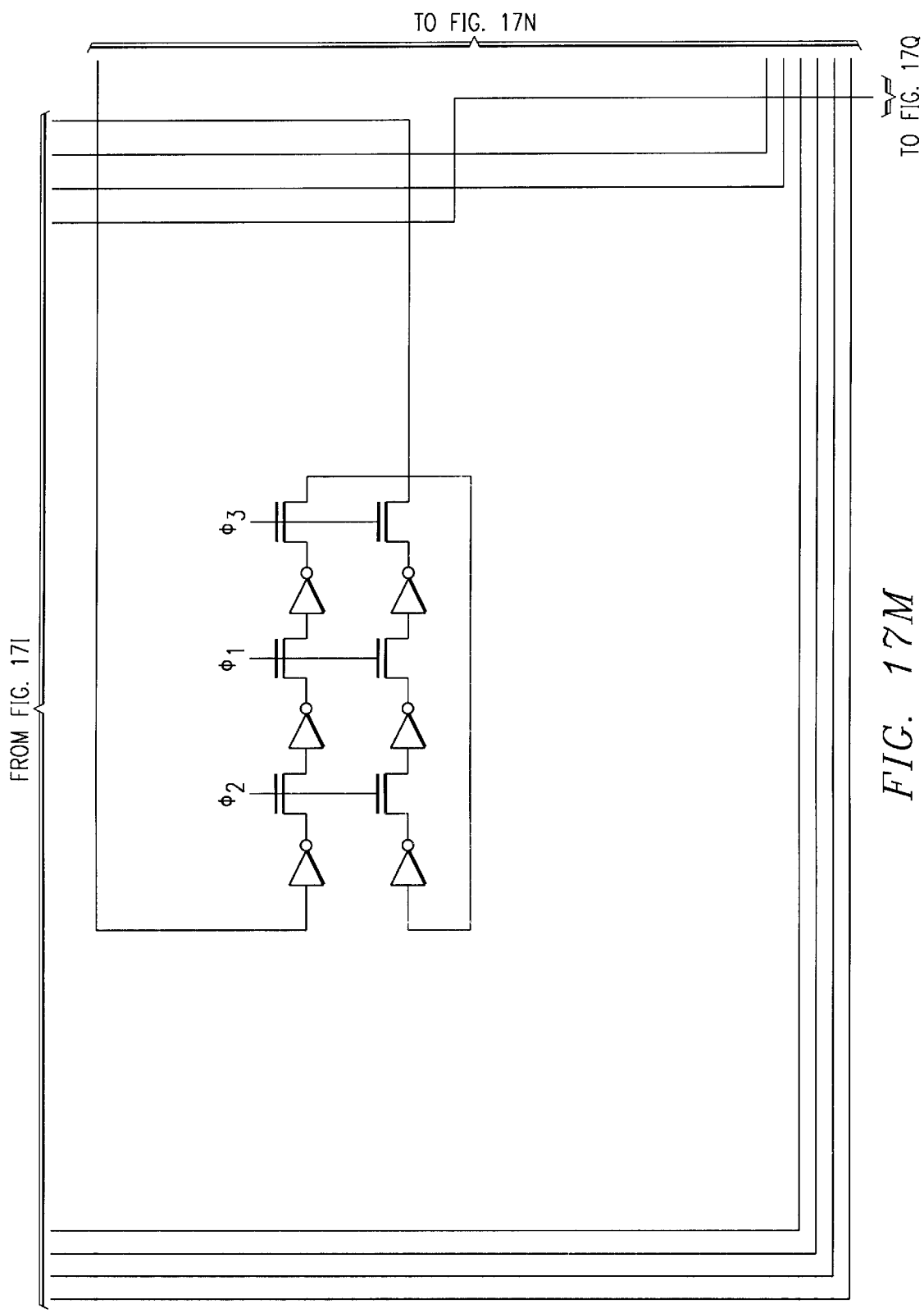
Figure 17N:
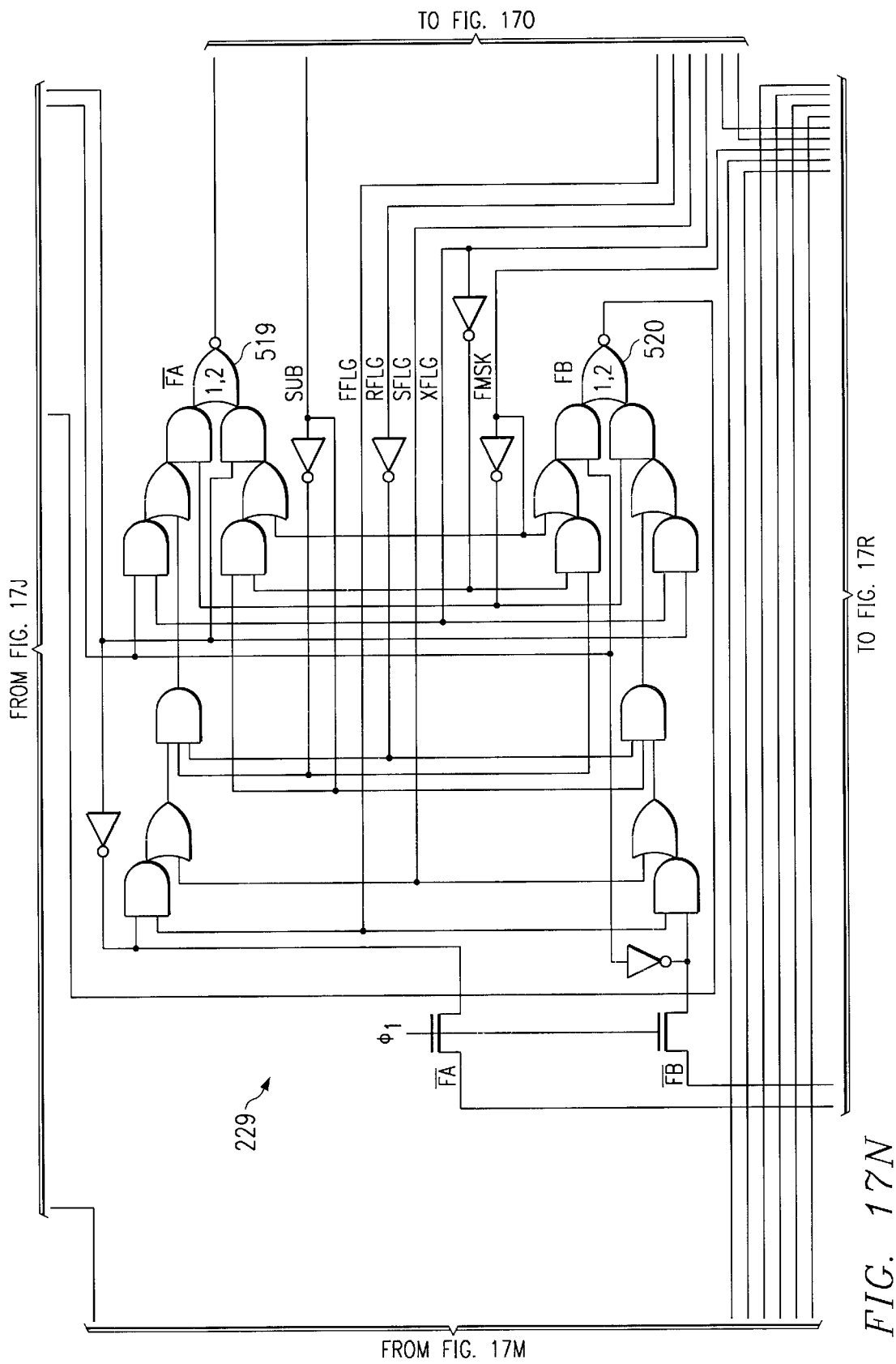
Figure 17O:
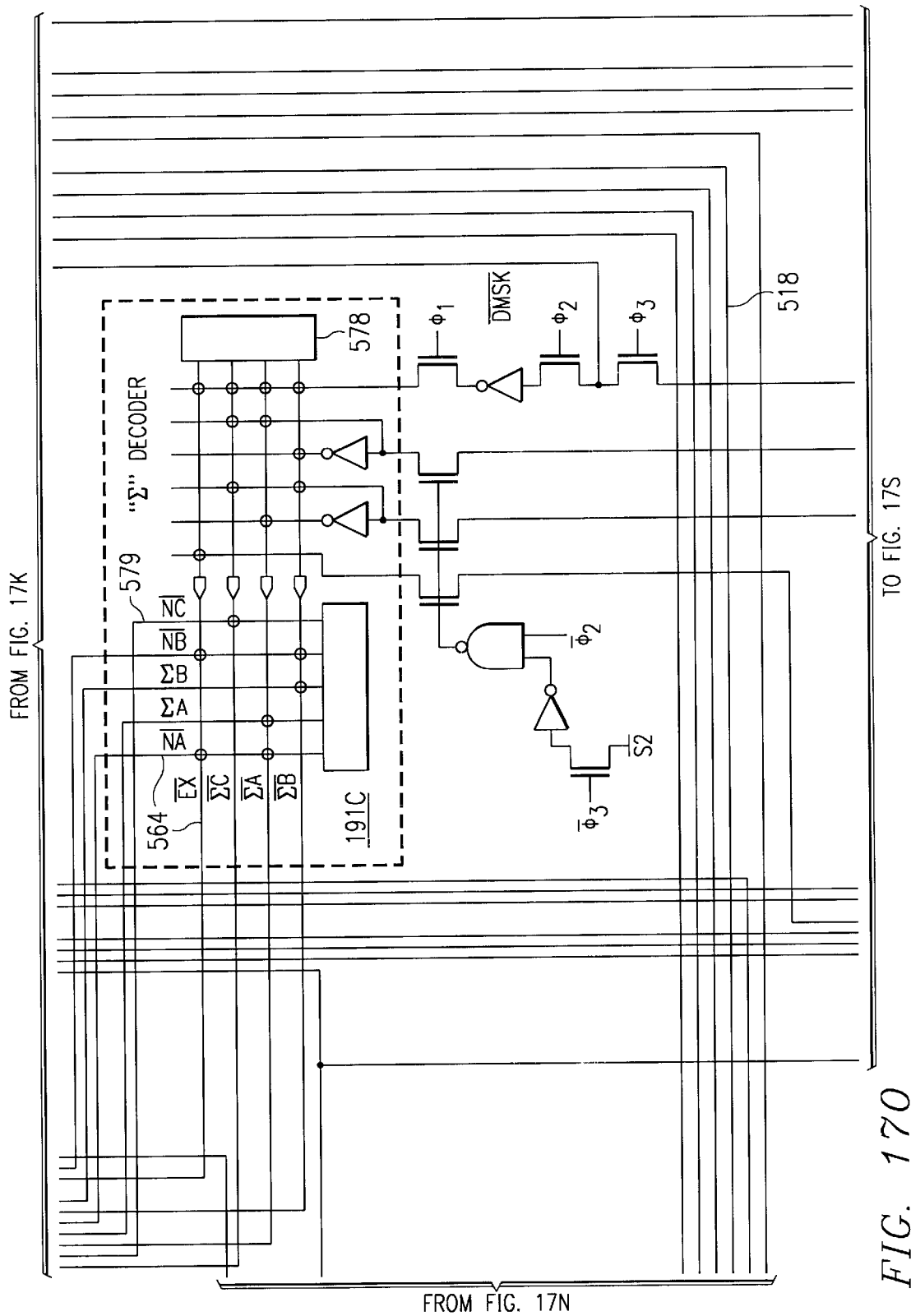
Figure 17P:
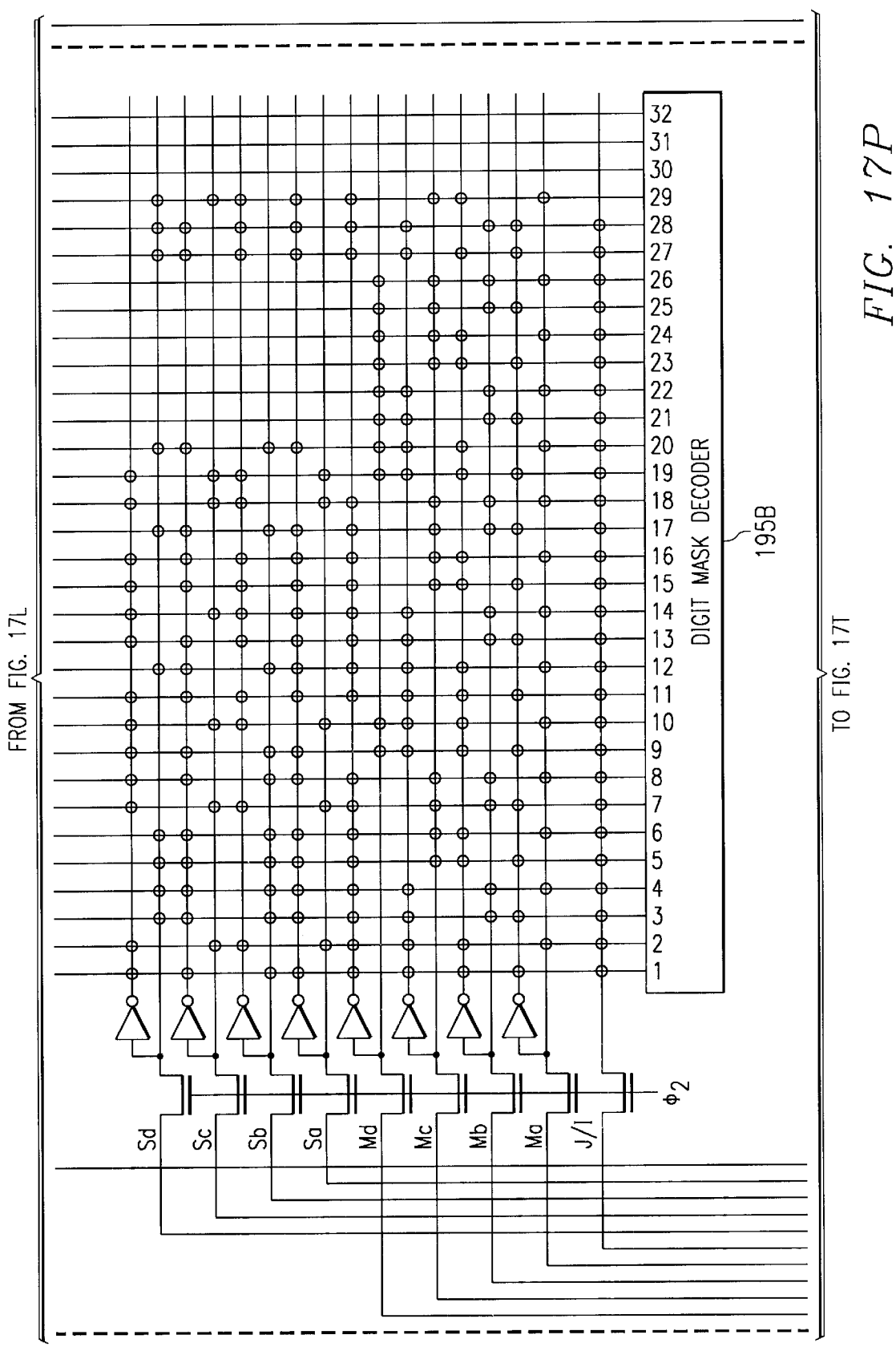
Figure 17Q:
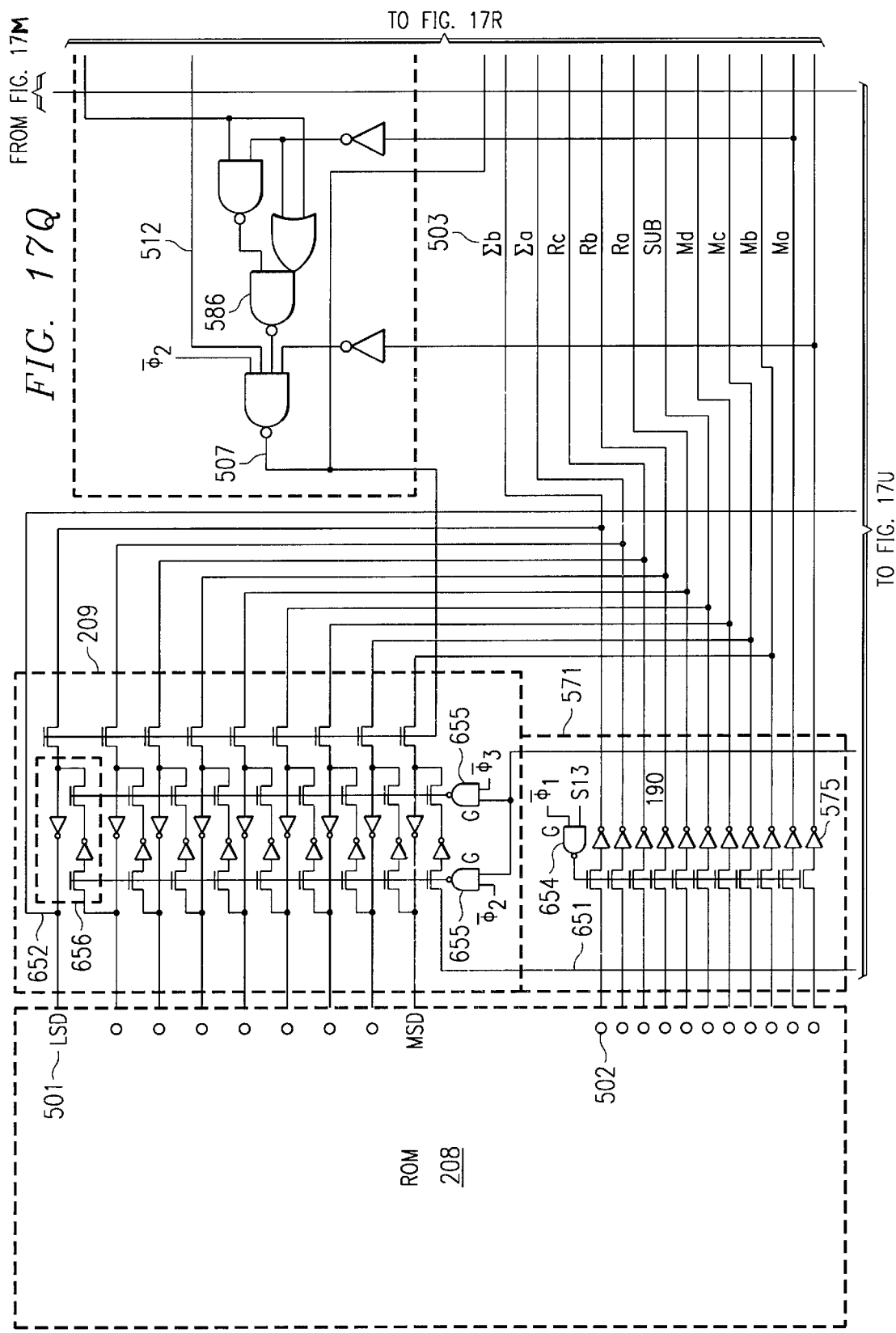
Figure 17R:
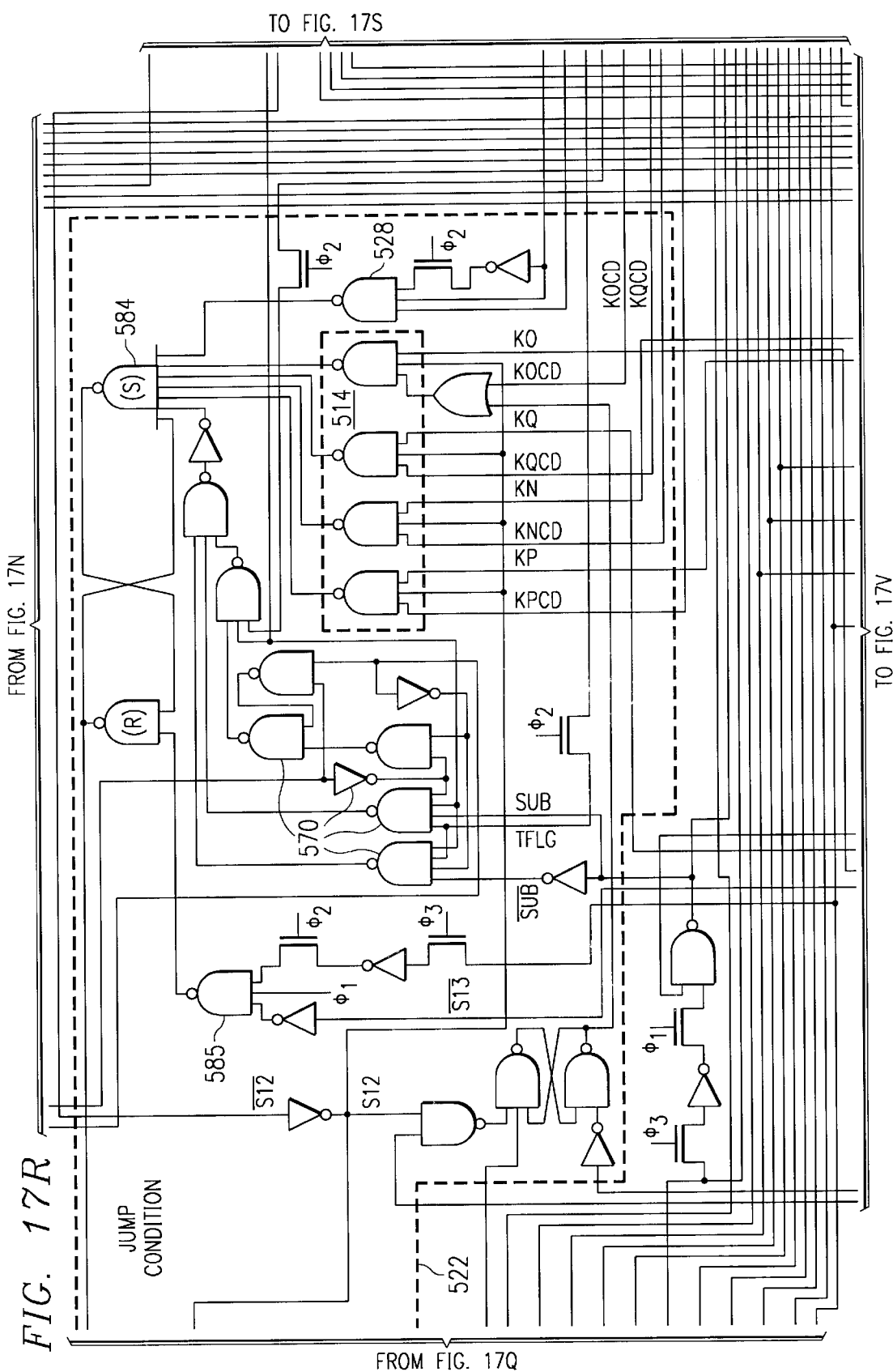
Figure 17T:
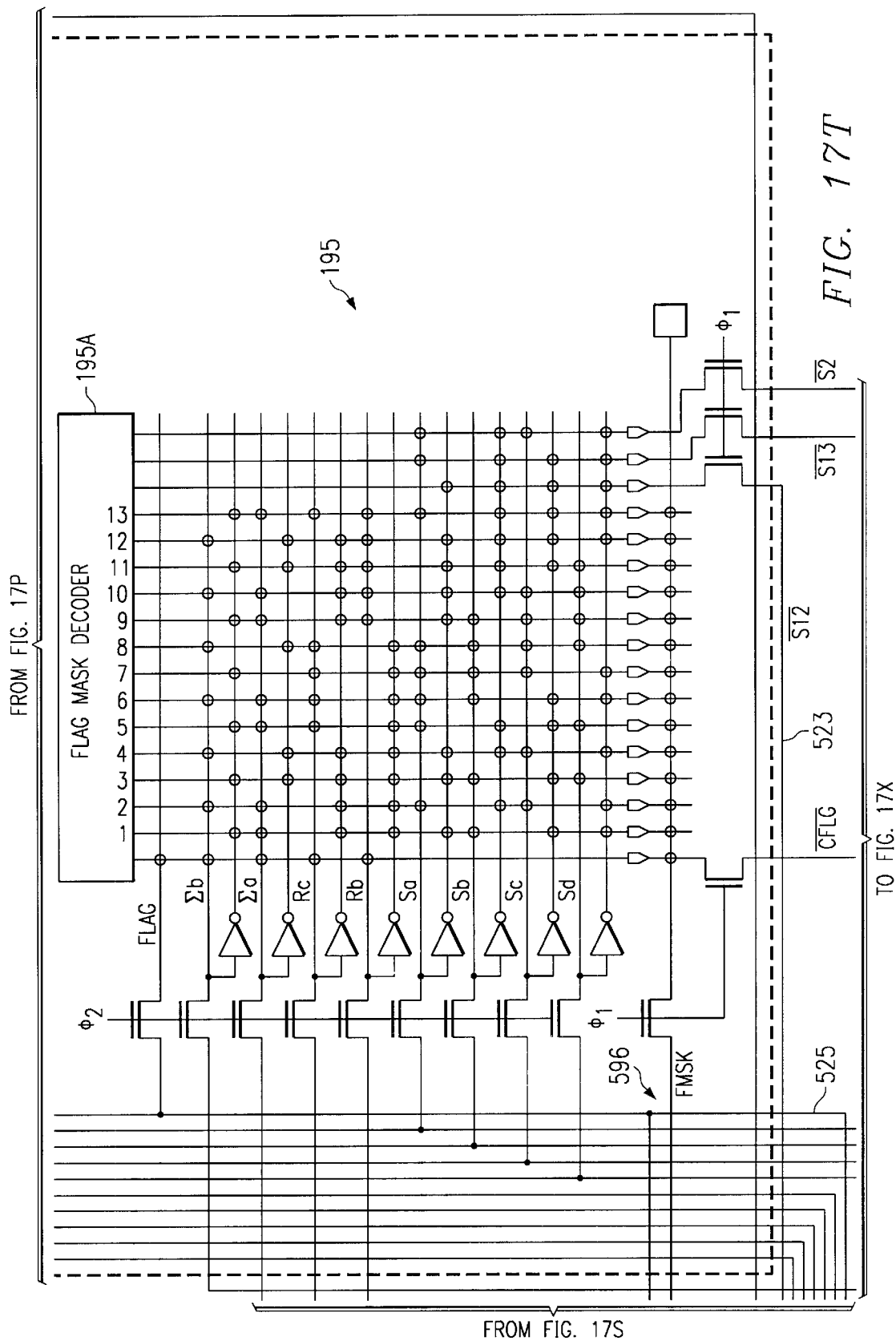
Figure 17U:
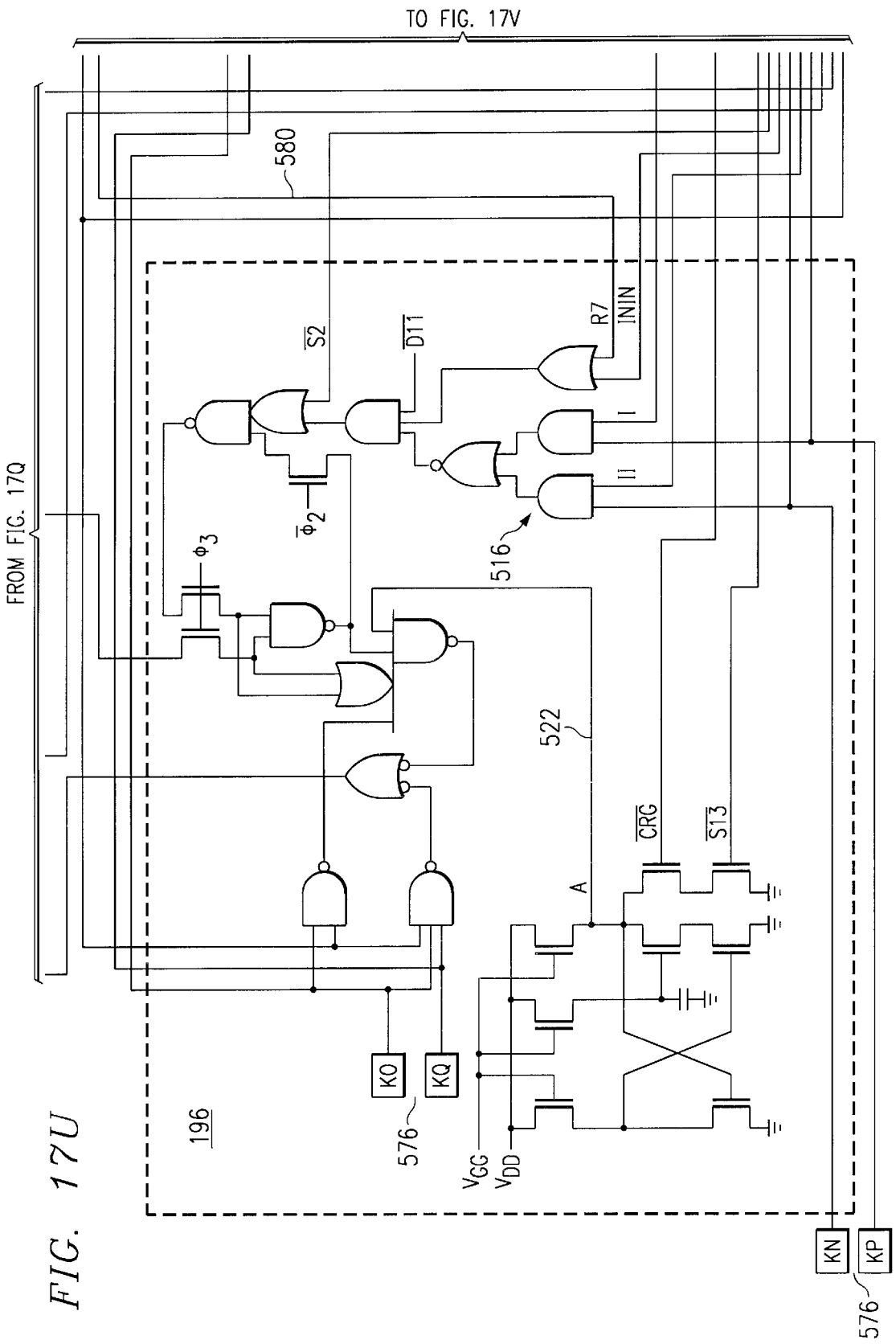
Figure 17V:
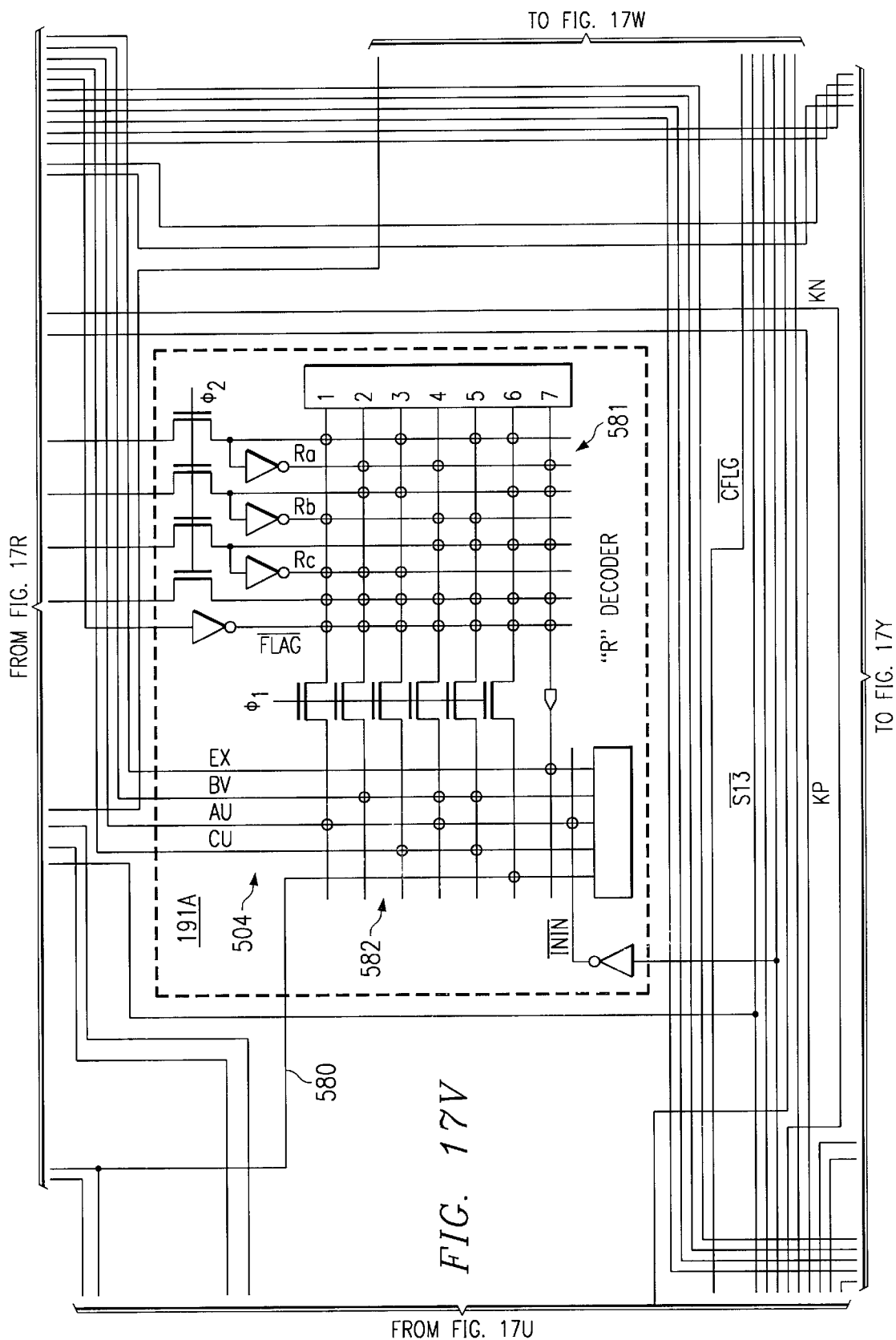
Figure 17W:
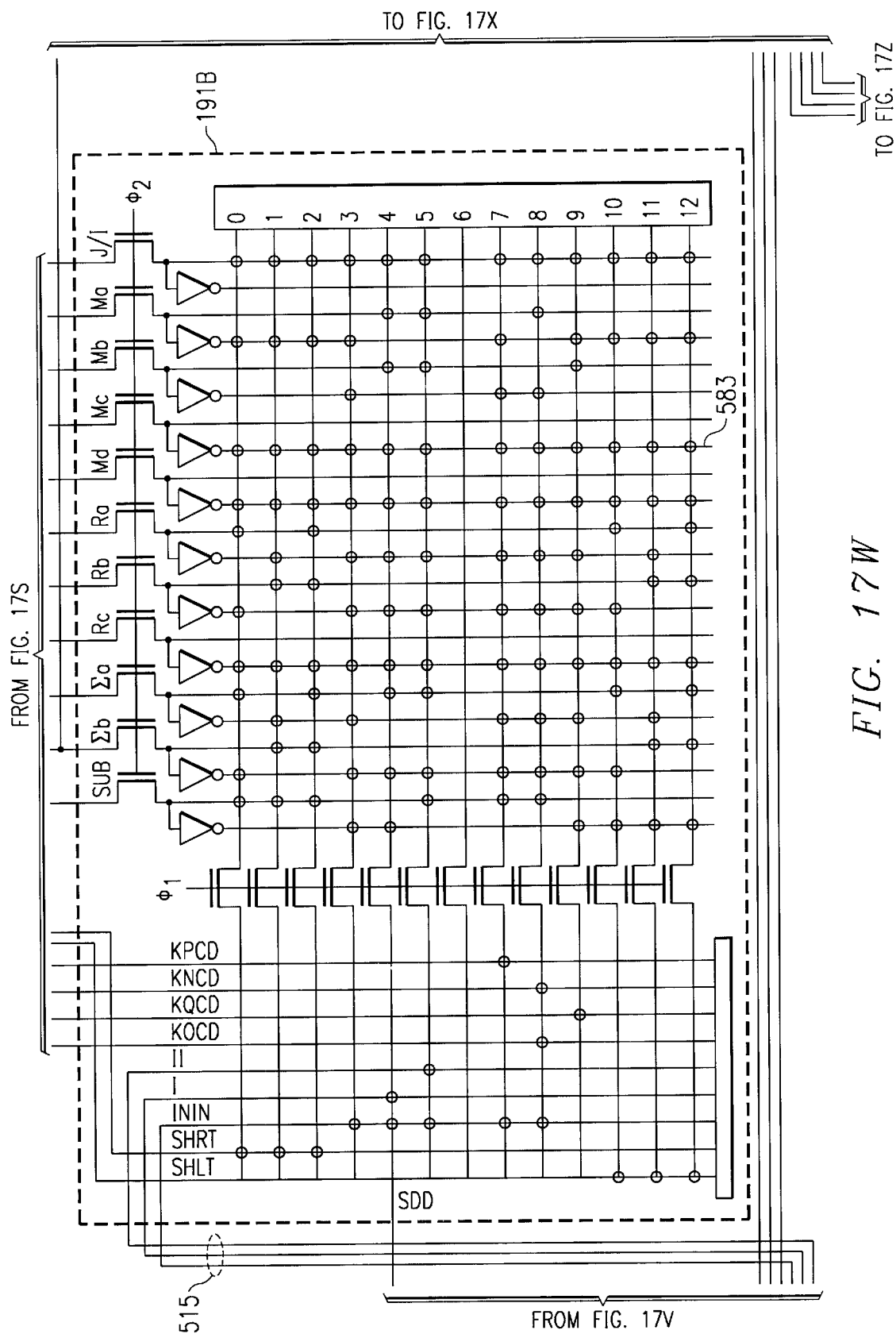

The calculator system according to the present invention has been discussed in terms of the function within each block of FIGS. 1 and 2. In the following sections the calculator system is described in terms of logic system and circuit elements which comprise the present calculator system embodiment which as previously noted is capable of being fabricated as a monolithic integrated semiconductor system utilizing contemporary MOS or MIS manufacturing technology. The complete calculator system of the present embodiment except for the keyboard illustrated separately in FIG. 16, the display element shown separately in FIGS. 12–14 and the display driver illustrated separately in FIG. 15. The logic/circuit diagram of FIG. 17 is comprised of 26 figures, FIGS. 17A through 17Z which are put together as illustrated in FIG. 17.

The functional elements described in the previous sections are identified in FIG. 17 with like numerals. In program block 201, program counter 209 provides a 9-bit address 501 to ROM 208. The data output 501 from ROM 208 is then transmitted to instruction register 190.

In control block 202, outputs 503 of instruction register 190 are distributed to jump-condition circuit 192; R decoder 191 A, control decoder 191 B, and Σ decoder 191 C of decoder 191 in control 202; and, FLAG and digit mask decoder circuits 195 A and 195 B in mask decoder circuits 195 of timing block 203. R decoder outputs 504 control U data selectors 215 and V data selectors 216 in data arithmetic logic unit 207. The condition output 507 of jump condition circuit 192 controls jump gates 508 in program counter functional element 209. Outputs 509 of Σ decoder 218 control the A data selector gates 219, the B data selector gates 220 and the C data selector gates 221 in arithmetic logic unit 207. Outputs 513 of control decoder 191 B operate the condition selector gates 514 in jump condition circuit 192. Outputs 515 of control decoder 191 B operate WAIT-KN-KP selector gate 516 of keyboard input circuit 196. Outputs 517 of control decoder 191 B operate Σ gates 218 in arithmetic logic unit 207.

In timing block 203, outputs 518 of digit and FLAG mask decoders 195 drive FA and FB FLAG operation logic gates 519 and 520. Outputs 521 of FLAG mask decoder 195 A operate keyboard synchronizing buffer control circuit 522 in keyboard input logic 196. Output 523 of FLAG mask decoder 195 A provides a synchronizing time pulse to jump-condition circuit 192. Outputs 524 of digit mask decoder 195 B is input to R decoder circuit 191 A and to FLAG mask decoder 195 B to discriminate FLAG commands from data operation commands. Output 526 from digit mask decoder 191 B provides a sub-addressing timing mask to Σ gate control circuit 527 and through the Σ decoder outputs 509 to A data selector gates 510, B data selector gates 511 and C data selector gates 512 in arithmetic logic unit 207; and, to carry-borrow detection gate 528 of jump-condition circuit 192. Output 529 of digit mask decoder 191 B provides a right-shift command to Σ control circuit 527 in arithmetic logic unit 207. Output signals 536 of A register 211 of the FLAG and data storage array 206 are transmitted to AA buffer circuit 542 in segment decoder 198.

Figure 18C:
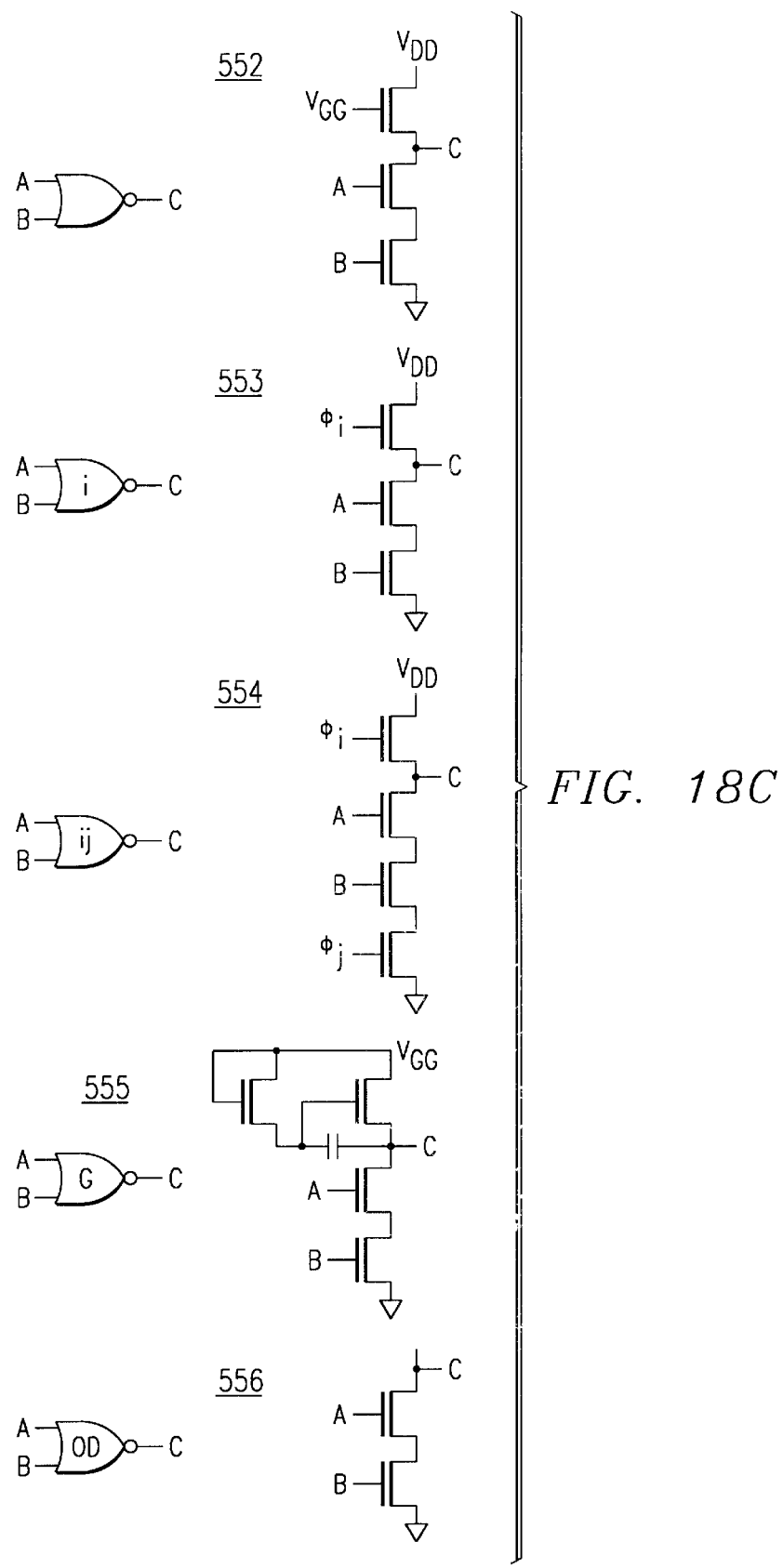

In the following sections the logic and the circuit descriptions of blocks 201–205 is described in detail. In order to better understand the calculator system, the logic symbology and its MOS circuit equivalents is here discussed with reference to FIGS. 18 A–D. FIG. 17 is described in terms of conventional logic symbology using positive logic convention. However, additional notation has been included to clarify the particular MOS circuit embodiment which have been chosen to meet transient, voltage level and timing requirements of the system. FIG. 18A illustrates five different inverters which appear in FIG. 17 and their respective MOS circuit equivalents. Similarly, FIG. 18B illustrates five corresponding types of NAND gates and their respect to MOS circuit equivalents and FIG. 18C illustrates five corresponding types of NOR gates and their respect to MOS circuit equivalents. The five different types of MOS circuits shown in each of FIGS. 18A–C may be described as follows a logic symbol 552 with no internal inscription is a conventional load ratio circuit. A logic symbol 553 with a single numeric inscription 1, 2 or 3 indicates a dynamic implementation of the logic function with-clocked load φI where I is the inscription. This type of circuit is used for lower power consumption and reduction of the number of service lines (DC voltages and clocks) required in arrays which don't require a gate bias voltage $V_{GG}$. A logic symbol 554 with two numeric inscriptions IJ indicates implementation of the logic function using a special ratioless type circuit with precharges on φI and conditional discharge on φJ where I and J are members of the set {1, 2, 3} and the condition is the logical condition of conduction. This type of circuit is used to reduce power, to reduce cell size and/or to increase circuit speed. A logic symbol 555 with the inscription G infers performing of the logic function using a boot strap load circuit which is later described in detail. Finally, a logic symbol 556 with the inscription OD infers the implementation of that logic function using open-drain circuits. This type of circuit is used in wire-OR logic where only one of severalccoupled logic gates requires a load.

Logic and Circuit Description of Data Block 204

Data block 204 comprises random access memory array shift register system 206 which is further comprised of A register 211, B register 212, C register 213, FA FLAG data storage register 226 and FB FLAG data storage register 227; and decimal arithmetic logic unit 207 and FLAG logic unit 229. Random access memory array shift register system 206 is comprised of a commutator system 545 which operates a 12×14 array or matrix 546 of charge storage cells 10 and 14 dynamic delays 214. Array 546 of charge storage cells 10 and delay cells 214 provide the parallel shifting storage system for three thirteen digit numbers and twenty-six binary FLAGS. The commutator system 545 is comprised of twelve shift register cells 541 (illustrated in detail in FIG. 19) arranged in serial connection by coupling the output of each intermediate cell 541 to the input of the next cell 541 in the series. In this manner cells 541 are capable of distributing common read-write control signals sequentially to adjacent rows of storage array 546. In order for the commutation to effect a stable image of rotation corresponding to the desired characteristics of fourteen parallel shifting shift registers of 13-bits in length with one input and one output for each of the fourteen columns of the array, additional means 547 and 544 are provided in the commutation circuit. NAND circuit 547 and delay element 544 eliminates multi-modal oscillations corresponding to circulation of more than one read-write control for rotation. The MOS circuit equivalents of shift register cells 541 is illustrated in FIG. 19. Each shift register cell 541 is comprised of a normal six MOS transistor shift register bit section and additionally includes a load circuit 548 which uses a capacitance boot strapping effect to given superior transient response as compared to conventional load circuits, RP pulse enable 550 from cell 543 and a kill circuit 551 which restricts the time interval of the read-write control pulse to that of clock φ2. The circuit of cell 543 is illustrated in detail in FIG. 20; circuit 543 develops the timing pulse RP by means of a double inverting amplifier circuit with an input from clock φ2. The random access memory shift register system embodied in the present invention is further described in copending patent application Ser. No. TI-4607 by Boone et al filed of even date with and assigned to the assignee of the present application. patent application Ser. No. TI-4607 is incorporated by reference herein.

Again, referring to FIG. 17, A data selector gates 219, B data selector gates 220 and C data selector gates 221 are coupled to and drive input means 510, 511 and 512 of A register 211 (Columns A1, A1, A4 and A8), B register 212 (Columns B1, B2, B4 and B8) and C register 213 (Columns C1, C2, C4 and C8), respectively. Output means 536, 537 and 538 of A register 211, B register 212 and C register 213, respectively complete a recirculation path through 1-bit delay elements 214 back to normal inputs NA of data selector 219, NB of data selector 220 and NC of data selector 221. In addition to the normal paths, Σ gates 218 can be selected by the Σ A control of A data selector 219 or by the Σ B control of B data selector 220 or Σ C control of C data selector 221. In addition to these paths, output means 536 and 537 of A register 211 and B register 212, respectively, transmitted through delay cells 214 are capable of being enabled to B data selector gates 220 and A data selector gates 219, respectively, by means of the exchange control in combination with the Σ A and Σ B controls as previously discussed with respect to FIG. 3. All of the normal Σ and exchange controls are provided to data selectors 219, 220 and 221 by Σ decoder 191 C.

Output means 536 of A register 211 and output means 538 of C register 213, delayed by the first half of delay cell 214, are selected (normally exclusively) to the plus side of adder 217 by U data selector 215. Similarly, output means 537 of B register 212, delayed by the first half of delay cell 214 and a constant N generated by means 524 are selected (normally exclusively) to the minus side of adder 217 by V data selector 216. Exclusive OR circuits 554 are utilized to conditionally complement the V inputs to adder 217 with respect to their normal (add) polarity at nodes 55 and where the condition of such complementation is the subtract command from output 503 of instruction register 190. U outputs 552 from U data selector 215 and the conditionally complemented V outputs 555 from exclusive OR circuits 554 are added with carry input 557 by ripple carry adder cells 556 to generate the binary sum U plus conditionally complemented V at nodes 558 and a binary carry signal at node 559. The binary sum generated at 558 and carry generated at 559 are corrected by logic unit 563 to a decimal sum and carry at T adder nodes 560 and inter-digit carry node 561 depending upon the state of CK control 564 and CBRS control 565. Controls 564 and 565 are used to select binary coding as opposed to binary-coded-decimal (BCD) operation and to block inter-digit carries in selected fields of the register data circulation.

Outputs 560 of T adder 563 can be selected by Σ data selectors 218 through either the no-shift (NS) or delay elements 566 and left shift (LS) Σ paths. Σ data selectors 218 also allow a right shift path by using the inverted U at input 552 and inverted V input 553. Σ gate control circuit 527 transmits left or right shift commands to the left or right channels of Σ data selector 218 and enables the no-shift path when neither left shift or right shift commands are present. In addition, when a left shift command is present, Σ gate control circuit 527 generates a leading-edge detection of digit mask control 526 which are utilized by left shift delay elements 566 in order to block the first digit to insure insertion of a zero in the least significant digit masked.

The FLAG operation logic 229, in much the same manner as the register operation logic of arithmetic logic unit 207 completes a circulation path generated by data storage array 206. The output means of the FA storage cells 568 and the FB storage cells 569 are the normal recirculating inputs to FA operational logic 519 and FE operational logic 520 of FLAG logic unit 229 and also are transmitted to FLAG selection gates 570 in jump-condition circuit 192. FLAG command inputs 518 from digit mask decoder 195 B allow a particular FLAG to be set, reset, or toggled where the particular FLAG is addressed by the SUB bit of instruction register 503 (FA or FB) and by FMSK control 519 from FLAG mask decoder 195 A (selecting one of thirteen time slots or states). In addition, FA and FB pairs of FLAGs in the same time slot (FMSK) may be exchanged by means of FFLG command 518 from digit mask decoder 195 B. FA and FB operation logic gates 519 and 520 provide FLAG data to FLAG data storage array input means 505 and 506, respectively, to complete the circulation loop for the FLAGs.

Logic and Circuit Description of Control Block 202

Control block 202 is comprised of instruction register 190, R decoder 191 A, control decoder 191 B, Σ decoder 191 C and jump-condition circuit 192.

Instruction register 190 is comprised of a set of eleven inverters 575 whose inputs are sampled from the program block ROM 208 data outputs 502 once per instruction cycle by boot strapped NAN D gate 571. The R, control and Σ decoders 191, as well as other decoders illustrated in FIG. 17 are implemented in programmable logic arrays which are similar in structure to the read only memory (ROM) decoder/encoder circuits with the exception that the decoder is not fully generated. That is, whereas in a N-bit address ROM, $2^N$ locations are decoded; in a PLA only the desired states are decoded. Consider, for example, the PLA illustrated in FIG. 21. A and B inputs 571 are presented to the first half (decoder) of a PLA in both true and complemented polarities. In this example, four product terms (decoder outputs) 572 are presented as inputs to a second (encoder) array. The circuits for the decoder gates 572 and encoder gates 573 are identical shunt gates; that is, logical NAND gates. However, since NAND-N logic reduces to AND-OR logic, it is convenient to use sum-of-product notation to describe the PLA circuit implementation where the dependence of a particular product term on a particular input is indicated by a circle at that juncture as for example 574. The circles also correspond to the physical placement of MOS gates by a programmable gate mask utilized during the fabrication of the MOS embodiment.

In accordance with the above symbology for decoders (PLA), Σ decoder 191 C has a four-term decoder circuit 578 and a four-line output encoder section 579 in order to decode the controls 509 from the Σ A and Σ B inputs from output 503 of instruction register 190 and digit mask output 526 of digit mask decoder 195 B and EX exchange command 504 from R decoder 191 A. Similarly, R decoder 191 A converts R field 234 output 503 of instruction 190 into the UV command CU, AU, BV, and EX 504 and the R7 WAIT condition code 580 using a seven-term decode array 581 and five-line output encoder array 582. All terms of the R decode matrix 581 are also conditioned by the true state of the I-bit 230 of instruction register 190 at output 503 and by the FLAG signal 525 in the inverted state. Control decoder 191 B decodes the controls for special keyboard instructions for keyboard condition 513, keyboard WAIT 515 and shift left and right 517. Control decoder 191 B utilizes a twelve-term decoder 583 and a nine-line output encoder array 584.

Jump-condition circuit 192 is comprised of a cross-coupled latch circuit 584 with inputs from the keyboard condition selector gates 514, carry-borrow selector gate 528 and FLAG test and compare gates 570 to the SET side of the latch; a timing input 585 to the reset side of the latch; and a gating circuit 586 to enable jump-condition control 507 to jump gates 508 when a jump instruction is decoded and the jump-condition is true.

Logic and Circuit Description of Timing Block 203

Timing block 203 comprises a clock generator 193, a state and digit timing generator 194, digit and FLAG mask decoder arrays 195 and key input logic 196.

Figure 17X:
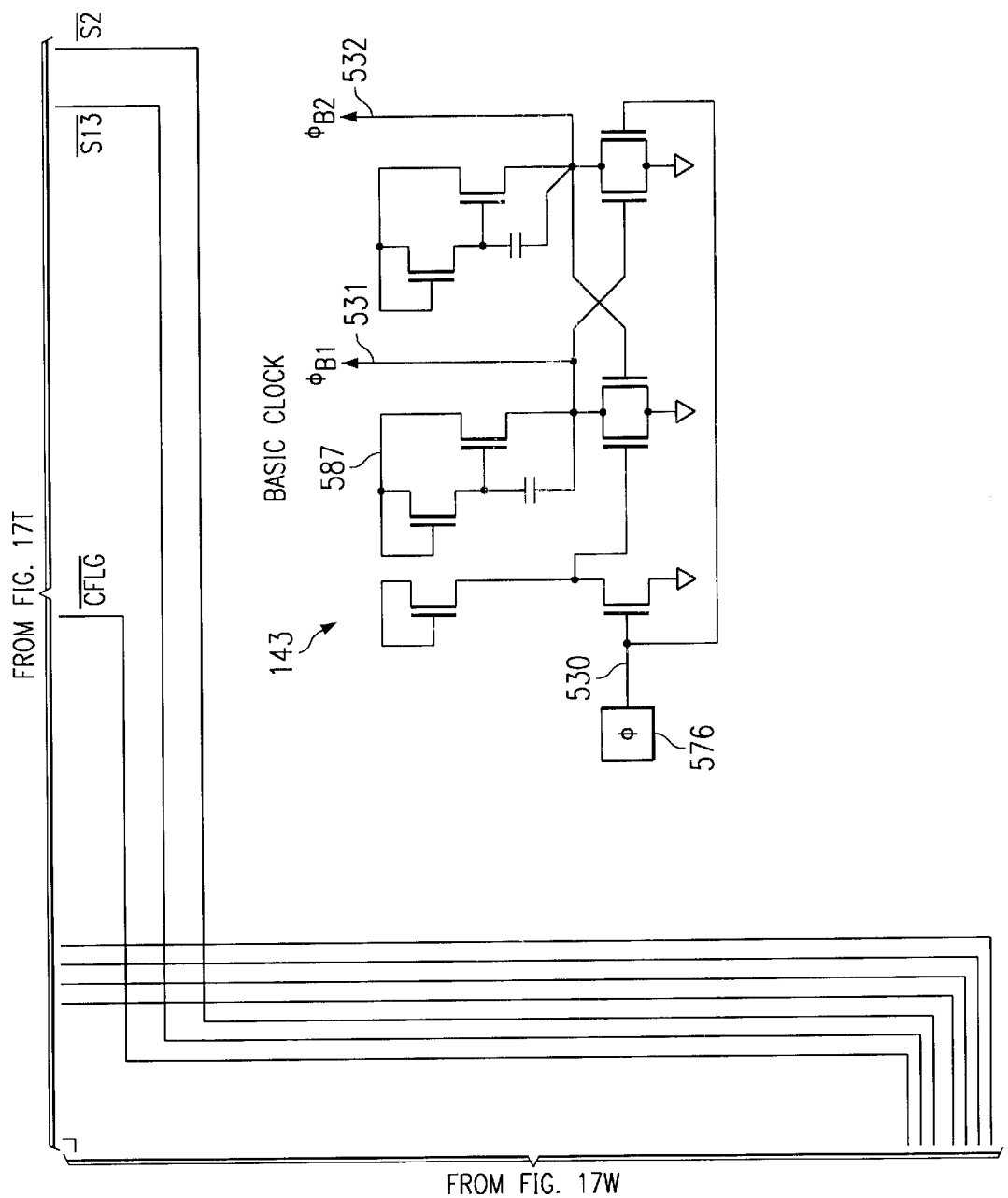
Figure 17Y:
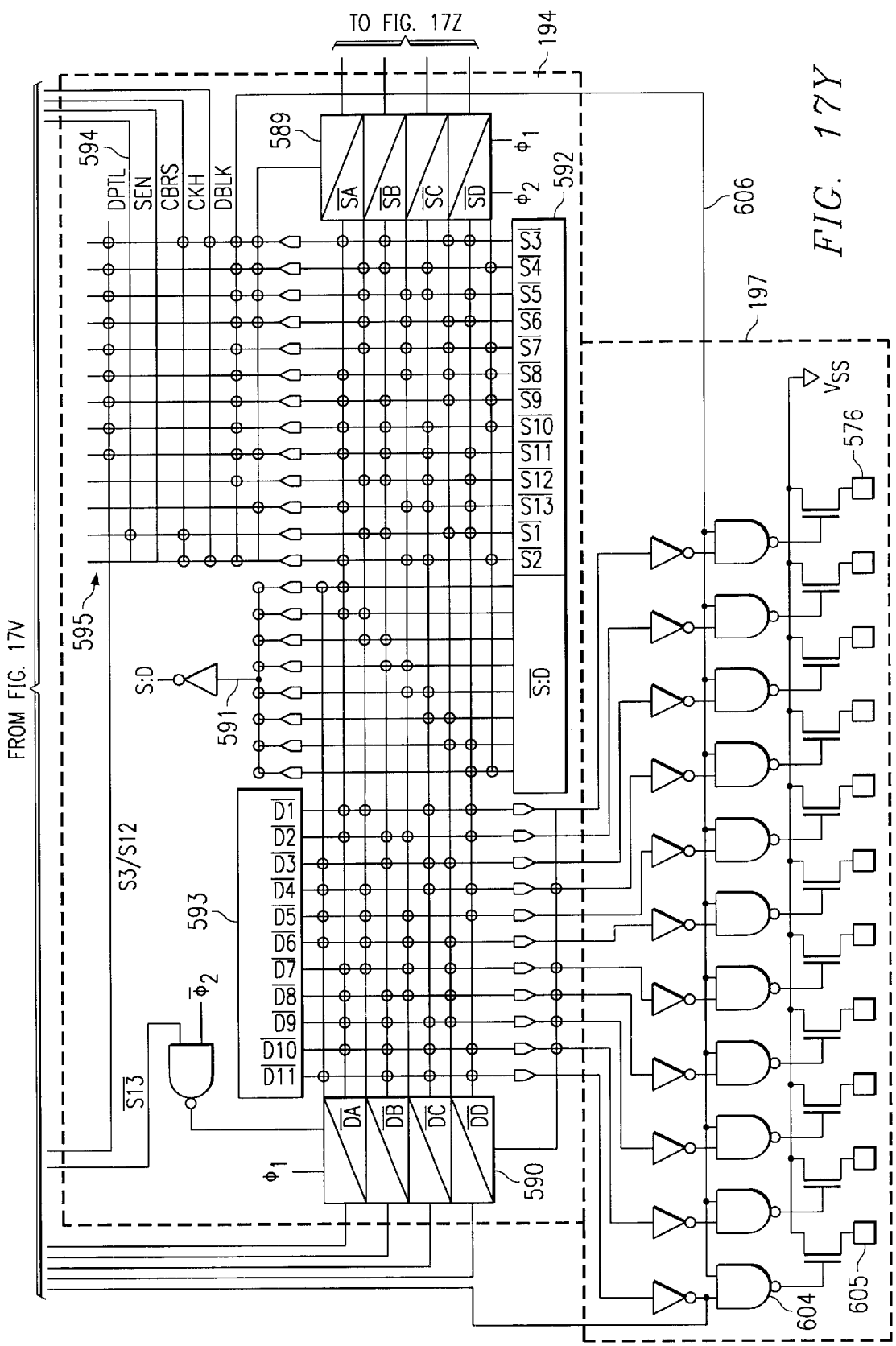
Figure 17Z:
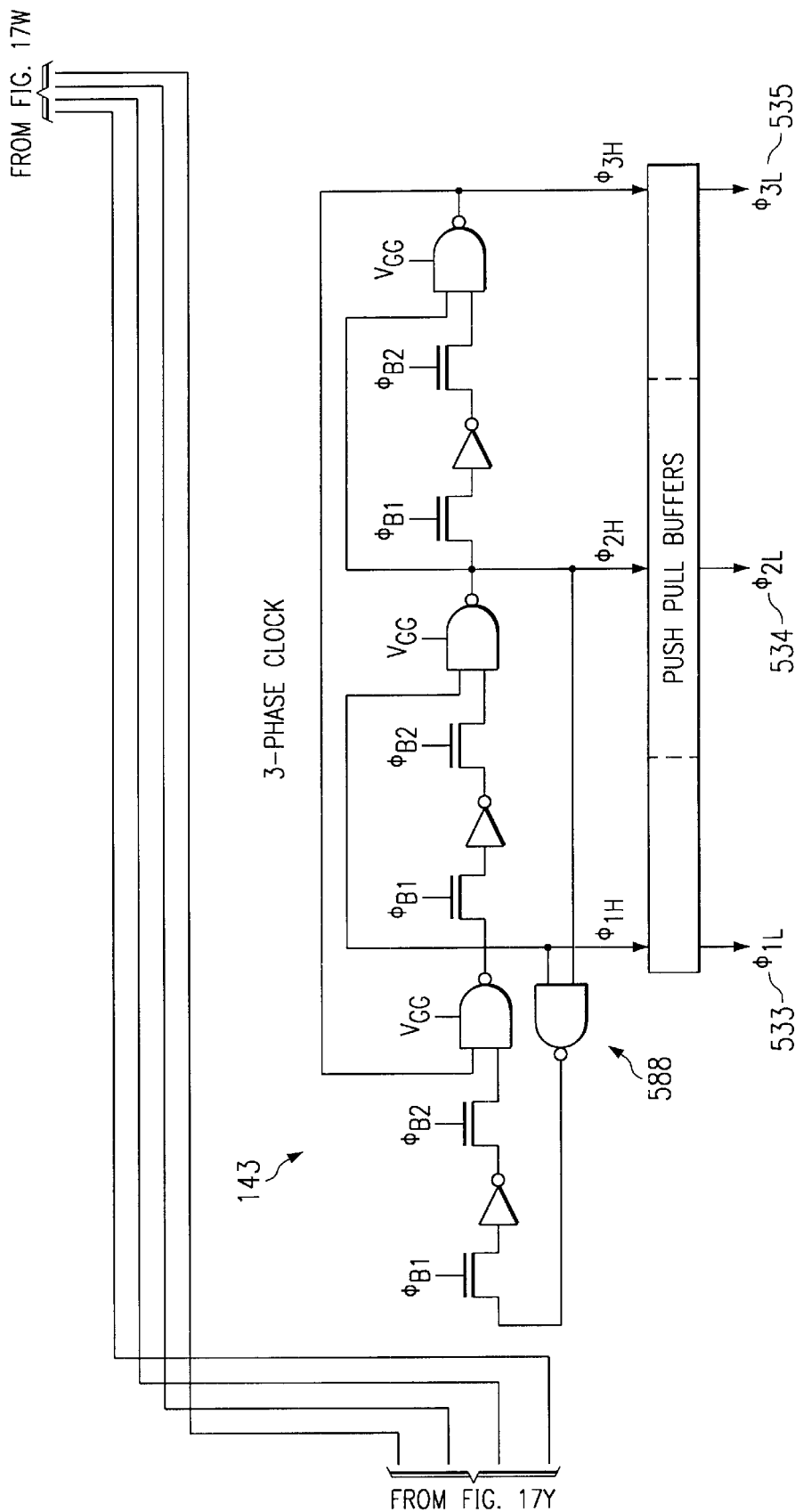

All timing information for the calculator system is provided by a square wave generator or oscillator (external to the monolithic semiconductor system illustrated in FIG. 17) which is approximately 250 KHz. Input clock lead C as indicated by the φ terminal 530 in FIG. 17X provides means for applying the external clock signal to the monolithic calculator system. The basic clock shown in FIG. 17X and the three phase clock shown in FIG. 17Z are both integrated into the monolithic semiconductor system. The square wave φ is immediately divided by the basic clock circuit of FIG. 17X into half frequency square waves φB1 and φB2 of opposite polarities at 531 and 532, respectively. The two phase clock outputs φB1 and φB2 are in turn divided by means of 3-bit ring counter 588 to provide the three phase clock φ1L, φ2L and φ3L at 533, 534 and 535, respectively, as the basic clocking system for all of the logic and circuit elements of the calculator system embodiment of FIG. 17.

State and digit timing generator 194 utilizes dynamic shift register elements and PLA logic to provide state counter 589, digit counter 590, state digit comparator 591, state decoder 592 and digit decoder 593. Re-encoded state decoder outputs 594 are distributed to the other functional elements to provide means for arbitrary selection of state timing on each of six independent timing buses. The state decoder outputs 595 are also distributed as required by other circuit elements of FIG. 17. In addition to providing means for deriving the correct feedback for the digit feedback shift register, the outputs of digit decoder 593 drives the output scanner 197.

Thirteen of the product terms in FLAG mask decoder 195 are used to correspond FLAG addresses from the R and Σ fields 234 and 235, respectively of instruction register 190 at output 503 to states one through thirteen as decoded from the SA, SB, SC and SD inputs of state counter S to derive the FLAG addressing signal FMSKat 596 which is then gated to FLAG operation logic 519 and 520 as the timing address of FLAG operations. Similarly, digit mask decoder 195B provides the digit mask signal 526 by associations of M field 232 of instruction register 190 at output 503 and from state counter 589. In this manner set and reset associations of arbitrary correspondence between state and mask for each of the six distinct masks is provided. In addition to the digit mask, digit mask decoder 195B also performs decoding of FLAG controls 518, shift right control 529 and constant N generator 524.

Logic and Circuit Description of Output Block 205

Segment output subsystem 198 is comprised of delay elements 542 which buffer output means 536 of the data storage array 206, segment decoder (PLA) 601 and output buffer circuit 602 which drive terminals 576 with 11-decode segment output signals. The segment decoder array has ten product terms for means of decoding numeric information for selective recombination, that is, encoding on numeric segment outputs 602; product terms for decoding FLAG information (for example, error or minus sign); and, product terms and feedback signal 603 to implement zero suppression.

The scan output subsystem 197 is comprised of 11 2-input NAND gates 604 which block digit decoder outputs 593 by digit BLANK signal 606 for inter-digit blanking capability; and, output buffer circuits 605 to drive terminals 576 effecting a scan of the keyboard and display as previously described.

Logic, Circuit and Program Description of Program Block 201

As previously described, program block 201 is comprised of program counter (PC) 209 and read-only memory (ROM) 208. Together, program counter 209 and read-only memory 208 perform the address-modification required for each instruction, and provide the control block 202 with, for example, in the described embodiment an 11-bit input to the instruction register (IR) 190.

The address modification required by a current instruction is either no modification f or WAIT operations, binary add one for normal incremented operations and jump operations that are not executed, or replacement of the entire 9-bit program counter with nine bits from instruction register 190 for jump operations which are executed. The no modification for WAIT operations and binary add one for normal incremented operations and jump operations which are not executed are satisfied by means of a serial input 651 to the MSD of program counter 209 from key input logic 196 in timing block 203 which either recirculates the LSD output 652 of program counter 209 or adds one to the LSD and circulates it to the MSB of the program counter 209, respectively. In either case the circulation is synchronous to the instruction cycle. The replacement of the entire 9-bit count with nine bits from instruction register 190 for jump operations which are executed is satisfied by means of parallel strobing of output 503 of instruction register 190 by the output of condition circuit 192 into the inputs 653 of all bits of program counter 209 simultaneously during state S12 of the instruction cycle.

The output of the instruction word to the control block instruction register 190 is strobed by NAND gate 654 providing a new input to instruction register 190 every instruction cycle during state S13. The serial circulation of program counter 190 is provided by means of conventional shift register bits 656 clocked by NAND gates 655 during S3 through S12. The TOM is comprised of a 1-out-of-64 decoder per instruction register 190 bit output 503 driving an array of 5 NAND gates per bit or a total of 55 NAND gates. One of these five gates is addressed by a 1-out-of-5 encoder for each bit. Hence, means is provided for storage of a maximum of 320 11-bit words, and a selection (decode and encode) is provided for random addressing of any one word. Program block 201 in the present calculator embodiment is comprised of programmable read-only memory 208 to store a fixed program; in further embodiments, however, a read-write memory replacing memory 208 would provide means for continuously varying the stored program and hence change the operation of the calculator system.

The resident program in one embodiment of the variable function calculator system provides means for the calculator operation characteristics called "Combination B" shown in Table VIII. The corresponding flowcharts for this embodiment are illustrated in FIGS. 22A to T; the resulting linear program is shown in Table VI; and the hexadecimal ROM code is shown in Table V. Finally a logic simulation result for a portion of an executing problem example is shown in Table VII.

Referring to FIG. 22, the calculator program logic flow is as follows:

TABLE V

1802 ROM ASSEMBLY ... COMBINATION B (+=)

OBJECT CODE IS 11 BITS

| ROM CODE START | END | | | | | | | | | | | | | | | | | |
|---|---|---|---|---|---|---|---|---|---|---|---|---|---|---|---|---|---|---|
| 000 | 010 | TM1802 | F8B2 | F892 | FBFE | FBFC | FBFF | F89D | FBFF | FB9F | 0404 | FB9F | FBFF | 0609 | FBFF | FB9F | 0609 |
| 011 | 021 | TM1802 | F816 | 0404 | FBE3 | 0458 | 043E | 0441 | 0441 | 0446 | 0441 | 0440 | 0447 | 0441 | F8FC | 062A | F8FF |
| 022 | 032 | TM1802 | F89B | F895 | F894 | F83D | 062A | F83E | F855 | FA3E | F83C | FB3A | FA1A | 0604 | F8BC | 0634 | F9DB |
| 033 | 043 | TM1802 | 0436 | F8D7 | 0604 | F81C | FB7A | FA3A | FBFF | FB1E | 0404 | 042F | F8DC | 061F | F8DD | F83E | 064A |
| 044 | 054 | TM1802 | F8FF | 067F | F8DD | F8DE | F83E | F81B | 064E | F81E | FBF8 | F8B5 | F815 | F8F5 | 0653 | F93E | F93D |
| 055 | 065 | TM1802 | F89C | F8DB | 0604 | F89C | F897 | F855 | F855 | F974 | 0452 | FB1E | FBE7 | F8B5 | F935 | F834 | 0668 |
| 066 | 076 | TM1802 | FBE7 | F935 | F935 | 0475 | FB55 | 0668 | F834 | FBE7 | 066C | 0471 | 0604 | 0663 | FBAC | FB8C | 0679 |
| 077 | 087 | TM1802 | FBE7 | F935 | FA50 | 047D | FB4F | 067E | FB4F | FBF7 | F935 | 0471 | FADB | 0488 | FB5A | 0668 | FA7A |
| 088 | 098 | TM1802 | F9DB | FA9B | F975 | 06A5 | FA9B | FB14 | FB6E | FADB | FADB | 04A4 | FADB | 046E | FBAC | FB14 | F814 |
| 099 | 0A9 | TM1802 | 048F | 0495 | 04A0 | F8D6 | FA7A | 049A | FB14 | FA5B | FASA | FAS5B | FA5A | 0488 | FA5A | FA98 | 0493 | FA7A |
| 0AA | 0BA | TM1802 | F934 | F99B | F877 | F8DF | F99A | F854 | 049F | FA7A | FBFE | FBFE | FB7A | 083F | FA3A | 0688 | FBF7 | 04A2 | FBF2 | F814 |
| 0BB | 0CB | TM1802 | F8F8 | F837 | F895 | F8BF | F8BF | F854 | 0688 | F83D | FB7A | FBE7 | F83F | 0705 | FBF7 | FBF2 | FBF4 |
| 0CC | 0DC | TM1802 | 06D4 | FBAE | F8E7 | FBE7 | FBE7 | 065D | 06C6 | F83D | F83D | F8AF | F83D | F934 | F8B8 | 06CB | F854 | 06BC |
| 0DD | 0ED | TM1802 | FAFA | 06DA | FADA | 0604 | 06DA | 06D4 | 06FB | 04CB | FADB | 04CB | 06D4 | 0404 | F8BF | FB4B | 04F2 | FB8F |
| 0EE | 0FE | TM1802 | FB7A | FAD3 | 04E2 | 06D6 | 06DA | 06FB | FAD3 | 06EE | FADB | 04FB | 06ED | FBD4 | FA7A | FB1E | 06FE | FB48 |
| 0FF | 10F | TM1802 | F838 | 047F | F8BE | F8BD | 067F | FA5B | FAS5B | F85A | F814 | F814 | 06F7 | FBF4 | FB1E | F8D6 | 06FF | FA5A |
| 110 | 120 | TM1802 | 0705 | F894 | F816 | F8BD | FB1B | FA1B | FB5A | FA5A | FB10 | FB78 | 050F | F99A | FBFE | FBFE | 0705 | FB5A |
| 121 | 131 | TM1802 | 0526 | FBF7 | FADA | F838 | 0455 | 0523 | 071B | FA9B | FB5A | FA1A | 04EB | 0523 | FBE7 | FBFE | FBFF | FBDF |
| 132 | 142 | TM1802 | FBE7 | FB8F | 04E2 | FBF7 | 0530 | 0455 | FBFF | FB50 | FB3A | FBDA | 04F3 | FBF5 | FB8F | FBE7 | FA5A | FB5A |
| 143 | 153 | TM1802 | 0000 | 0000 | 0000 | 0000 | 0000 | 0723 | FBDA | 0729 | FB3E | FA9B | 0504 | 0736 | FA7A | 0739 | 0000 | 0000 |
| 154 | 164 | TM1802 | 0000 | 0000 | 0000 | 0000 | 0000 | 0000 | 0000 | 0000 | 0000 | 0000 | 0714 | 0000 | 0000 | 0000 | 0000 | 0000 |
| 165 | 175 | TM1802 | 0000 | 0000 | 0000 | 0000 | 0000 | 0000 | 0000 | 0000 | 0000 | 0000 | 0000 | 0000 | 0000 | 0000 | 0000 | 0000 |
| 176 | 186 | TM1802 | 0000 | 0000 | 0000 | 0000 | 0000 | 0000 | 0000 | 0000 | 0000 | 0000 | 0000 | 0000 | 0000 | 0000 | 0000 | 0000 |
| 187 | 197 | TM1802 | 0000 | 0000 | 0000 | 0000 | 0000 | 0000 | 0000 | 0000 | 0000 | 0000 | 0000 | 0000 | 0000 | 0000 | 0000 | 0000 |
| 198 | 1A8 | TM1802 | 0000 | 0000 | 0000 | 0000 | 0000 | 0000 | 0000 | 0000 | 0000 | 0000 | 0000 | 0000 | 0000 | 0000 | 0000 | 0000 |
| 1A9 | 1B9 | TM1802 | 0000 | 0000 | 0000 | 0000 | 0000 | 0000 | 0000 | 0000 | 0000 | 0000 | 0000 | 0000 | 0000 | 0000 | 0000 | 0000 |
| 1BA | 1CA | TM1802 | 0000 | 0000 | 0000 | 0000 | 0000 | 0000 | 0000 | 0000 | 0000 | 0000 | 0000 | 0000 | 0000 | 0000 | 0000 | 0000 |
| 1CB | 1DB | TM1802 | 0000 | 0000 | 0000 | 0000 | 0000 | 0000 | 0000 | 0000 | 0000 | 0000 | 0000 | 0000 | 0000 | 0000 | 0000 | 0000 |
| 1DC | 1EC | TM1802 | 0000 | 0000 | 0000 | 0000 | 0000 | 0000 | 0000 | 0000 | 0000 | 0000 | 0000 | 0000 | 0000 | 0000 | 0000 | 0000 |
| 1ED | 1FD | TM1802 | 0000 | 0000 | 0000 | 0000 | 0000 | 0000 | 0000 | 0000 | 0000 | 0000 | 0000 | 0000 | 0000 | 0000 | 0000 | 0000 |
| 1FE | 1FF | TM1802 | 0000 | 0000 | 0000 | 0000 | 0000 | 0000 | 0000 | 0000 | 0000 | 0000 | 0000 | 0000 | 0000 | 0000 | 0000 | 0000 |

TABLE VI

| | | | | | | | |
|---|---|---|---|---|---|---|---|
| 000 | 111 | 0100 | 1101 | CLR | ZAEL | | |
| 001 | 111 | 0110 | 1101 | | ZBFL | | |
| 002 | 100 | 0000 | 0001 | | CLA | ALL | |
| 003 | 100 | 0000 | 0011 | | CLC | ALL | |
| 004 | 100 | 0000 | 0000 | LOCK | WD11 | | |
| 005 | 111 | 0110 | 0010 | | ZFB | 2 | MAKING SURE THAT PREV OP FLAG 2 IS 0 |
| 006 | 100 | 0000 | 0000 | | WD11 | | |
| 007 | 100 | 0110 | 0000 | | SCAN | | |
| 008 | 010 | 0000 | 0100 | | B7 | LOCK | KEY IS NOT RELEASED YET |
| 009 | 100 | 0000 | 0000 | IDLE | WD11 | | |
| 00A | 100 | 0110 | 0000 | | SCAN | | |
| 00B | 100 | 0000 | 0000 | | WD11 | | |
| 00C | 000 | 0000 | 1001 | | BO | IDLE | NOT FOUND ANYTHING |
| 00D | 100 | 0000 | 0000 | | WD11 | | |
| 00E | 100 | 0000 | 0000 | | WD11 | | |
| 00F | 100 | 0110 | 0000 | | SCAN | | |
| 010 | 000 | 0000 | 1001 | | BO | IDLE | NOT FOUND ANYTHING |
| | | | | * - - - INPUT ROUTINE - - - | | | |
| 011 | 111 | 1110 | 1001 | | TFB | 9 | OVERFLOW FLAG |
| 012 | 010 | 0000 | 0100 | | BZ | LOCK | YOU MUST DO A CLEAR |
| 013 | 100 | 0001 | 1100 | | SPWD | | |
| 014 | 010 | 0000 | 0000 | | BZ | CF | CLEAR ENTRY |
| 015 | 010 | 0000 | 0000 | | BZ | DPT | |
| 016 | 010 | 0000 | 0000 | | BZ | PLEQ | = KEY |
| 017 | 010 | 0000 | 0000 | | BZ | S | CHANGING SIGN |
| 018 | 010 | 0000 | 0100 | | BZ | LOCK | -= KEY |
| 019 | 010 | 0000 | 0000 | | BZ | PLEQ | |
| 01A | 010 | 0000 | 0000 | | BZ | MIN | - KEY |
| 01B | 010 | 0000 | 0000 | | BZ | DIVI | |
| 01C | 010 | 0000 | 0000 | | BZ | MULT | |
| 01D | 010 | 0000 | 0000 | | BZ | PLEQ | + KEY |
| | | | | * - - - DATA ENTRY PRIME - - - | | | |
| 01E | 111 | 0000 | 0011 | | SFA | 3 | FLAG MISC    DATA ENTRY PRIME |
| 01F | 111 | 1110 | 0100 | D3 | TFB | 4 | FLAG DISPLAY |
| 020 | 000 | 0000 | 0000 | | BO | D1 | |
| 021 | 100 | 0000 | 0001 | D2 | CLA | ALL | |
| 022 | 111 | 0110 | 0100 | | ZEB | 4 | FLAG DISPLAY |
| 023 | 111 | 0110 | 1010 | | ZFB | 10 | FLAG SIGN OF MONT OF A |
| 024 | 111 | 0110 | 1011 | | ZFB | 11 | FLAG SIGN OF EXP OF A |
| 025 | 111 | 1100 | 0010 | | TFA | 2 | |
| 026 | 000 | 0000 | 0000 | | BO | D1 | |
| 027 | 111 | 1100 | 0001 | | TFA | 1 | |
| 028 | 010 | 0000 | 0000 | | BZ | D1 | |
| 029 | 111 | 1010 | 1010 | | FFB | 10 | A NEGATIVE NUMBER |
| 02A | 111 | 1100 | 0011 | D1 | TFA | 3 | FLAG MISC |
| 02B | 010 | 0000 | 0000 | | BZ | D7 | |
| 02C | 101 | 1100 | 0001 | | DPTA | | |
| 02D | 101 | 1110 | 0101 | | SAKA | DPT1 | PUT A 0 TO DPT OF A; ONLY LAST DPT EFFECTIVE |
| 02E | 000 | 0000 | 0100 | | BO | LOCK | ALWAYS BRANCH |
| | | | | * - - - DIGIT ENTRY - - - | | | |
| 02F | 111 | 0100 | 0011 | D7 | ZFA | 3 | MISC |
| 030 | 101 | 0110 | 0100 | | CAK | MSD1 | |
| 031 | 000 | 0000 | 0000 | | BO | D5 | DIGIT OVERFLOW |
| 032 | 110 | 0010 | 0100 | | CAK | DPT7 | |
| 033 | 010 | 0000 | 0000 | | BZ | D6 | |
| 034 | 111 | 0010 | 1000 | D5 | SFB | 8 | |
| 035 | 000 | 0000 | 0100 | | BO | LOCK | DIGIT OVERFLOW |
| 036 | 111 | 1110 | 0011 | D6 | TFB | 3 | DPT FLAG |
| 037 | 000 | 0000 | 0000 | | BO | D4 | |
| 038 | 101 | 1100 | 0101 | | AAKA | DPT1 | |
| 039 | 100 | 1000 | 0101 | D4 | SLLA | MONT | LSD OF A IS MADE TO 0 |
| 03A | 100 | 0000 | 0000 | | WD11 | | |
| 03B | 100 | 1110 | 0001 | | SOCN | | |
| 03C | 100 | 1100 | 0101 | | AAKA | LSD1 | |
| 03D | 010 | 0000 | 0100 | | BZ | LOCK | ALWAYS BRANCH |
| | | | | * - - - DPT ENTRY - - - | | | |
| 03E | 111 | 0010 | 0011 | DPT | SFB | 3 | DPT FLAG |
| 03F | 000 | 0001 | 1111 | | BO | D3 | ALWAYS BRANCH |
| | | | | * - - - | | | |
| 040 | 111 | 0010 | 0010 | MIN | SFB | 2 | SUBTRACT COMMAND |
| 041 | 111 | 0110 | 0001 | PLEQ | ZFB | 1 | CURR OP 1 |
| 042 | 111 | 1100 | 0001 | | TFA | 1 | PREV OP 1 |
| 043 | 000 | 0000 | 0000 | | BO | OP2 | |
| 044 | 111 | 0000 | 0000 | OP5 | SFA | 0 | P-FLAG |
| 045 | 000 | 0000 | 0000 | | BO | PRE | ALWAYS BRANCH |
| 046 | 111 | 0010 | 0010 | DIVI | SFB | 2 | |
| 047 | 111 | 0010 | 0001 | MULT | SFB | 1 | |
| 048 | 111 | 1100 | 0001 | | TFA | 1 | PREV OP 1 |
| 049 | 000 | 0000 | 0000 | | BO | OP6 | |

TABLE VI-continued

| | | | | | | | |
|---|---|---|---|---|---|---|---|
| 04A | 111 | 1110 | 0100 | OP2 | TFB | 4 | DISPLAY FLAG |
| 04B | 000 | 0100 | 0100 | | BO | OP5 | |
| 04C | 111 | 1110 | 0001 | | TFB | 1 | CURR OP FLAG 1 |
| 04D | 010 | 0000 | 0000 | | BZ | OP1 | ONLY LAST *,/ OPERATOR IS EFFECTIVE |
| 04E | 100 | 0000 | 0111 | OP6 | AAKC | ALL | |
| 04F | 111 | 0100 | 1010 | | ZFA | 10 | SIGN OF MONT OF C |
| 050 | 111 | 1110 | 1010 | | TFB | 10 | SIGN OF MONT OF A |
| 051 | 000 | 0000 | 0000 | | BO | OP1 | |
| 052 | 111 | 0000 | 1010 | | SFA | 10 | |
| 053 | 110 | 1100 | 0001 | OP1 | XFA | 1 | EXCHANGE CURRENT 1 WITH PREV 1 |
| 054 | 110 | 1100 | 0010 | | XFA | 2 | EXCHANGE CURRENT 2 WITH PREV 2 |
| 055 | 111 | 0110 | 0011 | OP3 | ZFB | 3 | DPT FLAG |
| 056 | 111 | 0010 | 0100 | | SFB | 4 | FLAG DISPLAY |
| 057 | 000 | 0000 | 0100 | | BO | LOCK | ALWAYS BRANCH |
| | | | | * - - - CLEAR ENTRY - - - | | | |
| 058 | 111 | 0110 | 0011 | CE | ZFB | 3 | FLAG DPT |
| 059 | 111 | 0110 | 1000 | | ZFB | 8 | |
| 05A | 000 | 0010 | 0001 | | BO | D2 | ALWAYS BRANCH |
| | | | | * - - - CHANGE SIGN - - - | | | |
| 05B | 111 | 1010 | 1010 | S | FFB | 10 | |
| 05C | 000 | 0000 | 0100 | | BO | LOCK | ALWAYS BRANCH |
| | | | | * - - - ADD AND SUBTRACT - - - | | | |
| 05D | 110 | 1000 | 1011 | A/S | CFA | 11 | COMPARING EXP SIGNS |
| 05E | 000 | 0000 | 0000 | | BO | AS2 | |
| 05F | 100 | 0111 | 0000 | | CAB | EXP | |
| 060 | 000 | 0000 | 0000 | | BO | AS3 | |
| 061 | 100 | 0001 | 1000 | | EXAB | ALL | |
| 062 | 110 | 1100 | 1010 | | XFA | 10 | |
| 063 | 100 | 0111 | 0011 | AS3 | SABC | EXP | |
| 064 | 111 | 1100 | 1011 | | TFA | 11 | SIGN OF EXP |
| 065 | 000 | 0000 | 0000 | | BO | AS4 | |
| 066 | 100 | 0001 | 1000 | | EXAB | ALL | |
| 067 | 110 | 1100 | 1010 | | XFA | 10 | |
| 068 | 101 | 1010 | 1111 | AS4 | SCKC | EXP1 | |
| 069 | 010 | 0000 | 0000 | | BZ | AS5 | |
| 06A | 100 | 1010 | 1010 | | SRLB | MONT | |
| 06B | 000 | 0110 | 1000 | | BO | AS4 | ALWAYS BRANCH |
| 06C | 111 | 1100 | 1011 | AS2 | TFA | 11 | |
| 06D | 010 | 0000 | 0000 | | BZ | AS6 | |
| 06E | 100 | 0001 | 1000 | AS7 | EXAB | ALL | |
| 06F | 110 | 1100 | 1010 | | XFA | 10 | |
| 070 | 110 | 1100 | 1011 | | XFA | 11 | |
| 071 | 101 | 0010 | 0100 | AS6 | CAK | M11 | |
| 072 | 010 | 0110 | 1110 | | BZ | AS7 | |
| 073 | 100 | 0101 | 0011 | | AABC | EXP | |
| 074 | 000 | 0110 | 1000 | | BO | AS4 | ALWAYS BRANCH |
| 075 | 100 | 1011 | 0000 | AS5 | CAB | MONT | |
| 076 | 000 | 0000 | 0000 | | BO | AS8 | |
| 077 | 100 | 0001 | 1000 | | EXAB | ALL | |
| 078 | 110 | 1100 | 1010 | | XFA | 10 | |
| 079 | 110 | 1000 | 1010 | AS9 | CFA | 10 | |
| 07A | 010 | 0000 | 0000 | | BZ | AS8 | |
| 07B | 100 | 1011 | 0001 | | SABA | MONT | |
| 07C | 000 | 0000 | 0000 | | BO | PRE | ALWAYS BRANCH |
| 07D | 100 | 1001 | 0001 | AS8 | AABA | MONT | |
| | | | | * - - - PRENORMALIZING A NUMBER - - - | | | |
| 07E | 101 | 0010 | 0100 | PRE | CAK | M11 | |
| 07F | 010 | 0000 | 0000 | | BZ | A91 | DATA IS ZERO |
| 080 | 101 | 0100 | 0010 | | MSDB | | |
| 081 | 100 | 1000 | 1010 | | SLLB | MONT | |
| 082 | 100 | 1011 | 0000 | | CAB | M19 | IS M9 OF A NON-ZERO ? |
| 083 | 010 | 0000 | 0000 | | BZ | A2 | MSD OF A ZERO |
| 084 | 100 | 1010 | 0101 | | SRLA | MONT | |
| 085 | 111 | 1110 | 1011 | | TFB | 11 | SIGN OF EXP |
| 086 | 010 | 0000 | 0000 | | BZ | A13 | |
| 087 | 101 | 1000 | 0101 | | AAKA | EXP1 | |
| 088 | 110 | 0010 | 0100 | A2 | CAK | DPT7 | |
| 089 | 010 | 0000 | 0000 | | BZ | A3 | DPT OF A LESS THAN 7 |
| 08A | 101 | 0110 | 0100 | | CAK | M81 | |
| 08B | 000 | 0000 | 0000 | | BO | A9 | |
| 08C | 100 | 1000 | 0101 | | SLLA | MONT | |
| 08D | 111 | 1110 | 1011 | | TFB | 11 | SIGN OF EXP |
| 08E | 010 | 0000 | 0000 | | BZ | A4 | EXP OF A IS – |
| 08F | 101 | 1010 | 0100 | A5 | CAK | EXP1 | |
| 090 | 010 | 0000 | 0000 | | BZ | A6 | EXP OF A IS ZERO |
| 091 | 101 | 1010 | 0101 | | SAKA | EXP1 | |
| 092 | 000 | 1000 | 1000 | | BO | A2 | ALWAYS BRANCH |
| 093 | 101 | 1010 | 0101 | A13 | SAKA | EXP1 | |
| 094 | 000 | 1000 | 1000 | | BO | A2 | ALWAYS BRANCH |

TABLE VI-continued

| | | | | | | | |
|---|---|---|---|---|---|---|---|
| 095 | 101 | 1100 | 0101 | A3 | AAKA | DPT1 | |
| 096 | 101 | 0110 | 0100 | | CAK | M81 | |
| 097 | 010 | 0000 | 0000 | | BZ | A8 | MB OF A IS ZERO |
| 098 | 111 | 1110 | 1011 | | TFB | 11 | SIGN OF EXP |
| 099 | 010 | 1000 | 1111 | | BZ | A5 | SIGN OF E OF A IS NEGATIVE |
| 09A | 110 | 0110 | 0100 | A4 | CAK | EXP7 | |
| 09B | 010 | 0000 | 0000 | | BZ | A7 | EXP OF A LESS THAN 7 |
| 09C | 111 | 0010 | 1001 | | SFB | 9 | OVERFLOW |
| 09D | 110 | 0110 | 0101 | | SAKA | EXP7 | |
| 09E | 000 | 0000 | 0000 | | BO | A7 | ALWAYS BRANCH |
| 09F | 111 | 1010 | 1011 | A6 | FFB | 11 | CHANGE SIGN OF EXP OF A |
| 0A0 | 101 | 1000 | 0101 | A7 | AAKA | EXP1 | |
| 0A1 | 000 | 1000 | 1000 | | BO | A2 | ALWAYS BRANCH |
| 0A2 | 100 | 1000 | 0101 | A8 | SLLA | MONT | |
| 0A3 | 000 | 1000 | 1000 | | BO | A2 | ALWAYS BRANCH |
| 0A4 | 100 | 0000 | 0001 | A91 | CLA | ALL | |
| 0A5 | 111 | 1100 | 0000 | A9 | TFA | 0 | P-FLAG |
| 0A6 | 000 | 0000 | 0000 | | BO | POST | |
| 0A7 | 100 | 0001 | 1000 | | EXAB | ALL | |
| 0A8 | 100 | 0000 | 1101 | | ACKA | ALL | |
| 0A9 | 100 | 0000 | 1011 | | ABKC | ALL | |
| 0AA | 110 | 1100 | 1011 | | XFA | 11 | |
| 0AB | 111 | 1100 | 1000 | | TFA | 8 | A SPECIAL FLAG OFR PRF ROUTINE |
| 0AC | 111 | 1000 | 1000 | | FFA | 8 | |
| 0AD | 000 | 0111 | 1110 | | BO | PRC | |
| 0AE | 111 | 0100 | 0000 | | ZFA | 0 | P-FLAG |
| 0AF | 111 | 1100 | 0001 | | TFA | 1 | |
| 0B0 | 000 | 0101 | 1101 | | BO | A/S | |
| | | | | * - - - MULTIPLY AND DIVIDE - - - | | | |
| 0B1 | 111 | 1100 | 0010 | M/D | TFA | 2 | PREV OP 2 |
| 0B2 | 000 | 0000 | 0000 | | BO | M1 | |
| 0B3 | 111 | 1100 | 0111 | | TFA | 7 | C-REG CONTAINING A CONSTANT ? |
| 0B4 | 010 | 0000 | 0000 | | BZ | M1 | |
| 0B5 | 100 | 0001 | 1000 | | EXAB | ALL | |
| 0B6 | 110 | 1100 | 1011 | | XFA | 11 | |
| 0B7 | 111 | 0100 | 0111 | M1 | ZFA | 7 | RESET THE CONSTANT FLAG IN CASE K IS RELEASED |
| 0B8 | 100 | 0000 | 0000 | | WD11 | | |
| 0B9 | 100 | 1000 | 0000 | | KQCD | | |
| 0BA | 000 | 0000 | 0000 | | BO | M22 | |
| 0BB | 111 | 0000 | 0111 | | SFA | 7 | C-REG CONTAINS A CONSTANT |
| 0BC | 110 | 1000 | 1010 | M22 | CFA | 10 | |
| 0BD | 111 | 0110 | 1010 | | ZFB | 10 | |
| 0BE | 010 | 0000 | 0000 | | BZ | M2 | |
| 0BF | 111 | 0010 | 1010 | | SFB | 10 | |
| 0C0 | 110 | 1000 | 1011 | M2 | CFA | 11 | |
| 0C1 | 000 | 0000 | 0000 | | BO | M20 | UNLIKE F SIGNS |
| 0C2 | 111 | 1100 | 0010 | | TFA | 2 | * OR / |
| 0C3 | 010 | 0000 | 0000 | | BZ | M3 | / |
| 0C4 | 100 | 0101 | 0001 | M21 | AABA | EXP | |
| 0C5 | 000 | 0000 | 0000 | | BO | M4 | ALWAYS BRANCH |
| 0C6 | 111 | 1100 | 0010 | M20 | TFA | 2 | * OR / |
| 0C7 | 010 | 1100 | 0100 | | BZ | M21 | / |
| 0C8 | 100 | 0111 | 0000 | | CAB | EXP | |
| 0C9 | 000 | 0000 | 0000 | | BO | M3 | |
| 0CA | 111 | 1010 | 1011 | | FFB | 11 | |
| 0CB | 100 | 0111 | 0001 | M3 | SABA | EXP | |
| 0CC | 000 | 0000 | 0000 | | BO | M4 | |
| 0CD | 100 | 0101 | 0001 | | AABA | EXP | |
| 0CE | 100 | 0001 | 1000 | | FXAB | ALL | |
| 0CF | 100 | 0111 | 0010 | | SABB | EXP | |
| 0D0 | 100 | 0001 | 1000 | | EXAB | ALL | |
| 0D1 | 111 | 1100 | 0010 | | TFA | 2 | * OR / |
| 0D2 | 000 | 0000 | 0000 | | BO | M4 | * |
| 0D3 | 111 | 1010 | 1011 | | FFB | 11 | |
| 0D4 | 101 | 0010 | 0100 | M4 | CAK | M11 | |
| 0D5 | 010 | 0000 | 0000 | | BZ | M8 | TAKE CARE OF O/A, O/O, A*O THE RESULT IS 0 |
| 0D6 | 100 | 1000 | 0111 | | AAKC | MONT | |
| 0D7 | 100 | 1000 | 0001 | | CLA | MONT | |
| 0D8 | 111 | 1100 | 0010 | | TFA | 2 | PREV OP 2 |
| 0D9 | 000 | 0000 | 0000 | | BO | M5 | MULTIPLY |
| 0DA | 100 | 1011 | 0100 | M6 | CCB | MONT | |
| 0DB | 010 | 0000 | 0000 | | BZ | M7 | |
| 0DC | 100 | 1011 | 0111 | | SCBC | MONT | |
| 0DD | 101 | 0000 | 0101 | | AAKA | M11 | |
| 0DE | 000 | 1101 | 1010 | | BO | M6 | |
| 0DF | 101 | 0010 | 0101 | | SAKA | M11 | OVFLOW |
| 0E0 | 111 | 0010 | 1001 | | SFB | 9 | |
| 0E1 | 000 | 0000 | 0100 | | BO | LOCK | ALWAYS BRANCH |
| 0E2 | 101 | 0110 | 0100 | M7 | CAK | MSD1 | |

TABLE VI-continued

| | | | | | | | |
|---|---|---|---|---|---|---|---|
| 0E3 | 000 | 0000 | 0000 | | BO | M8 | DIVISION DONE, WITH OR WITHOUT REMAINDER |
| 0E4 | 101 | 0010 | 0100 | | CAK | M11 | |
| 0E5 | 000 | 0000 | 0000 | | BO | M23 | |
| 0E6 | 111 | 1110 | 1011 | | TFB | 11 | SIGN OF EXP OF A |
| 0E7 | 010 | 0000 | 0000 | | BZ | M24 | |
| 0E8 | 101 | 1010 | 0100 | | CAK | EXP1 | |
| 0E9 | 000 | 0000 | 0000 | | BO | M25 | |
| 0EA | 111 | 0010 | 1011 | | SFB | 11 | |
| 0EB | 101 | 1000 | 0101 | M24 | AAKA | EXP1 | |
| 0EC | 000 | 0000 | 0000 | | BO | M23 | ALWAYS BRANCH |
| 0ED | 101 | 1010 | 0101 | M25 | SAKA | EXP1 | |
| 0EE | 100 | 1000 | 0101 | M23 | SLLA | MONT | |
| 0EF | 101 | 0010 | 1100 | | CCK | M11 | |
| 0F0 | 010 | 1110 | 0010 | | BZ | M7 | |
| 0F1 | 100 | 1000 | 1111 | | SLLC | MONT | |
| 0F2 | 000 | 1101 | 1010 | | BO | M6 | ALWAYS BRANCH |
| 0F3 | 100 | 1010 | 1111 | M9 | SRLC | MONT | |
| 0F4 | 101 | 0010 | 1100 | | CCK | M11 | |
| 0F5 | 010 | 0000 | 0000 | | BZ | M8 | |
| 0F6 | 100 | 1010 | 0101 | | SRLA | MONT | |
| 0F7 | 100 | 1110 | 1111 | M5 | SCKC | LSD1 | |
| 0F8 | 010 | 1111 | 0011 | | BZ | M9 | |
| 0F9 | 100 | 1001 | 0001 | | AABA | MONT | |
| 0FA | 000 | 1111 | 0111 | | BO | M5 | ALWAYS BRANCH |
| 0FB | 100 | 0000 | 1011 | M8 | ABKC | ALL | |
| 0FC | 111 | 1110 | 0001 | | TFB | 1 | CURR OP 1 |
| 0FD | 000 | 0000 | 0000 | | BO | M12 | |
| 0FE | 111 | 0100 | 0111 | | ZFA | 7 | |
| 0FF | 111 | 1100 | 0111 | M12 | TFA | 7 | CONSTANT IN C-REG ? |
| 100 | 010 | 0111 | 1110 | | BZ | PRE | |
| 101 | 111 | 0100 | 0001 | | ZFA | 1 | PREV OP 1 |
| 102 | 111 | 0100 | 0010 | | ZFA | 2 | RESET PREV OP 2 |
| 103 | 000 | 0111 | 1110 | | BO | PRE | ALWAYS BRANCH |
| | | | | * - - - POST NORMALIZATION ROUTINE - - - | | | |
| 104 | 100 | 1010 | 0101 | P2 | SRLA | MONT | |
| 105 | 101 | 1010 | 0100 | POST | CAK | EXP1 | |
| 106 | 010 | 0000 | 0000 | | BZ | P1 | |
| 107 | 101 | 1010 | 0101 | | SAKA | EXP1 | |
| 108 | 111 | 1110 | 1011 | | TFB | 11 | SIGN OF EXP OF A |
| 109 | 011 | 0000 | 0100 | | BZ | P2 | |
| 10A | 110 | 0110 | 0100 | | CAK | EXP7 | |
| 10B | 010 | 0000 | 0000 | | BZ | P7 | |
| 10C | 110 | 0110 | 0101 | | SAKA | EXP7 | |
| 10D | 111 | 0010 | 1001 | | SFB | 9 | OVERFLOW |
| 10E | 001 | 0000 | 0101 | | BO | POST | ALWAYS BRANCH |
| 10F | 101 | 1110 | 0101 | P7 | SAKA | DPT1 | |
| 110 | 001 | 0000 | 0101 | | BO | POST | ALWAYS BRANCH |
| 111 | 111 | 0110 | 1011 | P1 | ZFB | 11 | |
| 112 | 111 | 1110 | 1001 | | TFB | 9 | OVERFLOW |
| 113 | 010 | 0000 | 0000 | | BZ | OP4 | NOT SET DESIRED DPT OR LOSE TRAILING 0 IF OVFLOW |
| 114 | 100 | 1110 | 0100 | P5 | CAK | LSD1 | |
| 115 | 000 | 0000 | 0000 | | BO | P4 | |
| 116 | 101 | 1110 | 0100 | | CAK | DPT1 | |
| 117 | 010 | 0000 | 0000 | | BZ | P4 | |
| 118 | 100 | 1010 | 0101 | | SRLA | MONT | GETTING RID OF TRAILING ZEROS |
| 119 | 101 | 1110 | 0101 | | SAKA | DPT1 | |
| 11A | 001 | 0001 | 0100 | | BO | P5 | ALWAYS BRANCH |
| 11B | 111 | 1110 | 0001 | P4 | TFB | 1 | CURR OP 1 |
| 11C | 010 | 0000 | 0000 | | BZ | OP4 | INTERMEDIATE RESULT IN FLOATING MODE |
| 11D | 100 | 0001 | 1000 | | EXAB | ALL | |
| 11E | 100 | 0000 | 0001 | | CLA | ALL | |
| 11F | 100 | 0000 | 0000 | | WD11 | | |
| 120 | 100 | 0010 | 0000 | | KPCD | | |
| 121 | 010 | 0000 | 0000 | | BZ | P3 | FIXED POINT MODE |
| 122 | 100 | 0001 | 1000 | | EXAB | ALL | FLOATING MODE |
| 123 | 111 | 1100 | 0111 | OP4 | TFA | 7 | CONSTANT IN C-REG ? |
| 124 | 010 | 0101 | 0101 | | BZ | OP3 | |
| 125 | 000 | 0100 | 1110 | | BO | OP6 | ALWAYS BRANCH |
| 126 | 100 | 0000 | 0000 | P3 | WD11 | | |
| 127 | 100 | 1100 | 0001 | | SOCP | | |
| 128 | 000 | 0000 | 0000 | | BO | NEXT | |
| 129 | 100 | 1100 | 0101 | NEXT | AAKA | LSD1 | RESET COND CODE |
| 12A | 100 | 0010 | 0101 | | SRLA | ALL | DESIRED DECIMAL PLACE GOES TO EXP OF A |
| 12B | 100 | 0000 | 1010 | | SLLB | ALL | ACTUAL DECIMAL PLACE GOES TO EXP OF B |
| 12C | 100 | 1010 | 1010 | | SRLB | MONT | |
| 12D | 100 | 0111 | 0000 | | CAB | EXP | |
| 12E | 100 | 0001 | 1000 | | EXAB | ALL | |
| 12F | 000 | 0000 | 0000 | | BO | P6 | |
| 130 | 101 | 1010 | 0101 | P8 | SAKA | EXP1 | |

TABLE VI-continued

| | | | | | | | |
|---|---|---|---|---|---|---|---|
| 131 | 100 | 1010 | 0101 | | SRLA | MONT | |
| 132 | 100 | 0001 | 1000 | | EXAB | ALL | |
| 133 | 100 | 0111 | 0000 | | CAB | EXP | |
| 134 | 100 | 0001 | 1000 | | EXAB | ALL | |
| 135 | 011 | 0011 | 0000 | | BZ | P8 | |
| 136 | 100 | 1000 | 0101 | P9 | SLLA | MONT | |
| 137 | 100 | 0010 | 0101 | | SRLA | ALL | |
| 138 | 001 | 0010 | 0011 | | BO | OP4 | ALWAYS BRANCH |
| 139 | 100 | 0111 | 0000 | P6 | CAB | EXP | |
| 13A | 001 | 0011 | 0110 | | BO | P9 | DESIRED DPT = ACTUAL DPT |
| 13B | 101 | 0110 | 0100 | | CAK | MSD1 | A8 NON-ZERO ? |
| 13C | 001 | 0011 | 0110 | | BO | P9 | CAN NOT ADJUST TO EQUAL DPT |
| 13D | 100 | 1000 | 0101 | | SLLA | MONT | |
| 13E | 101 | 1000 | 0101 | | AAKA | EXP1 | |
| 13F | 001 | 0011 | 1001 | | BO | P6 | ALWAYS BRANCH |

TABLE VII

EXAMPLE INSTRUCTION TRACE . . . DATA CARD 157 ($7.79 -= $) . . .

| PC | I-REG | A-REG | B-REG | C-REG | FLAGS (A) | FLAGS (B) | C | KPP | KNP | KOP | KQP |
|---|---|---|---|---|---|---|---|---|---|---|---|
| 00F | 460 | 00003249202 | 00000000000 | 00003249202 | 0100000000000 | 0000100000000 | 0 | 9 | 8 | 8 | 9 |
| 010 | 009 | 00003249202 | 00000000000 | 00003249202 | 0100000000000 | 0000100000000 | 1 | 9 | 8 | 8 | 9 |
| 011 | 7E9 | 00003249202 | 00000000000 | 00003249202 | 0100000000000 | 0000100000000 | 1 | 9 | 8 | 8 | 9 |
| 012 | 204 | 00003249202 | 00000000000 | 00003249202 | 0100000000000 | 0000100000000 | 1 | 9 | 8 | 8 | 9 |
| 013 | 41C | 00003249202 | 00000000000 | 00003249202 | 0100000000000 | 0000100000000 | 1 | 9 | 9 | 9 | 9 |
| 014 | 253 | 00003249202 | 00000000000 | 00003249202 | 0100000000000 | 0000100000000 | 1 | 9 | 9 | 8 | 9 |
| 015 | 239 | 00003249202 | 00000000000 | 00003249202 | 0100000000000 | 0000100000000 | 1 | 9 | 9 | 7 | 9 |
| 016 | 23C | 00003249202 | 00000000000 | 00003249202 | 0100000000000 | 0000100000000 | 1 | 9 | 9 | 6 | 9 |
| 017 | 256 | 00003249202 | 00000000000 | 00003249202 | 0100000000000 | 0000100000000 | 1 | 9 | 9 | 5 | 9 |
| 018 | 238 | 00003249202 | 00000000000 | 00003249202 | 0100000000000 | 0000100000000 | 1 | 9 | 9 | 4 | 9 |
| 019 | 23C | 00003249202 | 00000000000 | 00003249202 | 0100000000000 | 0000100000000 | 1 | 9 | 9 | 3 | 9 |
| 01A | 204 | 00003249202 | 00000000000 | 00003249202 | 0100000000000 | 0000100000000 | 1 | 9 | 9 | 2 | 9 |
| 01B | 241 | 00003249202 | 00000000000 | 00003249202 | 0100000000000 | 0000100000000 | 1 | 9 | 9 | 1 | 9 |
| 01C | 242 | 00003249202 | 00000000000 | 00003249202 | 0100000000000 | 0000100000000 | 1 | 9 | 9 | 0 | 9 |
| 01D | 23C | 00003249202 | 00000000000 | 00003249202 | 0100000000000 | 0000100000000 | 1 | 9 | 9 | 0 | 9 |
| 01E | 703 | 00003249202 | 00000000000 | 00003249202 | 0101000000000 | 0000100000000 | 1 | 9 | 9 | 0 | 9 |
| 01F | 7E4 | 00003249202 | 00000000000 | 00003249202 | 0101000000000 | 0000100000000 | 0 | 9 | 9 | 0 | 9 |
| 020 | 025 | 00003249202 | 00000000000 | 00003249202 | 0101000000000 | 0000100000000 | 1 | 9 | 9 | 0 | 9 |
| 021 | 401 | 00000000000 | 00000000000 | 00003249202 | 0101000000000 | 0000100000000 | 1 | 9 | 9 | 0 | 9 |
| 022 | 764 | 00000000000 | 00000000000 | 00003249202 | 0101000000000 | 0000000000000 | 1 | 9 | 9 | 0 | 9 |
| 023 | 76A | 00000000000 | 00000000000 | 00003249202 | 0101000000000 | 0000000000000 | 1 | 9 | 9 | 0 | 9 |
| 024 | 76B | 00000000000 | 00000000000 | 00003249202 | 0101000000000 | 0000000000000 | 1 | 9 | 9 | 0 | 9 |
| 025 | 7C3 | 00000000000 | 00000000000 | 00003249202 | 0101000000000 | 0000000000000 | 0 | 9 | 9 | 0 | 9 |
| 026 | 22A | 00000000000 | 00000000000 | 00003249202 | 0100000000000 | 0000000000000 | 1 | 9 | 9 | 0 | 9 |
| 02A | 743 | 00000000000 | 00000000000 | 00003249202 | 0100000000000 | 0000000000000 | 1 | 9 | 9 | 0 | 9 |
| 02B | 564 | 00000000000 | 00000000000 | 00003249202 | 0100000000000 | 0000000000000 | 0 | 9 | 9 | 0 | 9 |
| 02C | 02F | 00000000000 | 00000000000 | 00003249202 | 0100000000000 | 0000000000000 | 1 | 9 | 9 | 0 | 9 |
| 02D | 624 | 00000000000 | 00000000000 | 00003249202 | 0100000000000 | 0000000000000 | 0 | 9 | 9 | 0 | 9 |
| 02E | 231 | 00000000000 | 00000000000 | 00003249202 | 0100000000000 | 0000000000000 | 1 | 9 | 9 | 0 | 9 |
| 031 | 7E3 | 00000000000 | 00000000000 | 00003249202 | 0100000000000 | 0000000000000 | 1 | 9 | 9 | 0 | 9 |
| 032 | 034 | 00000000000 | 00000000000 | 00003249202 | 0100000000000 | 0000000000000 | 1 | 9 | 9 | 0 | 9 |
| 034 | 485 | 00000000000 | 00000000000 | 00003249202 | 0100000000000 | 0000000000000 | 1 | 9 | 9 | 0 | 9 |

| PC | I-REG | A-REG | B-REG | C-REG | FLAGS (A) | FLAGS (B) | C | KP | KN | KO | KQ |
|---|---|---|---|---|---|---|---|---|---|---|---|
| 035 | 400 | 00000000000 | 00000000000 | 00003249202 | 0100000000000 | 0000000000000 | 1 | 9 | 9 | 9 | 9 |
| 036 | 4E1 | 00000000600 | 00000000000 | 00003249202 | 0100000000000 | 0000000000000 | 0 | 9 | 5 | 9 | 9 |
| 037 | 4C5 | 00000000700 | 00000000000 | 00003249202 | 0100000000000 | 0000000000000 | 0 | 9 | 5 | 9 | 9 |
| 038 | 204 | 00000000700 | 00000000000 | 00003249202 | 0100000000000 | 0000000000000 | 1 | 9 | 5 | 9 | 9 |
| 004 | 400 | 00000000700 | 00000000000 | 00003249202 | 0100000000000 | 0000000000000 | 1 | 9 | 9 | 9 | 9 |
| 005 | 762 | 00000000700 | 00000000000 | 00003249202 | 0100000000000 | 0000000000000 | 1 | 9 | 9 | 9 | 9 |
| 006 | 400 | 00000000700 | 00000000000 | 00003249202 | 0100000000000 | 0000000000000 | 1 | 9 | 9 | 9 | 9 |
| 007 | 460 | 00000000700 | 00000000000 | 00003249202 | 0100000000000 | 0000000000000 | 1 | 9 | 8 | 8 | 9 |
| 008 | 204 | 00000000700 | 00000000000 | 00003249202 | 0100000000000 | 0000000000000 | 1 | 9 | 8 | 8 | 9 |
| 009 | 400 | 00000000700 | 00000000000 | 00003249202 | 0100000000000 | 0000000000000 | 1 | 9 | 8 | 9 | 9 |
| 00A | 460 | 00000000700 | 00000000000 | 00003249202 | 0100000000000 | 0000000000000 | 0 | 9 | 8 | 8 | 9 |
| 00B | 400 | 00000000700 | 00000000000 | 00003249202 | 0100000000000 | 0000000000000 | 0 | 9 | 9 | 9 | 9 |
| 00C | 009 | 00000000700 | 00000000000 | 00003249202 | 0100000000000 | 0000000000000 | 1 | 9 | 9 | 9 | 9 |
| 00D | 400 | 00000000700 | 00000000000 | 00003249202 | 0100000000000 | 0000000000000 | 1 | 9 | 9 | 9 | 9 |
| 00E | 400 | 00000000700 | 00000000000 | 00003249202 | 0100000000000 | 0000000000000 | 1 | 9 | 9 | 9 | 9 |
| 00F | 460 | 00000000700 | 00000000000 | 00003249202 | 0100000000000 | 0000000000000 | 0 | 9 | 8 | 8 | 9 |
| 010 | 009 | 00000000700 | 00000000000 | 00003249202 | 0100000000000 | 0000000000000 | 1 | 9 | 8 | 8 | 9 |
| 011 | 7E9 | 00000000700 | 00000000000 | 00003249202 | 0100000000000 | 0000000000000 | 1 | 9 | 8 | 8 | 9 |
| 012 | 204 | 00000000700 | 00000000000 | 00003249202 | 0100000000000 | 0001000000000 | 1 | 9 | 8 | 8 | 9 |

TABLE VII-continued

EXAMPLE INSTRUCTION TRACE ... DATA CARD 157 ($7.79 -= $) ...

| | | | | | | | | | | | |
|---|---|---|---|---|---|---|---|---|---|---|---|
| 013 | 41C | 00000000700 | 00000000000 | 00003249202 | 0100000000000 | 0000000000000 | 1 | 9 | 9 | 9 | 9 |
| 014 | 253 | 00000000700 | 00000000000 | 00003249202 | 0100000000000 | 0000000000000 | 1 | 9 | 9 | 8 | 9 |
| 015 | 239 | 00000000700 | 00000000000 | 00003249202 | 0100000000000 | 0000000000000 | 1 | 9 | 9 | 7 | 9 |
| 039 | 723 | 00000000700 | 00000000000 | 00003249202 | 0100000000000 | 0001000000000 | 1 | 9 | 9 | 7 | 9 |
| 03A | 01F | 00000000700 | 00000000000 | 00003249202 | 0100000000000 | 0001000000000 | 1 | 9 | 9 | 7 | 9 |
| 01F | 7E4 | 00000000700 | 00000000000 | 00003249202 | 0100000000000 | 0001000000000 | 1 | 9 | 9 | 7 | 9 |
| 020 | 025 | 00000000700 | 00000000000 | 00003249202 | 0100000000000 | 0001000000000 | 1 | 9 | 9 | 7 | 9 |
| 025 | 7C3 | 00000000700 | 00000000000 | 00003249202 | 0100000000000 | 0001000000000 | 1 | 9 | 9 | 7 | 9 |
| 026 | 22A | 00000000700 | 00000000000 | 00003249202 | 0100000000000 | 0001000000000 | 1 | 9 | 9 | 7 | 9 |
| 027 | 5C1 | 00000000701 | 00000000000 | 00003249202 | 0100000000000 | 0001000000000 | 1 | 9 | 9 | 7 | 9 |
| 028 | 5E5 | 00000000700 | 00000000000 | 00003249202 | 0100000000000 | 0001000000000 | 1 | 9 | 9 | 7 | 9 |
| 029 | 004 | 00000000700 | 00000000000 | 00003249202 | 0100000000000 | 0001000000000 | 1 | 9 | 9 | 7 | 9 |
| 004 | 400 | 00000000700 | 00000000000 | 00003249202 | 0100000000000 | 0001000000000 | 1 | 9 | 9 | 9 | 9 |
| 005 | 762 | 00000000700 | 00000000000 | 00003249202 | 0100000000000 | 0001000000000 | 1 | 9 | 9 | 9 | 9 |
| 006 | 400 | 00000000700 | 00000000000 | 00003249202 | 0100000000000 | 0001000000000 | 1 | 9 | 9 | 9 | 9 |
| 007 | 460 | 00000000700 | 00000000000 | 00003249202 | 0100000000000 | 0001000000000 | 1 | 9 | 8 | 8 | 9 |
| 008 | 204 | 00000000700 | 00000000000 | 00003249202 | 0100000000000 | 0001000000000 | 1 | 9 | 8 | 8 | 9 |
| 009 | 400 | 00000000700 | 00000000000 | 00003249202 | 0100000000000 | 0001000000000 | 1 | 9 | 9 | 9 | 9 |
| 00A | 460 | 00000000700 | 00000000000 | 00003249202 | 0100000000000 | 0001000000000 | 0 | 9 | 8 | 8 | 9 |
| 00B | 400 | 00000000700 | 00000000000 | 00003249202 | 0100000000000 | 0001000000000 | 0 | 9 | 9 | 9 | 9 |
| 00C | 009 | 00000000700 | 00000000000 | 00003249202 | 0100000000000 | 0001000000000 | 1 | 9 | 9 | 9 | 9 |
| 00D | 400 | 00000000700 | 00000000000 | 00003249202 | 0100000000000 | 0001000000000 | 1 | 9 | 9 | 9 | 9 |
| 00E | 400 | 00000000700 | 00000000000 | 00003249202 | 0100000000000 | 0001000000000 | 1 | 9 | 9 | 9 | 9 |
| 00F | 460 | 00000000700 | 00000000000 | 00003249202 | 0100000000000 | 0001000000000 | 0 | 9 | 8 | 8 | 9 |
| 010 | 009 | 00000000700 | 00000000000 | 00003249202 | 0100000000000 | 0001000000000 | 1 | 9 | 8 | 8 | 9 |
| 011 | 7E9 | 00000000700 | 00000000000 | 00003249202 | 0100000000000 | 0001000000000 | 1 | 9 | 8 | 8 | 9 |
| 012 | 204 | 00000000700 | 00000000000 | 00003249202 | 0100000000000 | 0001000000000 | | | | | |
| 013 | 41C | 00000000700 | 00000000000 | 00003249202 | 0100000000000 | 0001000000000 | 1 | 9 | 9 | 9 | 9 |
| 014 | 253 | 00000000700 | 00000000000 | 00003249202 | 0100000000000 | 0001000000000 | 1 | 9 | 9 | 8 | 9 |
| 015 | 239 | 00000000700 | 00000000000 | 00003249202 | 0100000000000 | 0001000000000 | 1 | 9 | 9 | 7 | 9 |
| 016 | 23C | 00000000700 | 00000000000 | 00003249202 | 0100000000000 | 0001000000000 | 1 | 9 | 9 | 6 | 9 |
| 017 | 256 | 00000000700 | 00000000000 | 00003249202 | 0100000000000 | 0001000000000 | 1 | 9 | 9 | 5 | 9 |
| 018 | 23B | 00000000700 | 00000000000 | 00003249202 | 0100000000000 | 0001000000000 | 1 | 9 | 9 | 4 | 9 |
| 019 | 23C | 00000000700 | 00000000000 | 00003249202 | 0100000000000 | 0001000000000 | 1 | 9 | 9 | 3 | 9 |
| 01A | 204 | 00000000700 | 00000000000 | 00003249202 | 0100000000000 | 0001000000000 | 1 | 9 | 9 | 2 | 9 |
| 01B | 241 | 00000000700 | 00000000000 | 00003249202 | 0100000000000 | 0001000000000 | 1 | 9 | 9 | 1 | 9 |
| 01C | 242 | 00000000700 | 00000000000 | 00003249202 | 0100000000000 | 0001000000000 | 1 | 9 | 9 | 0 | 9 |
| 01D | 23C | 00000000700 | 00000000000 | 00003249202 | 0100000000000 | 0001000000000 | 1 | 9 | 9 | 0 | 9 |
| 01E | 703 | 00000000700 | 00000000000 | 00003249202 | 0101000000000 | 0001000000000 | 1 | 9 | 9 | 0 | 9 |
| 01F | 7E4 | 00000000700 | 00000000000 | 00003249202 | 0101000000000 | 0001000000000 | 1 | 9 | 9 | 0 | 9 |
| 020 | 025 | 00000000700 | 00000000000 | 00003249202 | 0101000000000 | 0001000000000 | 1 | 9 | 9 | 0 | 9 |
| 025 | 7C3 | 00000000700 | 00000000000 | 00003249202 | 0101000000000 | 0001000000000 | 0 | 9 | 9 | 0 | 9 |
| 026 | 22A | 00000000700 | 00000000000 | 00003249202 | 0101000000000 | 0001000000000 | 1 | 9 | 9 | 0 | 9 |
| 02A | 743 | 00000000700 | 00000000000 | 00003249202 | 0100000000000 | 0001000000000 | 1 | 9 | 9 | 0 | 9 |
| 02B | 564 | 00000000700 | 00000000000 | 00003249202 | 0100000000000 | 0001000000000 | 0 | 9 | 9 | 0 | 9 |
| 02C | 02F | 00000000700 | 00000000000 | 00003249202 | 0100000000000 | 0001000000000 | 1 | 9 | 9 | 0 | 9 |
| 02D | 624 | 00000000700 | 00000000000 | 00003249202 | 0100000000000 | 0001000000000 | 0 | 9 | 9 | 0 | 9 |
| 02E | 231 | 00000000700 | 00000000000 | 00003249202 | 0100000000000 | 0001000000000 | 1 | 9 | 9 | 0 | 9 |
| 031 | 7E3 | 00000000700 | 00000000000 | 00003249202 | 0100000000000 | 0001000000000 | 0 | 9 | 9 | 0 | 9 |
| 032 | 034 | 00000000700 | 00000000000 | 00003249202 | 0100000000000 | 0001000000000 | 1 | 9 | 9 | 0 | 9 |
| 033 | 5C5 | 00000000701 | 00000000000 | 00003249202 | 0100000000000 | 0001000000000 | 1 | 9 | 9 | 0 | 9 |
| 034 | 485 | 00000007001 | 00000000000 | 00003249202 | 0100000000000 | 0001000000000 | 1 | 9 | 9 | 0 | 9 |
| 035 | 400 | 00000007001 | 00000000000 | 00003249202 | 0100000000000 | 0001000000000 | 1 | 9 | 9 | 9 | 9 |
| 036 | 4E1 | 00000007601 | 00000000000 | 00003249202 | 0100000000000 | 0001000000000 | 0 | 9 | 5 | 9 | 9 |
| 037 | 4C5 | 00000007701 | 00000000000 | 00003249202 | 0100000000000 | 0001000000000 | 0 | 9 | 5 | 9 | 9 |
| 038 | 204 | 00000007701 | 00000000000 | 00003249202 | 0100000000000 | 0001000000000 | 1 | 9 | 5 | 9 | 9 |
| 004 | 400 | 00000007701 | 00000000000 | 00003249202 | 0100000000000 | 0001000000000 | 1 | 9 | 9 | 9 | 9 |
| 005 | 762 | 00000007701 | 00000000000 | 00003249202 | 0100000000000 | 0001000000000 | 1 | 9 | 9 | 9 | 9 |
| 006 | 400 | 00000007701 | 00000000000 | 00003249202 | 0100000000000 | 0001000000000 | 1 | 9 | 9 | 9 | 9 |
| 007 | 460 | 00000007701 | 00000000000 | 00003249202 | 0100000000000 | 0001000000000 | 1 | 9 | 8 | 8 | 9 |
| 008 | 204 | 00000007701 | 00000000000 | 00003249202 | 0100000000000 | 0001000000000 | 1 | 9 | 8 | 8 | 9 |
| 009 | 400 | 00000007701 | 00000000000 | 00003249202 | 0100000000000 | 0001000000000 | 1 | 9 | 9 | 9 | 9 |
| 00A | 460 | 00000007701 | 00000000000 | 00003249202 | 0100000000000 | 0001000000000 | 0 | 9 | 8 | 8 | 9 |
| 00B | 400 | 00000007701 | 00000000000 | 00003249202 | 0100000000000 | 0001000000000 | 0 | 9 | 9 | 9 | 9 |
| 00C | 009 | 00000007701 | 00000000000 | 00003249202 | 0100000000000 | 0001000000000 | 1 | 9 | 9 | 9 | 9 |
| 00D | 400 | 00000007701 | 00000000000 | 00003249202 | 0100000000000 | 0001000000000 | 1 | 9 | 9 | 9 | 9 |
| 00E | 400 | 00000007701 | 00000000000 | 00003249202 | 0100000000000 | 0001000000000 | 1 | 9 | 9 | 9 | 9 |
| 00F | 460 | 00000007701 | 00000000000 | 00003249202 | 0100000000000 | 0001000000000 | 0 | 9 | 8 | 8 | 9 |
| 010 | 009 | 00000007701 | 00000000000 | 00003249202 | 0100000000000 | 0001000000000 | 1 | 9 | 8 | 8 | 9 |
| 011 | 7E9 | 00000007701 | 00000000000 | 00003249202 | 0100000000000 | 0001000000000 | 1 | 9 | 8 | 8 | 9 |
| 012 | 204 | 00000007701 | 00000000000 | 00003249202 | 0100000000000 | 0001000000000 | 1 | 9 | 8 | 8 | 9 |
| 013 | 41C | 00000007701 | 00000000000 | 00003249202 | 0100000000000 | 0001000000000 | 1 | 9 | 9 | 9 | 9 |
| 014 | 253 | 00000007701 | 00000000000 | 00003249202 | 0100000000000 | 0001000000000 | 1 | 9 | 9 | 8 | 9 |
| 015 | 239 | 00000007701 | 00000000000 | 00003249202 | 0100000000000 | 0001000000000 | 1 | 9 | 9 | 7 | 9 |
| 016 | 23C | 00000007701 | 00000000000 | 00003249202 | 0100000000000 | 0001000000000 | 1 | 9 | 9 | 6 | 9 |
| 017 | 256 | 00000007701 | 00000000000 | 00003249202 | 0100000000000 | 0001000000000 | 1 | 9 | 9 | 5 | 9 |
| 018 | 238 | 00000007701 | 00000000000 | 00003249202 | 0100000000000 | 0001000000000 | 1 | 9 | 9 | 4 | 9 |

TABLE VII-continued

EXAMPLE INSTRUCTION TRACE . . . DATA CARD 157 ($7.79 -= $) . . .

| | | | | | | | | | | | |
|---|---|---|---|---|---|---|---|---|---|---|---|
| 019 | 23C | 00000007701 | 00000000000 | 00003249202 | 0100000000000 | 0001000000000 | 1 | 9 | 9 | 3 | 9 |
| 01A | 204 | 00000007701 | 00000000000 | 00003249202 | 0100000000000 | 0001000000000 | 1 | 9 | 9 | 2 | 9 |
| 01B | 241 | 00000007701 | 00000000000 | 00003249202 | 0100000000000 | 0001000000000 | 1 | 9 | 9 | 1 | 9 |
| 01C | 242 | 00000007701 | 00000000000 | 00003249202 | 0100000000000 | 0001000000000 | 1 | 9 | 9 | 0 | 9 |
| 01D | 23C | 00000007701 | 00000000000 | 00003249202 | 0100000000000 | 0001000000000 | 1 | 9 | 9 | 0 | 9 |
| 01E | 703 | 00000007701 | 00000000000 | 00003249202 | 0101000000000 | 0001000000000 | 1 | 9 | 9 | 0 | 9 |
| 01F | 7E4 | 00000007701 | 00000000000 | 00003249202 | 0101000000000 | 0001000000000 | 1 | 9 | 9 | 0 | 9 |
| 020 | 025 | 00000007701 | 00000000000 | 00003249202 | 0101000000000 | 0001000000000 | 1 | 9 | 9 | 0 | 9 |
| 025 | 7C3 | 00000007701 | 00000000000 | 00003249202 | 0101000000000 | 0001000000000 | 0 | 9 | 9 | 0 | 9 |
| 026 | 22A | 00000007701 | 00000000000 | 00003249202 | 0101000000000 | 0001000000000 | 1 | 9 | 9 | 0 | 9 |
| 02A | 743 | 00000007701 | 00000000000 | 00003249202 | 0100000000000 | 0001000000000 | 1 | 9 | 9 | 0 | 9 |
| 02B | 564 | 00000007701 | 00000000000 | 00003249202 | 0100000000000 | 0001000000000 | 0 | 9 | 9 | 0 | 9 |
| 02C | 02F | 00000007701 | 00000000000 | 00003249202 | 0100000000000 | 0001000000000 | 1 | 9 | 9 | 0 | 9 |
| 02D | 624 | 00000007701 | 00000000000 | 00003249202 | 0100000000000 | 0001000000000 | 0 | 9 | 9 | 0 | 9 |
| 02E | 231 | 00000007701 | 00000000000 | 00003249202 | 0100000000000 | 0001000000000 | 1 | 9 | 9 | 0 | 9 |
| 031 | 7E3 | 00000007701 | 00000000000 | 00003249202 | 0100000000000 | 0001000000000 | 0 | 9 | 9 | 0 | 9 |
| 032 | 034 | 00000007701 | 00000000000 | 00003249202 | 0100000000000 | 0001000000000 | 1 | 9 | 9 | 0 | 9 |
| 033 | 5C5 | 00000007702 | 00000000000 | 00003249202 | 0100000000000 | 0001000000000 | 1 | 9 | 9 | 0 | 9 |
| 034 | 485 | 00000077002 | 00000000000 | 00003249202 | 0100000000000 | 0001000000000 | 1 | 9 | 9 | 0 | 9 |
| 035 | 400 | 00000077002 | 00000000000 | 00003249202 | 0100000000000 | 0001000000000 | 1 | 9 | 9 | 9 | 9 |
| 036 | 4E1 | 00000077802 | 00000000000 | 00003249202 | 0100000000000 | 0001000000000 | 0 | 9 | 7 | 9 | 9 |
| 037 | 4C5 | 00000077902 | 00000000000 | 00003249202 | 0100000000000 | 0001000000000 | 0 | 9 | 7 | 9 | 9 |
| 038 | 204 | 00000077902 | 00000000000 | 00003249202 | 0100000000000 | 0001000000000 | 1 | 9 | 7 | 9 | 9 |
| 004 | 400 | 00000077902 | 00000000000 | 00003249202 | 0100000000000 | 0001000000000 | 1 | 9 | 9 | 9 | 9 |
| 005 | 762 | 00000077902 | 00000000000 | 00003249202 | 0100000000000 | 0001000000000 | 1 | 9 | 9 | 9 | 9 |
| 006 | 400 | 00000077902 | 00000000000 | 00003249202 | 0100000000000 | 0001000000000 | 1 | 9 | 9 | 9 | 9 |
| 007 | 460 | 00000077902 | 00000000000 | 00003249202 | 0100000000000 | 0001000000000 | 1 | 9 | 8 | 8 | 9 |
| 008 | 204 | 00000077902 | 00000000000 | 00003249202 | 0100000000000 | 0001000000000 | 1 | 9 | 8 | 8 | 9 |
| 009 | 400 | 00000077902 | 00000000000 | 00003249202 | 0100000000000 | 0001000000000 | 1 | 9 | 9 | 9 | 9 |
| 00A | 460 | 00000077902 | 00000000000 | 00003249202 | 0100000000000 | 0001000000000 | 0 | 9 | 8 | 8 | 9 |
| 00B | 400 | 00000077902 | 00000000000 | 00003249202 | 0100000000000 | 0001000000000 | 0 | 9 | 9 | 9 | 9 |
| 00C | 009 | 00000077902 | 00000000000 | 00003249202 | 0100000000000 | 0001000000000 | 1 | 9 | 9 | 9 | 9 |
| 00D | 400 | 00000077902 | 00000000000 | 00003249202 | 0100000000000 | 0001000000000 | 1 | 9 | 9 | 9 | 9 |
| 00E | 400 | 00000077902 | 00000000000 | 00003249202 | 0100000000000 | 0001000000000 | 1 | 9 | 9 | 9 | 9 |
| 00F | 460 | 00000077902 | 00000000000 | 00003249202 | 0100000000000 | 0001000000000 | 0 | 9 | 8 | 8 | 9 |
| 010 | 009 | 00000077902 | 00000000000 | 00003249202 | 0100000000000 | 0001000000000 | 1 | 9 | 8 | 8 | 9 |
| 011 | 7E9 | 00000077902 | 00000000000 | 00003249202 | 0100000000000 | 0001000000000 | 1 | 9 | 8 | 8 | 9 |
| 012 | 204 | 00000077902 | 00000000000 | 00003249202 | 0100000000000 | 0001000000000 | 1 | 9 | 8 | 8 | 9 |
| 013 | 41C | 00000077902 | 00000000000 | 00003249202 | 0100000000000 | 0001000000000 | 1 | 9 | 9 | 9 | 9 |
| 014 | 253 | 00000077902 | 00000000000 | 00003249202 | 0100000000000 | 0001000000000 | 1 | 9 | 9 | 8 | 9 |
| 015 | 239 | 00000077902 | 00000000000 | 00003249202 | 0100000000000 | 0001000000000 | 1 | 9 | 9 | 7 | 9 |
| 016 | 23C | 00000077902 | 00000000000 | 00003249202 | 0100000000000 | 0001000000000 | 1 | 9 | 9 | 6 | 9 |
| 017 | 256 | 00000077902 | 00000000000 | 00003249202 | 0100000000000 | 0001000000000 | 1 | 9 | 9 | 5 | 9 |
| 018 | 23B | 00000077902 | 00000000000 | 00003249202 | 0100000000000 | 0001000000000 | 1 | 9 | 9 | 4 | 9 |
| 038 | 72A | -00000077902 | 00000000000 | 00003249202 | 0100000000000 | 0001000000100 | 1 | 9 | 9 | 4 | 9 |
| 03C | 761 | -00000077902 | 00000000000 | 00003249202 | 0100000000000 | 0001000000100 | 1 | 9 | 9 | 4 | 9 |
| 03D | 7C1 | -00000077902 | 00000000000 | 00003249202 | 0100000000000 | 0001000000100 | 0 | 9 | 9 | 4 | 9 |
| 03E | 045 | -00000077902 | 00000000000 | 00003249202 | 0100000000000 | 0001000000100 | 1 | 9 | 9 | 4 | 9 |
| 03F | 700 | -00000077902 | 00000000000 | 00003249202 | 1100000000000 | 0001000000100 | 1 | 9 | 9 | 4 | 9 |
| 040 | 079 | -00000077902 | 00000000000 | 00003249202 | 1100000000000 | 0001000000100 | 1 | 9 | 9 | 4 | 9 |
| 079 | 524 | -00000077902 | 00000000000 | 00003249202 | 1100000000000 | 0001000000100 | 1 | 9 | 9 | 4 | 9 |
| 07A | 29F | -00000077902 | 00000000000 | 00003249202 | 1100000000000 | 0001000000100 | 1 | 9 | 9 | 4 | 9 |
| 07B | 542 | -00000077902 | 01000000000 | 00003249202 | 1100000000000 | 0001000000100 | 1 | 9 | 9 | 4 | 9 |
| 07C | 48A | -00000077902 | 10000000000 | 00003249202 | 1100000000000 | 0001000000100 | 1 | 9 | 9 | 4 | 9 |
| 07D | 4B0 | -00000077902 | 10000000000 | 00003249202 | 1100000000000 | 0001000000100 | 0 | 9 | 9 | 4 | 9 |
| 07E | 283 | -00000077902 | 10000000000 | 00003249202 | 1100000000000 | 0001000000100 | 1 | 9 | 9 | 4 | 9 |
| 083 | 624 | -00000077902 | 10000000000 | 00003249202 | 1100000000000 | 0001000000100 | 0 | 9 | 9 | 4 | 9 |
| 084 | 290 | -00000077902 | 10000000000 | 00003249202 | 1100000000000 | 0001000000100 | 1 | 9 | 9 | 4 | 9 |
| 090 | 5C5 | -00000077903 | 10000000000 | 00003249202 | 1100000000000 | 0001000000100 | 1 | 9 | 9 | 4 | 9 |
| 091 | 564 | -00000077903 | 10000000000 | 00003249202 | 1100000000000 | 0001000000100 | 0 | 9 | 9 | 4 | 9 |
| 092 | 29D | -00000077903 | 10000000000 | 00003249202 | 1100000000000 | 0001000000100 | 1 | 9 | 9 | 4 | 9 |
| 09D | 485 | -00000779003 | 10000000000 | 00003249202 | 1100000000000 | 0001000000100 | 1 | 9 | 9 | 4 | 9 |
| 09E | 083 | -00000779003 | 10000000000 | 00003249202 | 1100000000000 | 0001000000100 | 1 | 9 | 9 | 4 | 9 |
| 083 | 624 | -00000779003 | 10000000000 | 00003249202 | 1100000000000 | 0001000000100 | 0 | 9 | 9 | 4 | 9 |
| 084 | 290 | -00000779003 | 10000000000 | 00003249202 | 1100000000000 | 0001000000100 | 1 | 9 | 9 | 4 | 9 |
| 090 | 5C5 | -00000779004 | 10000000000 | 00003249202 | 1100000000000 | 0001000000100 | 1 | 9 | 9 | 4 | 9 |
| 091 | 564 | -00000779004 | 10000000000 | 00003249202 | 1100000000000 | 0001000000100 | 0 | 9 | 9 | 4 | 9 |
| 092 | 29D | -00000779004 | 10000000000 | 00003249202 | 1100000000000 | 0001000000100 | 1 | 9 | 9 | 4 | 9 |
| 09D | 485 | -00007790004 | 10000000000 | 00003249202 | 1100000000000 | 0001000000100 | 1 | 9 | 9 | 4 | 9 |
| 09E | 083 | -00007790004 | 10000000000 | 00003249202 | 1100000000000 | 0001000000100 | 1 | 9 | 9 | 4 | 9 |
| 083 | 624 | -00007790004 | 10000000000 | 00003249202 | 1100000000000 | 0001000000100 | 0 | 9 | 9 | 4 | 9 |
| 084 | 290 | -00007790004 | 10000000000 | 00003249202 | 1100000000000 | 0001000000100 | 1 | 9 | 9 | 4 | 9 |
| 090 | 5C5 | -00007790005 | 10000000000 | 00003249202 | 1100000000000 | 0001000000100 | 1 | 9 | 9 | 4 | 9 |
| 091 | 564 | -00007790005 | 10000000000 | 00003249202 | 1100000000000 | 0001000000100 | 0 | 9 | 9 | 4 | 9 |
| 092 | 29D | -00007790005 | 10000000000 | 00003249202 | 1100000000000 | 0001000000100 | 1 | 9 | 9 | 4 | 9 |
| 09D | 485 | -00077900005 | 10000000000 | 00003249202 | 1100000000000 | 0001000000100 | 1 | 9 | 9 | 4 | 9 |
| 09E | 083 | -00077900005 | 10000000000 | 00003249202 | 1100000000000 | 0001000000100 | 1 | 9 | 9 | 4 | 9 |

TABLE VII-continued

EXAMPLE INSTRUCTION TRACE . . . DATA CARD 157 ($7.79 -= $) . . .

| | | | | | | | | | | | |
|---|---|---|---|---|---|---|---|---|---|---|---|
| 083 | 624 | −00077900005 | 10000000000 | 00003249202 | 1100000000000 | 0001000000100 | 0 | 9 | 9 | 4 | 9 |
| 084 | 290 | −00077900005 | 10000000000 | 00003249202 | 1100000000000 | 0001000000100 | 1 | 9 | 9 | 4 | 9 |
| 090 | 5C5 | −00077900006 | 10000000000 | 00003249202 | 1100000000000 | 0001000000100 | 1 | 9 | 9 | 4 | 9 |
| 091 | 564 | −00077900006 | 10000000000 | 00003249202 | 1100000000000 | 0001000000100 | 0 | 9 | 9 | 4 | 9 |
| 092 | 29D | −00077900006 | 10000000000 | 00003249202 | 1100000000000 | 0001000000100 | 1 | 9 | 9 | 4 | 9 |
| 09D | 485 | −00779000006 | 10000000000 | 00003249202 | 1100000000000 | 0001000000100 | 1 | 9 | 9 | 4 | 9 |
| 09E | 083 | −00779000006 | 10000000000 | 00003249202 | 1100000000000 | 0001000000100 | 1 | 9 | 9 | 4 | 9 |
| 083 | 624 | −00779000006 | 10000000000 | 00003249202 | 1100000000000 | 0001000000100 | 0 | 9 | 9 | 4 | 9 |
| 084 | 290 | −00779000006 | 10000000000 | 00003249202 | 1100000000000 | 0001000000100 | 1 | 9 | 9 | 4 | 9 |
| 090 | 5C5 | −00779000007 | 10000000000 | 00003249202 | 1100000000000 | 0001000000100 | 1 | 9 | 9 | 4 | 9 |
| 091 | 564 | −00779000007 | 10000000000 | 00003249202 | 1100000000000 | 0001000000100 | 0 | 9 | 9 | 4 | 9 |
| 092 | 29D | −00779000007 | 10000000000 | 00003249202 | 1100000000000 | 0001000000100 | 1 | 9 | 9 | 4 | 9 |
| 09D | 485 | −07790000007 | 10000000000 | 00003249202 | 1100000000000 | 0001000000100 | 1 | 9 | 9 | 4 | 9 |
| 09E | 083 | −07790000007 | 10000000000 | 00003249202 | 1100000000000 | 0001000000100 | 1 | 9 | 9 | 4 | 9 |
| 083 | 624 | −07790000007 | 10000000000 | 00003249202 | 1100000000000 | 0001000000100 | 0 | 9 | 9 | 4 | 9 |
| 084 | 290 | −07790000007 | 10000000000 | 00003249202 | 1100000000000 | 0001000000100 | 1 | 9 | 9 | 4 | 9 |
| 085 | 564 | −07790000007 | 10000000000 | 00003249202 | 1100000000000 | 0001000000100 | 1 | 9 | 9 | 4 | 9 |
| 086 | 0A0 | −07790000007 | 10000000000 | 00003249202 | 1100000000000 | 0001000000100 | 1 | 9 | 9 | 4 | 9 |
| 0A0 | 7C0 | −07790000007 | 10000000000 | 00003249202 | 1100000000000 | 0001000000100 | 0 | 9 | 9 | 4 | 9 |
| 0A1 | 100 | −07790000007 | 10000000000 | 00003249202 | 1100000000000 | 0001000000100 | 1 | 9 | 9 | 4 | 9 |
| 0A2 | 418 | −10000000000 | 07790000007 | 00003249202 | 1100000000000 | 0001000000100 | 1 | 9 | 9 | 4 | 9 |
| 0A3 | 40D | −00003249202 | 07790000007 | 00003249202 | 1100000000000 | 0001000000100 | 1 | 9 | 9 | 4 | 9 |
| 0A4 | 40B | −00003249202 | 07790000007 | 07790000007 | 1100000000000 | 0001000000100 | 1 | 9 | 9 | 4 | 9 |
| 0A5 | 6CB | −00003249202 | 07790000007 | 07790000007 | 1100000000000 | 0001000000100 | 1 | 9 | 9 | 4 | 9 |
| 0A6 | 7C8 | −00003249202 | 07790000007 | 07790000007 | 1100000000000 | 0001000000100 | 1 | 9 | 9 | 4 | 9 |
| 0A7 | 788 | −00003249202 | 07790000007 | 07790000007 | 1100000010000 | 0001000000100 | 1 | 9 | 9 | 4 | 9 |
| DA8 | 079 | −00003249202 | 07790000007 | 07790000007 | 1100000010000 | 0001000000100 | 1 | 9 | 9 | 4 | 9 |
| 079 | 524 | −00003249202 | 07790000007 | 07790000007 | 1100000010000 | 0001000000100 | 1 | 9 | 9 | 4 | 9 |
| 07A | 29F | −00003249202 | 07790000007 | 07790000007 | 1100000010000 | 0001000000100 | 1 | 9 | 9 | 4 | 9 |
| 07B | 542 | −00003249202 | 01000000007 | 07790000007 | 1100000010000 | 0001000000100 | 1 | 9 | 9 | 4 | 9 |
| 07C | 48A | −00003249202 | 10000000007 | 07790000007 | 1100000010000 | 0001000000100 | 1 | 9 | 9 | 4 | 9 |
| 07D | 4B0 | −00003249202 | 10000000007 | 07790000007 | 1100000010000 | 0001000000100 | 0 | 9 | 9 | 4 | 9 |
| 07E | 283 | −00003249202 | 10000000007 | 07790000007 | 1100000010000 | 0001000000100 | 1 | 9 | 9 | 4 | 9 |
| 083 | 624 | −00003249202 | 10000000007 | 07790000007 | 1100000010000 | 0001000000100 | 0 | 9 | 9 | 4 | 9 |
| 084 | 290 | −00003249202 | 10000000007 | 07790000007 | 1100000010000 | 0001000000100 | 1 | 9 | 9 | 4 | 9 |
| 090 | 5C5 | −00003249203 | 10000000007 | 07790000007 | 1100000010000 | 0001000000100 | 1 | 9 | 9 | 4 | 9 |
| 091 | 564 | −00003249203 | 10000000007 | 07790000007 | 1100000010000 | 0001000000100 | 0 | 9 | 9 | 4 | 9 |
| 092 | 29D | −00003249203 | 10000000007 | 07790000007 | 1100000010000 | 0001000000100 | 1 | 9 | 9 | 4 | 9 |
| 09D | 485 | −00032492003 | 10000000007 | 07790000007 | 1100000010000 | 0001000000100 | 1 | 9 | 9 | 4 | 9 |
| 09E | 083 | −00032492003 | 10000000007 | 07790000007 | 1100000010000 | 0001000000100 | 1 | 9 | 9 | 4 | 9 |
| 083 | 624 | −00032492003 | 10000000007 | 07790000007 | 1100000010000 | 0001000000100 | 0 | 9 | 9 | 4 | 9 |
| 084 | 290 | −00032492003 | 10000000007 | 07790000007 | 1100000010000 | 0001000000100 | 1 | 9 | 9 | 4 | 9 |
| 090 | 5C5 | −00032492004 | 10000000007 | 07790000007 | 1100000010000 | 0001000000100 | 1 | 9 | 9 | 4 | 9 |
| 091 | 564 | −00032492004 | 10000000007 | 07790000007 | 1100000010000 | 0001000000100 | 0 | 9 | 9 | 4 | 9 |
| 092 | 29D | −00032492004 | 10000000007 | 07790000007 | 1100000010000 | 0001000000100 | 1 | 9 | 9 | 4 | 9 |
| 09D | 485 | −00324920004 | 10000000007 | 07790000007 | 1100000010000 | 0001000000100 | 1 | 9 | 9 | 4 | 9 |
| 09E | 083 | −00324920004 | 10000000007 | 07790000007 | 1100000010000 | 0001000000100 | 1 | 9 | 9 | 4 | 9 |
| 083 | 624 | −00324920004 | 10000000007 | 07790000007 | 1100000010000 | 0001000000100 | 0 | 9 | 9 | 4 | 9 |
| 084 | 290 | −00324920004 | 10000000007 | 07790000007 | 1100000010000 | 0001000000100 | 1 | 9 | 9 | 4 | 9 |
| 090 | 5C5 | −00324920005 | 10000000007 | 07790000007 | 1100000010000 | 0001000000100 | 1 | 9 | 9 | 4 | 9 |
| 091 | 564 | −00324920005 | 10000000007 | 07790000007 | 1100000010000 | 0001000000100 | 0 | 9 | 9 | 4 | 9 |
| 092 | 29D | −00324920005 | 10000000007 | 07790000007 | 1100000010000 | 0001000000100 | 1 | 9 | 9 | 4 | 9 |
| 09D | 485 | −03249200005 | 10000000007 | 07790000007 | 1100000010000 | 0001000000100 | 1 | 9 | 9 | 4 | 9 |
| 09E | 083 | −03249200005 | 10000000007 | 07790000007 | 1100000010000 | 0001000000100 | 1 | 9 | 9 | 4 | 9 |
| 083 | 624 | −03249200005 | 10000000007 | 07790000007 | 1100000010000 | 0001000000100 | 0 | 9 | 9 | 4 | 9 |
| 084 | 290 | −03249200005 | 10000000007 | 07790000007 | 1100000010000 | 0001000000100 | 1 | 9 | 9 | 4 | 9 |
| 090 | 5C5 | −03249200006 | 10000000007 | 07790000007 | 1100000010000 | 0001000000100 | 1 | 9 | 9 | 4 | 9 |
| 091 | 564 | −03249200006 | 10000000007 | 07790000007 | 1100000010000 | 0001000000100 | 1 | 9 | 9 | 4 | 9 |
| 092 | 29D | −03249200006 | 10000000007 | 07790000007 | 1100000010000 | 0001000000100 | 1 | 9 | 9 | 4 | 9 |
| 093 | 7EB | −03249200006 | 10000000007 | 07790000007 | 1100000010000 | 0001000000100 | 1 | 9 | 9 | 4 | 9 |
| 094 | 28A | −03249200006 | 10000000007 | 07790000007 | 1100000010000 | 0001000000100 | 1 | 9 | 9 | 4 | 9 |
| 095 | 664 | −03249200006 | 10000000007 | 07790000007 | 1100000010000 | 0001000000100 | 0 | 9 | 9 | 4 | 9 |
| 096 | 29B | −03249200006 | 10000000007 | 07790000007 | 1100000010000 | 0001000000100 | 1 | 9 | 9 | 4 | 9 |
| 09B | 585 | −03249200016 | 10000000007 | 07790000007 | 1100000010000 | 0001000000100 | 1 | 9 | 9 | 4 | 9 |
| 09C | 083 | −03249200016 | 10000000007 | 07790000007 | 1100000010000 | 0001000000100 | 1 | 9 | 9 | 4 | 9 |
| 083 | 624 | −03249200016 | 10000000007 | 07790000007 | 1100000010000 | 0001000000100 | 0 | 9 | 9 | 4 | 9 |
| 084 | 290 | −03249200016 | 10000000007 | 07790000007 | 1100000010000 | 0001000000100 | 1 | 9 | 9 | 4 | 9 |
| 090 | 5C5 | −03249200017 | 10000000007 | 07790000007 | 1100000010000 | 0001000000100 | 1 | 9 | 9 | 4 | 9 |
| 091 | 564 | −03249200017 | 10000000007 | 07790000007 | 1100000010000 | 0001000000100 | 1 | 9 | 9 | 4 | 9 |
| 092 | 29D | −03249200017 | 10000000007 | 07790000007 | 1100000010000 | 0001000000100 | 1 | 9 | 9 | 4 | 9 |
| 093 | 7EB | −03249200017 | 10000000007 | 07790000007 | 1100000010000 | 0001000000100 | 1 | 9 | 9 | 4 | 9 |
| 094 | 28A | −03249200017 | 10000000007 | 07790000007 | 1100000010000 | 0001000000100 | 1 | 9 | 9 | 4 | 9 |
| 095 | 664 | −03249200017 | 10000000007 | 07790000007 | 1100000010000 | 0001000000100 | 0 | 9 | 9 | 4 | 9 |
| 096 | 29B | −03249200017 | 10000000007 | 07790000007 | 1100000010000 | 0001000000100 | 1 | 9 | 9 | 4 | 9 |
| 09B | 585 | −03249200027 | 10000000007 | 07790000007 | 1100000010000 | 0001000000100 | 1 | 9 | 9 | 4 | 9 |
| 09C | 083 | −03249200027 | 10000000007 | 07790000007 | 1100000010000 | 0001000000100 | 1 | 9 | 9 | 4 | 9 |
| 083 | 624 | −03249200027 | 10000000007 | 07790000007 | 1100000010000 | 0001000000100 | 1 | 9 | 9 | 4 | 9 |

TABLE VII-continued

EXAMPLE INSTRUCTION TRACE ... DATA CARD 157 ($7.79 -= $) ...

| | | | | | | | | | | | |
|---|---|---|---|---|---|---|---|---|---|---|---|
| 084 | 290 | −03249200027 | 10000000007 | 07790000007 | 1100000010000 | 0001000000100 | 1 | 9 | 9 | 4 | 9 |
| 085 | 564 | −03249200027 | 10000000007 | 07790000007 | 1100000010000 | 0001000000100 | 1 | 9 | 9 | 4 | 9 |
| 086 | 0A0 | −03249200027 | 10000000007 | 07790000007 | 1100000010000 | 0001000000100 | 1 | 9 | 9 | 4 | 9 |
| 0A0 | 7C0 | −03249200027 | 10000000007 | 07790000007 | 1100000010000 | 0001000000100 | 0 | 9 | 9 | 4 | 9 |
| 0A1 | 100 | −03249200027 | 10000000007 | 07790000007 | 1100000010000 | 0001000000100 | 1 | 9 | 9 | 4 | 9 |
| 0A2 | 418 | −10000000007 | 03249200027 | 07790000007 | 1100000010000 | 0001000000100 | 1 | 9 | 9 | 4 | 9 |
| 0A3 | 40D | −07790000007 | 03249200027 | 07790000007 | 1100000010000 | 0001000000100 | 1 | 9 | 9 | 4 | 9 |
| 0A4 | 40B | −07790000007 | 03249200027 | 03249200027 | 1100000010000 | 0001000000100 | 1 | 9 | 9 | 4 | 9 |
| 0A5 | 6CB | −07790000007 | 03249200027 | 03249200027 | 1100000010000 | 0001000000100 | 1 | 9 | 9 | 4 | 9 |
| 0A6 | 7C8 | −07790000007 | 03249200027 | 03249200027 | 1100000010000 | 0001000000100 | 0 | 9 | 9 | 4 | 9 |
| 0A7 | 7B8 | −07790000007 | 03249200027 | 03249200027 | 1100000000000 | 0001000000100 | 0 | 9 | 9 | 4 | 9 |
| 0A8 | 079 | −07790000007 | 03249200027 | 03249200027 | 1100000000000 | 0001000000100 | 1 | 9 | 9 | 4 | 9 |
| 0A9 | 740 | −07790000007 | 03249200027 | 03249200027 | 0100000000000 | 0001000000100 | 1 | 9 | 9 | 4 | 9 |
| 0AA | 7C1 | −07790000007 | 03249200027 | 03249200027 | 0100000000000 | 0001000000100 | 0 | 9 | 9 | 4 | 9 |
| 0AB | 058 | −07790000007 | 03249200027 | 03249200027 | 0100000000000 | 0001000000100 | 1 | 9 | 9 | 4 | 9 |
| 0AC | 7C2 | −07790000007 | 03249200027 | 03249200027 | 0100000000000 | 0001000000100 | 1 | 9 | 9 | 4 | 9 |
| 0AD | 0B2 | −07790000007 | 03249200027 | 03249200027 | 0100000000000 | 0001000000100 | 1 | 9 | 9 | 4 | 9 |
| 0B2 | 747 | −07790000007 | 03249200027 | 03249200027 | 0100000000000 | 0001000000100 | 1 | 9 | 9 | 4 | 9 |
| 0B3 | 400 | −07790000007 | 03249200027 | 03249200027 | 0100000000000 | 0001000000100 | 1 | 9 | 9 | 9 | 9 |
| 0B4 | 480 | −07790000007 | 03249200027 | 03249200027 | 0100000000000 | 0001000000100 | 1 | 9 | 9 | 9 | 8 |
| 0B5 | 0B7 | −07790000007 | 03249200027 | 03249200027 | 0100000000000 | 0001000000100 | 1 | 9 | 9 | 9 | 8 |
| 0B7 | 68A | −07790000007 | 03249200027 | 03249200027 | 0100000000000 | 0001000000100 | 1 | 9 | 9 | 9 | 8 |
| 0B8 | 76A | 07790000007 | 03249200027 | 03249200027 | 0100000000000 | 0001000000000 | 1 | 9 | 9 | 9 | 8 |
| 0B9 | 2BB | 07790000007 | 03249200027 | 03249200027 | 0100000000000 | 0001000000000 | 1 | 9 | 9 | 9 | 8 |
| 0BA | 72A | −07790000007 | 03249200027 | 03249200027 | 0100000000000 | 0001000000100 | 1 | 9 | 9 | 9 | 8 |
| 0BB | 68B | −07790000007 | 03249200027 | 03249200027 | 0100000000000 | 0001000000100 | 0 | 9 | 9 | 9 | 8 |
| 0BC | 0C1 | −07790000007 | 03249200027 | 03249200027 | 0100000000000 | 0001000000100 | 1 | 9 | 9 | 9 | 8 |
| 0BD | 7C2 | −07790000007 | 03249200027 | 03249200027 | 0100000000000 | 0001000000100 | 1 | 9 | 9 | 9 | 8 |
| 0BE | 2C6 | −07790000007 | 03249200027 | 03249200027 | 0100000000000 | 0001000000100 | 1 | 9 | 9 | 9 | 8 |
| 0BF | 451 | −07790000027 | 03249200027 | 03249200027 | 0100000000000 | 0001000000100 | 1 | 9 | 9 | 9 | 8 |
| 0C0 | 0CF | −07790000027 | 03249200027 | 03249200027 | 0100000000000 | 0001000000100 | 1 | 9 | 9 | 9 | 8 |
| 0CF | 524 | −07790000027 | 03249200027 | 03249200027 | 0100000000000 | 0001000000100 | 1 | 9 | 9 | 9 | 8 |
| 0D0 | 2F6 | −07790000027 | 03249200027 | 03249200027 | 0100000000000 | 0001000000100 | 1 | 9 | 9 | 9 | 8 |
| 0D1 | 487 | −07790000027 | 03249200027 | 07790000027 | 0100000000000 | 0001000000100 | 1 | 9 | 9 | 9 | 8 |
| 0D2 | 481 | −00000000027 | 03249200027 | 07790000027 | 0100000000000 | 0001000000100 | 1 | 9 | 9 | 9 | 8 |
| 0D3 | 7C2 | −00000000027 | 03249200027 | 07790000027 | 0100000000000 | 0001000000100 | 1 | 9 | 9 | 9 | 8 |
| 0D4 | 0F2 | −00000000027 | 03249200027 | 07790000027 | 0100000000000 | 0001000000100 | 1 | 9 | 9 | 9 | 8 |
| 0F2 | 4EF | −00000000027 | 03249200027 | 07790000927 | 0100000000000 | 0001000000100 | 0 | 9 | 9 | 9 | 8 |
| 0F3 | 2EE | −00000000027 | 03249200027 | 07790000927 | 0100000000000 | 0001000000100 | 1 | 9 | 9 | 9 | 8 |
| 0EE | 4AF | −00000000027 | 03249200027 | 00779000027 | 0100000000000 | 0001000000100 | 1 | 9 | 9 | 9 | 8 |
| 0EF | 52C | −00000000027 | 03249200027 | 00779000027 | 0100000000000 | 0001000000100 | 1 | 9 | 9 | 9 | 8 |
| 0F0 | 2F6 | −00000000027 | 03249200027 | 00779000027 | 0100000000000 | 0001000000100 | 1 | 9 | 9 | 9 | 8 |
| 0F1 | 4A5 | −00000000027 | 03249200027 | 00779000027 | 0100000000000 | 0001000000100 | 1 | 9 | 9 | 9 | 8 |
| 0F2 | 4EF | −00000000027 | 03249200027 | 00779000927 | 0100000000000 | 0001000000100 | 0 | 9 | 9 | 9 | 8 |
| 0F3 | 2EE | −00000000027 | 03249200027 | 00779000927 | 0100000000000 | 0001000000100 | 1 | 9 | 9 | 9 | 8 |
| 0EE | 4AF | −00000000027 | 03249200027 | 00077900027 | 0100000000000 | 0001000000100 | 1 | 9 | 9 | 9 | 8 |
| 0EF | 52C | −00000000027 | 03249200027 | 00077900027 | 0100000000000 | 0001000000100 | 1 | 9 | 9 | 9 | 8 |
| 0F0 | 2F6 | −00000000027 | 03249200027 | 00077900027 | 0100000000000 | 0001000000100 | 1 | 9 | 9 | 9 | 8 |
| 0F1 | 4A5 | −00000000027 | 03249200027 | 00077900027 | 0100000000000 | 0001000000100 | 1 | 9 | 9 | 9 | 8 |
| 0F2 | 4EF | −00000000027 | 03249200027 | 00077900927 | 0100000000000 | 0001000000100 | 0 | 9 | 9 | 9 | 8 |
| 0F3 | 2EE | −00000000027 | 03249200027 | 00077900927 | 0100000000000 | 0001000000100 | 1 | 9 | 9 | 9 | 8 |
| 0EE | 4AF | −00000000027 | 03249200027 | 00007790027 | 0100000000000 | 0001000000100 | 1 | 9 | 9 | 9 | 8 |
| 0EF | 52C | −00000000027 | 03249200027 | 00007790027 | 0100000000000 | 0001000000100 | 1 | 9 | 9 | 9 | 8 |
| 0F0 | 2F6 | −00000000027 | 03249200027 | 00007790027 | 1100000000000 | 0001000000100 | 1 | 9 | 9 | 9 | 8 |
| 0F1 | 4A5 | −00000000027 | 03249200027 | 00007790027 | 0100000000000 | 0001000000100 | 1 | 9 | 9 | 9 | 8 |
| 0F2 | 4EF | −00000000027 | 03249200027 | 00007790927 | 0100000000000 | 0001000000100 | 0 | 9 | 9 | 9 | 8 |
| 0F3 | 2EE | −00000000027 | 03249200027 | 00007790927 | 0100000000000 | 0001000000100 | 1 | 9 | 9 | 9 | 8 |
| 0EE | 4AF | −00000000027 | 03249200027 | 00000779027 | 0100000000000 | 0001000000100 | 1 | 9 | 9 | 9 | 8 |
| 0EF | 52C | −00000000027 | 03249200027 | 00000779027 | 0100000000000 | 0001000000100 | 1 | 9 | 9 | 9 | 8 |
| 0F0 | 2F6 | −00000000027 | 03249200027 | 00000779027 | 0100000000000 | 0001000000100 | 1 | 9 | 9 | 9 | 8 |
| 0F1 | 4A5 | −00000000027 | 03249200027 | 00000779027 | 0100000000000 | 0001000000100 | 1 | 9 | 9 | 9 | 8 |
| 0F2 | 4EF | −00000000027 | 03249200027 | 00000779927 | 0100000000000 | 0001000000100 | 0 | 9 | 9 | 9 | 8 |
| 0F3 | 2EE | −00000000027 | 03249200027 | 00000779927 | 0100000000000 | 0001000000100 | 1 | 9 | 9 | 9 | 8 |
| 0EE | 4AF | −00000000027 | 03249200027 | 00000077927 | 0100000000000 | 0001000000100 | 1 | 9 | 9 | 9 | 8 |
| 0EF | 52C | −00000000027 | 03249200027 | 00000077927 | 0100000000000 | 0001000000100 | 1 | 9 | 9 | 9 | 8 |
| 0F0 | 2F6 | −00000000027 | 03249200027 | 00000077927 | 0100000000000 | 0001000000100 | 1 | 9 | 9 | 9 | 8 |
| 0F1 | 4A5 | −00000000027 | 03249200027 | 00000077827 | 0100000000000 | 0001000000100 | 1 | 9 | 9 | 9 | 8 |
| 0F2 | 4EF | −00000000027 | 03249200027 | 00000077827 | 0100000000000 | 0001000000100 | 1 | 9 | 9 | 9 | 8 |
| 0F3 | 2EE | −00000000027 | 03249200027 | 00000077827 | 0100000000000 | 0001000000100 | 1 | 9 | 9 | 9 | 8 |
| 0F4 | 491 | −03249200027 | 03249200027 | 00000077827 | 0100000000000 | 0001000000100 | 1 | 9 | 9 | 9 | 8 |
| 0F5 | 0F2 | −03249200027 | 03249200027 | 00000077827 | 0100000000000 | 0001000000100 | 1 | 9 | 9 | 9 | 8 |
| 0F2 | 4EF | −03249200027 | 03249200027 | 00000077727 | 0100000000000 | 0001000000100 | 1 | 9 | 9 | 9 | 8 |
| 0F3 | 2EE | −03249200027 | 03249200027 | 00000077727 | 0100000000000 | 0001000000100 | 1 | 9 | 9 | 9 | 8 |
| 0F4 | 491 | −06498400027 | 03249200027 | 00000077727 | 0100000000000 | 0001000000100 | 1 | 9 | 9 | 9 | 8 |
| 0F5 | 0F2 | −06498400027 | 03249200027 | 00000077727 | 0100000000000 | 0001000000100 | 1 | 9 | 9 | 9 | 8 |
| 0F2 | 4EF | −06498400027 | 03249200027 | 00000077627 | 0100000000000 | 0001000000100 | 1 | 9 | 9 | 9 | 8 |
| 0F3 | 2FE | −06498400027 | 03249200027 | 00000077627 | 0100000000000 | 0001000000100 | 1 | 9 | 9 | 9 | 8 |

TABLE VII-continued

EXAMPLE INSTRUCTION TRACE . . . DATA CARD 157 ($7.79 -= $) . . .

| | | | | | | | | | | | |
|---|---|---|---|---|---|---|---|---|---|---|---|
| 0F4 | 491 | −09747600027 | 03249200027 | 00000077627 | 0100000000000 | 0001000000100 | 1 | 9 | 9 | 9 | 8 |
| 0F5 | 0F2 | −09747600027 | 03249200027 | 00000077627 | 0100000000000 | 0001000000100 | 1 | 9 | 9 | 9 | 8 |
| 0F2 | 4EF | −09747600027 | 03249200027 | 00000077527 | 0100000000000 | 0001000000100 | 1 | 9 | 9 | 9 | 8 |
| 0F3 | 2EE | −09747600027 | 03249200027 | 00000077527 | 0100000000000 | 0001000000100 | 1 | 9 | 9 | 9 | 8 |
| 0F4 | 491 | −12996800027 | 03249200027 | 00000077527 | 0100000000000 | 0001000000100 | 1 | 9 | 9 | 9 | 8 |
| 0F5 | 0F2 | −12996800027 | 03249200027 | 00000077527 | 0100000000000 | 0001000000100 | 1 | 9 | 9 | 9 | 8 |
| 0F2 | 4EF | −12996800027 | 03249200027 | 00000077427 | 0100000000000 | 0001000000100 | 1 | 9 | 9 | 9 | 8 |
| 0F3 | 2EE | −12996800027 | 03249200027 | 00000077427 | 0100000000000 | 0001000000100 | 1 | 9 | 9 | 9 | 8 |
| 0F4 | 491 | −16246000027 | 03249200027 | 00000077427 | 0100000000000 | 0001000000100 | 1 | 9 | 9 | 9 | 8 |
| 0F5 | 0F2 | −16246000027 | 03249200027 | 00000077427 | 0100000000000 | 0001000000100 | 1 | 9 | 9 | 9 | 8 |
| 0F2 | 4EF | −16246000027 | 03249200027 | 00000077327 | 0100000000000 | 0001000000100 | 1 | 9 | 9 | 9 | 8 |
| 0F3 | 2EE | −16246000027 | 03249200027 | 00000077327 | 0100000000000 | 0001000000100 | 1 | 9 | 9 | 9 | 8 |
| 0F4 | 491 | −19495200027 | 03249200027 | 00000077327 | 0100000000000 | 0001000000100 | 1 | 9 | 9 | 9 | 8 |
| 0F5 | 0F2 | −19495200027 | 03249200027 | 00000077327 | 0100000000000 | 0001000000100 | 1 | 9 | 9 | 9 | 8 |
| 0F2 | 4EF | −19495200027 | 03249200027 | 00000077227 | 0100000000000 | 0001000000100 | 1 | 9 | 9 | 9 | 8 |
| 0F3 | 2EE | −19495200027 | 03249200027 | 00000077227 | 0100000000000 | 0001000000100 | 1 | 9 | 9 | 9 | 8 |
| 0F4 | 491 | −22744400027 | 03249200027 | 00000077227 | 0100000000000 | 0001000000100 | 1 | 9 | 9 | 9 | 8 |
| 0F5 | 0F2 | −22744400027 | 03249200027 | 00000077227 | 0100000000000 | 0001000000100 | 1 | 9 | 9 | 9 | 8 |
| 0F2 | 4EF | −22744400027 | 03249200027 | 00000077127 | 0100000000000 | 0001000000100 | 1 | 9 | 9 | 9 | 8 |
| 0F3 | 2EE | −22744400027 | 03249200027 | 00000077127 | 0100000000000 | 0001000000100 | 1 | 9 | 9 | 9 | 8 |
| 0F4 | 491 | −25993600027 | 03249200027 | 00000077127 | 0100000000000 | 0001000000100 | 1 | 9 | 9 | 9 | 8 |
| 0F5 | 0F2 | −25993600027 | 03249200027 | 00000077127 | 0100000000000 | 0001000000100 | 1 | 9 | 9 | 9 | 8 |
| 0F2 | 4EF | −25993600027 | 03249200027 | 00000077027 | 0100000000000 | 0001000000100 | 1 | 9 | 9 | 9 | 8 |
| 0F3 | 2EE | −25993600027 | 03249200027 | 00000077027 | 0100000000000 | 0001000000100 | 1 | 9 | 9 | 9 | 8 |
| 0F4 | 491 | −29242800027 | 03249200027 | 00000077027 | 0100000000000 | 0001000000100 | 1 | 9 | 9 | 9 | 8 |
| 0F5 | 0F2 | −29242800027 | 03249200027 | 00000077027 | 0100000000000 | 0001000000100 | 1 | 9 | 9 | 9 | 8 |
| 0F2 | 4EF | −29242800027 | 03249200027 | 00000077927 | 0100000000000 | 0001000000100 | 0 | 9 | 9 | 9 | 8 |
| 0F3 | 2EE | −29242800027 | 03249200027 | 00000077927 | 0100000000000 | 0001000000100 | 1 | 9 | 9 | 9 | 8 |
| 0EE | 4AF | −29242800027 | 03249200027 | 00000007727 | 0100000000000 | 0001000000100 | 1 | 9 | 9 | 9 | 8 |
| 0EF | 52C | −29242800027 | 03249200027 | 00000007727 | 0100000000000 | 0001000000100 | 1 | 9 | 9 | 9 | 8 |
| 0F0 | 2F6 | −29242800027 | 03249200027 | 00000007727 | 0100000000000 | 0001000000100 | 1 | 9 | 9 | 9 | 8 |
| 0F1 | 4A5 | −02924280027 | 03249200027 | 00000007727 | 0100000000000 | 0001000000100 | 1 | 9 | 9 | 9 | 8 |
| 0F2 | 4EF | −02924280027 | 03249200027 | 00000007627 | 0100000000000 | 0001000000100 | 1 | 9 | 9 | 9 | 8 |
| 0F3 | 2EE | −02924280027 | 03249200027 | 00000007627 | 0100000000000 | 0001000000100 | 1 | 9 | 9 | 9 | 8 |
| 0F4 | 491 | −06173480027 | 03249200027 | 00000007627 | 0100000000000 | 0001000000100 | 1 | 9 | 9 | 9 | 8 |
| 0F5 | 0F2 | −06173480027 | 03249200027 | 00000007627 | 0100000000000 | 0001000000100 | 1 | 9 | 9 | 9 | 8 |
| 0F2 | 4EF | −06173480027 | 03249200027 | 00000007527 | 0100000000000 | 0001000000100 | 1 | 9 | 9 | 9 | 8 |
| 0F3 | 2EE | −06173480027 | 03249200027 | 00000007527 | 0100000000000 | 0001000000100 | 1 | 9 | 9 | 9 | 8 |
| 0F4 | 491 | −09422680027 | 03249200027 | 00000007527 | 0100000000000 | 0001000000100 | 1 | 9 | 9 | 9 | 8 |
| 0F5 | 0F2 | −09422680027 | 03249200027 | 00000007527 | 0100000000000 | 0001000000100 | 1 | 9 | 9 | 9 | 8 |
| 0F2 | 4EF | −09422680027 | 03249200027 | 00000007427 | 0100000000000 | 0001000000100 | 1 | 9 | 9 | 9 | 8 |
| 0F3 | 2EE | −09422680027 | 03249200027 | 00000007427 | 0100000000000 | 0001000000100 | 1 | 9 | 9 | 9 | 8 |
| 0F4 | 491 | −12671880027 | 03249200027 | 00000007427 | 0100000000000 | 0001000000100 | 1 | 9 | 9 | 9 | 8 |
| 0F5 | 0F2 | −12671880027 | 03249200027 | 00000007427 | 0100000000000 | 0001000000100 | 1 | 9 | 9 | 9 | 8 |
| 0F2 | 4EF | −12671880027 | 03249200027 | 00000007327 | 0100000000000 | 0001000000100 | 1 | 9 | 9 | 9 | 8 |
| 0F3 | 2EE | −12671880027 | 03249200027 | 00000007327 | 0100000000000 | 0001000000100 | 1 | 9 | 9 | 9 | 8 |
| 0F4 | 491 | −15921080027 | 03249200027 | 00000007327 | 0100000000000 | 0001000000100 | 1 | 9 | 9 | 9 | 8 |
| 0F5 | 0F2 | −15921080027 | 03249200027 | 00000007327 | 0100000000000 | 0001000000100 | 1 | 9 | 9 | 9 | 8 |
| 0F2 | 4EF | −15921080027 | 03249200027 | 00000007227 | 0100000000000 | 0001000000100 | 1 | 9 | 9 | 9 | 8 |
| 0F3 | 2EE | −15921080027 | 03249200027 | 00000007227 | 0100000000000 | 0001000000100 | 1 | 9 | 9 | 9 | 8 |
| 0F4 | 491 | −19170280027 | 03249200027 | 00000007227 | 0100000000000 | 0001000000100 | 1 | 9 | 9 | 9 | 8 |
| 0F5 | 0F2 | −19170280027 | 03249200027 | 00000007227 | 0100000000000 | 0001000000100 | 1 | 9 | 9 | 9 | 8 |
| 0F2 | 4EF | −19170280027 | 03249200027 | 00000007127 | 0100000000000 | 0001000000100 | 1 | 9 | 9 | 9 | 8 |
| 0F3 | 2EE | −19170280027 | 03249200027 | 00000007127 | 0100000000000 | 0001000000100 | 1 | 9 | 9 | 9 | 8 |
| 0F4 | 491 | −22419480027 | 03249200027 | 00000007127 | 0100000000000 | 0001000000100 | 1 | 9 | 9 | 9 | 8 |
| 0F5 | 0F2 | −22419480027 | 03249200027 | 00000007127 | 0100000000000 | 0001000000100 | 1 | 9 | 9 | 9 | 8 |
| 0F2 | 4EF | −22419480027 | 03249200027 | 00000007027 | 0100000000000 | 0001000000100 | 1 | 9 | 9 | 9 | 8 |
| 0F3 | 2EE | −22419480027 | 03249200027 | 00000007027 | 0100000000000 | 0001000000100 | 1 | 9 | 9 | 9 | 8 |
| 0F4 | 491 | −25668680027 | 03249200027 | 00000007027 | 0100000000000 | 0001000000100 | 1 | 9 | 9 | 9 | 8 |
| 0F5 | 0F2 | −25668680027 | 03249200027 | 00000007027 | 0100000000000 | 0001000000100 | 1 | 9 | 9 | 9 | 8 |
| 0F2 | 4EF | −25668680027 | 03249200027 | 00000007927 | 0100000000000 | 0001000000100 | 0 | 9 | 9 | 9 | 8 |
| 0F3 | 2EE | −25668680027 | 03249200027 | 00000007927 | 0100000000000 | 0001000000100 | 1 | 9 | 9 | 9 | 8 |
| 0EE | 4AF | −25668680027 | 03249200027 | 00000000727 | 0100000000000 | 0001000000100 | 1 | 9 | 9 | 9 | 8 |
| 0EF | 52C | −25668680027 | 03249200027 | 00000000727 | 0100000000000 | 0001000000100 | 1 | 9 | 9 | 9 | 8 |
| 0F0 | 2F6 | −25668680027 | 03249200027 | 00000000727 | 0100000000000 | 0001000000100 | 1 | 9 | 9 | 9 | 8 |
| 0F1 | 4A5 | −02566868027 | 03249200027 | 00000000727 | 0100000000000 | 0001000000100 | 1 | 9 | 9 | 9 | 8 |
| 0F2 | 4EF | −02566868027 | 03249200027 | 00000000627 | 0100000000000 | 0001000000100 | 1 | 9 | 9 | 9 | 8 |
| 0F3 | 2EE | −02566868027 | 03249200027 | 00000000627 | 0100000000000 | 0001000000100 | 1 | 9 | 9 | 9 | 8 |
| 0F4 | 491 | −05816068027 | 03249200027 | 00000000627 | 0100000000000 | 0001000000100 | 1 | 9 | 9 | 9 | 8 |
| 0F5 | 0F2 | −05816068027 | 03249200027 | 00000000627 | 0100000000000 | 0001000000100 | 1 | 9 | 9 | 9 | 8 |
| 0F2 | 4EF | −05816068027 | 03249200027 | 00000000527 | 0100000000000 | 0001000000100 | 1 | 9 | 9 | 9 | 8 |
| 0F3 | 2EE | −05816068027 | 03249200027 | 00000000527 | 0100000000000 | 0001000000100 | 1 | 9 | 9 | 9 | 8 |
| 0F4 | 491 | −09065268027 | 03249200027 | 00000000527 | 0100000000000 | 0001000000100 | 1 | 9 | 9 | 9 | 8 |
| 0F5 | 0F2 | −09065268027 | 03249200027 | 00000000527 | 0100000000000 | 0001000000100 | 1 | 9 | 9 | 9 | 8 |
| 0F2 | 4EF | −09065268027 | 03249200027 | 00000000427 | 0100000000000 | 0001000000100 | 1 | 9 | 9 | 9 | 8 |
| 0F3 | 2EE | −09065268027 | 03249200027 | 00000000427 | 0100000000000 | 0001000000100 | 1 | 9 | 9 | 9 | 8 |
| 0F4 | 491 | −12314468027 | 03249200027 | 00000000427 | 0100000000000 | 0001000000100 | 1 | 9 | 9 | 9 | 8 |

TABLE VII-continued

EXAMPLE INSTRUCTION TRACE . . . DATA CARD 157 ($7.79 -= $) . . .

| | | | | | | | | | | | |
|---|---|---|---|---|---|---|---|---|---|---|---|
| 0F5 | 0F2 | −12314468027 | 03249200027 | 00000000427 | 0100000000000 | 0001000000100 | 1 | 9 | 9 | 9 | 8 |
| 0F2 | 4EF | −12314468027 | 03249200027 | 00000000327 | 0100000000000 | 0001000000100 | 1 | 9 | 9 | 9 | 8 |
| 0F3 | 2EE | −12314468027 | 03249200027 | 00000000327 | 0100000000000 | 0001000000100 | 1 | 9 | 9 | 9 | 8 |
| 0F4 | 491 | −15563668027 | 03249200027 | 00000000327 | 0100000000000 | 0001000000100 | 1 | 9 | 9 | 9 | 8 |
| 0F5 | 0F2 | −15563668027 | 03249200027 | 00000000327 | 0100000000000 | 0001000000100 | 1 | 9 | 9 | 9 | 8 |
| 0F2 | 4EF | −15563668027 | 03249200027 | 00000000227 | 0100000000000 | 0001000000100 | 1 | 9 | 9 | 9 | 8 |
| 0F3 | 2EE | −15563668027 | 03249200027 | 00000000227 | 0100000000000 | 0001000000100 | 1 | 9 | 9 | 9 | 8 |
| 0F4 | 491 | −18812868027 | 03249200027 | 00000000227 | 0100000000000 | 0001000000100 | 1 | 9 | 9 | 9 | 8 |
| 0F5 | 0F2 | −18812868027 | 03249200027 | 00000000227 | 0100000000000 | 0001000000100 | 1 | 9 | 9 | 9 | 8 |
| 0F2 | 4EF | −18812868027 | 03249200027 | 00000000127 | 0100000000000 | 0001000000100 | 1 | 9 | 9 | 9 | 8 |
| 0F3 | 2EE | −18812868027 | 03249200027 | 00000000127 | 0100000000000 | 0001000000100 | 1 | 9 | 9 | 9 | 8 |
| 0F4 | 491 | −22062068027 | 03249200027 | 00000000127 | 0100000000000 | 0001000000100 | 1 | 9 | 9 | 9 | 8 |
| 0F5 | 0F2 | −22062068027 | 03249200027 | 00000000127 | 0100000000000 | 0001000000100 | 1 | 9 | 9 | 9 | 8 |
| 0F2 | 4EF | −22062068027 | 03249200027 | 00000000027 | 0100000000000 | 0001000000100 | 1 | 9 | 9 | 9 | 8 |
| 0F3 | 2EE | −22062068027 | 03249200027 | 00000000027 | 0100000000000 | 0001000000100 | 1 | 9 | 9 | 9 | 8 |
| 0F4 | 491 | −25311268027 | 03249200027 | 00000000027 | 0100000000000 | 0001000000100 | 1 | 9 | 9 | 9 | 8 |
| 0F5 | 0F2 | −25311268027 | 03249200027 | 00000000027 | 0100000000000 | 0001000000100 | 1 | 9 | 9 | 9 | 8 |
| 0F2 | 4EF | −25311268027 | 03249200027 | 00000000927 | 0100000000000 | 0001000000100 | 0 | 9 | 9 | 9 | 8 |
| 0F3 | 2EE | −25311268027 | 03249200027 | 00000000927 | 0100000000000 | 0001000000100 | 1 | 9 | 9 | 9 | 8 |
| 0EE | 4AF | −25311268027 | 03249200027 | 00000000027 | 0100000000000 | 0001000000100 | 1 | 9 | 9 | 9 | 8 |
| 0EF | 52C | −25311268027 | 03249200027 | 00000000027 | 0100000000000 | 0001000000100 | 0 | 9 | 9 | 9 | 8 |
| 0F0 | 2F6 | −25311268027 | 03249200027 | 00000000027 | 0100000000000 | 0001000000100 | 1 | 9 | 9 | 9 | 8 |
| 0F6 | 408 | −25311268027 | 03249200027 | 03249200027 | 0100000000000 | 0001000000100 | 1 | 9 | 9 | 9 | 8 |
| 0F7 | 7E1 | −25311268027 | 03249200027 | 03249200027 | 0100000000000 | 0001000000100 | 1 | 9 | 9 | 9 | 8 |
| 0F8 | 0FA | −25311268027 | 03249200027 | 03249200027 | 0100000000000 | 0001000000100 | 1 | 9 | 9 | 9 | 8 |
| 0FA | 7C7 | −25311268027 | 03249200027 | 03249200027 | 0100000000000 | 0001000000100 | 1 | 9 | 9 | 9 | 8 |
| 0FB | 279 | −25311268027 | 03249200027 | 03249200027 | 0100000000000 | 0001000000100 | 1 | 9 | 9 | 9 | 8 |
| 0FC | 741 | −25311268027 | 03249200027 | 03249200027 | 0000000000000 | 0001000000100 | 1 | 9 | 9 | 9 | 8 |
| 0FD | 742 | −25311268027 | 03249200027 | 03249200027 | 0000000000000 | 0001000000100 | 1 | 9 | 9 | 9 | 8 |
| 0FE | 079 | −25311268027 | 03249200027 | 03249200027 | 0000000000000 | 0001000000100 | 1 | 9 | 9 | 9 | 8 |
| 079 | 524 | −25311268027 | 03249200027 | 03249200027 | 0000000000000 | 0001000000100 | 1 | 9 | 9 | 9 | 8 |
| 07A | 29F | −25311268027 | 03249200027 | 03249200027 | 0000000000000 | 0001000000100 | 1 | 9 | 9 | 9 | 8 |
| 07B | 542 | −25311268027 | 01000000027 | 03249200027 | 0000000000000 | 0001000000100 | 1 | 9 | 9 | 9 | 8 |
| 07C | 48A | −25311268027 | 10000000027 | 03249200027 | 0000000000000 | 0001000000100 | 1 | 9 | 9 | 9 | 8 |
| 07D | 4B0 | −25311268027 | 10000000027 | 03249200027 | 0000000000000 | 0001000000100 | 1 | 9 | 9 | 9 | 8 |
| 07E | 283 | −25311268027 | 10000000027 | 03249200027 | 0000000000000 | 0001000000100 | 1 | 9 | 9 | 9 | 8 |
| 07F | 4A5 | −02531126827 | 10000000027 | 03249200027 | 0000000000000 | 0001000000100 | 1 | 9 | 9 | 9 | 8 |
| 080 | 7EB | −02531126827 | 10000000027 | 03249200027 | 0000000000000 | 0001000000100 | 1 | 9 | 9 | 9 | 8 |
| 081 | 28E | −02531126827 | 10000000027 | 03249200027 | 0000000000000 | 0001000000100 | 1 | 9 | 9 | 9 | 8 |
| 082 | 585 | −02531126837 | 10000000027 | 03249200027 | 0000000000000 | 0001000000100 | 1 | 9 | 9 | 9 | 8 |
| 083 | 624 | −02531126837 | 10000000027 | 03249200027 | 0000000000000 | 0001000000100 | 1 | 9 | 9 | 9 | 8 |
| 084 | 290 | −02531126837 | 10000000027 | 03249200027 | 0000000000000 | 0001000000100 | 1 | 9 | 9 | 9 | 8 |
| 085 | 564 | −02531126837 | 10000000027 | 03249200027 | 0000000000000 | 0001000000100 | 1 | 9 | 9 | 9 | 8 |
| 086 | 0A0 | −02531126837 | 10000000027 | 03249200027 | 0000000000000 | 0001000000100 | 1 | 9 | 9 | 9 | 8 |
| 0A0 | 7C0 | −02531126837 | 10000000027 | 03249200027 | 0000000000000 | 0001000000100 | 1 | 9 | 9 | 9 | 8 |
| 0A1 | 100 | −02531126837 | 10000000027 | 03249200027 | 0000000000000 | 0001000000100 | 1 | 9 | 9 | 9 | 8 |
| 100 | 5A4 | −02531126837 | 10000000027 | 03249200027 | 0000000000000 | 0001000000100 | 1 | 9 | 9 | 9 | 8 |
| 101 | 30C | −02531126837 | 10000000027 | 03249200027 | 0000000000000 | 0001000000100 | 1 | 9 | 9 | 9 | 8 |
| 102 | 5A5 | −02531126827 | 10000000027 | 03249200027 | 0000000000000 | 0001000000100 | 1 | 9 | 9 | 9 | 8 |
| 103 | 7FB | −02531126827 | 10000000027 | 03249200027 | 0000000000000 | 0001000000100 | 1 | 9 | 9 | 9 | 8 |
| 104 | 2FF | −02531126827 | 10000000027 | 03249200027 | 0000000000000 | 0001000000100 | 1 | 9 | 9 | 9 | 8 |
| 105 | 664 | −02531126827 | 10000000027 | 03249200027 | 0000000000000 | 0001000000100 | 0 | 9 | 9 | 9 | 8 |
| 106 | 30A | −02531126827 | 10000000027 | 03249200027 | 0000000000000 | 0001000000100 | 1 | 9 | 9 | 9 | 8 |
| 10A | 5E5 | −02531126826 | 10000000027 | 03249200027 | 0000000000000 | 0001000000100 | 1 | 9 | 9 | 9 | 8 |
| 10B | 100 | −02531126826 | 10000000027 | 03249200027 | 0000000000000 | 0001000000100 | 1 | 9 | 9 | 9 | 8 |
| 100 | 5A4 | −02531126826 | 10000000027 | 03249200027 | 0000000000000 | 0001000000100 | 1 | 9 | 9 | 9 | 8 |
| 101 | 30C | −02531126826 | 10000000027 | 03249200027 | 0000000000000 | 0001000000100 | 1 | 9 | 9 | 9 | 8 |
| 102 | 5A5 | −02531126816 | 10000000027 | 03249200027 | 0000000000000 | 0001000000100 | 1 | 9 | 9 | 9 | 8 |
| 103 | 7EB | −02531126816 | 10000000027 | 03249200027 | 0000000000000 | 0001000000100 | 1 | 9 | 9 | 9 | 8 |
| 104 | 2FF | −02531126816 | 10000000027 | 03249200027 | 0000000000000 | 0001000000100 | 1 | 9 | 9 | 9 | 8 |
| 105 | 664 | −02531126816 | 10000000027 | 03249200027 | 0000000000000 | 0001000000100 | 0 | 9 | 9 | 9 | 8 |
| 106 | 30A | −02531126816 | 10000000027 | 03249200027 | 0000000000000 | 0001000000100 | 1 | 9 | 9 | 9 | 8 |
| 10A | 5E5 | −02531126815 | 10000000027 | 03249200027 | 0000000000000 | 0001000000100 | 1 | 9 | 9 | 9 | 8 |
| 10B | 100 | −02531126815 | 10000000027 | 03249200027 | 0000000000000 | 0001000000100 | 1 | 9 | 9 | 9 | 8 |
| 100 | 5A4 | −02531126815 | 10000000027 | 03249200027 | 0000000000000 | 0001000000100 | 1 | 9 | 9 | 9 | 8 |
| 101 | 30C | −02531126815 | 10000000027 | 03249200027 | 0000000000000 | 0001000000100 | 1 | 9 | 9 | 9 | 8 |
| 102 | 5A5 | −02531126805 | 10000000027 | 03249200027 | 0000000000000 | 0001000000100 | 1 | 9 | 9 | 9 | 8 |
| 103 | 7EB | −02531126805 | 10000000027 | 03249200027 | 0000000000000 | 0001000000100 | 1 | 9 | 9 | 9 | 8 |
| 104 | 2FF | −02531126805 | 10000000027 | 03249200027 | 0000000000000 | 0001000000100 | 1 | 9 | 9 | 9 | 8 |
| 105 | 664 | −02531126805 | 10000000027 | 03249200027 | 0000000000000 | 0001000000100 | 0 | 9 | 9 | 9 | 8 |
| 106 | 30A | −02531126805 | 10000000027 | 03249200027 | 0000000000000 | 0001000000100 | 1 | 9 | 9 | 9 | 8 |
| 10A | 5E5 | −02531126804 | 10000000027 | 03249200027 | 0000000000000 | 0001000000100 | 1 | 9 | 9 | 9 | 8 |
| 10B | 100 | −02531126804 | 10000000027 | 03249200027 | 0000000000000 | 0001000000100 | 1 | 9 | 9 | 9 | 8 |
| 100 | 5A4 | −02531126804 | 10000000027 | 03249200027 | 0000000000000 | 0001000000100 | 0 | 9 | 9 | 9 | 8 |
| 101 | 30C | −02531126804 | 10000000027 | 03249200027 | 0000000000000 | 0001000000100 | 1 | 9 | 9 | 9 | 8 |
| 10C | 76B | −02531126804 | 10000000027 | 03249200027 | 0000000000000 | 0001000000100 | 1 | 9 | 9 | 9 | 8 |
| 10D | 7E9 | −02531126804 | 10000000027 | 03249200027 | 0000000000000 | 0001000000100 | 1 | 9 | 9 | 9 | 8 |

TABLE VII-continued

EXAMPLE INSTRUCTION TRACE . . . DATA CARD 157 ($7.79 −= $) . . .

| | | | | | | | | | | | |
|---|---|---|---|---|---|---|---|---|---|---|---|
| 10E | 31E | −02531126804 | 10000000027 | 03249200027 | 0000000000000 | 0001000000100 | 1 | 9 | 9 | 9 | 8 |
| 10F | 4E4 | −02531126804 | 10000000027 | 03249200027 | 0000000000000 | 0001000000100 | 1 | 9 | 9 | 9 | 8 |
| 110 | 116 | −02531126804 | 10000000027 | 03249200027 | 0000000000000 | 0001000000100 | 1 | 9 | 9 | 9 | 8 |
| 116 | 7E1 | −02531126804 | 10000000027 | 03249200027 | 0000000000000 | 0001000000100 | 1 | 9 | 9 | 9 | 8 |
| 117 | 31E | −02531126804 | 10000000027 | 03249200027 | 0000000000000 | 0001000000100 | 1 | 9 | 9 | 9 | 8 |
| 118 | 418 | −10000000027 | 02531126804 | 03249200027 | 0000000000000 | 0001000000100 | 1 | 9 | 9 | 9 | 8 |
| 119 | 401 | −00000000000 | 02531126804 | 03249200027 | 0000000000000 | 0001000000100 | 1 | 9 | 9 | 9 | 8 |
| 11A | 400 | −00000000000 | 02531126804 | 03249200027 | 0000000000000 | 0001000000100 | 1 | 9 | 9 | 9 | 9 |
| 11B | 420 | −00000000000 | 02531126804 | 03249200027 | 0000000000000 | 0001000000100 | 1 | 9 | 9 | 9 | 9 |
| 11C | 321 | −00000000000 | 02531126804 | 03249200027 | 0000000000000 | 0001000000100 | 1 | 9 | 9 | 9 | 9 |
| 11D | 418 | −02531126804 | 00000000000 | 03249200027 | 0000000000000 | 0001000000100 | 1 | 9 | 9 | 9 | 9 |
| 11E | 7C7 | −02531126804 | 00000000000 | 03249200027 | 0000000000000 | 0001000000100 | 1 | 9 | 9 | 9 | 9 |
| 11F | 250 | −02531126804 | 00000000000 | 03249200027 | 0000000000000 | 0001000000100 | 1 | 9 | 9 | 9 | 9 |
| 120 | 049 | −02531126804 | 00000000000 | 03249200027 | 0000000000000 | 0001000000100 | 1 | 9 | 9 | 9 | 9 |
| 049 | 407 | −02531126804 | 00000000000 | 02531126804 | 0000000000000 | 0001000000100 | 1 | 9 | 9 | 9 | 9 |
| 04A | 74A | −02531126804 | 00000000000 | 02531126804 | 0000000000000 | 0001000000100 | 1 | 9 | 9 | 9 | 9 |
| 04B | 7EA | −02531126804 | 00000000000 | 02531126804 | 0000000000000 | 0001000000100 | 0 | 9 | 9 | 9 | 9 |
| 04C | 04E | −02531126804 | 00000000000 | 02531126804 | 0000000000000 | 0001000000100 | 1 | 9 | 9 | 9 | 9 |
| 04D | 70A | −02531126804 | 00000000000 | 02531126804 | 0000000000100 | 0001000000100 | 1 | 9 | 9 | 9 | 9 |
| 04E | 6C1 | −02531126804 | 00000000000 | 02531126804 | 0000000000100 | 0001000000100 | 1 | 9 | 9 | 9 | 9 |
| 04F | 6C2 | −02531126804 | 00000000000 | 02531126804 | 0000000000100 | 0001000000100 | 1 | 9 | 9 | 9 | 9 |
| 050 | 763 | −02531126804 | 00000000000 | 02531126804 | 0000000000100 | 0000000000100 | 1 | 9 | 9 | 9 | 9 |
| 051 | 724 | −02531126804 | 00000000000 | 02531126804 | 0000000000100 | 0000100000100 | 1 | 9 | 9 | 9 | 9 |
| 052 | 004 | −02531126804 | 00000000000 | 02531126804 | 0000000000100 | 0000100000100 | 1 | 9 | 9 | 9 | 9 |
| 004 | 400 | −02531126804 | 00000000000 | 02531126804 | 0000000000100 | 0000100000100 | 1 | 9 | 9 | 9 | 9 |
| 005 | 762 | −02531126804 | 00000000000 | 02531126804 | 0000000000100 | 0000100000100 | 1 | 9 | 9 | 9 | 9 |
| 006 | 400 | −02531126804 | 00000000000 | 02531126804 | 0000000000100 | 0000100000100 | 1 | 9 | 9 | 9 | 9 |
| 007 | 460 | −02531126804 | 00000000000 | 02531126804 | 0000000000100 | 0000100000100 | 1 | 9 | 8 | 8 | 9 |
| 008 | 204 | −02531126804 | 00000000000 | 02531126804 | 0000000000100 | 0000100000100 | 1 | 9 | 8 | 8 | 9 |
| 009 | 400 | −02531126804 | 00000000000 | 02531126804 | 0000000000100 | 0000100000100 | 1 | 9 | 9 | 9 | 9 |
| 00A | 460 | −02531126804 | 00000000000 | 02531126804 | 0000000000100 | 0000100000100 | 0 | 9 | 8 | 8 | 9 |
| 00B | 400 | −02531126804 | 00000000000 | 02531126804 | 0000000000100 | 0000100000100 | 0 | 9 | 9 | 9 | 9 |
| 00C | 009 | −02531126804 | 00000000000 | 02531126804 | 0000000000100 | 0000100000100 | 1 | 9 | 9 | 9 | 9 |
| 00D | 400 | −02531126804 | 00000000000 | 02531126804 | 0000000000100 | 0000100000100 | 1 | 9 | 9 | 9 | 9 |
| 00E | 400 | −02531126804 | 00000000000 | 02531126804 | 0000000000100 | 0000100000100 | 1 | 9 | 9 | 9 | 9 |

TABLE VIII

Problems with the [+] [−] [=] Keyboard Configuration

| Problem | Key | Display |
|---|---|---|
| −a − b + c = | [C] | 0 |
| | [−] | 0 |
| | a | −a |
| | [−] | −a |
| | b | −b |
| | [+] | (−a − b) |
| | c | c |
| | [=] | (−a − b + c) |
| a ÷ b³ = | [C] | 0 |
| | [K]↓ | 0 |
| | a | a |
| | [÷] | a |
| | b | b |
| | [=] | (a/b) |
| | [=] | (a/b²) |
| | [=] | (a/b³) |
| a⁴ = | [C] | 0 |
| | [K]↓ | 0 |
| | a | a |
| | [×] | a |
| | [=] | (a²) |
| | [=] | (a³) |
| | [=] | (a⁴) |

TABLE VIII-continued

Problems with the [+] [-] [=] Keyboard Configuration

| Problem | Key | Display |
|---|---|---|
| a ÷ b = | [C] | 0 |
| c ÷ b = | [K]↓ | 0 |
| d ÷ b = | a | a |
|  | [÷] | a |
|  | b | b |
|  | [=] | (a/b) |
|  | c | c |
|  | [=] | (c/b) |
|  | d | d |
|  | [=] | (d/b) |
| a⁴ × b = | [C] | 0 |
|  | [K]↓ | 0 |
|  | a | a |
|  | [×] | a |
|  | b | b |
|  | [=] | (ab) |
|  | [=] | (a²b) |
|  | [=] | (a³b) |
|  | [=] | (a⁴b) |
| (−a) × b = | [C] | 0 |
|  | [−] | 0 |
|  | a | −a |
|  | [×] | −a |
|  | b | b |
|  | [=] | −(ab) |
| a ÷ (−b) = | [C] | 0 |
|  | a | a |
|  | [÷] | a |

TABLE VIII-continued

Problems with the [+] [-] [=] Keyboard Configuration

| Problem | Key | Display |
|---|---|---|
|  | b | b |
|  | [+/−] | −b |
|  | [=] | −(a/b) |
| a × (−b) ÷ (−c) = | [C] | 0 |
|  | a | a |
|  | [×] | a |
|  | b | b |
|  | [+/−] | −b |
|  | [÷] | −(ab) |
|  | c | c |
|  | [+/−] | −c |
|  | [=] | (ab/c) |
| $\frac{(a+b-c) \times d}{e} - f =$ | [C] | 0 |
|  | a | a |
|  | [+] | a |
|  | b | b |
|  | [−] | (a + b) |
|  | c | −c |
|  | [×] | (a + b − c) |
|  | d | d |
|  | [÷] | (a + b − c)d |
|  | e | e |
|  | [−] | (a + b − c)d/e |
|  | f | −f |
|  | [=] | (a + b − c)d/e − f |
| a × b = | [C] | 0 |
| a × c = | [K]↓ | 0 |
| a × d = | a | a |
|  | [×] | a |

TABLE VIII-continued

Problems with the [+] [-] [=] Keyboard Configuration

| Problem | Key | Display |
|---|---|---|
| | b | b |
| | [=] | (ab) |
| | c | c |
| | [=] | (ac) |
| | d | d |
| | [=] | (ad) |

FIG. 22A gives a key to the flowchart notation; the shape of the box is used to distinguish the various classes of instructions, and the inscriptions in the box are used to specify the particular instruction within the indicated class.

The circular symbol is used for labels, as for example, the GO and CONT labels on FIG. 22A. Rectangles symbolize assignments. For register operation arrow notation is used with subscripts indicative of the Digit Mask. For flag operations, with the extra-lined rectangle, the instruction is given, along with either mnemonic or alpha numeric to identification of the flag(s) to be so modified. The oval symbol is used for all test operations, including Test Flag, Compare Flag, and Compare Register instructions. The diamond symbol is used for Branch Conditional instructions, where the indicated conditions relate to the preceding test or register (carry/borrow) operation. The hexagonal symbol is used for WAIT operations. In addition to the WAIT condition, for example, D11 or KN, associated operations, for example Add One, are also indicated.

Referring to FIG. 22B through T, the program flowcharts can be corresponded to the linear program Table VI as follows:

In Table VI the first three-digit column counts the ROM locations (PC values) in hexadecimal code from $000_{16}$ ($0_{10}$) through $13F_{16}$ ($319_{10}$). The next eleven-bit column reflect the binary-code contents of the ROM which is programmed at each of the PC locations, that is the IR code which would be detected and executed if the PC value became equivalent to that indicated, row by row. The next column gives programming labels by which some routines are known. The next column gives the instruction mnemonic, as described in the functional description section above. The remainder of the table is devoted to comments relating to the operational meaning of the instructions, as appropriate. The ROM locations of individual instructions on the flowcharts FIG. 22 are indicated by the three-digit hexadecimal codes in proximity of the instruction symbol.

Referring to FIG. 22B, the basic control routine is shown which connects the four basic operation (+,−,×, ÷) routines and determines the current operation and previous operation status by means of the flag test and update decision tree shown. The linear program is given in Table VI beginning at location 040, label MIN (corresponding to =) and continuing through location 057, with an "always branch" to LOCK.

Referring to FIG. 22C, the routines for Clear Entry (CE), Decimal Point (DPT), Clear (C), and Data Entry are shown. Clear is located at 000 through 003 and provides means to clear all flags and the A and C registers, returning to LOCK. Clear Entry is at location 058 and branches to the 02 routine at 021 to clear the A register and related flags. Data Entry is the control routine for input of number key and decimal point switch routines, beginning at location 01E.

Referring to FIG. 22D, all operating routines terminate in LOCK which provides means for suppression of double-key entry and multiple execution of single operation entries by testing for quiescence (open-circuit) of all momentary keyboard inputs. LOCK resides at locations 004 through 008, branching to IDLE on confirmation of quiescence. In two WAIT loops at locations 009 through 010, IDLE provides means for defeating leading-edge key bounce and transient noise.

Referring to FIG. 22E, OPN provides means for polling of keyboard operation inputs (KO keys) to determine which operation is being requested. This is accomplished with a list of Branch Conditional instructions, where the sequence of their execution corresponds to the order of key connections to the Digit scanning outputs, and by means of the WAIT D11 instruction to synchronize the polling to the scan cycle, and by association of KO→Cond with the WAIT instruction to permit conditional branching on the state of the keyboard inputs. OPN is located between 011 and 01D on the ROM and terminates with a jump to Data Entry for numeric inputs, if no previous jump is executed.

Referring to FIG. 22F, NBR provides means for polling and scan-encoding the numeric keyboard inputs, for example number keys and Point Position Switches. This is done by the single instruction WAIT(D11+KN) at location 03A by means of association of (A−1→A) to subtract "one" from the mantissa of A for each instruction cycle of the wait.

Referring to FIGS. 22G, H, I, J, K, L, and M, the Add/Substract (AS) and Prenormalize (PRE) are shown. These routines involve a variety of testing and formating procedures in addition to the actual performance of ADD or SUBSTRACT.

Referring to FIGS. 22N, O,P,Q,R,S, and T, the Multiply/Divide (MD) and Postnormalize (POST) are shown. These routines employ repetitive additions and substractions in combination with shift, test, and counting procedures in order to accomplish the desired function.

FIG. 23 illustrates the physical relationship between the above described signals and functions of the present embodiment and the packaging techniques of contemporary integrated circuit technology. For example, the input/output terminals of the present embodiment can be connected to a ceramic or plastic package lead frame using wire conductors and thermal compression bonding to provide means for allowing the system to become more accessible to conventional DIP/printed circuit board handling and usage.

In the described MOS embodiment of the calculator system of the invention, $V_{SS}-V_{DD}$ and $V_{DD}-V_{GG}$ are for example, nominally 7.2 volts under normal operating conditions (8.1 volts maximum; 6.6 volts minimum). The clock (φ) frequency is nominally 250 KHz, minimum 200 KHz and maximum 330 KHz.

Programming of the Calculator System for Non-calculator Functions

The calculator system of the present invention is a variable function calculator system in that it may be programmed to perform functions other than the desk top calculator functions previously described. The variable functionability of the system is essentially provided by the programmability of various subsystems such as the programmable read-only-memory and the programmable logic arrays utilized in the system. As previously stated, these programmable subsystems are programmed during the fabrication of MOS or MIS embodiments by merely modifying the gate-insulator mask.

In further calculator embodiments, a large number of diverse functions utilizing additional keys on a keyboard and/or additional programs stored in the ROM could provide a system including, for example, right shift, exchange operand, square root, exponential operations, logarithmic operations, double and triple zero operation, and key sequence recognition.

Being that the calculator system of the invention includes program control, data control arithmetic and logic means and input/output subsystems in various embodiments the system may be programmed to perform non-calculator functions. For example, the calculator system May be programmed to perform meter functions such as for a digital volt meter, event counting, meter smoothing, taxi-fare meter, an odometer, scale meter to measure weight, etc. The system may also be programmed to perform cash register operations, act as a controller, arithmetic teaching unit, clock, display decoder, automobile rally computer, etc.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. An electronic system for preventing malfunction of key switch encoding comprising:

A. key switches, each having a quiescent state to block a signal from passing through the key switch and an information entry state to pass a signal through the key switch for entering information into the system;

B. memory circuits containing instruction words for operating the system; and

C. a single monolithic integrated semiconductor including the memory circuits, which include read only memory containing the instruction words, processor circuits, output terminals and input terminals, the output terminals being separate from the input terminals and the terminals being coupled to the key switches, the output terminals carrying sequences of active state output signals coupled to the key switches and the input terminals carrying input, signals occurring in response to the active state output signals passing through key switches in an information entry state, the output and input signals effecting a scanning of the key switches that is subject to malfunction, the processor circuits being coupled to the terminals and to the memory circuits and the processor circuits operating the system in response to executing the instruction words, the system including prevent means for preventing malfunction of the key switch scanning by executing at least one instruction word that results in a delay before distinguishing a key switch in an information entry state from a malfunction, and the system including defeat means for defeating double key entry after completing an operation by detecting the states of the key switches through the terminals to determine whether some key switch is still in the information entry state, and, if so, then waiting a length of time by executing at least one instruction word and again detecting the states of the key switches through the terminals until a condition is detected that no key switch is in an information entry state before again responding to any key switch being in an information entry state.

2. The system of claim 1 in which the processor circuits include:

A. arithmetic logic circuits operating in response to receiving control signals, and data storage circuits;

B. selector circuits interconnecting input and output of the arithmetic logic circuits with the data storage circuits in response to receiving control signals;

C. addressing circuits coupled to the read only memory for selecting sequences of instruction words from the read only memory for controlling operation of the processor circuits in response to receiving control signals; and D. control circuits coupled to the terminals and coupled to the read only memory to receive the sequences of instruction words, in response to each instruction word the control circuits generating the control signals that are coupled to the arithmetic logic circuits, the selector circuits, and the addressing circuits; and E. the prevent means including the addressing circuits and the control circuits.

3. The system of claim 1 in which the processor circuits operate the system in response to executing a series of instruction words for a wait operation, a scan operation, a wait operation and a branch conditional operation to detect that some key switch is in an information entry state.

4. The system of claim 3 in which the prevent means include a series of instruction words for executing two wait operations, a scan operation and a branch conditional operation to effect the delay.

5. The system of claim 1 in which the processor circuits operate the system in response to executing a series of instruction words for a wait operation, a flag assignment. operation, a wait operation, a scan operation and a branch conditional operation to detect a condition that no key switch is in an information entry state before again responding to any key switch being in an information entry state.

6. The system of claim 5 in which the prevent means include a series of instruction words for executing a wait operation, a flag assignment operation, a wait operation, a scan operation and a branch conditional operation to delay a length of time before again detecting the states of the key switches through the terminals until a condition is detected that no key switch is in an information entry state before again responding to any key switch being in an information entry state.

7. The system of claim 1 in which the delay effected by the prevent means is 2.5 milliseconds.

8. An electronic system for preventing malfunction of key switch encoding comprising:

A. key switches, each having a quiescent state and an information entry state for entering information into the system;

B. memory circuits containing instruction words for operating the system; and

C. a single monolithic integrated semiconductor including the memory circuits, which include read only memory containing the instruction words, processor circuits, output terminals and input terminals, the output terminals being separate from the input terminals and the terminals being coupled to the key switches, the processor circuits being coupled to the terminals and to the memory circuits and the processor circuits operating the system in response to executing the instruction words, the system including:
i. debounce means for indicating within the processor circuits that some key switch is still in the information entry state after a delay that results by executing at least one instruction word after detecting through the terminals that some key switch indicates an information entry state;
ii. operating means for completing plural instruction words to perform an operation associated with the key switch that is in the information entry state; and
iii. defeat means for defeating double key entry after completing the operation by detecting the states of the key switches through the terminals to determine whether some key switch is still in the information entry state, and, if so, then waiting a length of time by executing at least one instruction word and again detecting the states of the key switches through the terminals until a condition is detected that no key switch is in an information entry state before again responding to any key switch being in an information entry state.

9. The system of claim 8 in which the processor circuits include:
A. arithmetic logic circuits operating in response to receiving control signals, and data storage circuits;
B. selector circuits interconnecting input and output of the arithmetic logic circuits with the data storage circuits in response to receiving control signals;
C. addressing circuits coupled to the read only memory for selecting sequences of instruction words from the read only memory for controlling operation of the processor circuits in response to receiving control signals; and
D. control circuits coupled to the terminals and coupled to the read only memory to receive the sequences of instruction words, in response to each instruction word the control circuits generating the control signals that are coupled to the arithmetic logic circuits, the selector circuits, and the addressing circuits; and
E. the debounce means and the defeat means including the addressing circuits and the control circuits.

10. An electronic system for preventing malfunction of key switch encoding comprising:
A. key switches, each having a quiescent state and an information entry state for entering information into the system;
B. memory circuits containing instruction words for operating the system; and
C. a single monolithic integrated semiconductor including the memory circuits, which include read only memory containing the instruction words, processor circuits, output terminals and input terminals, the output terminals being separate from the input terminals and the terminals being coupled to the key switches, the processor circuits being coupled to the terminals and to the memory circuits and the processor circuits operating the system in response to executing the instruction words, the system including;
debounce means for indicating within the processor circuits that some key switch is still in the information entry state after a delay that results by executing at least one instruction word after detecting through the terminals that some key switch indicates an information entry state.

11. The system of claim 10 in which the processor circuits include:
A. arithmetic logic circuits operating in response to receiving control signals, and data storage circuits;
B. selector circuits interconnecting input and output of the arithmetic logic circuits with the data storage circuits in response to receiving control signals;
C. addressing circuits coupled to the read only memory for selecting sequences of instruction words from the read only memory for controlling operation of the processor circuits in response to receiving control signals; and
D. control circuits coupled to the terminals and coupled to the read only memory to receive the sequences of instruction words, in response to each instruction word the control circuits generating the control signals that are coupled to the arithmetic logic circuits, the selector circuits, and the addressing circuits; and
E. the debounce means including the addressing circuits and the control circuits.

12. The system of claim 8 or 10 in which the debounce means include a series of instruction words for executing a wait operation, a scan operation, a wait operation and a branch conditional operation to detect that some key switch indicates the information entry state.

13. The system of claim 8 or 10 in which the debounce means include a series of instruction words for executing two wait operations, a scan operation and a branch conditional operation to effect the delay.

14. The system of claim 8 or 10 in which the delay effected by the debounce means is 2.5 milliseconds.

15. An electronic system for preventing malfunction of key switch encoding comprising:
A. key switches, each having a quiescent state and an information entry state for entering information into the system;
B. memory circuits containing instruction words for operating the system; and
C. a single monolithic integrated semiconductor including the memory circuits, which include read only memory containing the instruction words, processor circuits, output terminals and input terminals, the output terminals being separate from the input terminals and the terminals being coupled to the key switches, the processor circuits being coupled to the terminals and to the memory circuits and the processor circuits operating the system in response to executing the instruction words, the system including:
defeat means for defeating double key entry after the processor circuits complete an operation indicated by a key switch being in an information entry state by detecting the states of the key switches through the terminals to determine whether some key switch is still in the information entry state, and, if so, then waiting a length of time by executing at least one instruction word and again detecting the states of the key switches through the terminals until a condition is detected that no key switch is in an information entry state before again responding to any key switch being in an information entry state.

16. The system of claim 15 in which the processor circuits include:
A. arithmetic logic circuits operating in response to receiving control signals, and data storage circuits;

B. selector circuits interconnecting input and output of the arithmetic logic circuits with the data storage circuits in response to receiving control signals;

C. addressing circuits coupled to the read only memory for selecting sequences of instruction words from the read only memory for controlling operation of the processor circuits in response to receiving control signals; and D. control circuits coupled to the terminals and coupled to the read only memory to receive the sequences of instruction words, in response to each instruction word, the, control circuits generating the control signals that are coupled to the arithmetic logic circuits, the selector circuits, and the. addressing circuits; and E. the defeat means including the addressing circuits and the control circuits.

17. The system of claim 8 or 15 in which the defeat means include a series of instruction words for executing a wait operation, a flag assignment operation, a wait operation, a scan operation and a branch conditional operation to detect a condition that no key switch is in an information entry state before again responding to any key switch being in a information entry state.

18. The system of claim 1, 8, 10, or 15 in which the processor circuits include output scanner circuits connected to the key switches through the output terminals, state and timing generator circuits having digit decoder circuits that drive the output scanner circuits, and key input logic circuits having outputs connected to the processor circuits and being connected to the key switches through the input terminals.

19. The system of claim 1, 8, 10 or 15 in which the key switches include keys that are operated momentarily and exclusively.

20. The system of claim 1, 8, 10 or 15 including a display coupled to the processor circuits.

21. The system of claim 1, 8, 10 or 15 in which the processing circuits operate in bit-parallel.

22. The system of claim 1, 8, 10 or 15 in which the information to be entered associates only operation with each key switch.

23. The system of claim 1, 8, 10 or 15 in which the system is a calculator.

24. The system of claim 1, 8, 10 or 15 in which the output terminals connect to the key switches.

25. The system of claim 1, 8, 10 or 15 in which the input terminals connect to the key switches.

26. The system of claim 1, 8, 10 or 15 in which the output and input terminals connect to the key switches.

27. The system of claim 1, 8, 10 or 15 in which the processor circuits include a state and digit timing generator (194) having a digit decoder (593) with eleven digit decoder leads, connected to and driving output scanner circuits (197), the output scanner circuits having eleven 2-input NAND gates (604) respectively connected to the eleven digit decoder leads and to a digit BLANK signal (606), which blocks the digit decoder outputs for interdigit blanking, the outputs of the eleven 2-input NAND gates connecting to eleven respective output buffer circuits (605) that drive eleven respective output terminals (576) connected to the keys (340), the keys are arranged in a matrix of eleven columns and four rows with each output terminal connected respectively to one column of keys, and key input logic circuits (196) having four input terminals (576) connected respectively to the four rows of keys, the processor circuits including jump condition circuits (522) having four condition selector gates (514), and the key input logic circuits including four output lines respectively connecting the four input terminals to the four condition selector gates.

28. The system of claim 1, 8, 10 or 15 in which the output terminals connect to the key switches.

29. The system of claim 1, 8, 10 or 15 in which the input terminals connect to the key switches.

30. The system of claim 1, 8, 10 or 15 in which the output terminals and input terminals connect to the key switches.

31. A process of preventing malfunction of key switch encoding in an electronic system that includes key switches, each having a quiescent state to block a signal from passing through the key switch and an information entry state to pass a signal through the key switch for entering information into the system, memory circuits containing instruction words for operating the system, and a single monolithic integrated semiconductor including the memory circuits, which include read only memory containing the instruction words, processor circuits, output terminals and input terminals, the output terminals being separate from the input terminals and the terminals being coupled to the key switches, the processor circuits being coupled to the terminals and to the memory circuits and the processor circuits operating the system in response to executing the instruction words, the process comprising:

i. effecting a scanning of the key switches that is subject to malfunction by producing on the output terminals sequences of active state output signals that are coupled to the key switches, and receiving on the input terminals active state input signals that occur in response to the active state output signals passing through the key switches in an information entry state; and ii. preventing malfunction of the key switch scanning by executing at least one instruction word that results in a delay before distinguishing a key switch in an information entry state from a malfunction.

32. The process of claim 31 in which the effecting a scanning includes executing a series of instruction words effecting a wait operation, a scan operation, a wait operation and a branch conditional operation to detect the states of the key switches.

33. The process of claim 32 in which the preventing includes executing a series of instruction words effecting two wait operations, a scan operation and a branch conditional operation to effect the delay.

34. The process of claim 31 in which the effecting a scanning includes executing a series of instruction words for a wait operation, a flag assignment operation, a wait operation, a scan operation and a branch conditional operation to detect a condition that no key switch is in an information entry state before again responding to any key switch being in a information entry state.

35. The process of claim 34 in which the preventing includes executing a series of instruction words for a wait operation, a flag assignment operation, a wait operation, a scan operation and a branch conditional operation to delay a length of time before again detecting the states of the key switches through the terminals until a condition is detected that no key switch is in an information entry state before again responding to any key switch being in a information entry state.

36. The process of claim 31 in which the preventing includes effecting a delay of 2.5 milliseconds.

37. A process of preventing malfunction of key switch encoding in an electronic system that includes key switches, each having a quiescent state and an information entry state for entering information into the system, memory circuits containing instruction words for operating the system, and a single monolithic integrated semiconductor including the memory circuits, which include read only memory containing the instruction words, processor circuits, output terminals and input terminals, the output terminals being separate from the input terminals and the terminals being coupled to the key switches, the processor circuits being coupled to the terminals and the memory circuits and the processor circuits operating the system in response to executing the instruction words, the process comprising:

i. detecting through the terminals that some key switch indicates an information entry state;
  ii. effecting a delay by executing at least one of the instruction words;
  iii. detecting through the terminals that some key switch is still in a information entry state after the delay;
  iv. completing a series of instruction words to perform an operation associated with the key switch that is in the information entry state; and
  v. detecting the states of the key switches through the terminals to determine whether some key switch is still in the information entry state, and, if so, then waiting a length of time by executing at least one instruction word and again detecting the states of the key switches through the terminals until a condition is detected that no key switch is in an information entry state before again responding to any key switch being in an information entry state.

38. A process of preventing malfunction of key switch encoding in an electronic system that includes key switches, each having a quiescent state and having an information entry state for entering information into the system, memory circuits containing instruction words for operating the system, and a single monolithic integrated semiconductor including the memory circuits, which include read only memory containing the instruction words, processor circuits, output terminals and input terminals, the output terminals being separate from the input terminals and the terminals being coupled to the key switches, the processor circuits being coupled to the terminals and to the memory circuits and the processor circuits operating the system in response to executing the instruction words, the process comprising:

i. detecting through the terminals that some key switch indicates an information entry state;
  ii. effecting a delay by executing at least one of the instruction words;
  iii. detecting through the terminals that some key switch is still in an information entry state after the delay; and
  iv. completing a series of instruction words to perform an operation associated with the key switch that is in the information entry state.

39. The process of claim 37 or 38 in which detecting through the terminals that some key switch indicates an information entry state includes executing a series of instruction words effecting a wait operation, a scan operation, a wait operation and a branch conditional operation.

40. The process of claim 37 or 38 in which effecting a delay includes executing a series of instruction words effecting two wait operations, a scan operation and a branch conditional operation.

41. The process of claim 37 or 38 in which effecting a delay includes effecting a delay of 2.5 milliseconds.

42. A process of preventing malfunction of key switch encoding in an electronic system that includes key switches, each having a quiescent state and an information entry state for entering information into the system, memory circuits containing instruction words for operating the system, and a single monolithic integrated semiconductor including the memory circuits, which include read only memory containing the instruction words, processor circuits, output terminals and input terminals, the output terminals being separate from the input terminals and the terminals being coupled to the key switches, the processor circuits being coupled to the terminals and to the memory circuits and the processor circuits operating the system in response to executing the instruction words, the process comprising:

i. completing a series of instruction words to perform an operation associated with information entered in the system by a key switch being in an information entry state; and
  ii. detecting the states of the key switches through the terminals to determine whether some key switch is still in an information entry state, and, if so, then waiting a length of time by executing at least one instruction word and again detecting the states of the key switches through the terminals until a condition is detected that no key switch is in an information entry state before again responding to any key switch being in an information entry state.

43. The process of claim 37 or 42 in which the detecting the states of the key switches through the terminals includes executing a series of instruction words for a wait operation, a flag assignment operation, a wait operation, a scan operation and a branch conditional operation to detect a condition that no key switch is in an information entry state before again responding to any key switch being in a information entry state.

44. The process of claim 31, 37, 38 or 42 in which the processor circuits include:

A. arithmetic logic circuits operating in response to receiving control signals, and data storage circuits;
  B. selector circuits interconnecting input and output of the arithmetic logic circuits with the data storage circuits in response to receiving control signals;
  C. addressing circuits coupled to the read only memory for selecting sequences of instruction words from the read only memory for controlling operation of the processor circuits in response to receiving control signals; and
  D. control circuits coupled to the terminals and coupled to the read only memory to receive the sequences of instruction words, in response to each instruction word the control circuits generating the control signals that are coupled to the arithmetic logic circuits, the selector circuits, and the addressing circuits.

45. The process of claim 31, 37, 38 or 42 including driving the key switches through the output terminals, digit scanner circuits, and digit decoder circuits from state and timing generator circuits that are also driving states and timing of the processor circuits, and connecting driven outputs from the key switches to the processor circuits through the input terminals and key input circuits.

46. The process of claim 31, 37, 38 or 42 in which the key switches include keys that are operated momentarily and exclusively.

47. The process of claim 31, 37, 38, or 42 including coupling a display to the processor circuits.

48. The process of claim 31, 37, 38 or 42 including operating the processing circuits in bit-parallel.

49. The process of claim 31, 37, 38 or 42 including associating only one operation with each key switch.

50. The process of claim 31, 37, 38 or 42 in which the system is a calculator.

51. The process of claim 31, 37, 38 or 42 including connecting the output terminals to the key switches.

52. The process of claim 31, 37, 38 or 42 including connecting the input terminals to the key switches.

53. The process of claim 31, 37, 38 or 42 including connecting the output and input terminals to the key switches.

54. The process of claim 31, 37, 38 or 42 including:
   a. producing eleven respective digit decoder signals from a state and digit timing generator (194) having a digit decoder (593),
   b. driving eleven respective NAND gates (604) with the digit decoder signals and a digit BLANK signal (606), which blocks the digit decoder outputs for interdigit blanking,
   c. driving eleven respective output buffer circuits (605) from outputs of the eleven NAND gates,
   d. driving eleven respective output terminals (576) connected to the keys (340) from the output buffer circuits,
   e. arranging the keys in a matrix of eleven columns and four rows,
   f. connecting each output terminal to one respective column of keys,
   g. connecting four input terminals (576) of key input logic circuits (196) respectively to the four rows of keys, and
   h. connecting the four input terminals respectively to four condition selector gates of jump condition circuits (522) in the processor circuits.

55. The process of claim 31, 37, 38, or 42 including connecting the output terminals to the key switches.

56. The process of claim 31, 37, 38, or 42 including connecting the input terminals to the key switches.

57. The process of claim 31, 37, 38, or 42 including connecting the output terminals and input terminals to the key switches.

58. A monolithic integrated semiconductor device comprising:
   A. a single monolithic integrated semiconductor including memory circuits, which include read only memory containing instruction words;
   B. output terminals and input terminals on the semiconductor, the output terminals being separate from the input terminals and the terminals being adapted for coupling to key switches off of the substrate, each key switch having a quiescent state to block a signal from passing through the key switch and an information entry state to pass a signal through the key switch for entering information into the device, the output terminals carrying sequences of active state output signals coupled to the key switches and the input terminals carrying input signals that occur in response to the active state output signals passing through key switches in an information entry state, the output and input signals effecting a scanning of the key switches that is subject to malfunction; and
   C. processor circuits on the semiconductor coupled to the output terminals and input terminals and to the memory circuits, the processor circuits for operating the device in response to executing the instruction words, the device including prevent means for preventing malfunction of key switch scanning by executing at least one instruction word that results in a delay in distinguishing a key switch in an information entry state from a malfunction.

59. The device of claim 58 in which the processor circuits include:
   A. arithmetic logic circuits operating in response to receiving control signals, and data storage circuits;
   B. selector circuits interconnecting input and output of the arithmetic logic circuits with the data storage circuits in response to receiving control signals;
   C. addressing circuits coupled to the read only memory for selecting sequences of instruction words from the read only memory for controlling operation of the processor circuits in response to receiving control signals; and
   D. control circuits coupled to the terminals and coupled to the read only memory to receive the sequences of instruction words, in response to each instruction word the control circuits generating the control signals that are coupled to the arithmetic logic circuits, the selector circuits, and the addressing circuits; and
   E. the prevent means including the addressing circuits and the control circuits.

60. The device of claim 58, in which the processor circuits operate the system in response to executing a series of instruction words for a wait operation, a scan operation, a wait operation and a branch conditional operation to detect that some key switch is in an information entry state.

61. The device of claim 60 in which the prevent means include a series of instruction words for executing two wait operations, a scan operation and a branch conditional operation to effect the delay.

62. The device of claim 58 in which the processor circuits operate the system in response to executing a series of instruction words for a wait operation, a flag assignment operation, a wait operation, a scan operation and a branch conditional operation to detect a condition that no key switch is in an information entry state before again responding to any key switch being in an information entry state.

63. The device of claim 62 in which the prevent means include a series of instruction words for executing a wait operation, a flag assignment operation, a wait operation, a scan operation and a branch conditional operation to delay a length of time before again detecting the states of the key switches through the terminals until a condition is detected that no key switch is in an information entry state before again responding to any key switch being in an information entry state.

64. The device of claim 58 in which the delay effected by the prevent means is 2.5 milliseconds.

65. A monolithic integrated semiconductor device comprising:
   A. a single monolithic integrated semiconductor including memory circuits, which include read only memory containing instruction words;
   B. output terminals and input terminals on the semiconductor, the output terminals being separate from the input terminals and the terminals being adapted for coupling to key switches off of the substrate, each key switch having a quiescent state and an information entry state for entering information into the device; and
   C. processor circuits on the semiconductor coupled to the output and input terminals and to the memory circuits, the processor circuits for operating the device in response to executing the instruction words, the device including:
      i. debounce means for indicating within the processor circuits that some key switch is still in the information entry state after a delay that results by executing at least one instruction word after detecting through the terminals that some key switch indicates an information entry state;

ii. operating means for completing a plurality of instruction words to perform an operation associated with the key switch that is in the information entry state; and iii. defeat means for defeating double key entry after completing the operation by detecting the states of the key switches through the terminals to determine whether some key switch is still in the information entry state, and, if so, then waiting a length of time by executing at least one instruction word and again detecting the states of the key switches through the terminals until a condition is detected that no key switch is in an information entry state before again responding to any key switch being in an information entry state.

66. The device of claim 65 in which the processor circuits include:

A. arithmetic logic circuits operating in response to receiving control signals, and data storage circuits;

B. selector circuits interconnecting input and output of the arithmetic logic circuits with the data storage circuits in response to receiving control signals;

C. addressing circuits coupled to the read only memory for selecting sequences of instruction words from the read only memory for controlling operation of the processor circuits in response to receiving control signals; and D. control circuits coupled to the terminals and coupled to the read only memory to receive the sequences of instruction words, in response to each instruction word the control circuits generating the control signals that are coupled to the arithmetic logic circuits, the selector circuits, and the addressing circuits; and E. the debounce means and the defeat means including the addressing circuits and the control circuits.

67. A monolithic integrated semiconductor device comprising:

A. a single monolithic integrated semiconductor including memory circuits, which include read only memory containing instruction words;

B. output terminals and input terminals on the semiconductor, the output terminals being separate from the input terminals and the terminals being adapted for coupling to key switches off of the substrate, each key switch having a quiescent state and an information entry state for entering information into the device; and C. processor circuits on the semiconductor coupled to the output and input terminals and to the memory circuits, the processor circuits for operating the device in response to executing the instruction words, the device including:

debounce means for indicating within the processor circuits that some key switch is still in the information entry state after a delay that results by executing at least one instruction word after detecting through the terminals that some key switch indicates an information entry state.

68. The device of claim 67 in which the processor circuits include:

A. arithmetic logic circuits operating in response to receiving control signals, and data storage circuits;

B. selector circuits interconnecting input and output of the arithmetic logic circuits with the data storage circuits in response to receiving control signals;

C. addressing circuits coupled to the read only memory for selecting sequences of instruction words from the read only memory for controlling operation of the processor circuits in response to receiving control signals; and D. control circuits coupled to the terminals and coupled to the read only memory to receive the sequences of instruction words, in response to each instruction word the control circuits generating the control signals that are coupled to the arithmetic logic circuits, the selector circuits, and the addressing circuits; and E. the debounce means including the addressing circuits and the control circuits.

69. The device of claim 65 or 67 in which the debounce means include a series of instruction words for executing a wait operation, a scan operation, a wait operation and a branch conditional operation to detect that some key switch indicates the information entry state.

70. The device of claim 65 or 67 in which the debounce means include a series of instruction words for executing two wait operations, a scan operation and a branch conditional operation to effect the delay.

71. The device of claim 65 or 67 in which the delay effected by the debounce means is 2.5 milliseconds.

72. A monolithic integrated semiconductor device comprising:

A. a single monolithic integrated semiconductor including memory circuits, which include read only memory containing instruction words;

B. output terminals and input terminals on the semiconductor, the output terminals being separate from the input terminals and the terminals being adapted for coupling to key switches off of the substrate, each key switch having a quiescent state and having an information entry state for entering information into the device; and C. processor circuits on the semiconductor coupled to the output terminals and input terminals and to the memory circuits, the processor circuits for operating the device in response to executing the instruction words, the device including:

defeat means for defeating double key entry after completing an operation indicated by a key switch being in an information entry state by detecting the states of the key switches through the terminals to determine whether some key switch is still in the information entry state, and, if so, then waiting a length of time by executing at least one instruction word and again detecting the states of the key switches through the terminals until a condition is detected that no key switch is in an information entry state before again responding to any key switch being in an information entry state.

73. The device of claim 72 in which the processor circuits include:

A. arithmetic logic circuits operating in response to receiving control signals, and data storage circuits;

B. selector circuits interconnecting input and output of the arithmetic logic circuits with the data storage circuits in response to receiving control signals;

C. addressing circuits coupled to the read only memory for selecting sequences of instruction words from the read only memory for controlling operation of the processor circuits in response to receiving control signals; and D. control circuits coupled to the terminals and coupled to the read only memory to receive the sequences of instruction words, in response to each instruction word, the control circuits generating the control signals that are coupled to the arithmetic logic circuits, the selector circuits, and the addressing circuits; and E. the defeat means including the addressing circuits and the control circuits.

74. The device of claim 65 or 72 in which the defeat means include a series of instruction words for executing a wait operation, a flag assignment operation, a wait operation, a scan operation and a branch conditional operation to detect a condition that no key switch is in an information entry state before again responding to any key switch being in an information entry state.

75. The device of claim 58, 65, 67 or 72 in which the processor circuits include output scanner circuits adapted for connection to the key switches through the output terminals, state and timing generator circuits having digit decoder circuits that drive the output scanner circuits, and key input logic circuits having outputs connected to the processor circuits and adapted for connection to the key switches through the input terminals.

76. The device of claim 58, 65, 67 or 72 in which the key switches include keys that are operated momentarily and exclusively.

77. The device of claim 58, 65, 67 or 72 including a display adapted for coupling to the processor circuits.

78. The device of claim 58, 65, 67 or 72 in which the processing circuits operate in bit-parallel.

79. The device of claim 58, 65, 67 or 72 in which the information to be entered associates only one operation with each key switch.

80. The device of claim 58, 65, 67 or 72 in which the device operates as a calculator.

81. The device of claim 58, 65, 67 or 72 in which the output terminals are adapted to be connected to the key switches.

82. The device of claim 58, 65, 67 or 72 in which the input terminals are adapted to be connected to the key switches.

83. The device of claim 58, 65, 67 or 72 in which the output and input terminals are adapted to be connected to the key switches.

84. The device of claim 58, 65, 67 or 72 in which the processor circuits include a state and digit timing generator (194) having a digit decoder (593) with eleven digit decoder leads connected to and driving output scanner circuits (197), the output scanner circuits having eleven 2-input NAND gates (604) respectively connected to the eleven digit decoder leads and to a digit BLANK signal (606), which blocks the digit decoder outputs for interdigit blanking, the outputs of the eleven 2-input NAND gates connecting to eleven respective output buffer circuits (605) that drive eleven respective output terminals (576) adapted to be connected to the keys (340), the keys are arranged in a matrix of eleven columns and four rows with each output terminal adapted to be connected respectively to one column of keys, and key input logic circuits (196) having four input terminals (576) adapted to be connected respectively to the four rows of keys, the processor circuits including jump condition circuits (522) having four condition selector gates (514), and the key input logic circuits including four output lines respectively connecting the four input terminals to the four condition selector gates.

85. The device of claim 58, 65, 67 or 72 in which the output terminals are adapted to be connected to the key switches.

86. The device of claim 58, 65, 67 or 72 in which the input terminals are adapted to be connected to the key switches.

87. The device of claim 58, 65, 67 or 72 in which the output terminals and input terminals are adapted to be connected to the key switches.

88. An electronic system for preventing malfunction of key switch encoding comprising:

A. key switches, each having a quiescent state to block a signal from passing through the key switch and an information entry state to pass a signal through the key switch for entering information into the system;

B. memory circuits containing instruction words for operating the system; and

C. a single monolithic integrated semiconductor including processor circuits, output terminals and input terminals, the output terminals being separate from the input terminals and the terminals being coupled to the key switches, the output terminals carrying sequences of active state output signals coupled to the key switches and the input terminals carrying input signals occurring in response to the active state output signals passing through key switches in an information entry state, the output and input signals effecting a scanning of the key switches that is subject to malfunction, the processor circuits being coupled to the terminals and to the memory circuits and the processor circuits operating the system in response to executing the instruction words, and the system including prevent means for preventing malfunction of the key switch scanning by executing at least one instruction word that results in a delay before distinguishing a key switch in an information entry state from a malfunction;

D. the semiconductor including the memory circuits, which include read only memory containing the instruction words, and the processor circuits including:
  i. arithmetic logic circuits operating in response to receiving control signals, and data storage circuits;
  ii. selector circuits interconnecting input and output of the arithmetic logic circuits with the data storage circuits in response to receiving control signals;
  iii. addressing circuits coupled to the read only memory for selecting sequences of instruction words from the read only memory for controlling operation of the processor circuits in response to receiving control signals;
  iv. control circuits coupled to the terminals and coupled to the read only memory to receive the sequences of instruction words, in response to each instruction word the control circuits generating the control signals that are coupled to the arithmetic logic circuits, the selector circuits, and the addressing circuits; and
  v. the scanning means and the prevent means including the addressing circuits and the control circuits;

E. the scan means including a series of instruction words for executing a wait operation, a flag assignment operation, a wait operation, a scan operation and a branch conditional operation to detect a condition that no key switch is in an information entry state before again responding to any key switch being in an information entry state;

F. the prevent means including a series of instruction words for executing a wait operation, a flag assignment operation, a wait operation, a scan operation and a branch conditional operation to delay a length of time before again detecting the states of the key switches through the terminals until a condition is detected that no key switch is in an information entry state before again responding to any key switch being in an information entry state;

G. the delay effected by the prevent means is 2.5 milliseconds; and

H. the processor circuits including a state and digit timing generator (194) having a digit decoder (593) with eleven digit decoder leads connected to and driving output scanner circuits (197), the output scanner circuits having eleven 2-input NAND gates (604) respectively connected to the eleven digit decoder leads and to a digit BLANK signal (606), which blocks the digit decoder outputs for interdigit blanking, the outputs of the eleven 2-input NAND gates connecting to eleven respective output buffer circuits (605) that drive eleven respective output terminals (576) connected to the keys (340), the keys are arranged in a matrix of eleven columns and four rows with each output terminal connected respectively to one column of keys, and key input logic circuits (196) having four input terminals (576) connected respectively to the four rows of keys, the processor circuits including jump condition circuits (522) having four condition selector gates (514), and the key input logic circuits including four output lines respectively connecting the four input terminals to the four condition selector gates.

89. A process of operating an electronic system comprising:

A. scanning key switches that are each subject to malfunction by producing on one of plural output terminals of a single monolithic integrated semiconductor an output signal that is coupled to the key switches;

B. receiving on one of plural input terminals of the single monolithic integrated semiconductor, which are separate from the output terminals, an input signal that occurs in response to the output signal being applied to a key switch that is in an active state; and C. preventing malfunction of the key switch scanning by executing at least one instruction word on the single monolithic integrated semiconductor, which includes read only memory circuits containing the instruction words, that results in a delay before distinguishing the key switch in an active state.

90. The process of claim 89 in which the preventing includes reading an instruction word from the memory circuits on the monolithic integrated semiconductor and executing that instruction word in processor circuits on that monolithic integrated semiconductor.

91. An electronic system comprising:

A. an array of key switches arranged in columns and rows, each key switch having an inactive state and an active state, for entering information into the system; and B. a single monolithic integrated semiconductor including processor circuits, read only memory circuits containing instruction words for operating the system, and output terminals and input terminals, the output terminals being separate from the input terminals, the output terminals being connected to one of either of the columns and rows of key switches and the input terminals being connected to the other of either of the columns and rows of key switches, the output terminals carrying sequences of output signals coupled to the key switches and the input terminals carrying input signals occurring in response to the output signals being applied to the key switches in an active state, the output and input signals effecting a scanning of the key switches that is subject to malfunction, the processor circuits being coupled to the terminals and to the memory circuits and the processor circuits operating the system in response to executing the instruction words, and the processor circuits executing at least one instruction word that results in a delay before distinguishing a key switch in an active state.

* * * * *